US009552188B1

(12) United States Patent
Qureshey et al.

(10) Patent No.: US 9,552,188 B1
(45) Date of Patent: *Jan. 24, 2017

(54) METHOD AND DEVICE FOR DISPLAYING SUPPLEMENTAL INFORMATION WHILE RENDERING A PLAYLIST

(71) Applicant: Black Hills Media, LLC, Wilmington, DE (US)

(72) Inventors: Safi Qureshey, Santa Ana, CA (US); Daniel D. Sheppard, Brea, CA (US)

(73) Assignee: Black Hills Media, LLC, Wilmington ( * ) Notice: Subject to any disclaimer, the term of this patent is extended or adjusted under 35 U.S.C. 154(b) by 0 days.

This patent is subject to a terminal disclaimer.

(21) Appl. No.: 14/256,226

(22) Filed: Apr. 18, 2014

Related U.S. Application Data

(63) Continuation of application No. 13/282,758, filed on Oct. 27, 2011, now Pat. No. 8,755,763, which is a
(Continued)

(51) Int. Cl.
H04B 1/06 (2006.01)
H05K 11/00 (2006.01)
(Continued)

(52) U.S. Cl.
CPC ..................... G06F 3/167 (2013.01)

(58) Field of Classification Search
CPC .............. G06F 17/30749; G06F 21/10; G06F 17/30775; G06F 17/30772; G06F 15/16; G06Q 30/0641; H04B 1/08; H04H 20/38; H04H 20/82; H04H 60/06; H04H 60/74; H04L 12/2812; H04L 29/06027; H04L 65/4076; H04L 65/4084; H04L 67/00; H04L 2012/2849; H04M 3/5307; H04M 3/533; H04M 7/0006; H04M 2201/60
(Continued)

(56) References Cited

U.S. PATENT DOCUMENTS 3,291,919 A 12/1966 Robitaille
3,609,227 A 9/1971 Kuljian
(Continued)

FOREIGN PATENT DOCUMENTS

EP 0663737 7/1995
EP 0789502 8/1997
(Continued)

OTHER PUBLICATIONS

Non-Published U.S. Appl. No. 09/653,964 to Steve Perlman, filed Sep. 1, 2000 (first publicly available Mar. 30, 2010) 98 pages.
(Continued)

Primary Examiner — Pablo Tran

(57) ABSTRACT

A media player device and method for receiving and playing a playlist is provided. The device has a transceiver to wirelessly send and receive communication, a memory, a control system connected to the memory and the transceiver, and at least one speaker to play the plurality of songs. The control system and method receive a command to log into an account before receiving a playlist, receive and display the playlist identifying a plurality of songs in a menu with context sensitive icons representing different functions, receive and display information associated with an artist from a currently playing song of the plurality of songs in the playlist, receive and display information on a related song that is from a genre similar to that of one of the currently playing song, and receive and display advertising. The method provides for the speaker to play the plurality of songs.

24 Claims, 49 Drawing Sheets

Related U.S. Application Data continuation of application No. 11/563,232, filed on Nov. 27, 2006, now Pat. No. 8,050,652, which is a continuation of application No. 09/805,470, filed on Mar. 12, 2001, now abandoned, which is a continuation-in-part of application No. 09/096,703, filed on Jun. 12, 1998, now abandoned.

(60) Provisional application No. 60/246,842, filed on Nov. 8, 2000, provisional application No. 60/072,127, filed on Jan. 22, 1998.

(51) Int. Cl.
*G06F 15/16* (2006.01)
*H04N 5/445* (2011.01)
*G06F 3/16* (2006.01)

(58) Field of Classification Search
USPC ............. 455/3.02, 3.06, 142, 150.1, 151.1, 151.2,455/154.1, 154.2, 158.1, 158.2, 158.4, 186.1,455/344, 414.1, 414.3, 456.2, 556.1, 557; 709/217, 219; 725/39, 45, 18
See application file for complete search history.

(56) References Cited

U.S. PATENT DOCUMENTS

| | | |
|---|---|---|
| 4,357,710 A | 11/1982 | Kramer et al. |
| 4,682,370 A | 7/1987 | Matthews |
| 4,720,873 A | 1/1988 | Goodman et al. |
| 4,788,675 A | 11/1988 | Jones et al. |
| 4,829,500 A | 5/1989 | Saunders |
| 4,920,432 A | 4/1990 | Eggers et al. |
| 5,035,438 A | 7/1991 | Cronquist |
| 5,119,188 A | 6/1992 | McCalley et al. |
| 5,127,003 A | 6/1992 | Doll, Jr. et al. |
| 5,129,036 A | 7/1992 | Dean et al. |
| 5,132,992 A | 7/1992 | Yurt et al. |
| 5,134,719 A | 7/1992 | Mankovitz |
| 5,168,481 A | 12/1992 | Culbertson et al. |
| 5,189,630 A | 2/1993 | Barstow et al. |
| 5,191,573 A | 3/1993 | Hair |
| 5,192,999 A | 3/1993 | Graczyk et al. |
| 5,215,466 A | 6/1993 | Rubio |
| 5,262,875 A | 11/1993 | Mincer et al. |
| 5,282,028 A | 1/1994 | Johnson et al. |
| 5,305,438 A | 4/1994 | MacKay et al. |
| 5,349,678 A | 9/1994 | Morris et al. |
| 5,351,276 A | 9/1994 | Doll, Jr. et al. |
| 5,355,302 A | 10/1994 | Martin et al. |
| 5,396,417 A | 3/1995 | Burks et al. |
| 5,414,455 A | 5/1995 | Hooper et al. |
| 5,418,713 A | 5/1995 | Allen |
| 5,440,334 A | 8/1995 | Walters et al. |
| 5,440,336 A | 8/1995 | Buhro et al. |
| 5,442,701 A | 8/1995 | Guillou et al. |
| 5,455,570 A | 10/1995 | Cook et al. |
| 5,475,835 A | 12/1995 | Hickey |
| 5,481,535 A | 1/1996 | Hershey |
| 5,512,935 A | 4/1996 | Majeti et al. |
| 5,526,284 A | 6/1996 | Mankovitz |
| 5,534,913 A | 7/1996 | Majeti et al. |
| 5,539,635 A | 7/1996 | Larson, Jr. |
| 5,544,161 A | 8/1996 | Bigham et al. |
| 5,550,576 A | 8/1996 | Klosterman |
| 5,553,126 A | 9/1996 | Tang |
| 5,557,541 A | 9/1996 | Schulhof et al. |
| 5,568,645 A | 10/1996 | Morris et al. |
| 5,570,134 A | 10/1996 | Hong |
| 5,572,442 A | 11/1996 | Schulhof et al. |
| 5,577,128 A | 11/1996 | Farinelli |
| 5,581,461 A | 12/1996 | Coll et al. |
| 5,581,479 A | 12/1996 | McLaughlin et al. |
| 5,583,763 A | 12/1996 | Atcheson et al. |
| 5,592,511 A | 1/1997 | Schoen et al. |
| 5,594,779 A | 1/1997 | Goodman |
| 5,616,876 A | 4/1997 | Cluts |
| 5,617,565 A | 4/1997 | Augenbraun et al. |
| 5,618,045 A | 4/1997 | Kagan |
| 5,625,608 A | 4/1997 | Grewe et al. |
| 5,629,867 A | 5/1997 | Goldman |
| 5,636,211 A | 6/1997 | Newlin et al. |
| 5,640,193 A | 6/1997 | Wellner |
| 5,652,841 A | 7/1997 | Nemirovsky et al. |
| 5,654,886 A | 8/1997 | Zereski, Jr. et al. |
| 5,661,787 A | 8/1997 | Pocock |
| 5,671,436 A | 9/1997 | Morris et al. |
| 5,673,322 A | 9/1997 | Pepe et al. |
| 5,682,525 A | 10/1997 | Bouve et al. |
| 5,684,799 A | 11/1997 | Bigham et al. |
| 5,703,795 A | 12/1997 | Mankovitz |
| 5,706,427 A | 1/1998 | Tabuki |
| 5,710,970 A | 1/1998 | Walters et al. |
| 5,721,827 A | 2/1998 | Logan et al. |
| 5,727,048 A | 3/1998 | Hiroshima et al. |
| 5,732,216 A | 3/1998 | Logan et al. |
| 5,734,719 A | 3/1998 | Anderson et al. |
| 5,734,893 A | 3/1998 | Li et al. |
| 5,740,035 A | 4/1998 | Cohen et al. |
| 5,758,257 A | 5/1998 | Herz et al. |
| 5,768,527 A | 6/1998 | Zhu et al. |
| 5,781,889 A | 7/1998 | Martin et al. |
| 5,790,426 A | 8/1998 | Robinson |
| 5,790,935 A | 8/1998 | Payton |
| 5,793,980 A | 8/1998 | Glaser et al. |
| 5,794,217 A | 8/1998 | Allen |
| 5,805,154 A | 9/1998 | Brown |
| 5,809,246 A | 9/1998 | Goldman |
| 5,812,765 A | 9/1998 | Curtis |
| 5,812,937 A | 9/1998 | Takahisa et al. |
| 5,815,662 A | 9/1998 | Ong |
| 5,818,510 A | 10/1998 | Cobbley et al. |
| 5,818,512 A | 10/1998 | Fuller |
| 5,819,160 A | 10/1998 | Foladare et al. |
| 5,819,273 A | 10/1998 | Vora et al. |
| 5,828,839 A | 10/1998 | Moncreiff |
| 5,832,499 A | 11/1998 | Gustman |
| 5,844,893 A | 12/1998 | Gollnick et al. |
| 5,850,340 A | 12/1998 | York |
| 5,852,610 A | 12/1998 | Olaniyan |
| 5,855,015 A | 12/1998 | Shoham |
| 5,857,149 A | 1/1999 | Suzuki |
| 5,862,171 A | 1/1999 | Mahany |
| 5,864,682 A | 1/1999 | Porter et al. |
| 5,870,390 A | 2/1999 | Campanella |
| 5,873,045 A | 2/1999 | Lee et al. |
| 5,874,986 A | 2/1999 | Gibbon et al. |
| 5,878,223 A | 3/1999 | Becker et al. |
| 5,878,429 A | 3/1999 | Morris et al. |
| 5,880,721 A | 3/1999 | Yen |
| 5,884,048 A | 3/1999 | Takano |
| 5,890,152 A | 3/1999 | Rapaport et al. |
| 5,892,536 A | 4/1999 | Logan et al. |
| 5,903,892 A | 5/1999 | Ali et al. |
| 5,905,865 A | 5/1999 | Palmer et al. |
| 5,907,831 A | 5/1999 | Lotvin et al. |
| 5,914,941 A | 6/1999 | Janky |
| 5,918,223 A | 6/1999 | Blum et al. |
| 5,920,856 A | 7/1999 | Syeda-Mahmood |
| 5,923,902 A | 7/1999 | Inagaki |
| 5,926,624 A | 7/1999 | Katz et al. |
| 5,930,765 A | 7/1999 | Martin |
| 5,933,822 A | 8/1999 | Braden-Harder et al. |
| 5,943,398 A | 8/1999 | Klein et al. |
| 5,943,422 A | 8/1999 | Van Wie et al. |
| 5,948,084 A | 9/1999 | Ha |
| 5,949,492 A | 9/1999 | Mankovitz |
| 5,949,877 A | 9/1999 | Traw et al. |
| 5,953,005 A | 9/1999 | Liu |
| 5,956,716 A | 9/1999 | Kenner et al. |
| 5,959,945 A | 9/1999 | Kleiman |
| 5,968,120 A | 10/1999 | Guedalia |

(56) References Cited

U.S. PATENT DOCUMENTS

| | | | |
|---|---|---|---|
| 5,973,722 A | 10/1999 | Wakai et al. |
| 5,973,724 A | 10/1999 | Riddle |
| 5,974,441 A | 10/1999 | Rogers et al. |
| 5,983,200 A | 11/1999 | Slotznick |
| 5,983,218 A | 11/1999 | Syeda-Mahmood |
| 5,986,692 A | 11/1999 | Logan et al. |
| 5,990,868 A | 11/1999 | Frederick |
| 5,991,306 A | 11/1999 | Burns et al. |
| 5,991,693 A | 11/1999 | Zalewski |
| 5,991,737 A | 11/1999 | Chen |
| 6,005,563 A | 12/1999 | White et al. |
| 6,006,225 A | 12/1999 | Bowman et al. |
| 6,009,422 A | 12/1999 | Ciccarelli |
| 6,012,086 A | 1/2000 | Lowell |
| 6,014,569 A | 1/2000 | Bottum |
| 6,018,522 A | 1/2000 | Schultz |
| 6,018,768 A | 1/2000 | Ullman et al. |
| 6,026,150 A | 2/2000 | Frank et al. |
| 6,029,165 A | 2/2000 | Gable |
| 6,032,202 A | 2/2000 | Lea |
| 6,035,350 A | 3/2000 | Swamy et al. |
| 6,038,591 A | 3/2000 | Wolfe et al. |
| 6,038,601 A | 3/2000 | Kemper et al. |
| 6,038,668 A | 3/2000 | Chipman et al. |
| 6,041,311 A | 3/2000 | Chislenko et al. |
| 6,041,326 A | 3/2000 | Amro et al. |
| 6,044,403 A | 3/2000 | Gerszberg et al. |
| 6,051,389 A | 4/2000 | Ahl et al. |
| 6,055,566 A | 4/2000 | Kikinis |
| 6,060,997 A | 5/2000 | Taubenheim et al. |
| 6,064,379 A | 5/2000 | DeMoney |
| 6,067,562 A | 5/2000 | Goldman |
| 6,081,830 A | 6/2000 | Schindler |
| 6,088,455 A | 7/2000 | Logan et al. |
| 6,088,722 A | 7/2000 | Herz et al. |
| 6,093,880 A | 7/2000 | Arnalds |
| 6,104,334 A | 8/2000 | Allport |
| 6,105,060 A | 8/2000 | Rothblatt |
| 6,122,658 A | 9/2000 | Chaddha |
| 6,122,757 A | 9/2000 | Kelley |
| 6,125,387 A | 9/2000 | Simonoff et al. |
| 6,128,663 A | 10/2000 | Thomas |
| 6,131,130 A | 10/2000 | Van Ryzin |
| 6,134,590 A | 10/2000 | Perlman |
| 6,157,411 A | 12/2000 | Williams et al. |
| 6,160,997 A | 12/2000 | Oberlaender |
| 6,161,132 A | 12/2000 | Roberts |
| 6,161,142 A | 12/2000 | Wolfe et al. |
| 6,166,735 A | 12/2000 | Dom et al. |
| 6,167,393 A | 12/2000 | Davis, III et al. |
| 6,169,573 B1 | 1/2001 | Sampath-Kumar et al. |
| 6,195,436 B1 | 2/2001 | Scibora et al. |
| 6,195,654 B1 | 2/2001 | Wachtel |
| 6,195,657 B1 | 2/2001 | Rucker et al. |
| 6,199,076 B1 | 3/2001 | Logan et al. |
| 6,204,885 B1 | 3/2001 | Kwoh |
| 6,212,282 B1 | 4/2001 | Mershon |
| 6,226,672 B1 | 5/2001 | DeMartin et al. |
| 6,233,430 B1 | 5/2001 | Helferich |
| 6,243,725 B1 | 6/2001 | Hempleman et al. |
| 6,243,760 B1 | 6/2001 | Armbruster et al. |
| 6,253,193 B1 | 6/2001 | Ginter |
| 6,263,507 B1 | 7/2001 | Ahmad et al. |
| 6,292,786 B1 | 9/2001 | Deaton et al. |
| 6,295,093 B1 | 9/2001 | Park et al. |
| 6,295,555 B1 | 9/2001 | Goldman |
| 6,335,927 B1 | 1/2002 | Elliott et al. |
| 6,339,693 B1 | 1/2002 | Chan |
| 6,345,289 B1 | 2/2002 | Lotspiech et al. |
| 6,354,748 B1 | 3/2002 | Vrvilo |
| 6,374,237 B1 | 4/2002 | Reese |
| 6,487,390 B1 | 11/2002 | Virine et al. |
| 6,505,160 B1 | 1/2003 | Levy et al. |
| 6,549,942 B1 | 4/2003 | Janky |
| 6,560,651 B2 | 5/2003 | Katz et al. |
| 6,567,847 B1 | 5/2003 | Inoue |
| 6,587,127 B1 | 7/2003 | Leeke et al. |
| 6,711,622 B1 | 3/2004 | Fuller et al. |
| 6,741,869 B1 | 5/2004 | Lehr |
| 6,823,225 B1 | 11/2004 | Sass |
| 6,839,705 B1 | 1/2005 | Grooters |
| 6,882,299 B1 | 4/2005 | Allport |
| 7,082,106 B2 | 7/2006 | Sharma et al. |
| 7,181,023 B1 | 2/2007 | Andrews et al. |
| 7,185,054 B1 | 2/2007 | Ludwig et al. |
| 7,188,352 B2 | 3/2007 | Nathan et al. |
| 7,206,838 B2 | 4/2007 | Boyd et al. |
| 8,045,952 B2 | 10/2011 | Qureshey et al. |
| 8,050,652 B2 | 11/2011 | Qureshey et al. |
| 8,214,873 B2 * | 7/2012 | Weel ............................. 725/141 |
| 8,316,015 B2 * | 11/2012 | Svendsen et al. ............ 707/722 |
| 8,787,164 B2 * | 7/2014 | Julia et al. .................... 370/232 |
| 8,788,080 B1 * | 7/2014 | Kallai et al. .................... 700/94 |
| 8,832,746 B2 * | 9/2014 | Pack et al. ...................... 725/52 |
| 8,843,228 B2 * | 9/2014 | Lambourne .................... 700/94 |
| 8,918,480 B2 | 12/2014 | Qureshey et al. |
| 2001/0053994 A1 | 12/2001 | Atcheson et al. |
| 2002/0072326 A1 | 6/2002 | Qureshey et al. |
| 2002/0161858 A1 | 10/2002 | Goldman |
| 2006/0072724 A1 | 4/2006 | Cohen et al. |
| 2007/0088804 A1 | 4/2007 | Qureshey et al. |
| 2007/0089132 A1 | 4/2007 | Qureshey et al. |
| 2007/0089135 A1 | 4/2007 | Qureshey et al. |
| 2007/0180063 A1 | 8/2007 | Qureshey et al. |
| 2008/0133520 A1 | 6/2008 | Hempleman et al. |
| 2012/0143729 A1 | 6/2012 | Qureshey et al. |

FOREIGN PATENT DOCUMENTS

| | | |
|---|---|---|
| GB | 2306869 | 5/1997 |
| JP | 09-081164 | 3/1997 |
| WO | WO 96/17451 | 6/1996 |
| WO | WO 97/26601 | 7/1997 |
| WO | WO 97/44747 | 11/1997 |

OTHER PUBLICATIONS

"Defendant Sonos Inc.'s Initial Disclosures," Civil Action No. 2:13-cv-06062, Oct. 28, 2013, 21 pages.

2:14-cv-471-BHM v. *Pioneer Corporation*, et al.—Pioneer/Yamaha Courtesy Invalidity Contentions, Jan. 29, 2014, 37 pages.

"3Com Demonstrates Kerbango Internet Radio at NAB Radio Show," San Francisco, CA, Sep. 21, 2000, 2 pages.

"3COM Plans to Acquire Kerbango, Developers of the First Internet Radio," Business Wire, Santa Clara, California, Jun. 27, 2000, 3 pages.

Alvear, Jose, "3Com to Acquire Kerbango for $80 Million," Streaming Media Magazine, Jun. 27, 2000.

U.S. Appl. No. 60/174,706, Palm, filed Jan. 6, 2000, 10 pages.

U.S. Appl. No. 60/212,831, Fleenor, filed Jun. 21, 2000, 14 pages.

Pachet, Francois, "A Combinatorial Approach to Content-based Music Selection," IEEE 1999.

Kouvelas, "A Combined Network, System and User Based Approach to improving the Quality of Multicast Audio," Department of Computer Science, University College London, May 1998, 125 pages.

Li, Yalun, "A Framework for Universal Personal Computing," Dept. of Electrical Engineering, The University of British Columbia, 1996.

Mauve, M., "A General Framework and Communication Protocol for the Real-Time Transmission of Interactive Media," Reihe Informatik 16/98, 16 pages.

Gbaguidi, C., et al., "A Generic Service Management Architecture for Multimedia Multipoint Communications," Swiss Federal Institute of Technology, Telecommunications Laboratory / Telecommunications Services Group (1995) 12 pages.

"A Music Revolution . . . SoundServer," imerge, publication date unknown, 2 pages.

"A Music Revolution . . . SoundServer," imerge, date unknown but obtained on or prior to Dec. 28, 2007, 2 pages.

(56) References Cited

OTHER PUBLICATIONS

Yang, et al., "A Real-Time Synchronization Model and Transport Protocol for Multimedia Applications," Copyright 1994 IEEE, Communications and Multimedia Laboratory, Department of Computer Science and Information Engineering, National Taiwan University, 8 pages.
"About Intermind's Channel Communications Patents," downloaded from <http://www.intermind.com/materials/patent_desc.html> on Feb. 27, 1998, 5 pages.
"About.com: http://quintura.com/," at <http://websearch.about.com/gi/dynamic/offisite.htm?zi=1/XJ&sdn=web...f=10&su=p284.8.150.ip_&tt=13&bt=0&bts=0&zu=http%3A//quintura.com/>, copyright 2007, Quintura Inc., printed Oct. 17, 2007, 2 pages.
Mao, Zhuoqing, "Achieving Service Portability in ICEBERG," EECS Dept., University of California at Berkeley, IEEE 2000.
"AddressBook:1 Service," For UPnP Verson 1.0, Standardized DCP (SDCP) Dec. 10, 2012, Document Version 1.0, Service Template Version 2.00, 35 pages.
Kawaguchi, N., et al., "Ad-Hoc On-Demand Communication System Based on Mobile Agents," Proceedings of the 3rd International Symposium on Wireless Personal Multimedia Communications (WPMC2000) 2000, 6 pages.
"AltaVista Radio Now Available on 3Com Kerbango Internet Tuning Service—The Heart of the Soon to be Released Kerbango Internet Radio," San Francisco, Sep. 21, 2000, NAB Radio Show, 3 pages.
"Amazon.com: Kerbango 100E Internet Radio: MP3 Players & Accessories," Amazon.com, first available Sep. 9, 1999) printed Sep. 2, 2013.
Kevin C. Almeroth et al., "An Alternative Paradigm for Scalable On-Demand Applications: Evaluating and Deploying the Interactive Multimedia Jukebox," IEEE Transactions on Knowledge and Data Engineering, vol. 11, No. 4, Jul./Aug. 1999, pp. 658-672, copyright 1999 IEEE, 15 pages.
Lingnau et al., "An HTTP-based Infrastructure for Mobile Agents," at <http://www.w3.org/Conferences/WWW4/Papers/150/>, 1995, pp. 1-15, printed Dec. 20, 1999, 15 pages.
"An introduction to the Synchronized Multimedia Integration Language," Editor Peiy Liu, Siemens Corporate Research, IEEE 1998.
"Announcing Liquid Player 5.0 Preview," http://web.archive.org/web/20000229110956/http://www.liquidaudio.com.
"anthony.liekens.net >> Music >> Cloud," at <http://anthony.liekens.net/index.php/Music/Cloud>, page last modified on Apr. 12, 2007, copyright 2000-2006, Anthony Liekens, printed Oct. 17, 2007, 4 pages.
"AOL Music Now," at <http://web.archive.org/web/20060508184531/aol.musicnow.com/az/home.jhtml?_requesti...>, copyright 2006, AOL Music Now LLC, printed Nov. 16, 2007, 1 page.
"Apple—iPod+ iTunes," at <http://www.apple.com/itunes/>, copyright 2007 by Paramount Pictures, printed Feb. 7, 2007, 2 pages.
Ramanathan, et al., "Architectures for Personalized Multimedia," IEEE MultiMedia (1994), vol. 1, Issue 1, 10 pages.
"Arrakis Digilink DC4-100," Protocol Update—Jul. 10, 2000, Arrakis Systems, Inc., 2 pages.
Helder, "Audio on Demand extensions to Jungle Monkey," University of Michigan, EECS 571 Project Report, Apr. 20, 1999.
"Audio Point: Welcome to the Coolest Way to Listed to Digital Music Over Your Conventional Stereo Equipment," Home Director, Inc., Revision Sep. 2002, 2 pages.
Dipert, B., ed., "Audio Receivers Tune in to Binary Broadcasts," Apr. 26, 2001, 5 pages.
Bloom, B., "Audio Request ARQ1-20 Home MP3/CD Player/Recorder With HD Storage," Equipment Review No. 2, Mar./Apr. 2001, Audiophile Audition, 7 pages.
"Audio Request: Music The Way You Want It," Copyright 2001, ReQuest, Inc., 75 pages.
"Audio ReQuest User Manual: ReQuest Serious Play," Copyright 2005, ReQuest, Inc., 44 pages.
"Audio ReQuest Users Manual for ARQTera ARQFusion ARQnitro ARQ2 Pro ARQ Zone ARQ1 Pro," ReQuest, Inc., date unknown, 63 pages.
Jonas, Karl, "Audio Streaming on the Internet Experiences with Real-Time Streaming of Audio Streams," German National Research Center for Information Technology (GMD), IEEE 1997.
"Audio Switcher Model CCSW84-01," Computer Concepts Corp. Digital Commercial System, Feb. 1991, 3 pages.
"AudioTron: Digital Music Player for Home Networks—Accessories," Turtle Beach Connected Audio, Feb. 12, 2003 (Archived at http://web.archive.org/web/20030212144240/http://www.turtlebeach.com/site/products/audiotron/accessories.asp) 2 pages.
"AudioTron: Digital Music Player for Home Networks—Accessories," Turtle Beach Connected Audio, Aug. 6, 2002 (Archived at http://web.archive.org/web/20020806183335/http://www.turtlebeach.com/site/products/audiotron/accessories.asp) 2 pages.
"AudioTron Digital Music and Internet Radio Player—Reference Manual," AudioTron Reference Manual, Version 3.0, May 2002, Copyright 2002 Voyetra Turtle Beach, Inc., 70 pages.
Heathering, B., "AudioTron Digital Music Player," Feb. 24, 2003, Home Toys Inc. Copyright 1996-2002 (Archived at http://web.archive.org...www.hometoys.com/htinews/apr01/reviews/audiotron/audiotron.com) 2 pages.
"AudioTron: Digital Music Player for Home Networks," Turtle Beach Connected Audio, Apr. 1, 2003 (Archived at http://web.archive.org/web/20030401095445/http://www.turtlebeach.com/site/products/audiotron/producthome.asp) 2 pages.
"AudioTron: Digital Music Player for Home Networks—Frequently Asked Questions," Turtle Beach Connected Audio, Feb. 12, 2003 (Archived at http://web.archive.org/web/20030212144110/http://www.turtlebeach.com/site/products/audiotron/faqs.asp) 10 pages.
"AudioTron: Digital Music Player for Home Networks—In Detail," Turtle Beach Connected Audio, Apr. 1, 2003 (Archived at http://web.archive.org/web/20030401211824/http://www.turtlebeach.com/site/products/audiotron/indetail.asp) 2 pages.
"AudioTron: Digital Music Player for Home Networks—In Detail," Turtle Beach Connected Audio, Jun. 9, 2002 (Archived at http://web.archive.org/web/20020609155522/http://www.turtlebeach.com/site/products/audiotron/indetail.asp) 2 pages.
"AudioTron: Digital Music Player for Home Networks—Partner Products," Turtle Beach Connected Audio, Feb. 2, 2003 (Archived at http://web.archive.org/web/20030202062712/http://www.turtlebeach.com/site/products/audiotron/partners.asp) 2 pages.
"AudioTron: Digital Music Player for Home Networks—Product Downloads," Turtle Beach Connected Audio, Aug. 7, 2002 (Archived at http://web.archive.org/web/20020807224358/http://www.turtlebeach.com/site/products/audiotron/downloads.asp) 1 page.
"AudioTron: Digital Music Player for Home Networks—Products & Awards," Turtle Beach Connected Audio, Feb. 10, 2003 (Archived at http://web.archive.org/web/20030210104730/http://www.turtlebeach.com/site/products/audiotron/reviews.asp) 3 pages.
"AudioTron: Digital Music Player for Home Networks—Product Reviews & Awards," Turtle Beach Connected Audio, Aug. 6, 2002 (Archived at http://web.archive.org/web/20020806184002/http://www.turtlebeach.com/site/products/audiotron/reviews.asp) 3 pages.
"AudioTron Setup Guide—Digital Music Player for Home Networks," Copyright 2001-2002, Voyetra Turtle Beach, Inc., 38 pages.
"AudioTron: Digital Music Player for Home Networks—Specifications," Turtle Beach Connected Audio, Feb. 2, 2003 (Archived at http://web.archive.org/web/20030202062309/http://www.turtlebeach.com/site/products/audiotron/specs.asp) 2 pages.
"AudioTron: Digital Music Player for Home Networks—Specifications," Turtle Beach Connected Audio, Aug. 6, 2002 (Archived at http://web.archive.org/web/20020806184248/http://www.turtlebeach.com/site/products/audiotron/specs.asp) 2 pages.
"AudioTron: Digital Music Player for Home Networks—Requirements," Turtle Beach Connected Audio, Feb. 2, 2003 (Archived at http://web.archive.org/web/20030202063415/http://www.turtlebeach.com/site/products/audiotron/whatdoineed.asp) 2 pages.
"AudioTron: Digital Music Player for Home Networks—System Requirements," Turtle Beach Connected Audio, Apr. 9, 2002

(56) References Cited

OTHER PUBLICATIONS (Archived at http://web.archive.org/web/20020409132409/http://www.turtlebeach.com/site/products/audiotron/whatdoineed.asp) 1 page.
"AudioTron: Digital Music Player for Home Networks—Top 10 Things to Look at Before You Buy a Digital Audio Receiver," Turtle Beach Connected Audio, Feb. 28, 2003 (Archived at http://web.archive.org/web/20030228031931/http://www.turtlebeach.com/site/products/audiotron/comparisons.asp) 2 pages.
"AudioTron: Digital Music Player for Home Networks—User Comments," Turtle Beach Connected Audio, Feb. 12, 2003 (Archived at http://web.archive.org/web/20030212144608/http://www.turtlebeach.com/site/products/audiotron/feedback.asp) 2 pages.
"AudioTron: Digital Music Player for Home Networks—User Comments," Turtle Beach Connected Audio, Aug. 7, 2002 (Archived at http://web.archive.org/web/20020807224930/http://www.turtlebeach.com/site/products/audiotron/feedback.asp) 2 pages.
"AudioTron: Digital Music Player for Home Networks—Product Downloads," Turtle Beach Connected Audio, Feb. 12, 2003 (Archived at http://web.archive.org/web/20030212145129/http://www.turtlebeach.com/site/products/audiotron/downloads.asp) 1 page.
AVS Forum, "CD Changers (200-300)," Jul. 22, 2000, 4 pages.
Buerk, L., et al, "AVTransport: 1 Service Template Version 1.01," for UPnP Version 1.0, Standardized DCP, Jun. 25, 2002, UPnP Forum, 67 pages.
"BasicManagement:1 Service Template Version 1.01," for UPnP Version 1.0, Standardized DCP (SDCP) Jul. 20, 2010, 72 pages.
"BasicManagement:2 Service Template Version 1.01," for UPnP Version 1.0, Standardized DCP (SDCP) Feb. 16, 2012, 145pages.
2:14-cv-471—*BHM* v. *Pioneer Corporation*, et al.—Pioneer/Yamaha Courtesy Invalidity Contentions—Exhibit C-1—Berman Chart—U.S. Pat. No. 6,502,194 to Berman, et al., directed to U.S. Pat. No. 8,045,952 to Qureshey, Jan. 29, 2014, 2 pages.
2:14-cv-471—*BHM* v. *Pioneer Corporation*, et al.—Pioneer/Yamaha Courtesy Invalidity Contentions—Exhibit C-10d—Kerbango Device Chart—Kerbango Radio 100E device, directed to U.S. Pat. No. 8,045,952 to Qureshey, Jan. 29, 2014, 16 pages.
2:14-cv-471—*BHM* v. *Pioneer Corporation*, et al.—Pioneer/Yamaha Courtesy Invalidity Contentions—Exhibit C-10p—Kerbango Press Chart—Kerbango Prior Art Press Publications, directed to U.S. Pat. No. 8,045,952 to Qureshey, Jan. 29, 2014, 11 pages.
2:14-cv-471—*BHM* v. *Pioneer Corporation*, et al.—Pioneer/Yamaha Courtesy Invalidity Contentions—Exhibit C-11—Perlman Chart—WIPO Publication No. WO 02/21841 to Perlman, directed to U.S. Pat. No. 8,045,952 to Qureshey, Jan. 29, 2014, 12 pages.
2:14-cv-471—*BHM* v. *Pioneer Corporation*, et al.—Pioneer/Yamaha Courtesy Invalidity Contentions—Exhibit C-12—Watson Chart—U.S. Pat. No. 7,693,992 to Watson, directed to U.S. Pat. No. 8,045,952 to Qureshey, Jan. 29, 2014, 14 pages.
2:14-cv-471—*BHM* v. *Pioneer Corporation*, et al.—Pioneer/Yamaha Courtesy Invalidity Contentions—Exhibit C-13—Sass Chart—U.S. Pat. No. 6,823,225 to Sass, directed to U.S. Pat. No. 8,045,952 to Qureshey, Jan. 29, 2014, 5 pages.
2:14-cv-471—*BHM* v. *Pioneer Corporation*, et al.—Pioneer/Yamaha Courtesy Invalidity Contentions—Exhibit C-2—Leeke Chart—U.S. Pat. No. 6,587,127 to Leeke, et al., directed to U.S. Pat. No. 8,045,952 to Qureshey, Jan. 29, 2014, 3 pages.
2:14-cv-471—*BHM* v. *Pioneer Corporation*, et al.—Pioneer/Yamaha Courtesy Invalidity Contentions—Exhibit C-3—Wolff Chart—U.S. Pat. No. 7,472,353 to Wolff, et al., directed to U.S. Pat. No. 8,045,952 to Qureshey, Jan. 29, 2014, 2 pages.
2:14-cv-471—*BHM* v. *Pioneer Corporation*, et al.—Pioneer/Yamaha Courtesy Invalidity Contentions—Exhibit C-4d—Lansonic DAS-750 Device Chart—Lansonic DAS-750 System, directed to U.S. Pat. No. 8,045,952 to Qureshey, Jan. 29, 2014, 11 pages.
2:14-cv-471—*BHM* v. *Pioneer Corporation*, et al.—Pioneer/Yamaha Courtesy Invalidity Contentions—Exhibit C-4w—Lansonic DAS-750 Website Chart—Lansonic Digital Audio Server DAS-750 Web Pages, directed to U.S. Pat. No. 8,045,952 to Qureshey, Jan. 29, 2014, 3 pages.
2:14-cv-471—*BHM* v. *Pioneer Corporation*, et al.—Pioneer/Yamaha Courtesy Invalidity Contentions—Exhibit C-5—Cluts Chart—U.S. Pat. No. 5,616,876 to Cluts, directed to U.S. Pat. No. 8,045,952 to Qureshey, Jan. 29, 2014, 3 pages.
2:14-cv-471—*BHM* v. *Pioneer Corporation*, et al.—Pioneer/Yamaha Courtesy Invalidity Contentions—Exhibit C-6—Johnson Chart—U.S. Pat. No. 7,451,177 to Johnson, et al., directed to U.S. Pat. No. 8,045,952 to Qureshey, Jan. 29, 2014, 4 pages.
2:14-cv-471—*BHM* v. *Pioneer Corporation*, et al.—Pioneer/Yamaha Courtesy Invalidity Contentions—Exhibit C-7—Langdon Chart—U.S. Pat. No. 7,734,688 to Langdon, directed to U.S. Pat. No. 8,045,952 to Qureshey, Jan. 29, 2014, 9 pages.
2:14-cv-471—*BHM* v. *Pioneer Corporation*, et al.—Pioneer/Yamaha Courtesy Invalidity Contentions—Exhibit C-8—Lipscomb Chart—U.S. Pat. No. 7,020,704 to Lipscomb, directed to U.S. Pat. No. 8,045,952 to Qureshey, Jan. 29, 2014, 11 pages.
2:14-cv-471—*BHM* v. *Pioneer Corporation*, et al.—Pioneer/Yamaha Courtesy Invalidity Contentions—Exhibit C-9d—Philips FW-i1000 Chart—Philips FW-i1000 (Fwi) Kerbango Device, directed to U.S. Pat. No. 8,045,952 to Qureshey, Jan. 29, 2014, 16 pages.
2:14-cv-471—*BHM* v. *Pioneer Corporation*, et al.—Pioneer/Yamaha Courtesy Invalidity Contentions—Exhibit C-9m—Philips FW-i1000 Manual—Philips Streamium FW-i1000 Manual, directed to U.S. Pat. No. 8,045,952 to Qureshey, Jan. 29, 2014, 3 pages.
2:14-cv-471—*BHM* v. *Pioneer Corporation*, et al.—Pioneer/Yamaha Courtesy Invalidity Contentions—Exhibit D-1—Leeke Chart—U.S. Pat. No. 6,587,127 to Leeke, et al., directed to U.S. Pat. No. 8,050,652 to Qureshey, Jan. 29, 2014, 6 pages.
2:14-cv-471—*BHM* v. *Pioneer Corporation*, et al.—Pioneer/Yamaha Courtesy Invalidity Contentions—Exhibit D-10—Perlman Chart—WIPO Publication No. WO 02/21841 to Perlman, directed to U.S. Pat. No. 8,050,652 to Qureshey, Jan. 29, 2014, 36 pages.
2:14-cv-471—*BHM* v. *Pioneer Corporation*, et al.—Pioneer/Yamaha Courtesy Invalidity Contentions—Exhibit D-11—Watson Chart—U.S. Pat. No. 7,693,992 to Watson, directed to U.S. Pat. No. 8,050,652 to Qureshey, Jan. 29, 2014, 109 pages.
2:14-cv-471—*BHM* v. *Pioneer Corporation*, et al.—Pioneer/Yamaha Courtesy Invalidity Contentions—Exhibit D-12—Langdon Chart—U.S. Pat. No. 7,734,688 to Langdon, directed to U.S. Pat. No. 8,050,652 to Qureshey, Jan. 29, 2014, 17 pages.
2:14-cv-471—*BHM* v. *Pioneer Corporation*, et al.—Pioneer/Yamaha Courtesy Invalidity Contentions—Exhibit D-13—Sass Chart—U.S. Pat. No. 6,823,225 to Sass, directed to U.S. Pat. No. 8,050,652 to Qureshey, Jan. 29, 2014, 15 pages.
2:14-cv-471—*BHM* v. *Pioneer Corporation*, et al.—Pioneer/Yamaha Courtesy Invalidity Contentions—Exhibit D-2—Berman Chart—U.S. Pat. No. 6,502,194 to Berman, et al. in view of WIPO Publication No. WO 99/38266 to Qureshey, et al., directed to U.S. Pat. No. 8,050,652 to Qureshey, Jan. 29, 2014, 5 pages.
2:14-cv-471—*BHM* v. *Pioneer Corporation*, et al.—Pioneer/Yamaha Courtesy Invalidity Contentions—Exhibit D-3d—Lansonic DAS-750 Device Chart—Lansonic DAS-750 System, directed to U.S. Pat. No. 8,050,652 to Qureshey, Jan. 29, 2014, 47 pages.
2:14-cv-471—*BHM* v. *Pioneer Corporation*, et al.—Pioneer/Yamaha Courtesy Invalidity Contentions—Exhibit D-3w—Lansonic DAS-750 Website Chart—Lansonic Digital Audio Server DAS-750 Web Pages, directed to U.S. Pat. No. 8,050,652 to Qureshey, Jan. 29, 2014, 6 pages.
2:14-cv-471—*BHM* v. *Pioneer Corporation*, et al.—Pioneer/Yamaha Courtesy Invalidity Contentions—Exhibit D-4—White Chart—U.S. Pat. No. 7,187,947 to White, et al., directed to U.S. Pat. No. 8,050,652 to Qureshey, Jan. 29, 2014, 5 pages.
2:14-cv-471—*BHM* v. *Pioneer Corporation*, et al.—Pioneer/Yamaha Courtesy Invalidity Contentions—Exhibit D-5—Johnson Chart—U.S. Pat. No. 7,451,177 to Johnson, et al., directed to U.S. Pat. No. 8,050,652 to Qureshey, Jan. 29, 2014, 8 pages.

(56) References Cited

OTHER PUBLICATIONS

2:14-cv-471—*BHM* v. *Pioneer Corporation*, et al.—Pioneer/Yamaha Courtesy Invalidity Contentions—Exhibit D-6—Lipscomb Chart—U.S. Pat. No. 7,020,704 to Lipscomb, directed to U.S. Pat. No. 8,050,652 to Qureshey, Jan. 29, 2014, 8 pages.
2:14-cv-471—*BHM* v. *Pioneer Corporation*, et al.—Pioneer/Yamaha Courtesy Invalidity Contentions—Exhibit D-7—Leyden Chart—WIPO Publication No. WO 01/61894 to Leyden, et al., directed to U.S. Pat. No. 8,050,652 to Qureshey, Jan. 29, 2014, 8 pages.
2:14-cv-471—*BHM* v. *Pioneer Corporation*, et al.—Pioneer/Yamaha Courtesy Invalidity Contentions—Exhibit D-8d—Philips FW-i1000 Chart—Philips FW-i1000 (Fwi) Kerbango Device, directed to U.S. Pat. No. 8,050,652 to Qureshey, Jan. 29, 2014, 55 pages.
2:14-cv-471—*BHM* v. *Pioneer Corporation*, et al.—Pioneer/Yamaha Courtesy Invalidity Contentions—Exhibit D-8m—Philips FW-i1000 Manual—Philips Streamium FW-i1000 Manual, directed to U.S. Pat. No. 8,050,652 to Qureshey, Jan. 29, 2014, 11 pages.
2:14-cv-471—*BHM* v. *Pioneer Corporation*, et al.—Pioneer/Yamaha Courtesy Invalidity Contentions—Exhibit D-9d—Kerbango Device Chart—Kerbango Radio 100E device, directed to U.S. Pat. No. 8,050,652 to Qureshey, Jan. 29, 2014, 62 pages.
2:14-cv-471—*BHM* v. *Pioneer Corporation*, et al.—Pioneer/Yamaha Courtesy Invalidity Contentions—Exhibit D-9p—Kerbango Press Chart—Kerbango Prior Art Press Publications, directed to U.S. Pat. No. 8,050,652 to Qureshey, Jan. 29, 2014, 46 pages.
"BinaryLight:1 Device Template Version 1.01," for UPnP Version 1.0, Standardized DCP, Nov. 23, 2003, 7 pages.
"Blockbuster and IBM Announce New Multimedia Ventures," May 11, 1993, 2 pages.
Pique, J. G., et al., "Bluetooth," date unknown, 12 pages.
Kardach, "Bluetooth Architecture Overview," Intel Corporation, Technology Journal Q2, 2000, 7 pages.
Kansal, "Bluetooth Primer," Copyright 2002, Red-M, 30 pages.
"Specification of the Bluetooth System," Specification vol. 1, v1.0 B, Bluetooth, Dec. 1, 1999 (Part H1) 255pages.
"Specification of the Bluetooth System," Specification vol. 1, v1.0 B, Bluetooth, Dec. 1, 1999 (Parts A-B) 182 pages.
"Specification of the Bluetooth System," Specification vol. 1, v1.0 B, Bluetooth, Dec. 1, 1999 (Parts C-D) 150 pages.
"Specification of the Bluetooth System," Specification vol. 1, v1.0 B, Bluetooth, Dec. 1, 1999 (Parts E-F) 207 pages.
"Specification of the Bluetooth System," Specification vol. 1, v1.0 B, Bluetooth, Dec. 1, 1999 (Parts H2-H4) 57 pages.
"Specification of the Bluetooth System," Specification vol. 1, v1.0 B, Bluetooth, Dec. 1, 1999 (Parts I-Index) 290 pages.
"Bluetooth White Paper 1.1," AU-System, Jan. 2000, 26 pages.
Declaration of V. Michael Bove, Jr., with regard to U.S. Pat. No. 8,045,952 (Inter Partes Review No. IPR2013-00593), 40 pages.
Declaration of V. Michael Bove, Jr., with regard to U.S. Pat. No. 8,050,652 (Inter Partes Review No. IPR2013-00594), 41 pages.
"Calendar:1 Service," For UPnP Verson 1.0, Standardized DCP (SDCP) Dec. 10, 2012, Document Version 1.0, Service Template Version 2.00, 39 pages.
"CallManagement:1 Service," For UPnP Verson 1.0, Standardized DCP (SDCP) Mar. 22, 2011, Document Version 1.0, Service Template Version 2.00, 312 pages.
"CallManagement:2 Service," For UPnP Verson 1.0, Standardized DCP (SDCP) Dec. 10, 2012, Document Version 1.0, Service Template Version 2.00, 303 pages.
"Cd3o Network MP3 Player Quick Installation Guide," cd3o, date unknown, 1 page.
"Cd3o Network MP3 Player Voice-Guide Remove Control," cd3o, date unknown, 1 page.
Blackwell, G., "Cd3o Wireless Network MP3 Player," date unknown, at least as early as Oct. 12, 2013, (http://www.wi-fiplanet.com/reviews/CD/article.php/3338481/cd3o-Wireless-Network-MP3-Player.htm) 2 pages.
CEDIA (Custom Electronic Design and Installation Association) Expo 2002, Mineapolis, Sep. 25-29, 2002, Panel, 4 pages.
"Cirrus Logic's Maverick Processor Chosen for Turtle Beach Audiotron Internet Audio Appliance," Cirrus Logic, Inc. Press Release, News Archive 2000, 2 pages.
"CodeName: "Streamer"," Date Unknown, 2 pages.
Nielsen, J., et al., "Comparative Design Review: An Exercise in Parallel Design," Interchi '93, Apr. 24-29, 1993, pp. 414-417.
"Competition Catastrophe: A Device That Will Add 800 Stations to Your Market," Radio Ink, vol. XIV, No. 21—Oct. 11, 1999, 6 pages.
Clark, Louise; Sasse, Angela, "Conceptual Design Reconsidered: The Case of the Internet Session Directory Tool," University College London, In People and Computers XII: Proceedings of HCI'97.
"ConfigurationManagement:1 Service Template Version 1.01," For UPnP Version 1.0, Standardized DCP (SDCP) Jul. 20, 2010, 103 pages.
"ConfigurationManagement:2 Service Template Version 1.01," For UPnP Version 1.0, Standardized DCP (SDCP) Mar. 4, 2013, 160 pages.
"ConnectionManager:2 Service, Annex A—Control Point Requirements," For UPnP Version 1.0, Standardized DCP Annex, Oct. 6, 2010, Service Template Version: 2.00, 4 pages.
Pope, S. T., et al., "Content Analysis and Queries in a Sound and Music Database," International Computer Music Conference Proceedings (1999) pp. 124-130.
K. Debique, et al., Content Directory:1 Service Template Version 1.01 for UPnP Version 1.0, Standardized DCP, Jun. 25, 2002, Copyright 1999-2002 Contributing Members of the UPnP Forum, 89 pages.
"ContentDirectory:1 Service Annex A—Control Point Requirements," For UPnP Version 1.0, Standardized DCP Annex, Oct. 6, 2010, Service Template Version 2:00, 4 pages.
Douglas, G., "Copyright and Peer-To-Peer Music File Sharing: The Napster Case and the Argument Against Legislative Reform," vol. 11, No. 1 (Mar. 2004) 16 pages.
"Creative Introduces the Zen X-Fi and the Zen X-Fi With Wireless Lan—The Only Players to Improve the Quality of MP3 Music Playback With X-Fi Audio Technology," Creative Press Release, Singapore, Jul. 10, 2008, 2 Pages.
"Creative Sound Blaster Wireless Music," Users Guide, Copyright 2003, Creative Technology Ltd. (Version 1.0, Aug. 2003) 66 pages.
Krishnan, V., et al., "Customized Internet Radio," Proceedings of the 9th International World Wide Web Conference on Computer Networks: The International Journal of Computer and Telecommunications Networking, vol. 33, Issue 1-6, Jun. 2000, pp. 609-618.
Krishnan, Venky, Chang, Grace, "Customized Internet Radio," Hewlett-Packard Labs, 2000.
"DCS Live! Live Radio Just Got Easier," Computer Concepts Corporation, obtained on or prior to Dec. 28, 2007, 1 page.
"DCS Overview," Computer Concepts Corporation, obtained on or prior to Dec. 28, 2007, 1 page.
Hermann, R., et al., "DEAPspace—Transient ad hoc Networking of Pervasive Devices," Computer Networks 35 (2001) pp. 411-428.
Decision—Institution of Inter Partes Review entered Mar. 20, 2014 for IPR2013-00593, 29 pages.
Decision—Institution of Inter Partes Review entered Mar. 20, 2014 for IPR2013-00594, 34 pages.
Matthew Eccles, "Telephonic Discovery Deposition of Matthew Eccles," in ITC Investigation No. 337-TA-882, Taken Oct. 14, 2013, 12 pages.
Shin, "Design and Implementation of the SMIL (Synchronized Multimedia Inegration Language) Player," Dept. of Computer Engineering, Sejong University, IEEE, Jun. 24, 2002.
Kruse, Kelly; Mori, Rob, "Designing an Internet Radio Interface Prototype," Sun Microsystems, Inc., Interactive Posters, CHI Mar. 31-Apr. 5, 2001.
"DeviceProtection:1 Service," For UPnP Version 1.0, Standardized DCP (SDCP), Version 1.0, Feb. 24, 2011, Service Template Version 2.00, 67 pages.
"Digilink 4 Control Protocol," Arrakis Systems, Inc., Dec. 14, 2000, 51 pages.

(56) References Cited

OTHER PUBLICATIONS

"DigiLink 4 by Arrakis Systems, Inc. Music Library Features," Arrakis Systems, Inc., Jan. 21, 2000, 82 pages.
"Digilink Application Note—Link Groups Feature," Arrakis Systems, Inc., May 12, 2000, 1 page.
"Digilink Application Note—Recording the Latest News, Weather, Sports," Arrakis Systems, Inc., Jun. 26, 2000, 1 page.
"Digilink DC4-100 Whole House Music Library System, 3rd Party Control Systems," Arrakis Systems, Inc., Feb. 15, 2001, 5 pages.
"Digilink DC4-100 Whole House Music Library System, CD Music Management for the Home," Arrakis Systems, Inc., date unknown, 2 pages.
Howard, B., "Digital Jukeboxes," PC Magazine, Oct. 1, 2002, 3 pages.
"Digital On-Air Studio System," Jan. 31, 1994, Copyright format only 1997, Knight-Ridder Info., 1 page.
"DigitalSecurityCamera:1 Device Template version 1.01," For UPnP Version 1.0, Standardized DCP, Mar. 24, 2005, 8 pages.
"DigitalSecurityCameraMotionImage:1 Service Template Version 1.01," For UPnP Version 1.0, Standardized DCP, Mar. 24, 2005, 23 pages.
"DigitalSecurityCameraSettings:1 Service Template Version 1.01," For UPnP Version 1.0, Standardized DCP, Mar. 24, 2005, 18 pages.
"DigitalSecurityCameraStillImage:1 Service Template Version 1.01," For UPnP Version 1.0, Standardized DCP, Mar. 24, 2005, 20 pages.
"DimmableLight:1 Device Template Version 1.01," For UPnP Version 1.0, Standardized DCP, Nov. 23, 2003, 7 pages.
"Dimming:1 Service Template Version 1.01," For UPnP Version 1.0, Standardized DCP, Nov. 23, 2003, 29 pages.
"Don't Dream It. Stream It. Streamium Broadband Internet Micro System MCi200," Copyright 2001, Philips Consumer Electronic Company, 2 pages.
"Downloadable Kerbango Logos," Kerbango, Inc., date unknown, 2 pages.
Aguilera, M.K. and Strom, R.E., "Efficient Atomic Broadcast Using Deterministic Merge," Proceedings of ACM Symposium on Principles of Distributed Computing (PODC), Jul. 16-19, 2000, copyright 2000, ACM, New York, New York, 10 pages.
Brassil, Jack, "Enhancing Internet Streaming Media with Cueing Protocols," IEEE Infocom 2001.
"Enigma Digital and Kerbango Enter Strategic Promotional Relationship to Offer Music Lifestyles at the Touch of a Button," Santa Monica, CA and Cupertino, CA, Mar. 16, 2000, 2 pages.
"Ericsson Review: The Telecommunications Technology Journal," No. 3. 1998, 44 pages.
"Escient and Audio Request Compatibility Memo (ZR-4630)," Niles Audio Corporation, Dec. 4, 2002, 1 page.
"P800/P802," Sony Ericsson White Paper, Jan. 2003, pp. 1-14, 24-25, 36, 70-72, 87-88, 94, and 112 (24 pages).
Expert Report of Jerry Black, PH.D., ITC Investigation No. 337-TA-882, filed Nov. 12, 2013, 26 pages.
Expert Report of Kevin Jeffay PH.D., ITC Investigation No. 337-TA-882, filed Nov. 12, 2013, 155 pages.
"ExternalActivity:1.0 Service Template Version 1.01," For UPnP version 1.0, Standardized DCP, Sep. 11, 2002, 16 pages.
Huhn, Mary, "Fed Up With Radio? Create Your Own Online Station," New York Post, at <http://pgasb.pqarchiver.com/nypost/access/68457933.html?FMT=FT&di...>, Nov. 22, 1998, printed Oct. 13, 2009, 2 pages.
"Feeder:1.0 Service Template Version 1.01," For UPnP Version 1.0, Standardized DCP, Sep. 11, 2002, 20 pages.
Hauver, David, "Flycasting: Using Collaborative Filtering to Generate a Playlist for Online Radio," Dept. of Computer Science, University of Virginia, IEEE 2001.
"Frequently Asked Questions about Intermind's Patents," downloaded from <http://www.intermind.com/materials/patent_faq.html> on Feb. 27, 1998, 9 pages.
Bonanno, C., "From the Computer Room to the Living Room: The Future of Digital Home Audio," Home Toys Article, Aug. 2000 (Archived at http://web.archive.org/web/200302020092947/http://hometoys.com/htinews/aug00/articles/tbeach/tbeach.htm) 2 pages.
"Home Control Via Touch Panel," Elan Home Systems, Copyright 2002, 4 pages.
"2003 Canadian Product Catalog," Home Director, Trusted Technology Advisor for Builders, Version 6.4, Copyright 2003, Home Director, Inc., 30 pages.
"Home Director Announces Availability of AudioPoint Digital Audio Receiver; Play MP3 Digital Music or Streaming Internet Radio on Conventional Stereo Equipment," PR Newswire, Sep. 27, 2002, 4 pages.
"Home Director Announces Availability of AudioPoint Digital Audio Receiver; Play MP3 Digital Music or Streaming Internet Radio on Conventional Stereo Equipment," PR Newswire, Sep. 27, 2002, 2 pages.
"Home Director: Innovations in Home Networking," Home Director, Inc., Copyright 2002 (Archived at web.archive.org/web/20031129164409/http://homedirector.com/) 1 page.
Wong, W., "Home Networking Opens Its Doors for Business," CNET News, Oct. 19, 1999, 4 pages.
"HP Digital Entertainment Center Owner's Guide: DE100C," Copyright 2001, Hewlett-Packard Company, 118 pages.
"HP Digital Media Receiver User's Guide," Copyright 2002, Hewlett-Packard Company, 67 pages.
Kaplan, Marc A., "IBM Cryptolopes TM, SuperDistribution and Digital Rights Management," found at <http://www.research.ibm.com/people/k/kaplan/cryptolope-docs/crypap.html> from the Internet Archive, copyright Dec. 30, 1996, IBM Corporation, printed Mar. 15, 2000, 7 pages.
"IBM Launches Business to Deploy Multimedia Applications and Services," Jan. 20, 1993, 3 pages.
Krigel, Beth Lipton, "Imagine Radio spinning off," CNET News, at <http://news.cnet.com/Imagine-Radio-spinning-off/2100-1033_3-213613.html>, Jul. 22, 1998, printed Oct. 13, 2009, 3 pages.
"iMerge M1000 SoundServer—Specs," iMerge Ltd, Manufactured Nov. 2000-Aug. 2003 (downloaded from the Internet Oct. 12, 2013) <URL:www.imerge.co.uk/products/m1000/m1000_home.php> 2 pages.
"iMerge M1000 SoundServer User Guide," Copyright 2001, iMerge Ltd., 40 pages.
"iMerge Multi-room SoundServer Application note," Issue 1.1, Aug. 2000, 9 pages.
"iMerge S1000 SoundServer—Specs," iMerge Ltd, Manufactured May 2001-Nov. 2002 (downloaded from the Internet Oct. 12, 2013) <URL:www.imerge.co.uk/products/s1000/s1000_home.php> 2 pages.
"iMerge S1000 SoundServer User Guide," Copyright 2001, iMerge Ltd., 60 pages.
"iMerge S2000 SoundServer—Specs," iMerge Ltd, Manufactured Nov. 2002-Aug. 2004 (downloaded from the Internet Oct. 12, 2013) <URL:www.imerge.co.uk/products/s2000/s2000_home.php> 2 pages.
"iMerge S2000 SoundServer Hard Disk Audio System User Guide," Copyright 2002, iMerge Ltd., 48 pages.
Veronica Hendricks, "Imerge SoundServer," Techonline, http://www.techonline.com/scripts/tol.exe?TEMPLATE,top.ops&AREA,1&CONTENT,8988&NET,13&USER.todd_Bergeson@3com.com, Copyright 1999-2000 TechOnLine, Inc., printed Sep. 22, 2000, 2 pages.
"iMerge XiVA Server Utilities Application Note," Copyright 2002, iMerge Ltd., 4 pages.
"iMerge XiVA Server Utilities User Manual," Copyright 2002, iMerge Ltd., 4 pages.
Carroll, J., "Industries Blind to What's Ahead," Globe & Mail, Mar. 12, 2001, 2 pages.
"InferNote is an exploration tool for your music collection," at <http://www.itweaks.com/infdoc/index.html>, copyright 2004, otherslikeyou.com Inc., printed Feb. 7, 2007, 13 pages.
"InputConfig:1 Service," For UPnP Verson 1.0, Standardized DCP (SDCP) Mar. 22, 2011, Document Version 1.0, Service Template Version 2.00, 43 pages.

(56) References Cited

OTHER PUBLICATIONS

Schulzrinne, "Integrated Internet Appliances: More than Just a Phone," Internet Real-Time (IRT) Laboratory, Columbia University, Feb. 15, 1999.
"IntelliControl Home Theater Automation System," Niles Audio Corporation, Copyright 2003, 8 pages.
Egyhazy et al., "Intelligent Web Search Agents," at <http://csgrad.cs.vt.edu/~tplunket/article.html>, pp. 1-23, printed Dec. 20, 1999, 23 pages.
"Intermind Announces Approval of First Patent Application," dated Oct. 7, 1997, downloaded from <http://www.intermind.com/inside/press_rel/100797_allow.html>, 3 pages.
"Internet Audio iM Jukebox (PC Link) Set-Up" Quick Reference Guide—Internet Audio Operations, iM Jukebox, Apr. 20, 2001, 2 pages.
"Internet Audio Mini Hi-Fi System," Philips FW-i1000 Manual, EL4965E006/MAC4110/12-98, 106 pages.
Stoll, Felderhoff, Spikofski, "Internet Radio and Excellent Audio Quality; Dreamboat or Reality?" IBC'97, Amsterdam, Sep. 12-16, 1997.
Crouch, Cameron, "Internet radio dumps the PC; New stand-alone devices let you listen to Web-based broadcasts, from CDs to radio stations. (Kerbango/AudioRamp.com) (Product Information)," Network World, Feb. 14, 2000.
"Internet Radio Feature Proposal," Anonymous, Date Unknown, 6 pages.
"InternetGatewayDevice:2 Device Template Version 1.01," For UPnP Versions 1.0 and 1.1, Standardized DCP (SDCP), Version 1.00, Dec. 10, 2010, 28 pages.
"iPAQ Music Center—Addendum A," Copyright 2002, Compaq Computer Corporation, 38 pages.
"iPronto—Dashboard for the Digital Home," Copyright 2002, Philips Consumer Electronics, 13 pages.
"iPronto tsi6400—Getting Started," Philips, date unknown, 9 pages.
"iPronto tsi6400—Getting Started," Philips, date unknown, 4 pages.
"iPronto tsi6400 Installation Guide," Copyright Royal Philips Electronics NV (date unknown) 67 pages.
"Is Bluetooth Worth the Wait?" The Economist, Dec. 7, 2000, 7 pages.
Carroll, J., "Is This Guy Crazy or Just Way Ahead of His Time," Link Magazine, Jul. 2002, pp. 18-20.
"Respondents' and Intervenor's Joint Notice of Prior Art," ITC Investigation No. 337-TA-882, filed Oct. 25, 2013, 49 pages.
Expert Report of Dr. Kevin Jeffay, Exhibit No. 34—Lipscomb Chart directed to U.S. Pat. No. 8,045,952, 70 pages.
Expert Report of Dr. Kevin Jeffay, Exhibit No. 35—Lipscomb Chart directed to U.S. Pat. No. 8,050,652, 71 pages.
Expert Report of Dr. Kevin Jeffay, Exhibit No. 57—RealPlayer Chart directed to U.S. Pat. No. 8,045,952, 91 pages.
Expert Report of Dr. Kevin Jeffay, Exhibit No. 58—RealPlayer Chart directed to U.S. Pat. No. 8,050,652, 98 pages.
"Searching," Kerbango, Inc., date unknown, 4 pages.
"Kerbango," from Wikipedia, the free encyclopedia, en.wikipedia.org/wiki/Kerbango, Last Modified May 16, 2012, 1 page.
Kerbango AM/FM Internet Radio, Kerbango.com, publication date unknown, DS-01-041100.
Metcalfe, Bob, "Kerbango AM/FM/IM Radio moves us toward the Broadcast Internet," web.archive.org/web/20081229161920/http://www.infoworld.com/articles/op/xml/00/06/12/000612opmetcalfe.html, printed Sep. 2, 2013.
"Kerbango and ApplianceWare Deliver Digital Music Library," Indian Wells, California DEMO 2000, Feb. 7, 2000 (3Com Corporation Press Release) 2 pages.
"Kerbango and Arbistron Strike Strategic Alliance to Enhance Internet Radio Industry's Most In-Depth Research to Internet Broadcasters and Advertisers," Cupertino, CA and New York, NY, May 23, 2000, 4 pages.
"Kerbango and Interep Interactive Team Up on Advertising for Kerbango Internet Radio," Boston, MA, Radio Ink Internet Conference, May 17, 2000, Kerbango, Inc., 2 pages.

Image of Kerbango Device, rear perspective, date unknown, 1 page.
Image of Kerbango Device, front perspective, date unknown, 1 page.
Image of Kerbango Device, front side perspective, date unknown, 1 page.
Kerbango FAQ web.archive.org/web/20000617123538/http://kerbango.com/radio/faq.html, Jun. 17, 2000, printed Sep. 2, 2013.
"Kerbango Group Photo," Kerbango, Inc., date unknown, 1 page.
"Identity—Ingredient Brand: Sizing and Clear Space," Kerbango, Inc., date unknown (updated 0.02.01-luckow) 2 pages.
Kerbango Internet Radio, "www.gadgetcentral.com/kerbango_intro.html," posted Jan. 2000, 2 pages.
"Kerbango Internet Radio by 3Com Clinches Awards at the 2001 International Consumer Electronics Show: World's First Stand-Alone Internet Radio Appliance Wins CEA Innovations 2001 "Best of Show" Lauren and Dealerscope Magazine's "Editors' Choice" Award," Jan. 8, 2001, 2 pages.
"Kerbango Internet Radio, Product Intro," http://web.archive.org/web/20000824175603, Apr. 1, 2000.
"Kerbango Internet Radio, Product Intro," http://web.archive.org/web/2000052214305, Apr. 1, 2000.
"Kerbango Partner Quotes," Kerbango, Inc., date unknown, 5 pages.
"Kerbango Partners," Kerbango, Inc., date unknown, 1 page.
"Kerbango Photo," Kerbango, Inc., date unknown, 1 page.
"Kerbango Presentation," Kerbango, Inc., date unknown, 18 pages.
"Kerbango Radio AM FM Internet, Model 100E for Broadband Connections, Tuning Service," Copyright 2000, Kerbango, a division of 3Com Corporation, DS-01-091300, 2 pages.
"What the Reviewers Think of Kerbango," Kerbango, Inc., date unknown, 2 pages.
Kerbango Software Screenshot, Kerbango, Inc., date unknown, 1 page.
Kerbango Software Screenshot—Search Results, Kerbango, Inc., date unknown, 1 page.
Kerbango Tuning Service, Kerbango.com, publication date unknown, DS-02-041100.
Kerbango Tuning Service Screenshot, Kerbango, Inc., Mar. 1, 2000, 1 page.
Kerbango Tuning Service Screenshot, Kerbango, Inc., Mar. 1, 2000, (Archived at web.archive.org/web/20000301135348/http://www.kerbango.com/tuner/index.html?fcn_menu=1&tuning_id=0&bwc=) 1 page.
"Kerbango Tuning Service User Guide," Copyright 2000, Kerbango, Inc., (Archived at web.archive.org/web/.../http://www.kerbango.com/help/index.html?play_sound=1) 3 pages.
Kerbango User Guide, web.archive.org/web/20000614154943/http://kerbango.com/help/index.html?bwc=, Kerbango, Inc.
"Lansonic Capabilities," [online] Aug. 17, 2000 [Downloaded from the Internet on Aug. 23, 2013] URL: <web.archive.org/web/20000817023735/http://www.lansonic.com/capability.htm> (p. 6 of Yamaha Corporation of America Exhibit 1013) 1 page.
"Lansonic Company Information," [online] Sep. 18, 2000 [Downloaded from the Internet on Aug. 23, 2013] URL: <web.archive.org/web/20000918102826/http://www.lansonic.com/co_info.htm> (p. 20 of Yamaha Corporation of America Exhibit 1013) 1 page.
"Lansonic Digital Audio Server DAS-750," Sep. 18, 2000, 21 pages.
"Lansonic DAS-750 Digital Audio Server Operating Instructions, Version 2.2.0," Copyright 2001, Digital Voice Systems, Inc. (Feb. 2, 2002) 104 pages.
"Lansonic DAS-750 Product Photographs," [online] Jun. 19, 2000 [Downloaded from the Internet on Aug. 23, 2013] URL: <web.archive.org/web/20000619153458/http://www.lansonic.com/photos.htm> (p. 7 of Yamaha Corporation of America Exhibit 1013) 1 page.
"Lansonic DAS-750 Product Photographs—Enlarged Front," [online] Jun. 20, 2000 [Downloaded from the Internet on Aug. 23, 2013] URL: <web.archive.org/web/20000620195000/http://www.lansonic.com/images/a_ned_front.jpg> (p. 8 of Yamaha Corporation of America Exhibit 1013) 1 page.
"Lansonic DAS-750 User Manual," [online] Sep. 18, 2000 [Downloaded from the Internet on Aug. 23, 2013] URL: <web.archive.

(56) References Cited

OTHER PUBLICATIONS org/web/20000918102806/http://www.lansonic.com/excertps.htm> (pp. 12-17 of Yamaha Corporation of America Exhibit 1013) 6 pages.
"Lansonic DAS-950 Pro Series," [online] Feb. 2, 2002 [Downloaded from the Internet on Jan. 21, 2014] URL: <web.archive.org. . . http://www.lansonic.com/DAS-950_main.htm> 2 pages.
"Lansonic Digital Audio Server and MP3 Player Frequently Asked Questions," [online] Aug. 17, 2000 [Downloaded from the Internet on Aug. 23, 2013] URL: <web.archive.org/web/20000817023740/http://www.lansonic.com/faq_3_1_00.htm> (pp. 9-11 of Yamaha Corporation of America Exhibit 1013) 3 pages.
"Lansonic Digital Audio Server DAS-750," [online] Sep. 18, 2000 [Downloaded from the Internet on Aug. 23, 2013] URL: <web.archive.org/web/20000918102747/http://www.lansonic.com/configuration.htm> (pp. 1-2 of Yamaha Corporation of America Exhibit 1013) 2 pages.
"Lansonic Ignites Digital Music Revolution," [online] Press Release Dated Jan. 5, 2000 [Downloaded from the Internet on Aug. 23, 2013] Downloaded from Internet Archive Dated Jun. 19, 2000, URL: <web.archive.org/web/20000619182933/http://www.lansonic.com/pr.htm> (p. 21 of Yamaha Corporation of America Exhibit 1013) 1 page.
"Lansonic Order Form," [online] Aug. 17, 2000 [Downloaded from the Internet on Aug. 23, 2013] URL: <web.archive.org/web/20000817024550/http://www.lansonic.com/order.htm> (pp. 18-19 of Yamaha Corporation of America Exhibit 1013) 2 pages.
"Lansonic Specifications," [online] Aug. 17, 2000 [Downloaded from the Internet on Aug. 23, 2013] URL: <web.archive.org/web/20000817023726/http://www.lansonic.com/specifications.htm> (p. 5 of Yamaha Corporation of America Exhibit 1013) 1 page.
"Lansonic's New 3-Zone Output Digital Audio Server," CEDIA, 2002, Westford, MA, Home Toys, date unknown (CEDIA Expo 2002 held Sep. 25-29, 2002,Minneapolis, MN) 3 pages.
"LAUNCHcast Radio—Yahoo! Messenger," http://messenger.yahoo.com/launch.php, copyright 2007 Yahoo! Inc., printed Nov. 8, 2007, 1 page.
Lehmann-Haupt, Rachel, "Library/Internet Radio; Listeners Take on Role of the Deejay," The New York Times, at <http://www.nytimes.com/1998/11/05/technology/library-internet-radio-lis...>, Nov. 5, 1998, printed Oct. 13, 2009, 2 pages.
Lehmann-Haupt, Rachel, "Library/Internet Radio; On Spinner, Wide Range of Choices," The New York Times, at <http://www.nytimes.com/1998/11/05/technology/library-internet-radio-on-spinner-wide-range-of-choices.html?scp=1&sq=On...>, Nov. 5, 1998, printed Oct. 15, 2009, 5 pages.
Lehmann-Haupt, Rachel, "Library/Internet Radio; Web Radio Expands Listening Horizons," The New York Times, at <http://www.nytimes.com/1998/11/05/technology/library-internet-radio-web-radio-expands-listening-horizons.html?scp=2&sq=...>, Nov. 5, 1998, printed Oct. 15, 2009, 5 pages.
"LinkAuthentication:1," Service Template Version 1.01, for UPnP Version 1.0, Standardized DCP, Oct. 17, 2003, 32 pages.
"Linksys Quick Installation Guide—Instant Wireless Series WPC11 ver. 3.0," Date Unknown, QI-WPC11 ver. 3.0-012201NC KL, 9 pages.
"Liquid Audio Products and Services," http://web.archive.org/web/20000615070537, Jun. 15, 2000, printed on Sep. 24, 2013.
"Live365's Extensive Internet Radio Station Collection Coming to 3COM Kerbangosm Tuning Service," Santa Clara, CA, Jan. 8, 2001, 3 pages.
Boswell, Wendy, "Loading 'Quintura—Search With Quintura, a Tag Cloud Search Engine'," at <http://websearch.about.com/od/dailywebsearchtips/qt/dnt0830.htm?p=1>, copyright 2007 About.com, Inc., printed Oct. 17, 2007, 1 page.
"LowPowerDevice:1 Service Template Version 1.01," For UPnP Version 1.0, Design Complete, Aug. 28, 2007, Document Version 1.00, 23 pages.

"LowPowerProxy:1 Service Template Version 1.01," For UPnP Version 1.0, Standardized DCP, Aug. 28, 2007, Document Version 1.00, 18 pages.
"ManageableDevice:1 Device Template Version 1.01," For UPnP Version 1.0, Standardized DCP (SDCP) Jul. 20, 2010, 14 pages.
"ManageableDevice:2 Device Template Version 1.01," For UPnP Version 1.0, Standardized DCP (SDCP) Feb. 16, 2012, 23 pages.
"Many New ELAN Products Shipping Around CES 2003," Lexington, KY, Home Toys, date unknown (CES 2003 held Jan. 9-19, 2003, Las Vegas, NV) 2 pages.
"Master's Projects of the KR&R Group," Faculty of Sciences, Vrije Universiteit, Amsterdam, URL unknown, publication date unknown, obtained on or prior to Apr. 22, 2009, 7 pages.
"MediaManagement:1 Service," For UPnP Verson 1.0, Standardized DCP (SDCP) Mar. 22, 2011, Document Version 1.0, Service Template Version 2.00, 228 pages.
"MediaManagement:2 Service," For UPnP Verson 1.0, Standardized DCP (SDCP) Dec. 10, 2012, Document Version 1.0, Service Template Version 2.00, 192 pages.
Ritchie, J., "MediaRenderer:1 Device Template Version 1.01," For UPnP 1.0, Standardized DCP, Jun. 25, 2002, UPnP Forum, 12 pages.
"MegaTouch Combo Jukebox Owner's Manual," Copyright 2003, Merit Industries, Inc., PM0378-07, 58 pages.
"MegaTunes Owner's Manual," Copyright 2004, Merit Industries, Inc., PM0396-07, 30 pages.
"Merit Remote Sound System Installation Manual," Copyright 2003, Merit Industries, Inc., PM0397-02, 14 pages.
"Messaging:1 Service," For UPnP Verson 1.0, Standardized DCP (SDCP) Mar. 22, 2011, Document Version 1.0, Service Template Version 2.00, 72 pages.
"Messaging:2 Service," For UPnP Verson 1.0, Standardized DCP (SDCP) Dec. 10, 2012, Document Version 1.0, Service Template Version 2.00, 74 pages.
Maloney, P., "Microsoft's MongoMusic.com "Sounds Like" a Possible Winner," RAIN Radio and Internet Newsletter, Sep. 26, 2000, 6 pages.
Henry, Alan, "MixxMaker: The Mix Tape Goes Online," Jan. 18, 2008, AppScout, found at <http://appscout.pcmag.com/crazy-start-ups-vc-time/276029-mixxmaker-the-mix-tape-goes-online#fbid=DfUZtDa46ye>, printed Nov. 15, 2011, 4 pages.
Tomas Bostrom, Susanne Eliasson, Per Lindtorp, Fabio Moioli and Mats Nystrom, "Mobile Audio Distribution," Royal Institue of Technology, Stockholm, Sweden, Personal Technologies (1999) vol. 3, Issue 4, pp. 166-172.
"MongoMusic.com and Kerbango Team Up to Personalize Internet Radio for Consumers," Cupertino, CA and Menlo Park, CA, Mar. 13, 2000, 3 pages.
"MontaVista's Hard Hat Linux Embedded in World's First Standalone Internet Radio," Indian Wells, CA, Demo 2000, Feb. 7, 2000, 2 pages.
Spring, T., "Move MP3s to Home Stereo," Computerworld, Apr. 28, 2000, 3 pages.
Spring, T., "Move MP3s to Your Home Stereo," CNN.com, May 1, 2000, (http://europe.cnn.com/2000/TECH/computing/05/01.mnp3.stereo.idg/index.html) 3 pages.
Knudsen, C., "MP3 Linux Players," Linux Journal, vol. 1999 Issue 63es, Jul. 1999, Article 10 (5 pages).
Hacker, S., "MP3: The Definitive Guide," O'Reilly, 1st Ed. Mar. 2000, 378 pages.
Hacker, S., "MP3: The Definitive Guide, Sample Chapter 6, Hardware, Portables, Home Stereos, and Kits," 1st Edition Mar. 2000, 32 pages.
Schmid, P., "Multimedia in the Living Room: From DVD Player to Media Center," Mar. 12, 2004 (www.tomsguide.com/us/multimedia-in-the-living-room,review-243-9.html) 4 pages.
Schmid, P., "Multimedia in the Living Room: From DVD Player to Media Center: 7. Cd3o C300," Tom's Guide—Home Theatre—Home Theatre Review, Mar. 12, 2004, 4 pages.
Schmid, P., "Multimedia in the Living Room: From DVD Player to Media Center: 9. Cd3o C300, Continued," Tom's Guide—Home Theatre—Home Theatre Review, Mar. 12, 2004, 4 pages.
Schmandt, Chris, "Multimedia Nomadic Services on Today's Hardware," IEEE Network Sep./Oct. 1994.

(56) References Cited

OTHER PUBLICATIONS

"MultiZone Audio Preamplifier Installation & Operation Guide: Four-Source, Six-Zone Preamplifier," A4.6Ci, Copyright 2002, Niles Audio Corporation, 107 pages.
"Multi-Zone With Escient Tune-Base CD Mgmt," AVS Forums, Nov. 11, 2000, Copyright 2013 AVS, 6 pages.
"Music Artist Cloud," at <http://artistcloud.camaris.be/>, copyright 2007, mac, printed Oct. 17, 2007, 2 pages.
Rose, "Music in the Home: Interfaces for Music Appliances," Personal Technologies (2000) vol. 4, Issue 1, pp. 45-53.
Weiss, A., "Music Selection for Internet Radio," Department of Computer Science, University of Cantergury, New Zealand, Nov. 3, 2000, 56 pages.
Brown, B., et al., "Music Sharing as a Computer Supported Collaborative Application," HP Laboratories Bristol, HPL-2001-103, May 2, 2001, 21 pages.
"Networked MP3 Player Lineup Bows From cd3o," Twice, Jan. 9, 2003 (www.twice.com/news/networked-mp3-plyaer-lineup.bows-cd3o-0) 1 page.
"NetX Getting Started Guide," Philips, date unknown, 7 pages.
"New Devices Boost MP3 Use At Home," CNET News, May 24, 2000, 3 pages.
Gribble, "The Ninja Jukebox," Ninja Research Group, presentation date unknown, Univ. of Cal. at Berkeley.
"NPR : National Public Radio : News & Analysis, World, US, Music & Arts," http://www.npr.org, Copyright 2007 NPR, printed Oct. 16, 2007, 7 pages.
"Nullsoft SHOUTcast," http://web.archive.org/web/20000815054138, Aug. 15, 2000, printed on Sep. 24, 2013.
"Omnifi DMSI User Manual," Omnifi Media, Jul. 2003, 36 pages.
"FAQ," at <http://blog.pandora.com/faq/>, copyright 2005-2006, Pandora Media, Inc., printed Aug. 8, 2006, 20 pages.
"Pandora—Frequently Asked Questions," from <http:www.pandora.com>, obtained on or prior to Apr. 22, 2009, copyright 2005-2009, Pandora Media, Inc., 48 pages.
"Pandora Internet Radio—Find New Music, Listen to Free Web Radio," at <http://www.pandora.com/>, copyright 2005-2007, Pandora Media, Inc., printed Feb. 7, 2007, 1 page.
"Pandora Radio—Listen to Free Internet Radio, Find New Music—The Music Genome Project," at <http://www.pandora.com/mgp>, copyright 2005-2007, Pandora Media, Inc., printed Oct. 26, 2007, 1 page.
Patent Owner's Preliminary Response to Inter Partes Review of U.S. Pat. No. 8,045,952 (Inter Partes Review No. IPR2013-00593) Filed Dec. 26, 2013, 50 pages.
Patent Owner's Preliminary Response to Inter Partes Review of U.S. Pat. No. 8,050,652 (Inter Partes Review No. IPR2013-00594) Filed Dec. 26, 2013, 57 pages.
International Search Report for PCT/GB01/03069 mailed Oct. 11, 2002, 3 pages.
Adam Field, Pieter Hartel, Wim Mooij, "Personal DJ, an Architecture for Personalised Content Delivery," www10, ACM 1-58113-348-0, May 1-5, 2001.
Petition for Inter Partes Review of U.S. Pat. No. 8,045,952 (Inter Partes Review No. IPR2013-00593) Filed Sep. 18, 2013, 57 pages.
Petition for Inter Partes Review of U.S. Pat. No. 8,050,652 (Inter Partes Review No. IPR2013-00594) Filed Sep. 18, 2013, 65 pages.
"PhoneManagement:1," For UPnP Verson 1.0, Standardized DCP (SDCP) Mar. 22, 2011, Document Version 1.0, Service Template Version 2.00, 53 pages.
"PhoneManagement:2," For UPnP Verson 1.0, Standardized DCP (SDCP) Dec. 10, 2012, Document Version 1.0, Service Template Version 2.00, 74 pages.
USDC N. Dist. of CA, Case No. C-99-5183 MHP, Plaintiffs' Memorandum of Points and Authorities in Opposition to Defendant Napster, Inc.'s Motion for Summary Adjudication on the Applicability of the 17 U.S.C. '512(a) Safe Harbor Affirmative Defense.
"News! Dec. 2001," Practically Networked, Dec. 2001, online <URL:http://www.practically.networked.com/news/news_12_01.htm> 7 pages.
"Presence:1 Service," For UPnP Verson 1.0, Standardized DCP (SDCP) Dec. 10, 2012, Document Version 1.0, Service Template Version 2.00, 37 pages.
"PrintBasic:1 Service Template Version 1.01," For UPnP Version 1.0, Approved Standard, Aug. 8, 2002, 42 pages.
"PrintEnhanced:1 Service Template Version 1.01," For UPnP Version 1.0, Standardized DCP, Oct. 28, 2006, Document Revision 1.01, 83 pages.
Little, T.D.C., et al., "Prospects for Interactive Video-On-Demand," (MCL Technical Report, Feb. 15, 1994) IEEE Multimedia, vol. 1, No. 3, Fall 1994, pp. 14-24.
Merkel, Oliver et al., "Protecting VoD the Easier Way," Proceedings of the sixth ACM International Conference on Multimedia, Sep. 13-16, 1998, Bristol, United Kingdom, 1998, pp. 21-28, 8 pages.
Young, Cliff, "Protium, an Infrastructure for Partitioned Applications," Bell Laboratories, Lucent Technologies, IEEE 2001.
Helbig, Tobias; Schreyer, Oliver, "Protocol for Browsing in Continuous Data for Cooperative Multi-Server and Multi-Client Applications," Philips Research Laboratories, IDMS'98, LNCS 1483, pp. 231-236, 1998.
Salonidis, T., "Proximity Awareness and Ad Hoc Network Establishment in Bluetooth," Electrical and Computer Engineering Department, University of Maryland; AT&T Labs Research; IBM T.J.Watson Research Center (2001) 26 pages.
Krigel, Beth Lipton, "Radio features at center of Net law," CNET News, at <http://news.cnet.com/Radio-features-at-center-of-Net-law/2100-1033_3-214752.html>, Aug. 24, 1998, printed Oct. 15, 2009, 2 pages.
Weller, Mary, "Radio Station Software: Programmes That Meet Your Stations Needs," Music & Media, Nov. 28, 1992, p. 11, Copyright 1995, Information Access Co., 3 pages.
Greenberg, K., "Radio The Hard-Drive Way," ADWEEK, Jun. 12, 2000, 2 pages.
"RadiusClient:1, Service Template Version 1.01," For UPnP Version 1.0, Standardized DCP, Oct. 17, 2003, 12 pages.
"RCA Radio Photo," RCA, date unknown, 1 page.
"RCS Acquires Decision Inc.; Offers Complete Software Solution for Radio Station Programming Operations," Businesswire, Feb. 9, 1993, Copyright 1995, Reuters Info. Svcs., 2 pages.
Akst, Daniel, "RealAudio Gives Rise to Online Radio Programs," Los Angeles Times, Jul. 8, 1996.
RealAudio Server, Administrator's Guide, Release 2.0, Progressive Networks, Inc., 1996.
"RealPlayer Plus Specifications," http://web.archive.org/web/19980121234859, Jan. 21, 1998, printed on Sep. 24, 2013.
RealPlayer 7 Plus User Manual, RealNetworks, Inc. 2000, 117 pages.
RealPlayer 8 Plus User Manual, RealNetworks, Inc. 2000, 112 pages.
"RealPlayer Plus 5.0 Makes Your Computer the World's Coolest Entertainment Center," http://web.archive.org/web/19980121234541/http://www.real.com, Jan. 21, 1998.
"RealPlayer Plus G2 Manual," Copyright 1998-1999, Real Networks, Inc., 82 pages.
RealServer Administration and Content Creation Guide, Version 4.0, Progressive Networks, Inc., 1995-1997.
RealServer Administration Guide RealServer 7.0 Powered by RealSystem G2, RealNetworks, 1998-1999.
RealServer Administration Guide RealServer G2, RealNetworks, 1997.
"Redband's Broadcasting's Audio Programs Now Available on the Kerbango Internet Tuning Service," San Francisco, CA, Sep. 21, 2000, 2 pages.
"Reinventing Radio," Kerbango Overview, Jul. 2000, Kerbango, Inc., 3 pages.
"Reinventing Radio: Internet Startup-Kerbango-Debuts at Upside's Launch," Kerbango Resources, Cupertino, California, Oct. 13, 1999, <http://www.tuner.espace.com/press/101399.html> 4 pages.
"TRM: The Universal Barcode for Music and Media from Relatable," found at <http://relatable.com/tech/trm.html>, copyright 2000-2003, Relatable, printed Oct. 3, 2011, 1 page.

(56) References Cited

OTHER PUBLICATIONS

"Relatable's Open Source Audio Signature Solution, TRM," found at <http://www.relatable.com/tech/trm.html>, on the Internet Archive, Copyright 2000, Relatable, printed Nov. 28, 2007, 2 pages.
"Relatable's Open Source Audio Signature Solution, TRM," http://web.archive.org/web/20001117082600/http://wvvw.relatable.com/tec h/trm.html, copyright Relatable 2000, printed Nov. 28, 2007, 2 pages.
"Release Noties MC-i200/250," Philips, Date Unknown, 2 pages.
"Rio Advanced Digital Audio Center, User's Guide," SONICblue, Inc., Copyright 2001-2002, 116 pages.
"Rio One User Guide," Copyright 2001, SONICblue Incorporated, 23 pages.
"Rio PMP300 User's Guide," Copyright 1998, Diamond Multimedia Systems, Ltd., 27 pages.
"Rio500 Getting Started Guide," Copyright 1999, Diamond Multimedia Systems, Ltd., 2 pages.
"RioReceiver—Getting Started," Copyright 2002, SONICblue, Inc., 4 pages.
Wolz, Ursula, "r-MUSIC, A Collaborative Music DJ for Ad Hoc Networks," Dept. of Computer Science, The College of New Jersey, Proceedings of the Fourth International Conference on Web Delivering of Music (WEDELMUSIC'04) 2004.
"Roku Control Protocol—Functional Specification," Jul. 13, 2006, Version 2.0, Roku, LLC, 135 pages.
"Roku SoundBridge M1000 and M2000," PCMag.com, http://www.pcmag.com/article2/0,2817,1646246,00.asp, Sep. 20, 2004.
"Roku SoundBridge M1000/M1001 Network Music System," [online] Jul. 18, 2012, <URL:http://www.amazon.com/Roku-SoundBridge-M1001-Network-System/dp/B000B|6AH8//> 6 pages.
"Roku SoundBridge Network Music Player," Copyright 2006, Roku, LLC, 2 pages.
"Roku SoundBridge Network Music Player User Guide," Roku, LLC, date unknown, 67 pages.
"Roku SoundBridge Network Music Player User Guide, Software V. 2.5," Copyright 2006, Roku, LLC, 74 pages.
"SoundBridge Radio WI-Fi Music System User Guide, Software V. 2.5," Roku, LLC, date unknown, 51 pages.
"Roku SoundBridge Wi-Fi Setup Instructions," Revision 1.2, Aug. 31, 2004, 14 pages.
"User Guide for Software Release 1.5.18, HD1000," Copyright 2004, Roku, LLC (Revised Apr. 29, 2004) 34 pages.
Nickell, Joe Ashbrook, "Roll Your Own Radio," at <http://www.wired.com/print/culture/lifestyle/news/1998/08/14706>, Aug. 28, 1998, printed Oct. 13, 2009, 1 page.
"SB1—SqueezeboxWiki," Copyright 2012, Logitech (http://wiki.slimdevices.com/index.php?title=SB1&oldid=10934) 1 page.
"Scan:1.0 Service Template Version 1.01," For UPnP Version 1.0, Standardized DCP, Sep. 11, 2002, 54 pages.
"Scanner:1.0 Device Template Version 1.01," For UPnP Version 1.0, Standardized DCP, Sep. 11, 2002, 9 pages.
"ScheduledRecording:1 Service Annex A—Control Point Requirements," For UPnP Version 1.0, Standardized DCP Annex, Oct. 6, 2010, Service Template Version: 2.00, 5 pages.
"ScheduledRecording:1 Service Template Version 1.01," For UPnP Version 1.0, Approved Standard, May 31, 2006, Document Version 1.00, 267 pages.
"ScheduledRecording:2 Service," For UPnP Version 1.0, Standardized DCP (SDCP) Dec. 31, 2010, Service Template Version 1.01, 245 pages.
"ScheduledRecording:2 Service Annex A—Control Point Requirements," For UPnP Version 1.0, Standardized DCP Annex, Oct. 6, 2010, Service Template Version: 2.00, 5 pages.
"ScheduledRecording:2 Service Template Version 1.01," For UPnP Version 1.0, Standardized DCP, Sep. 30, 2008, Document Version 1.0, 273 pages.
Madan, Sameer, "Search the Web without a headache," PC World (India), pp. 40-41, Feb. 1998, printed Dec. 20, 1999, 2 pages.

"Searching and Browsing Radio Time," URL unknown, publication date unknown, obtained on or prior to Apr. 22, 2009, 3 pages.
Lamantia, Joe, "Second Generation Tag Clouds," Feb. 23, 2006, at <http://www.joelamantia.com/blog/archives/ideas/second_generation_tag_clouds.html>, copyright 2006, Joe Lamantia, printed Nov. 29, 2007, 19 pages.
Bussey, H., et al., "Service Architecture, Prototype Description, and Network Implications of a Personalized Information Grazing Service," INFOCOM '90, Ninth Annual Joint Conference of the IEEE Computer and Communication Societies, pp. 1046-1053.
"ServiceType:V Formatting (MS Word) Guidelines," Contribuing Members of the UPnP Forum, 2008, 26 pages.
"SHOUTcast Online Documentation," http://web.archive.org/web/20000815054155, Jul. 20, 1999, printed on Sep. 24, 2013.
"SHOUTcast Online Documentation—Configuring your SHOUTcast Server," http://web.archive.org/web/20000620161230, Jul. 20, 1999, printed on Sep. 24, 2013.
"SHOUTcast Online Documentation—How SHOUTcast works," http://web.archive.org/web/20000620182733, Jul. 20, 1999, printed on Sep. 24, 2013.
"SHOUTcast Online Documentation—What is SHOUTcast?" http://web.archive.org/web/20000620145452, Jul. 20, 1999, printed on Sep. 24, 2013.
"SHOUTcast Online Documentation—FAQ Advanced Topics," http://web.archive.org/web/20000619163953, Jul. 20, 1999, printed on Sep. 24, 2013.
"SHOUTcast Online Documentation—FAQ Troubleshooting," http://web.archive.org/web/20000619191320, Jul. 20, 1999, printed on Sep. 24, 2013.
"SHOUTcast Online Documentation—What is the SHOUTcast Server?" http://web.archive.org/web/20000620063713, Jul. 20, 1999, printed on Sep. 24, 2013.
"SHOUTcast Online Documentation—What Platforms Are Supported," http://web.archive.org/web/20001029073229, Jul. 20, 1999, printed on Sep. 24, 2013.
"SHOUTcast Server—Version 1.7.x Available!," http://web.archive.org/web/20000815054151, Aug. 15, 2000, printed on Sep. 24, 2013.
"Simplefi Wireless Digital Audio Receiver, Installation & User Guide," Copyright 2001, Motorola, Inc., 111 pages.
Gibbs, M., "Sit Back and Listen to the Tunes," Network World, Aug. 19, 2002, 5 pages.
SLIMP3—SqueezeboxWiki, Copyright 2012, Logitech (http://wiki.slimdevices.com/index.php?title=SLIMP3&oldid=10936) 1 page.
"SLIMP3 Network MP3 Player Owner's Manual," Copyright 2003, Slim Devices Inc., Revision Apr. 5, 2003, 15 pages.
Hayes, Conor; Cunningham, Pádraig, "Smart Radio—a proposal," Dublin, Trinity College Dublin, Department of Computer Science, TCD-CS-1999-24, 1999, pp. 14.
"SMIL 2.0," Editor Peiy Liu, Siemens Corporate Research, IEEE 2001.
Nwana, H. S., "Software Agents: An Overview," Knowledge Engineering Review, vol. 11, No. 3, pp. 205-244, Oct./Nov. 1996, 49 pages.
"SoftwareManagement:1 Service Template Version 1.01," For UPnP Version 1.0, Standardized DCP (SDCP) Jul. 20, 2010, 76 pages.
"SoftwareManagement:2 Service Template Version 1.01," For UPnP Version 1.0, Standardized DCP (SDCP) Feb. 16, 2012, 88 pages.
"SolarProtectionBlind:1 Device Template Version 1.01," For UPnP Version 1.0, Standardized DCP, Sep. 9, 2008, 7 pages.
Townley, J., "Sonicbox Releases iM Software Tuner," InternetNews.com, Apr. 11, 2000, 2 pages.
"Sony Unveils Palm-Powered Handheld Strategy," CNET News, Jul. 13, 2000, 5 pages.
"SoundBridge User Guide: Wireless Network Music Player, Software Version 2.5," Copyright 2006, Roku, LLC, 37 pages.
"Squeezebox (Network Music Player)," from Wikipedia, the free encyclopedia, en.wikipedia.org/wiki/Squeezebox_(network_music_player), Last Modified Mar. 31, 2012, 5 pages.
"Start Listening with Last.fm," at <http://www.last.fm/>, date unknown but may date back as early as 2002, 1 page.

(56) References Cited

OTHER PUBLICATIONS

Tatarinov, I., "Static Caching in Web Servers—Abstract," Proceedings of the 6th International Conference on Computer Communications and Networks, Sep. 22-25, 1997, 2 pages.
Ng, W.C.T., et al., "Streaming Multimedia Content Over Home Network With an Intelligent Controller," The 29th Annual Conference of the IEEE, Nov. 2-6, 2003, Copyright 2003 IEEE, pp. 1802-1807.
"Streamium MC-i200 Getting Started," Philips, May 31, 2002, 2 pages.
"Streamium Micro Hi-Fi System MC-i200 Manual," Philips, Date Unknown, 39 pages.
"Streamium Micro Hi-Fi System MC-i200 Manual—English/French/Spanish Language Version," Philips, Date Unknown, 55 pages.
"SwitchPower:1 Service Template Version 1.02," For UPnP Version 1.0, Standardized DCP, May 1, 2011, 11 pages.
"Tag cloud in standalone player—Feedback and Ideas—Last.fm," at <http://www.last.fm/forum/21717/_/333289>, posting dated Oct. 4, 2007, copyright 2002-2007, Last.fm Ltd., printed Oct. 17, 2007, 2 pages.
Hearst, Marti A. et al., "Tag Clouds: Data Analysis Tool or Social Signaller?," Proceedings of the 41st Annual Hawaii International Conference on System Sciences (HICSS 2008), Jan. 7-10, 2008, Waikoloa, Big Island, Hawaii, p. 160, available from <http://csdl2.computer.org/persagen/DLAbsToc.jsp?resourcePath=/dl/proceedings/&toc=comp/proceedings/hicss/2008/3075/00/3075toc.xml&DOI=10.1109/HICSS.2008.422>, 10 pages.
Cardoza, P., "Take a Look at the Latest Integrated PDA/Cell Phone Devices," [online] Tech Republic, Apr. 8, 2002 (downloaded on Jun. 11, 2013) Downloaded from the Internet: URL: <http://www.techrepublic.com/article/take-a-look-at-the-latest-integrated-pda-cell-phone-devices/>, 3 pages.
"TalkStreamLive.com—A Dynamic Directory of Streaming Radio," at <http://www.talkstreamlive.com/aboutus.aspx>, from the Internet Archive, dated Aug. 1, 2008, copyright 2006-2008, 3 pages.
"Telephony:1 Security Best Practice," For UPnP Verson 1.0, Standardized DCP (SDCP) Mar. 22, 2011, Document Version 1.0, Service Template Version 2.00, 27 pages.
"TelephonyArchitecture:1," For UPnP Verson 1.0, Standardized DCP (SDCP) Mar. 22, 2011, Document Version 1.0, Service Template Version 2.00, 24 pages.
"TelephonyArchitecture:2," For UPnP Verson 1.0, Standardized DCP (SDCP) Dec. 10, 2012, Document Version 1.0, Service Template Version 2.00, 23 pages.
"TelephonyClient:1 Device," For UPnP Verson 1.0, Standardized DCP (SDCP) Mar. 22, 2011, Document Version 1.0, Service Template Version 2.00, 12 pages.
"TelephonyClient:2 Device," For UPnP Verson 1.0, Standardized DCP (SDCP) Dec. 10, 2012, Document Version 1.0, Service Template Version 2.00, 9 pages.
"TelephonyServer:1 Device," For UPnP Verson 1.0, Standardized DCP (SDCP) Mar. 22, 2011, Document Version 1.0, Service Template Version 2.00, 13 pages.
"TelephonyServer:2 Device," For UPnP Verson 1.0, Standardized DCP (SDCP) Dec. 10, 2012, Document Version 1.0, Service Template Version 2.00, 10 pages.
"The BroadcastWeb Network and Kerbango Sign Co-Marketing Agreement," Boca Raton, FL, Feb. 7, 2000, 3 pages.
Rouarch, Pierre, "The Cloud Search Beta," at <http://www.itcom3.com/thecloudsearch/aboutthecloudsearch.php>, copyright 2007, Pierre Rouarch, printed Oct. 17, 2007, 2 pages.
"The Computer Concepts Traffic System. You'll wonder how you managed without it.," Computer Concepts Corporation, dated Apr. 1990, 1 page.
Van Winkle, W., "The Easy Upgrade," CCNews, Mar. 11, 2003 (Archived at http://www.archive.org/web/20030311134950/http://www.ccnmag.com/index.php?sec+mag&id=134.0) 4 pages.
"The History of Broadcasting and Growth of Internet Audio," Kerbango, Inc., date unknown, 2 pages.

Scherf, K., "The Home Network Market: Data and Multimedia Connectivity, a Parks Associates White Paper," Copyright Sep. 2003, Parks Associates, 13 pages.
Raeder, A., "The Internet Express: Radio on the Internet," The Internet Express, Jul./Aug. 1996, Searcher: The Magazine for Database Professionals, pp. 22 and 24-27 (5 pages).
McCandless, Michael, "The MP3 revolution," IEEE Intelligent Systems, May/Jun. 1999.
Crutcher, Laurence, "The Networked Video Jukebox," IEEE Transactions on Circuits and Systems for Vide:o Technology, vol. 4, No. 2. Apr. 1994.
Moller, Hammar, "The new facilities for the Department for Light and Sound Design of the Theatre Academy of Finland," 95th Covention of AES, Oct. 7-10, 1993.
Goldberg, I., et al., "The Ninja Jukebox," Proceedings of the USITS '99: The 2nd USENIX Symposium on Internet Technologies & Systems, Boulder, Colorado, Oct. 11-14, 1999, 10 pages.
Ian Goldberg, Steven D. Gribble, David Wagner, and Eric A. Brewer, "The Ninja Jukebox," Proceedings of USITS' 99: The 2nd USENIX Symposium on Internet Technologies & Systems Boulder, Colorado, USA, Oct. 11-14, 1999, 11 pages.
"The Ninja Project," http://web.archive.org/web/20000527172201, May 27, 2000, printed on Sep. 24, 2013.
"The Not So Hard Disk," Wheatstone Corporation, and "ENCO DAD486SX—Digital Audio Delivery System," ENCO Systems, Inc., on facsimile dated Dec. 22, 1993, 5 pages.
Robertson, M., et al., "The Official MP3.com Guide to MP3," Copyright 1999, MP3.com, Inc., San Diego, CA 30 pages.
Robertson, M., et al., "The Official MP3.com Guide to MP3," Copyright 1999, MP3.com, Inc., San Diego, CA 118 pages.
McConnell, Chris, "The tapeless revolution comes to radio (disk-based radio broadcasting storage, production and editing systems)," Broadcasting & Cable, v124, n41, p. 77, Oct. 10, 1994, Copyright 1995, Info Access Co., 4 pages.
Gibbon, John F. et al., "The Use of Network Delay Estimation for Multimedia Data Retrieval," IEEE Journal on Selected Areas in Communications, vol. 14, No. 7, Sep. 1996, pp. 1376-1387, 12 pages.
"Thomson Multimedia Expands Reach of Digital Audio With Plans to Offer Internet Radio Products," Paris, Indianapolis, IN, Jun. 27, 2000, 4 pages.
Brandt, E., et al., "Time in Distributed Real-Time Systems," Carnegie Mellon University, Research Showcase, Computer Science Department, School of Computer Science, Paper 498, Jan. 1, 1999, 5 pages.
Atwood, "Timecast offers custom-designed radio," Billboard, May 11, 1996, p. 54.
Chung, Soon; Pereira, Anil, "Timed Petri Net Representation of the Synchronized Multimedia Integration Language (SMIL) of XML," Dept. of Computer Science and Engineering, Wright State University, Proceedings of the International Conference on Information.
"Join LinkedIn and See How You are Connected to TouchTunes. It's Free," TouchTunes—LinkedIn (date unknown) Downloaded on Jul. 18, 2012 (downloaded from the Internet: <URL:www.linkedin.com/company/touchtunes>) 2 pages.
"TouchTunes Software Manual," Copyright 2003, Merit Industries, Inc., PM0377-03, 22 pages.
Busby, C., "TouchTunes Tyranny: Why the Digital JukeBox Revolution is Revolting,"http://www.thebollard.bangordailynews.com/2009/10/07/touchtunes-tyranny.com) Oct. 7, 2009, 6 pages.
TRM: The Universal Barcode for Music and Media from Relatable,ä€ found at <http://relatable.com/tech/trm.html>, copyright 2000-2003, Relatable, printed Oct. 3, 2011, 1 page.
"TuneBase Pro MK-II a CD Library Management System, User's Guide," Document Version 05311999, May 31, 1999, Escient, 56 pages.
LaBanca, R., "Turtle Beach AudioTron," The Home Automation Forum, Copyright 1999 (Archived at http://www.archive.org/web/20021205173424/http://www.homeautomationforum.com/reviews/atron/atron.html) 2 pages.
LaBanca, R., "Turtle Beach AudioTron Continued: But wait, there's more!" The Home Automation Forum, Oct. 23, 2002 (Archived at

(56) References Cited

OTHER PUBLICATIONS http://www.archive.org/web/20021023235309/http://www.homeautomationforum.com/reviews/atron/atron2.html) 3 pages.
LaBanca, R., "Turtle Beach AudioTron Continued: But What About Automation?" The Home Automation Forum, Nov. 4, 2002 (Archived at http://www.archive.org/web/20021104171610/http://www.homeautomationforum.com/reviews/atron/atron3.html) 2 pages.
Bell, I., "Turtle Beach AudioTron Review," Apr. 17, 2002 (Archived at http://web.archive.org/web/20030103061851/http://www.designtechnica.com/reviews.php?op=showcontent&id=23&page=3) 2 pages.
Bell, I., "Turtle Beach AudioTron Review," By Corsair, Apr. 17, 2002 (Archived at http://web.archive.org/web/20030212134345/http://www.designtechnica.com/reviews.php?op=showcontent&id=23) 2 pages.
"Turtle Beach AudioTron Review," WhiningDog.net, Jul. 31, 2002 (Archived at http://web.archive.org/web/20030202100233/http://www.whiningdog.net/Reviews/Gadgets/Audio/MP3/20020801-AudioTron/page1.htm) 2 pages.
"Turtle Beach AudioTron Review: Navigation and Playback," WhiningDog.net, Jul. 31, 2002 (Archived at http://web.archive.org/web/20030302225111/http://www.whiningdog.net/Reviews/Gadgets/Audio/MP3/20020801-AudioTron/page4.htm) 3 pages.
"Turtle Beach AudioTron Review: Other Stuff," WhiningDog.net, Jul. 31, 2002 (Archived at http://web.archive.org/web/20030310213307/http://www.whiningdog.net/Reviews/Gadgets/Audio/MP3/20020801-AudioTron/page5.htm) 2 pages.
"Turtle Beach AudioTron Review: Package Contents," WhiningDog.net, Jul. 31, 2002 (Archived at http://web.archive.org/web/20030212215140/http://www.whiningdog.net/Reviews/Gadgets/Audio/MP3/20020801-AudioTron/page2.htm) 4 pages.
"Turtle Beach AudioTron Review: Web Server Interface," WhiningDog.net, Jul. 31, 2002 (Archived at http://web.archive.org/web/20030107223623/http://www.whiningdog.net/Reviews/Gadgets/Audio/MP3/20020801-AudioTron/page3.htm) 3 pages.
Bell, I., "Turtle Beach AudioTron Review," By XMS, Apr. 17, 2002 (Archived at http://web.archive.org/web/20030220223536/http://www.designtechnica.com/reviews.php?op=showcontent&id=23&page=2) 2 pages.
"TwoWayMotionMotor:1 Service Template Version 1.01," For UPnP Version 1.0, Standardized DCP, Jul. 27, 2007, 30 pages.
Ritchie, J., et al., "UPnP AV Architecture Version 1.0," Jun. 25, 2002, URL:<http://upnp.org/specs/av/UPnP-av-AVArchitecture-v1-20020625.pdf> 22 pages.
"UPnP Device and Services Templates," ISO-IEC, Nov. 30, 2012, 156 pages.
"UPnP FanSpeed:1 Service Template Version 1.01," For UPnP Device Architecture 1.0, Standardized DCP, Sep. 21, 2007, 13 pages.
"UPnP Low Power Architecture," For UPnP Version 1.0, Design Complete, Aug. 28, 2007, Document Version 1.00, 44 pages.
"UPnP Printer:1 Device Template Version 1.01," For UPnP Device Architecture 1.0, Standardized DCP, Oct. 15, 2008, 7 pages.
"UPnP Printer:1 Device Template Version 1.01, Annex A—Optional Service Addition Version 1.0," For UPnP Device Architecture 1.0, Standardized DCP, Oct. 15, 2008, 4 pages.
"UPnP-av-SchemaFiles," Dec. 31, 2010, 46 pages.
"UPnP-av-SchemaFiles," Mar. 31, 2013, 13 pages.
"UPnP-av-SchemaFiles," Nov. 28, 2007, 12 pages.
"UPnP-av-TestFiles," Dec. 31, 2010, 86 pages.
"UPnP-av-TestFiles," Sep. 27, 2007, 142 pages.
"UPnP-basic-testFiles," Dec. 11, 2002, 3 pages.
"UPnP-cs-SchemaFiles," Mar. 6, 2008, 4 pages.
"UPnP-cs-TestFiles," Mar. 2, 2009, 147 pages.
"UPnP-dm-SchemaFiles," Feb. 16, 2012, 5 pages.
"UPnP-dm-SchemaFiles," Jan. 14, 2010, 4 pages.
"UPnP-dm-TestFiles," Feb. 16, 2012, 194 pages.
"UPnP-dm-TestFiles," Jan. 14, 2010, 233 pages.
"UPnP-gw-IGD-TestFiles," Dec. 10, 2010, 85 pages.
"UPnP-gw-IGD-TestFiles," Feb. 24, 2011, 96 pages.
"UPnP-gw-IGD-TestFiles," Sep. 21, 2001, 62 pages.
"UPnP-gw-SchemaFiles," Feb. 24, 2011, 3 pages.
"UPnP-gw-SchemaFiles," Nov. 3, 2009, 4 pages.
"UPnP-gw-WLAN-TestFiles," Oct. 17, 2003, 45 pages.
"UPnP-ha-DigitalSecurityCameraTestFiles," Mar. 24, 2005, 19 pages.
"UPnP-ha-HVAC-TestFiles," May 13, 2003, 31 pages.
"UPnP-ha-Lighting-TestFiles," Nov. 23, 2003, 14 pages.
"UPnP-ha-SolarProtectionBlind-TestFiles," Sep. 9, 2008, 7 pages.
"UPnP-Ip-SchemaFiles," Apr. 4, 2007, 4 pages.
"UPnP-Ip-TestFiles," Nov. 14, 2008, 7 pages.
"UPnP-phone-SchemaFiles," Dec. 10, 2012, 14 pages.
"UPnP-phone-SchemaFiles," Mar. 22, 2011, 3 pages.
"UPnP-phone-TestFiles," Dec. 10, 2012, 9 pages.
"UPnP-phone-TestFiles," Mar. 22, 2011, 18 pages.
"UPnP-pntr-SchemaFile," May 9, 2005, 110 pages.
"UPnP-pntr-TestFile," Oct. 28, 2009, 8 pages.
"UPnP-scnr-TestFiles," Sep. 11, 2002, 21 pages.
"UPnP-sec-SchemaFiles," Nov. 20, 2003, 22 pages.
"UPnP-sec-TestFiles," Nov. 14, 2008, 15 pages.
Gowan, M., "Use Your PC to Serve Up Music: Turn Your PC Into a Music Server with Turtle Beach's Great-Sounding, Networked Digital-Music Player," PC World, Feb. 2, 2001, 2 pages.
Hochmair, H.H. et al., "User Interface Design for Semantic Query Expansion in Geo-data Repositories," Angewandte Geoinformatik 2006—Beitrage zum 18, AGIT-Symposium Salzburg: Heidelberg: Wichmann, 2006, 10 pages.
"Via DJ Digital Music Server," Copyright 2003, Elan Home Systems, 2 pages.
"Via DJ Digital Music Server Installation Manual," Copyright 2003, Elan Home Systems, 16 pages.
"Via DJ Digital Music Server Users Guide," Copyright 2003, Elan Home Systems, 33 pages.
Gebhard, Harald, "Virtual Inernet Broadcasting," University of Dortmund, Germany, IEEE Communicaitons Magazine, Jun. 2001.
Paul, Baldine, "VTJukebox: Implementation Issues for RTP-Based Recording and On-Demand Multicast of Multimedia Conferences," AT&T Labs—Research, 1998.
"WANConnectionDevice:2 Device Template Version 1.01," For UPnP Versions 1.0 and 1.1, Standardized DCP (SDCP), Version 1.00, Sep. 10, 2010, 13 pages.
"WANDevice:1 Device Template Version 1.01," For UPnP Version 1.0, Standardized DCP, Nov. 12, 2001, 12 pages.
"WANDevice:2 Device Template Version 1.01," For UPnP Versions 1.0 and 1.1, Proposed DCP (PDCP), Version 1.0, Sep. 10, 2010, 11 pages.
"WANIPConnection:2 Service," For UPnP Version 1.0, Standardized DCP (SDCP) Sep. 10, 2010, Service Template Version 2.00, 85 pages.
"WANIPv6FirewallControl:1 Service," For UPnP Version 1.0, Standardized DCP (SDCP), version 1.00, Dec. 10, 2010, Service Template Version: 2.00, 39 pages.
Smith, Patricia, "WebCompass Takes Web Searching in the Right Direction," Seybold Report on Desktop Publishing, vol. 10, No. 10, pp. 1-9, found at <http://www.seyboldseminars.com/seybold_report/reports/D1010001.htm>, copyright 1996, Seybold Publications Inc., 9 pages.
"Webradio Com," http://www.webradio.com/eflp/web+radio/pid73231/D284974/C2243539, Copyright 2007 www.webradio.com, printed Oct. 16, 2007, 1 page.
"Welcome to Internet Talk Radio from Talkzone.com," at <http://www.talkzone.com/> from the Internet Archive, dated Jul. 19, 2008, copyright 2007-2008, Syndication Networks Corp., 2 pages.
"Welcome to Kerbango! Entertainment," Kerbango, Inc., Apr. 8, 2000 (Archived at <URL:http://www.kerbango.com/tuner/index.html?fcn_menu=1&tuning_id=10&bwc=) 1 page.
"Welcome to Kerbango! Music," Kerbango, Inc., May 11, 2000 (Archived at <URL:http://www.kerbango.com/tuner/index.html?fcn_menu=1&tuning_id=1&bwc=) 1 page.
"Welcome to Kerbango! News," Kerbango, Inc., May 11, 2000 (Archived at <URL:http://www.kerbango.com/tuner/index.html?fcn_menu=1&tuning_id=7&bwc=) 1 page.

(56) References Cited

OTHER PUBLICATIONS

"Welcome to the Merit Technical Center," Merit Industries, Inc., Revised Aug. 24, 2004, 1 page.
"What is BlogTalkRadio," at <http://www.blogtalkradio.com/whatis.aspx> from the Internet Archive, dated Feb. 28, 2009, copyright 2009, appears that it may have existed in 2008, BlogTalkRadio.com, 2 pages.
"What is the Lansonic Digital Audio Server," [online] Aug. 15, 2000 [Downloaded from the Internet on Aug. 23, 2013] URL: <web.archive.org/web/20000815200431/http://www.lansonic.com/product.htm> (pp. 3-4 of Yamaha Corporation of America Exhibit 1013) 2 pages.
Manes, S., "Wired Jukeboxes," Forbes, Dec. 10, 2001, 4 pages.
Frodigh, M., et al., "Wireless Ad Hoc Networking—The Art of Networking Without a Network," Ericsson Review No. 4, 2000, 16 pages.
"Wireless LAN Networking—Whitepaper," U.S. Robotics, IEEE Computer Society (2009) 12 pages.
"WLANAccessPointDevice:1 Device Template Version 1.01," For UPnP Version 1.0, Standardized DCP, Oct. 17, 2003, 15 pages.
"WLANConfiguration:1, Service Template Version 1.01," For UPnP Version 1.0, Standardized DCP, Oct. 17, 2003, 71 pages.
"World's First Standalone Internet Radio Unveiled by Kerbango," PR Newswire, Indian Wells, California, DEMO 2000, Feb 7, 2000, 4 pages.
"World-Wide Internet Radio: Internet Audio Mini Hi-Fi System," FW-I 1000, Jun. 2001, Royal Philips Electronics N.V., 2 pages.
"www.com and Kerbango, Inc. Joint Forces to Take Internet Radio Beyond the Computer," Los Angeles, May 22, 2000, 3 pages.
"Xantech IR-DC4 (IR/RS232 Interface Module) Installation Instructions," Xantech, Nov. 16, 1998, 4 pages.
"XHTML—Print Photo Templates for UPnP PrintEnhanced:1," For UPnP Version 1.0, Design Complete—Version 1.0, May 4, 2005, 79 pages.
"XHTML—Print/CSS Print Profile Guidelines for PrintEnhanced:1," For UPnP Version 1.0, Design Complete Version 1.0, May 4, 2005, 55 pages.
"YouTube—Broadcast Yourself.," at <http://www.youtube.com/>, copyright 2007, YouTube, LLC, printed Oct. 26, 2007, 2 pages.
"Zoned Audio/Video Z Series," Elan Home Systems, Copyright 2003, 8 pages.
ITC Investigation No. 337-TA-882 Respondents and Intervenors Joint Notice of Prior Art—Appendix A1—UPnP AV 1.0 Chart directed to U.S. Pat. No. 8,028,323, 181 pages.
ITC Investigation No. 337-TA-882 Respondents and Intervenors Joint Notice of Prior Art—Appendix A2—UPnP AV 1.0 Chart directed to U.S. Pat. No. 8,214,873, 269 pages.
ITC Investigation No. 337-TA-882 Respondents and Intervenors Joint Notice of Prior Art—Appendix A3—UPnP AV 1.0 Chart directed to U.S. Pat. No. 8,230,099, 54 pages.
ITC Investigation No. 337-TA-882 Respondents and Intervenors Joint Notice of Prior Art—Appendix B1—UPnP Version 1.0 Chart directed to U.S. Pat. No. 8,028,323, 222 pages.
ITC Investigation No. 337-TA-882 Respondents and Intervenors Joint Notice of Prior Art—Appendix B2—UPnP Version 1.0 Chart directed to U.S. Pat. No. 8,214,873, 324 pages.
ITC Investigation No. 337-TA-882 Respondents and Intervenors Joint Notice of Prior Art—Appendix B3—UPnP Version 1.0 Chart directed to U.S. Pat. No. 8,230,099, 67 pages.
ITC Investigation No. 337-TA-882 Respondents and Intervenors Joint Notice of Prior Art—Appendix C1—Encarnacion Chart directed to U.S. Pat. No. 8,028,323, 189 pages.
ITC Investigation No. 337-TA-882 Respondents and Intervenors Joint Notice of Prior Art—Appendix C2—Encarnacion Chart directed to U.S. Pat. No. 8,214,873, 266 pages.
ITC Investigation No. 337-TA-882 Respondents and Intervenors Joint Notice of Prior Art—Appendix C3—Encarnacion Chart directed to U.S. Pat. No. 8,230,099, 79 pages.
ITC Investigation No. 337-TA-882 Respondents and Intervenors Joint Notice of Prior Art—Appendix D1—Weast Chart directed to U.S. Pat. No. 8,028,323, 152 pages.
ITC Investigation No. 337-TA-882 Respondents and Intervenors Joint Notice of Prior Art—Appendix D2—Weast Chart directed to U.S. Pat. No. 8,214,873, 225 pages.
ITC Investigation No. 337-TA-882 Respondents and Intervenors Joint Notice of Prior Art—Appendix D3—Weast Chart directed to U.S. Pat. No. 8,230,099, 60 pages.
ITC Investigation No. 337-TA-882 Respondents and Intervenors Joint Notice of Prior Art—Appendix E1—Khedouri Chart directed to U.S. Pat. No. 8,028,323, 212 pages.
ITC Investigation No. 337-TA-882 Respondents and Intervenors Joint Notice of Prior Art—Appendix E2—Khedouri Chart directed to U.S. Pat. No. 8,214,873, 352 pages.
ITC Investigation No. 337-TA-882 Respondents and Intervenors Joint Notice of Prior Art—Appendix E3—Khedouri Chart directed to U.S. Pat. No. 8,230,099, 85 pages.
ITC Investigation No. 337-TA-882 Respondents and Intervenors Joint Notice of Prior Art—Appendix F1—Chen 062 Chart directed to U.S. Pat. No. 8,028,323, 170 pages.
ITC Investigation No. 337-TA-882 Respondents and Intervenors Joint Notice of Prior Art—Appendix F2—Chen 062 Chart directed to U.S. Pat. No. 8,214,873, 244 pages.
ITC Investigation No. 337-TA-882 Respondents and Intervenors Joint Notice of Prior Art—Appendix F3—Chen 062 Chart directed to U.S. Pat. No. 8,230,099, 63 pages.
ITC Investigation No. 337-TA-882 Respondents and Intervenors Joint Notice of Prior Art—Appendix G1—IEEE 2003 Article Chart directed to U.S. Pat. No. 8,028,323, 110 pages.
ITC Investigation No. 337-TA-882 Respondents and Intervenors Joint Notice of Prior Art—Appendix G2—IEEE 2003 Article Chart directed to U.S. Pat. No. 8,214,873, 169 pages.
ITC Investigation No. 337-TA-882 Respondents and Intervenors Joint Notice of Prior Art—Appendix G3—IEEE 2003 Article Chart directed to U.S. Pat. No. 8,230,099, 39 pages.
ITC Investigation No. 337-TA-882 Respondents and Intervenors Joint Notice of Prior Art—Appendix H1—Janik 616 Chart directed to U.S. Pat. No. 8,028,323, 88 pages.
ITC Investigation No. 337-TA-882 Respondents and Intervenors Joint Notice of Prior Art—Appendix H2—Janik 616 Chart directed to U.S. Pat. No. 8,214,873, 132 pages.
ITC Investigation No. 337-TA-882 Respondents and Intervenors Joint Notice of Prior Art—Appendix H3—Janik 616 Chart directed to U.S. Pat. No. 8,230,099, 60 pages.
ITC Investigation No. 337-TA-882 Respondents and Intervenors Joint Notice of Prior Art—Appendix I1—Palm Chart directed to U.S. Pat. No. 8,028,323, 214 pages.
ITC Investigation No. 337-TA-882 Respondents and Intervenors Joint Notice of Prior Art—Appendix I2—Palm Chart directed to U.S. Pat. No. 8,214,873, 321 pages.
ITC Investigation No. 337-TA-882 Respondents and Intervenors Joint Notice of Prior Art—Appendix I3—Palm Chart directed to U.S. Pat. No. 8,230,099, 73 pages.
ITC Investigation No. 337-TA-882 Respondents and Intervenors Joint Notice of Prior Art—Appendix J1—Caspi Chart directed to U.S. Pat. No. 8,028,323, 172 pages.
ITC Investigation No. 337-TA-882 Respondents and Intervenors Joint Notice of Prior Art—Appendix J2—Caspi Chart directed to U.S. Pat. No. 8,214,873, 259 pages.
ITC Investigation No. 337-TA-882 Respondents and Intervenors Joint Notice of Prior Art—Appendix J3—Caspi Chart directed to U.S. Pat. No. 8,230,099, 60 pages.
ITC Investigation No. 337-TA-882 Respondents and Intervenors Joint Notice of Prior Art—Appendix K—Saint-Hilaire Chart directed to U.S. Pat. No. 8,230,099, 40 pages.
ITC Investigation No. 337-TA-882 Respondents and Intervenors Joint Notice of Prior Art—Appendix L—Bi Chart directed to U.S. Pat. No. 8,230,099, 53 pages.
ITC Investigation No. 337-TA-882 Respondents and Intervenors Joint Notice of Prior Art—Appendix M—Falvo Chart directed to U.S. Pat. No. 8,230,099, 38 pages.

(56) References Cited

OTHER PUBLICATIONS

ITC Investigation No. 337-TA-882 Respondents and Intervenors Joint Notice of Prior Art—Appendix N—Sound Blaster Chart directed to U.S. Pat. No. 8,230,099, 103 pages.
ITC Investigation No. 337-TA-882 Respondents and Intervenors Joint Notice of Prior Art—Appendix O—Champion Chart directed to U.S. Pat. No. 8,230,099, 43 pages.
ITC Investigation No. 337-TA-882 Respondents and Intervenors Joint Notice of Prior Art—Appendix P—Allen Chart directed to U.S. Pat. No. 8,230,099, 56 pages.
U.S. Appl. No. 60/157,736, Libscomb, et al., filed Oct. 5, 1999, 13 pages.
U.S. Appl. No. 60/176,829, Lipscomb, filed Jan. 19, 2000, 14 pages.
U.S. Appl. No. 60/176,830, Lipscomb, filed Jan. 19, 2000, 15 pages.
U.S. Appl. No. 60/176,833, Libscomb, filed Jan. 19, 2000, 37 pages.
U.S. Appl. No. 60/177,063, Lipscomb, filed Jan. 19, 2000, 29 pages.
U.S. Appl. No. 60/177,783, Lipscomb, et al., filed Jan. 24, 2000, 4 pages.
U.S. Appl. No. 60/177,867, Lipscomb, et al., filed Jan. 24, 2000, 29 pages.
U.S. Appl. No. 60/177,884, Lipscomb, et al., filed Jan. 24, 2000, 5 pages.
U.S. Appl. No. 60/233,741 to Dannie C. Lau, et al., filed Sep. 19, 2000, entitled, "Personal Device-To-Device Networking," 18 pages.
"A complete implementation of the Universal Plug and Play Standard for networked devices," SimpleDevices, May 2, 2004, http://web.archive.org/web/20040502165533/http://simpledevices.com/up np enabler.shtml.
"A new way to bring enhanced content and services to your connected media devices," SimpleDevices, Apr. 13, 2004, http://web.archive.org/web/20040413143604/http://simpledevices.com/mu sic explorer.shtml.
Alexander Sinitsyn, "A Synchronization Framework for Personal Mobile Servers," Philips Research, Proceedings of the Second IEEE Annual Conference on Pervasive Computing and Communications Workshops (PERCOMW'04), 2004 IEEE.
"About SimpleDevices, Inc.," SimpleDevices, Inc., May 1, 2004, http://web.archive.org/web/20040501022142/http://www.simpledevices.co m/aboutus.shtml.
Schneider, "Adhoc Personal Ubiquitous Multimedia Services Via UPNP," Siemens Corporate Research, 2001 IEEE International Conference on Multimedia and Expo ISBN 0-7695-1198-8/01.
"Alcatel and Korean WiderThan.com extend cooperation agreement with global reseller alliance," Pressi.com, Feb. 17, 2003.
"ALi and Oregan Offer Industry Leading 802.11a/b/g Networked DVD Player and Digital Media Adapter Solutions," Business Wire, Jan. 5, 2004.
Hiles, "All MHS Use Cases," Digital Home Working Group, v0.5, Feb. 27, 2004, pp. 1-259.
"Allegro Media Server Lets Users Stream iTunes," Online Reporter, Jan. 24, 2004.
Declaration of Kevin Almeroth, Ph.D., with regard to U.S. Pat. No. 8,028,323, Apr. 20, 2014 (Inter Partes Review No. IPR2014-00709), 32 pages.
Declaration of Kevin Almeroth, Ph.D., with regard to U.S. Pat. No. 8,214,873, May 1, 2014 (Inter Partes Review No. IPR2014-00723), 32 pages.
Declaration of Kevin Almeroth, Ph.D., with regard to U.S. Pat. No. 8,230,099, Apr. 30, 2014 (Inter Partes Review No. IPR2014-00711), 33 pages.
Amended Petition for Inter Partes Review of U.S. Pat. No. 8,045,952 (Inter Partes Review No. IPR2015-00340) Filed Jan. 7, 2015, 64 pages.
"Apogee claims to be first with content-based billing.(Apogee Networks)(Brief Article)(Product Announcement)," New Media Age, HighBeam Research, Mar. 8, 2001.
"Apogee unveils platform for accurate billing of WAP-based Internet service.(Company Business and Marketing)(Brief Article)," Telecomworldwire, HighBeam Research, Mar. 1, 2001.
"Arcadyan Ships First Digital Media Receiver for European Market," Business Wire, Dec. 17, 2003.
Caesar, Matthew, "Architecture of iMode," Apr. 3, 2002.
"Audio: 1 Sample Service Template for UPnP Version 1.0," Contributing Members of the UPnP Forum, 2001.
"AvantGo arrives in UK.(Industry Trend or Event), (Brief Article)," New Media Age, HighBeam Research, Nov. 30, 2000.
Bopardikar, R., et al., "AVTransport:1 Service Annex A—Control Point Requirements," For UPnP Version 1.0, Standardized DCP Annex, Service Template Version: 2.00, Oct. 6, 2010, UPnP Forum, 4 pages.
"AVTransport:1 Service, Annex A—Control Point Requirements," for UPnP Version 1.0, Standardized DCP Annex, Oct. 6, 2010, Service Template Version: 2:00, 4 pages.
"AVTransport:2 Service Template Version 1.01," for UPnP Version 1.0, Standardized DCP, Sep. 30, 2008, Document Version 1.0, 96 pages.
"AVTransport:2 Service, Annex A—Control Point Requirements," For UPnP Version 1.0, Standardized DCP Annex, Oct. 6, 2010, Service Template Version: 2.00, 5 pages.
"AVTransport:3 Service," For UPnP Version 1.0, Standardized DCP (SDCP), Dec. 31, 2010, Service Template Version 1.01, 131 pages.
"AVTransport1.SyntaxTests.xml," date unknown, 3 pages.
"AVTransportl.xml," date unknown, 7 pages.
"AVTransport2.SyntaxTests.xml," date unknown, 4 pages.
"AVTransport2.xml," date unknown, 12 pages.
"Babulous :: Keep it loud," at <http://www.babulous.com/home.jhtml>, copyright 2009, Babulous, Inc., printed Mar. 26, 2009, 2 pages.
"Basic:1.0 Device Definition Version 1.0 for UPnP Version 1.0," Contributing Members of the UPnP Forum, 2002.
*BHM* v *Sonos* "First Amended Complaint for Patent Infringement," filed Sep. 11, 2012, in Civil Action No. 1:12-cv-00637(RGA), 22 pages.
*BHM* v *Sonos* "Complaint for Patent Infringement," filed Jan. 21, 2014, in Civil Action No. 2:14-cv-00486, 31 pages.
Dismissal Order in *Black Hills Media, LLC* v. *Yamaha Corp. of America*, Case No. 2:13-cv-06054 (C.D. Cal.) Dated Jan. 14, 2014, 7 pages.
Order Staying *Black Hills Media, LLC* v. *Yahama Corp. of America*, Case No. 8:14-cv-00101 (C.D. Cal.) dated May 8, 2014, 9 pages.
2:14-cv-471—*BHM* v. *Pioneer Corporation*, et al.—Pioneer/Yamaha Courtesy Invalidity Contentions—Exhibit E-1—Janik Chart—U.S. Patent Publication No. 2002/0068558 to Janik, in view of U.S Patent Publication No. 2002/0065902 to Janik, directed to U.S. Pat. No. 8,214,873 to Weel, Jan. 29, 2014, 5 pages.
2:14-cv-471—*BHM* v. *Pioneer Corporation*, et al.—Pioneer/Yamaha Courtesy Invalidity Contentions—Exhibit E-10d—cd3o Device Chart—cd3o System, directed to U.S. Pat. No. 8,214,873 to Weel, Jan. 29, 2014, 22 pages.
2:14-cv-471—*BHM* v. *Pioneer Corporation*, et al.—Pioneer/Yamaha Courtesy Invalidity Contentions—Exhibit E-10m—cd3o Manual Chart—cd3o Network MP3 Player Product Manual, directed to U.S. Pat. No. 8,214,873 to Weel, Jan. 29, 2014, 8 pages.
2:14-cv-471—*BHM* v. *Pioneer Corporation*, et al.—Pioneer/Yamaha Courtesy Invalidity Contentions—Exhibit E-11d—Lansonic DAS-750 Device Chart—Lansonic DAS-750 System, directed to U.S. Pat. No. 8,214,873 to Weel Jan. 29, 2014, 26 pages.
2:14-cv-471—*BHM* v. *Pioneer Corporation*, et al.—Pioneer/Yamaha Courtesy Invalidity Contentions—Exhibit E-11m—Lansonic DAS-750 Manual Chart—Lansonic Digital Audio Server Operating Instructions Version 2.2.0 DAS-750-PRO, directed to U.S. Pat. No. 8,214,873 to Weel Jan. 29, 2014, 7 pages.
2:14-cv-471—*BHM* v. *Pioneer Corporation*, et al.—Pioneer/Yamaha Courtesy Invalidity Contentions—Exhibit E-12d—Lansonic DAS-950 Device Chart—Lansonic DAS-950 System, directed to U.S. Pat. No. 8,214,873 to Weel Jan. 29, 2014, 24 pages.
2:14-cv-471—*BHM* v. *Pioneer Corporation*, et al.—Pioneer/Yamaha Courtesy Invalidity Contentions—Exhibit E-12p—Lansonic DAS-950 Archived Web Chart—Lansonic DAS-950 Pro Series Archived Web Page dated Feb. 2, 2002, directed to U.S. Pat. No. 8,214,873 to Weel Jan. 29, 2014, 17 pages.

(56) References Cited

OTHER PUBLICATIONS

2:14-cv-471—BHM v. *Pioneer Corporation*, et al.—Pioneer/Yamaha Courtesy Invalidity Contentions—Exhibit E-13—Juszkiewicz Chart—U.S. Pat. No. 7,249,147 to Juszkiewicz, directed to U.S. Pat. No. 8,214,873 to Weel, Jan. 29, 2014, 8 pages.
2:14-cv-471—BHM v. *Pioneer Corporation*, et al.—Pioneer/Yamaha Courtesy Invalidity Contentions—Exhibit E-14—IEEE 2003 Article Chart—Non-Patent Literature Document entitled, "Streaming Multimedia Content Over Home Network With an Intelligent Controller," (IEEE 2003 Article) directed to U.S. Pat. No. 8,214,873 to Weel, Jan. 29, 2014, 24 pages.
2:14-cv-471—BHM v. *Pioneer Corporation*, et al.—Pioneer/Yamaha Courtesy Invalidity Contentions—Exhibit E-2—Bi+Erekson Chart—U.S. Patent Publication No. 2002/0087996 to Bi, et al. in view of U.S. Pat. No. 6,622,018 to Erekson, directed to U.S. Pat. No. 8,214,873 to Weel, Jan. 29, 2014, 4 pages.
2:14-cv-471—BHM v. *Pioneer Corporation*, et al.—Pioneer/Yamaha Courtesy Invalidity Contentions—Exhibit E-3—Berman+Van Ryzin Chart—U.S. Pat. No. 6,502,194 to Berman, et al. in view of U.S. Pat. No. 6,127,941 to Van Ryzin, directed to U.S. Pat. No. 8,214,873 to Weel, Jan. 29, 2014, 4 pages.
2:14-cv-471—BHM v. *Pioneer Corporation*, et al.—Pioneer/Yamaha Courtesy Invalidity Contentions—Exhibit E-4—UPnP AV 1.0 Chart—Non-Patent Literature Document entitled, "UPnP AV Architecture:1," directed to U.S. Pat. No. 8,214,873 to Weel, Jan. 29, 2014, 28 pages.
2:14-cv-471—BHM v. *Pioneer Corporation*, et al.—Pioneer/Yamaha Courtesy Invalidity Contentions—Exhibit E-5—Encarnacion Chart—U.S. Pat. No. 7,668,939 to Encarnacion, directed to U.S. Pat. No. 8,214,873 to Weel, Jan. 29, 2014, 30 pages.
2:14-cv-471—BHM v. *Pioneer Corporation*, et al.—Pioneer/Yamaha Courtesy Invalidity Contentions—Exhibit E-6—Weast Chart—U.S. Pat. No. 7,454,511 to Weast, directed to U.S. Pat. No. 8,214,873 to Weel, Jan. 29, 2014, 20 pages.
2:14-cv-471—BHM v. *Pioneer Corporation*, et al.—Pioneer/Yamaha Courtesy Invalidity Contentions—Exhibit E-7—Chen Chart—U.S. Patent Publication No. 2002/0170062 to Chen, directed to U.S. Pat. No. 8,214,873 to Weel, Jan. 29, 2014, 29 pages.
2:14-cv-471—BHM v. *Pioneer Corporation*, et al.—Pioneer/Yamaha Courtesy Invalidity Contentions—Exhibit E-8—Khedouri Chart—U.S. Pat. No. 8,160,495 to Khedouri, directed to U.S. Pat. No. 8,214,873 to Weel, Jan. 29, 2014, 30 pages.
2:14-cv-471—BHM v. *Pioneer Corporation*, et al.—Pioneer/Yamaha Courtesy Invalidity Contentions—Exhibit E-9d—TurtleBeach AudioTron Device Chart—TurtleBeach AudioTron System, directed to U.S. Pat. No. 8,214,873 to Weel, Jan. 29, 2014, 41 pages.
2:14-cv-471—BHM v. *Pioneer Corporation*, et al.—Pioneer/Yamaha Courtesy Invalidity Contentions—Exhibit E-9m—TurtleBeach AudioTron Manual Chart—TurtleBeach AudioTron Reference Manual, directed to U.S. Pat. No. 8,214,873 to Weel, Jan. 29, 2014, 17 pages.
2:14-cv-471—BHM v. *Pioneer Corporation*, et al.—Pioneer/Yamaha Courtesy Invalidity Contentions—Exhibit F-1—Bi Chart—U.S. Patent Publication No. 2002/0087996 to Bi, et al., directed to U.S. Pat. No. 8,230,099 to Weel, Jan. 29, 2014, 5 pages.
2:14-cv-471—BHM v. *Pioneer Corporation*, et al.—Pioneer/Yamaha Courtesy Invalidity Contentions—Exhibit F-10d—TurtleBeach AudioTron Device Chart—TurtleBeach AudioTron System, directed to U.S. Pat. No. 8,230,099 to Weel, Jan. 29, 2014, 28 pages.
2:14-cv-471—BHM v. *Pioneer Corporation*, et al.—Pioneer/Yamaha Courtesy Invalidity Contentions—Exhibit F-10m—TurtleBeach AudioTron Manual Chart—TurtleBeach AudioTron Reference Manual, directed to U.S. Pat. No. 8,230,099 to Weel, Jan. 29, 2014, 10 pages.
2:14-cv-471—BHM v. *Pioneer Corporation*, et al.—Pioneer/Yamaha Courtesy Invalidity Contentions—Exhibit F-11d—cd3o Device Chart—cd3o System, directed to U.S. Pat. No. 8,230,099 to Weel, Jan. 29, 2014, 17 pages.
2:14-cv-471—BHM v. *Pioneer Corporation*, et al.—Pioneer/Yamaha Courtesy Invalidity Contentions—Exhibit F-11m—cd3o Manual Chart—cd3o Network MP3 Player Product Manual, directed to U.S. Pat. No. 8,230,099 to Weel, Jan. 29, 2014, 7 pages.
2:14-cv-471—BHM v. *Pioneer Corporation*, et al.—Pioneer/Yamaha Courtesy Invalidity Contentions—Exhibit F-12d—Lansonic DAS-750 Device Chart—Lansonic DAS-750 System, directed to U.S. Pat. No. 8,230,099 to Weel Jan. 29, 2014, 17 pages.
2:14-cv-471—BHM v. *Pioneer Corporation*, et al.—Pioneer/Yamaha Courtesy Invalidity Contentions—Exhibit F-12m—Lansonic DAS-750 Manual Chart—Lansonic Digital Audio Server Operating Instructions Version 2.2.0 DAS-750-PRO, directed to U.S. Pat. No. 8,230,099 to Weel Jan. 29, 2014, 6 pages.
2:14-cv-471—BHM v. *Pioneer Corporation*, et al.—Pioneer/Yamaha Courtesy Invalidity Contentions—Exhibit F-13d—Lansonic DAS-950 Device Chart—Lansonic DAS-950 System, directed to U.S. Pat. No. 8,230,099 to Weel Jan. 29, 2014, 16 pages.
2:14-cv-471—BHM v. *Pioneer Corporation*, et al.—Pioneer/Yamaha Courtesy Invalidity Contentions—Exhibit F-13p—Lansonic DAS-950 Archived Web Chart—Lansonic DAS-950 Pro Series Archived Web Page dated Feb. 2, 2002, directed to U.S. Pat. No. 8,230,099 to Weel Jan. 29, 2014, 16 pages.
2:14-cv-471—BHM v. *Pioneer Corporation*, et al.—Pioneer/Yamaha Courtesy Invalidity Contentions—Exhibit F-14—Juszkiewicz Chart—U.S. Pat. No. 7,249,147 to Juszkiewicz, directed to U.S. Pat. No. 8,230,099 to Weel, Jan. 29, 2014, 9 pages.
2:14-cv-471—BHM v. *Pioneer Corporation*, et al.—Pioneer/Yamaha Courtesy Invalidity Contentions—Exhibit F-15—IEEE 2003 Chart—Non-Patent Literature Document entitled, "Streaming Multimedia Content Over Home Network With an Intelligent Controller," (IEEE 2003 Article) directed to U.S. Patent. No. 8,230,099 to Weel, Jan. 29, 2014, 14 pages.
2:14-cv-471—BHM v. *Pioneer Corporation*, et al.—Pioneer/Yamaha Courtesy Invalidity Contentions—Exhibit F-2—Gladwin Chart—WIPO Publication No. WO 01/17142 to Gladwin, et al., directed to U.S. Pat. No. 8,230,099 to Weel, Jan. 29, 2014, 5 pages.
2:14-cv-471—BHM v. *Pioneer Corporation*, et al.—Pioneer/Yamaha Courtesy Invalidity Contentions—Exhibit F-3—Berman Chart—U.S. Pat. No. 6,502,194 to Berman, et al., directed to U.S. Pat. No. 8,230,099 to Weel, Jan. 29, 2014, 6 pages.
2:14-cv-471—BHM v. *Pioneer Corporation*, et al.—Pioneer/Yamaha Courtesy Invalidity Contentions—Exhibit F-4—Janik+Janik Chart—U.S. Patent Publication No. 2002/0068558 to Janik, in view of U.S. Patent Publication No. 2002/0065902 to Janik, et al., directed to U.S. Pat. No. 8,230,099 to Weel, Jan. 29, 2014, 6 pages.
2:14-cv-471—BHM v. *Pioneer Corporation*, et al.—Pioneer/Yamaha Courtesy Invalidity Contentions—Exhibit F-5—UPnP AV 1.0 Chart—Non-Patent Literature Document entitled, "UPnP AV Architecture:1," directed to U.S. Pat. No. 8,230,099 to Weel, Jan. 29, 2014, 24 pages.
2:14-cv-471—BHM v. *Pioneer Corporation*, et al.—Pioneer/Yamaha Courtesy Invalidity Contentions—Exhibit F-6—Allen Chart—U.S. Pat. No. 7,428,023 to Allen, directed to U.S. Pat. No. 8,230,099 to Weel, Jan. 29, 2014, 25 pages.
2:14-cv-471—BHM v. *Pioneer Corporation*, et al.—Pioneer/Yamaha Courtesy Invalidity Contentions—Exhibit F-7—Champion Chart—U.S. Pat. No. 8,230,099 to Champion, directed to U.S. Pat. No. 8,230,099 to Weel, Jan. 29, 2014, 10 pages.
2:14-cv-471—BHM v. *Pioneer Corporation*, et al.—Pioneer/Yamaha Courtesy Invalidity Contentions—Exhibit F-8—Janik Chart—U.S. Pat. No. 7,130,616 to Janik, directed to U.S. Pat. No. 8,230,099 to Weel, Jan. 29, 2014, 16 pages.
2:14-cv-471—BHM v. *Pioneer Corporation*, et al.—Pioneer/Yamaha Courtesy Invalidity Contentions—Exhibit F-9—Sound Blaster Chart—Non-Patent Literature Document entitled, "Creative Sound Blaster Wireless Music User's Guide Version 1.0," directed to U.S. Pat. No. 8,230,099 to Weel, Jan. 29, 2014, 36 pages.
2:14-cv-471—BHM v. *Pioneer Corporation*, et al.—Pioneer/Yamaha Courtesy Invalidity Contentions—Exhibit G-1—Bi Chart—U.S. Patent Publication No. 2002/0087996 to Bi, et al., directed to U.S. Pat. No. 8,458,356 to Weel, Jan. 29, 2014, 4 pages.
2:14-cv-471—BHM v. *Pioneer Corporation*, et al.—Pioneer/Yamaha Courtesy Invalidity Contentions—Exhibit Exhibit G-10—

(56) References Cited

OTHER PUBLICATIONS

TurtleBeach AudioTron Device Chart—TurtleBeach AudioTron System, directed to U.S. Pat. No. 8,458,356 to Weel, Jan. 29, 2014, 15 pages.
2:14-cv-471—*BHM* v. *Pioneer Corporation*, et al.—Pioneer/Yamaha Courtesy Invalidity Contentions—Exhibit G-10m—TurtleBeach AudioTron Manual Chart—TurtleBeach AudioTron Reference Manual, directed to U.S. Pat. No. 8,458,356 to Weel, Jan. 29, 2014, 5 pages.
2:14-cv-471—*BHM* v. *Pioneer Corporation*, et al.—Pioneer/Yamaha Courtesy Invalidity Contentions—Exhibit G-11d—cd3o Device Chart—cd3o System, directed to U.S. Pat. No. 8,458,356 to Weel, Jan. 29, 2014, 9 pages.
2:14-cv-471—*BHM* v. *Pioneer Corporation*, et al.—Pioneer/Yamaha Courtesy Invalidity Contentions—Exhibit G-11m—cd3o Manual Chart—cd3o Network MP3 Player Product Manual, directed to U.S. Pat. No. 8,458,356 to Weel, Jan. 29, 2014, 5 pages.
2:14-cv-471—*BHM* v. *Pioneer Corporation*, et al.—Pioneer/Yamaha Courtesy Invalidity Contentions—Exhibit G-12d—Lansonic DAS-750 Device Chart—Lansonic DAS-750 System, directed to U.S. Pat. No. 8,458,356 to Weel Jan. 29, 2014, 10 pages.
2:14-cv-471—*BHM* v. *Pioneer Corporation*, et al.—Pioneer/Yamaha Courtesy Invalidity Contentions—Exhibit G-12m—Lansonic DAS-750 Manual Chart—Lansonic Digital Audio Server Operating Instructions Version 2.2.0 DAS-750-PRO, directed to U.S. Pat. No. 8,458,356 to Weel Jan. 29, 2014, 4 pages.
2:14-cv-471—*BHM* v. *Pioneer Corporation*, et al.—Pioneer/Yamaha Courtesy Invalidity Contentions—Exhibit G-13d—Lansonic DAS-950 Device Chart—Lansonic DAS-950 System, directed to U.S. Pat. No. 8,458,356 to Weel Jan. 29, 2014, 10 pages.
2:14-cv-471—*BHM* v. *Pioneer Corporation*, et al.—Pioneer/Yamaha Courtesy Invalidity Contentions—Exhibit G-13M—Lansonic DAS-950 Archived Web Chart—Lansonic DAS-950 Pro Series Archived Web Page dated Feb. 2, 2002, directed to U.S. Pat. No. 8,458,356 to Weel Jan. 29, 2014, 10 pages.
2:14-cv-471—*BHM* v. *Pioneer Corporation*, et al.—Pioneer/Yamaha Courtesy Invalidity Contentions—Exhibit G-14—Juszkiewicz Chart—U.S. Pat. No. 7,249,147 to Juszkiewicz, directed to U.S. Pat. No. 8,458,356 to Weel, Jan. 29, 2014, 10 pages.
2:14-cv-471—*BHM* v. *Pioneer Corporation*, et al.—Pioneer/Yamaha Courtesy Invalidity Contentions—Exhibit G-15—IEEE 2003 Chart—Non-Patent Literature Document entitled, "Streaming Multimedia Content Over Home Network With an Intelligent Controller," (IEEE 2003 Article) directed to U.S. Pat. No. 8,458,356 to Weel, Jan. 29, 2014, 12 pages.
2:14-cv-471—*BHM* v. *Pioneer Corporation*, et al.—Pioneer/Yamaha Courtesy Invalidity Contentions—Exhibit G-2—Gladwin Chart—WIPO Publication No. WO 01/17142 to Gladwin, et al., directed to U.S. Pat. No. 8,458,356 to Weel, Jan. 29, 2014, 3 pages.
2:14-cv-471—*BHM* v. *Pioneer Corporation*, et al.—Pioneer/Yamaha Courtesy Invalidity Contentions—Exhibit G-3—Berman Chart—U.S. Pat. No. 6,502,194 to Berman, et al., directed to U.S. Pat. No. 8,458,356 to Weel, Jan. 29, 2014, 3 pages.
2:14-cv-471—*BHM* v. *Pioneer Corporation*, et al.—Pioneer/Yamaha Courtesy Invalidity Contentions—Exhibit G-4—Janik+Janik Chart—U.S. Patent Publication No. 2002/0068558 to Janik, in view of U.S. Patent Publication No. 2002/0065902 to Janik, et al., directed to U.S. Pat. No. 8,458,356 to Weel, Jan. 29, 2014, 6 pages.
2:14-cv-471—*BHM* v. *Pioneer Corporation*, et al.—Pioneer/Yamaha Courtesy Invalidity Contentions—Exhibit G-5—UPnP AV 1.0 Chart—Non-Patent Literature Document entitled, "UPnP AV Architecture:1," directed to U.S. Pat. No. 8,458,356 to Weel, Jan. 29, 2014, 16 pages.
2:14-cv-471—*BHM* v. *Pioneer Corporation*, et al.—Pioneer/Yamaha Courtesy Invalidity Contentions—Exhibit G-6—Janik Chart—U.S. Pat. No. 7,130,616 to Janik, directed to U.S. Pat. No. 8,458,356 to Weel, Jan. 29, 2014, 10 pages.
2:14-cv-471—*BHM* v. *Pioneer Corporation*, et al.—Pioneer/Yamaha Courtesy Invalidity Contentions—Exhibit G-7—Sound Blaster Chart—Non-Patent Literature Document entitled, "Creative Sound Blaster Wireless Music User's Guide Version 1.0," directed to U.S. Pat. No. 8,458,356 to Weel, Jan. 29, 2014, 33 pages.
2:14-cv-471—*BHM* v. *Pioneer Corporation*, et al.—Pioneer/Yamaha Courtesy Invalidity Contentions—Exhibit G-8—Allen Chart—U.S. Pat. No. 7,428,023 to Allen, directed to U.S. Pat. No. 8,458,356 to Weel, Jan. 29, 2014, 15 pages.
2:14-cv-471—*BHM* v. *Pioneer Corporation*, et al.—Pioneer/Yamaha Courtesy Invalidity Contentions—Exhibit G-9—Champion Chart—U.S. Pat. No. 8,458,356 to Champion, directed to U.S. Pat. No. 8,458,356 to Weel, Jan. 29, 2014, 6 pages.
2:14-cv-471—*BHM* v. *Pioneer Corporation*, et al.—Pioneer/Yamaha Courtesy Invalidity Contentions—Exhibit H-10d—'323—TurtleBeach AudioTron Device Chart—TurtleBeach AudioTron System, directed to U.S. Pat. No. 8,028,323 to Weel, Jan. 29, 2014, 27 pages.
2:14-cv-471—*BHM* v. *Pioneer Corporation*, et al.—Pioneer/Yamaha Courtesy Invalidity Contentions—Exhibit H-10m—'323—TurtleBeach AudioTron Manual Chart—TurtleBeach AudioTron Reference Manual, directed to U.S. Pat. No. 8,028,323 to Weel, Jan. 29, 2014, 12 pages.
2:14-cv-471—*BHM* v. *Pioneer Corporation*, et al.—Pioneer/Yamaha Courtesy Invalidity Contentions—Exhibit H-11d—'323—Lansonic DAS-750 Device Chart—Lansonic DAS-750 System, directed to U.S. Pat. No. 8,028,323 to Weel Jan. 29, 2014, 16 pages.
2:14-cv-471—*BHM* v. *Pioneer Corporation*, et al.—Pioneer/Yamaha Courtesy Invalidity Contentions—Exhibit H-11m—'323—Lansonic DAS-750 Manual Chart—Lansonic Digital Audio Server Operating Instructions Version 2.2.0 DAS-750-PRO, directed to U.S. Pat. No. 8,028,323 to Weel Jan. 29, 2014, 5 pages.
2:14-cv-471—*BHM* v. *Pioneer Corporation*, et al.—Pioneer/Yamaha Courtesy Invalidity Contentions—Exhibit H-12d—'323—Lansonic DAS-950 Device Chart—Lansonic DAS-950 System, directed to U.S. Pat. No. 8,028,323 to Weel Jan. 29, 2014, 16 pages.
2:14-cv-471—*BHM* v. *Pioneer Corporation*, et al.—Pioneer/Yamaha Courtesy Invalidity Contentions—Exhibit H-12P—'323—Lansonic DAS-950 Archived Web Chart—Lansonic DAS-950 Pro Series Archived Web Page dated Feb. 2, 2002, directed to U.S. Pat. No. 8,028,323 to Weel Jan. 29, 2014, 12 pages.
2:14-cv-471—*BHM* v. *Pioneer Corporation*, et al.—Pioneer/Yamaha Courtesy Invalidity Contentions—Exhibit H-1d—'323—cd3o Device Chart—cd3o System, directed to U.S. Pat. No. 8,028,323 to Weel, Jan. 29, 2014, 16 pages.
2:14-cv-471—*BHM* v. *Pioneer Corporation*, et al.—Pioneer/Yamaha Courtesy Invalidity Contentions—Exhibit H-1m—'323—cd3o Manua Chart—cd3o Network MP3 Player Product Manual, directed to U.S. Pat. No. 8,028,323 to Weel, Jan. 29, 2014, 6 pages.
2:14-cv-471—*BHM* v. *Pioneer Corporation*, et al.—Pioneer/Yamaha Courtesy Invalidity Contentions—Exhibit H-2—'323—Janik+ Janik Chart—U.S. Patent Publication No. 2002/0068558 to Janik, in view of U.S. Patent Publication No. 2002/0065902 to Janik, et al., directed to U.S. Pat. No. 8,028,323 to Weel, Jan. 29, 2014, 4 pages.
2:14-cv-471—*BHM* v. *Pioneer Corporation*, et al.—Pioneer/Yamaha Courtesy Invalidity Contentions—Exhibit H-3—'323—Bi Chart—U.S. Patent Publication No. 2002/0087996 to Bi, et al., directed to U.S. Pat. No. 8,028,323 to Weel, Jan. 29, 2014, 3 pages.
2:14-cv-471—*BHM* v. *Pioneer Corporation*, et al.—Pioneer/Yamaha Courtesy Invalidity Contentions—Exhibit H-4—'323—Berman+Van Ryzin Chart—U.S. Pat. No. 6,502,194 to Berman, et al. in view of U.S. Pat. No. 6,127,941 to Van Ryzin, directed to U.S. Pat. No. 8,028,323 to Weel, Jan. 29, 2014, 4 pages.
2:14-cv-471—*BHM* v. *Pioneer Corporation*, et al.—Pioneer/Yamaha Courtesy Invalidity Contentions—Exhibit H-5—'323—UPnP AV 1.0 Chart—Non-Patent Literature Document entitled, "UPnP AV Architecture:1," directed to U.S. Pat. No. 8,028,323 to Weel, Jan. 29, 2014, 16 pages.
2:14-cv-471—*BHM* v. *Pioneer Corporation*, et al.—Pioneer/Yamaha Courtesy Invalidity Contentions—Exhibit H-6—'323—Encarnacion Chart—U.S. Pat. No. 7,668,939 to Encarnacion, directed to U.S. Pat. No. 8,028,323 to Weel, Jan. 29, 2014, 16 pages.
2:14-cv-471—*BHM* v. *Pioneer Corporation*, et al.—Pioneer/Yamaha Courtesy Invalidity Contentions—Exhibit H-7—'323—

(56) References Cited

OTHER PUBLICATIONS

Weast Chart—U.S. Pat. No. 7,454,511 to Weast, directed to U.S. Pat. No. 8,028,323 to Weel, Jan. 29, 2014, 13 pages.
2:14-cv-471—*BHM* v. *Pioneer Corporation*, et al.—Pioneer/Yamaha Courtesy Invalidity Contentions—Exhibit H-8—'323—Chen Chart—U.S. Patent Publication No. 2002/0170062 to Chen, directed to U.S. Pat. No. 8,028,323 to Weel, Jan. 29, 2014, 20 pages.
2:14-cv-471—*BHM* v. *Pioneer Corporation*, et al.—Pioneer/Yamaha Courtesy Invalidity Contentions—Exhibit H-9—'323—Khedouri Chart—U.S. Pat. No. 8,160,495 to Khedouri, directed to U.S. Pat. No. 8,028,323 to Weel, Jan. 29, 2014, 21 pages.
"Billboard Music Charts—Latest Music News—Music Videos," http://www.billboard.com/bbcom/index.jsp, printed Feb. 7, 2007, 2 pages.
Declaration of V. Michael Bove, Jr., with regard to U.S. Pat. No. 8,214,873, May 16, 2014 (Inter Partes Review No. IPR2014-00766), 41 pages.
Declaration of V. Michael Bove, Jr., with regard to U.S. Pat. No. 8,458,356, May 6, 2014 (Inter Partes Review No. IPR2014-00733), 13 pages.
Declaration of V. Michael Bove, Jr., with regard to U.S. Pat. No. 8,214,873, Sep. 18, 2013 (Inter Partes Review No. IPR2013-00598), 42 pages.
Declaration of V. Michael Bove, Jr., with regard to U.S. Pat. No. 8,230,099, Sep. 18, 2013 (Inter Partes Review No. IPR2013-00597), 35 pages.
"CD Player: 1 Sample Service Template for UPnP Version 1.0," Contributing Members of the UPnP Forum, 2001.
"Cd3o Network MP3 Player Product Manual," Copyright 2003, cd3o, Inc., 65 pages.
Stone, Glen, "CEA R7.7 Wireless Entertainment Networking," Digital Home Working Group, Aug. 5, 2003.
Jepson, Brian, "Cellular Networking with CDPD," Web Techniques, Nov. 2001.
"ChangeDisc: 1 Sample Service Template for UPnP Version 1.0," Contributing Members of the UPnP Forum, 2000.
"Checklist for UPnP Standard Device Template Version 1.01," Contributing Members of the UPnP Forum, publication date unknown.
"Checklist for UPnP Standard Service Templates Version 1.01," Contributing Members of the UPnP Forum, publication date unknown.
"CNET Names PRISMIQ MediaPlayer Best of CES," PR Newswire, Jan. 14, 2003, pp. 1-2.
"CNN.com—Breaking News, U.S., World, Weather, Entertainment & Video News," http://www.cnn.com/, copyright 2007 Cable News Network LP, LLLP, printed Feb. 7, 2007, 3 pages.
Petersson, Justus, "Connected Home—the Home IMS Gateway," Ericsson, Telefonica, Feb. 28, 2007.
"Connection Manager: 1 Service Template Vrsion 1.01," Contributing Members of the UPnP Forum, Jun. 25, 2002.
"ConnectionManager:1 Service, Annex A—Control Point Requirements," For UPnP Version 1.0, Standardized DCP Annex, Oct. 6, 2010, Service Template Version: 2.00, 4 pages.
"ConnectionManager:2 Service Template Version 1.01," For UPnP Version 1.0, Approved Standard, May 31, 2006, Document Version 1.00, 49 pages.
"ConnectionManager:3 Service," For UPnP Version 1.0, Standardized DCP (SDCP), Dec. 31, 2010, Service Template Version 1.01, 84 pages.
"ConnectionManager1.SyntaxTests.xml," date unknown, 1 page.
"ConnectionManager1.xml," date unknown, 3 pages.
"ConnectionManager2.SyntaxTests.xml," date unknown, 1 page.
"ConnectionManager2.xml," date unknown, 4 pages.
"ContentDirectory:2 Service Annex A—Control Point Requirements," For UPnP Version 1.0, Standardized DCP Annex, Oct. 6, 2010, Service Template Version 2:00, 4 pages.
"ContentDirectory:2 Service Template Version 1.01," For UPnP Version 1.0, Approved Standard, May 31, 2006, Document Version 1.00, 172 pages.
"ContentDirectory:3 Service Annex A—Control Point Requirements," For UPnP Version 1.0, Standardized DCP Annex, Oct. 6, 2010, Service Template Version 2:00, 5 pages.
"ContentDirectory:3 Service Template Version 1.01," For UPnP Version 1.0, Standardized DCP, Sep. 30, 2008, Document Version 1.00, 248 pages.
"ContentDirectory:4 Service," For UPnP Version 1.0, Standardized DCP (SDCP) Dec. 31, 2010, Service Template Version 1.01, 377 pages.
"ContentDirectory1.SyntaxTests.xml," date unknown, 3 pages.
"ContentDirectory1.xml," date unknown, 6 pages.
"ContentDirectory2.SyntaxTests.xml," date unknown, 3 pages.
"ContentDirectory2.xml," date unknown, 8 pages.
"ContentDirectory3.SyntaxTests.xml," date unknown, 4 pages.
"ContentDirectory3.xml," date unknown, 10 pages.
"ContentSync:1 Service Template Version 1.01, for UPnP Version 1.0," Contributing Members of the UPnP Forum, 2009, 111 pages.
"Continential Automated Buldings Association,Digital Home White Paper, IS 2003-31," Digital Home Working Group, Jun. 2003, 14 pages.
"ControlValve:1 Service Template for UPnP Device Architecture V 1.0," Contributing Members of the UPnP Forum, 2003, 15 pages.
Corrected Petition for Inter Partes Review of U.S. Pat. No. 8,050,652 (Inter Partes Review No. IPR2015-00590) Filed Feb. 9, 2015, 60 pages.
"CyberLink Reveals UPnP-Compliant Home," PR Newswire, Apr. 12, 2004, pp. 1-3.
Decision—Institution of Inter Partes Review entered Jan. 24, 2013 for IPR2012-00004, 28 pages.
Decision—Institution of Inter Partes Review entered Jul. 3, 2014 for IPR2013-00175, 21 pages.
Decision—Institution of Inter Partes Review entered Mar. 20, 2014 for IPR2013-00597, 23 pages.
Decision—Institution of Inter Partes Review entered Mar. 20, 2014 for IPR2013-00598, 26 pages.
Decision—Institution of Inter Partes Review entered Nov. 4, 2014 for IPR2014-00709, 20 pages.
Decision—Institution of Inter Partes Review entered Nov. 4, 2014 for IPR2014-00711, 22 pages.
Decision—Institution of Inter Partes Review entered Nov. 4, 2014 for IPR2014-00723, 20 pages.
Decision—Institution of Inter Partes Review entered Nov. 10, 2014 for IPR2014-00733, 16 pages.
Decision—Institution of Inter Partes Review entered Nov. 4, 2014 for IPR2014-00737, 24 pages.
Decision—Institution of Inter Partes Review entered Nov. 4, 2014 for IPR2014-00740, 25 pages.
Decision—Institution of Inter Partes Review entered Nov. 24, 2014 for IPR2014-00766, 24 pages.
Decision—Institution of Inter Partes Review and Grant of Joinder entered Jan. 28, 2015 for IPR2015-00337, 6 pages.
Decision—Institution of Inter Partes Review and Grant of Joinder entered Jan. 28, 2015 for IPR2015-00338, 6 pages.
Decision—Institution of Inter Partes Review and Grant of Joinder entered Jan. 28, 2015 for IPR2015-00339, 6 pages.
Decision—Institution of Inter Partes Review and Grant of Joinder entered Jan. 28, 2015 for IPR2015-00340, 6 pages.
Kim, Dong-Sung, "Design and Implementation of Home Network Systems Using UPnP Middleware for Networked Appliances," School of Electrical Engineering and Computer Science, Seoul National University, Jul. 22, 2002, 10 pages.
DLNA, "Design Guidelines," Jul. 1, 2004, http://www.dlna.org/resources, 1 page.
"Designing a UPnP AV MediaServer," Version 1.00, Intel Corporation, 2003, 46 pages.
"DeviceSecurity:1 Service Template for UPnP Device Architure 1.0," Contributing Members of the UPnP Forum, 2003, 66 pages.
"DeviceType:V Device Template Version 1.01 for UPnP Version 1.0," Contributing Members of the UPnP Forum, Jan. 16, 2001, 9 pages.
Stone, Glen, "DHWG HNv1 and Use Case Subcommittee Update," Digital Home Working Group, 2004, 35 pages.

(56) References Cited

OTHER PUBLICATIONS

Stone, Glen, "DHWG Status to CEA," Digital Home Working Group, Nov. 11, 2003, 10 pages.
Peter Jansen Associates, "Digital Convergence and Home Entertainment," Apr. 1, 2002, web.archive.org/web/20040619093957/ http://www.mediabolic.com/press/i tem.php?id=58, 9 pages.
"Digital Home White Paper," IS 2003-31, Jun. 2003, <www.caba.org. 14 pages.
Smith, "Digital home group touts convergence spec," The Register, Jun. 23, 2004, 2 pages.
"Digital Home Working Group Design Guidelines," Version 1.0, Working Draft, Apr. 1, 2004, Copyright 2004 Digital Home Working Group, 160 pages.
DHWG/DLNA, "Digital Home Working Group Design Guidelines, Version: 1.0," Digital Home Working Group, Version No. HNv1-0.900, Apr. 1, 2004, 160 pages.
DHWG/DLNA, "Digital Living Network Alliance Home Networked Device Interoperability Guidelines Version: 1.0," Digital Living Network Alliance, Jun. 2, 2004, pp. 1-151.
"D-Link Unveils 1st UPnP-Enabled Central Home Storage Drive," PR Newswire, Sep. 16, 2003, pp. 1-3.
"D-Link Wireless Media Player Validated by Intel to Meet Interoperability Guidelines D-Link is the First Major Networking Device Manufacturer to Earn Intel(R) Networked Media Product Requirements (Intel(R) NMPR) Conformance Validation," PR Newswire, May 4, 2004, 4 pages.
D-Link's New Wireless Media Device Plays Digital Music, Videos, and Photos on Home Television and Stereo New D-Link Digital Home Solution Merges Home Entertainment Center With Home Network for Seamless Delivery of Multimedia Content Anywhere in the Home, Jan. 20, 2004, 4 pages.
Ailara, "DLNA Strides Toward Consumer-Friendly Home Networked Devices With New Interoperability Guidelines," DLNA, Jun. 22, 2004, 4 pages.
DV Archive From Wikipedia, the free encyclopedia, en.wikipedia.org/wiki/DVArchive, printed on Sep. 3, 2013.
Brumitt, Barry, "Easy Living: Technologies for Intelligent Environments," The Easy Living Project, Microsoft Research, Handheld and Ubiclitous Computing, 2nd International Symposium, Bristol, UK September 2000, 12 pages.
Expert Report of Dr. Kevin C. Almeroth, ITC Investigation No. 337-TA-882, filed Nov. 12, 2013, 178 pages.
Final Written Decision of IPR, with regard to U.S. Pat. No. 8,045,952, Mar. 18, 2015 (Inter Partes Review No. IPR2013-00593), 22 pages.
Final Written Decision of IPR, with regard to U.S. Pat. No. 8,050,652, Mar. 18, 2015 (Inter Partes Review No. IPR2013-00594), 29 pages.
Final Written Decision of IPR, with regard to U.S. Pat. No. 8,230,099, Mar. 18, 2015 (Inter Partes Review No. IPR2013-00597), 31 pages.
Final Written Decision of IPR, with regard to U.S. Pat. No. 8,230,873, Mar. 18, 2015 (Inter Partes Review No. IPR2013-00598), 24 pages.
Mandayan Raghunath et al., "Fostering a Symbiotic Handheld Environment," IEEE Computer Society, pp. 56-65, Sep. 2003.
Williams, "Gadgets getting connected with DLNA," PC World Business Centre, Oct. 14, 2004, 3 pages.
"Goombah" Preview, at <http://www.goombah.com/preview.html>, printed Jan. 8, 2008, 5 pages.
The HAVi Specification Version 1.1 of the Home Audio/Video Interoperability (HAVi) Architecture, HAVi, Inc., May 15, 2001, 529 pages.
Jussi Teirikangas, "HAVi: Home Audio Video Interoperability," Helsinki University of Technology, 2001, 10 pages.
DHWG/DLNA, "HNv1 Approved Phase 1 Use Cases," Digital Home Working Group, Jan. 29, 2004, pp. 1-23.
DHWG/DLNA, "HNv1 Approved Phase 2 Use Cases," Digital Home Working Group, Jan. 29, 2004, pp. 1-18.

"Home Entertainment Solutions," SimpleDevices, Apr, 13, 2004, http://web.archive.org/web/20040413030604/http://www.simpledevices.co m/homeentertainment.shtml, 1 page.
Peter M. Corcoran et al., "Home Network Infrastructure for Handheld/Wearable Appliances," IEEE Transactions on Consumer Electronics, vol. 48, No. 3, Aug. 2002, pp. 490-495.
DHWG/DLNA, "Home Networked Device Ineroperability Guidelines v1.0," Digital Living Network Alliance, 2004, pp. 1-202.
DHWG/DLNA, "Home Networked Device Ineroperability Guidelines White Paper," Digital Living Network Alliance, Jun. 2004, pp. 1-16.
Miller, "Home Networking with Universal Plug and Play," IEEE Communications Magazine, Dec. 2001 vol. 39 No. 12, 16 pages.
"HouseStatus:1 Service Template for UPnP Device Architecture 1.0," Standardized DCP, May 13, 2003, Contributing Members of the UPnP Forum, 17 pages.
"HVAC_FanOperatingMode:1 Service Template for UPnP Device Architecture 1.0," Standardized DCP, May 13, 2003, Contributing Members of the UPnP Forum, 12 pages.
"HVAC_SetpointSchedule:1 Service Template for UPnP Device Architecture 1.0," Contributing Members of the UPnP Forum, 2003, 16 pages.
"HVAC_System:1 Device Template for UPnP Device Architecture 1.0," Contributing Members of the UPnP Forum, 2003, 8 pages.
"HVAC_UserOperatingMode:1 Service Template for UPnP Device Architecture 1.0," Contributing Members of the UPnP Forum, 2003, 15 pages.
"HVAC_ZoneThermostat:1 Device Template for UPnP Device Architecture 1.0," Contributing Members of the UPnP Forum, 2003, 10 pages.
Ma; Gibbs; Kaplan, "IDTV Broadcast Applications for a Handheld Device," Panasonic Technologies Co., IEEE Communications Society, pp. 85-89, 2004 IEEE.
Vacca, John, "I-Mode Crash Course," McGraw-Hill, 2002, 4 pages.
"InboundConnectionConfig:1 Service," For UPnP Version 1.0, Standardized DCP, Sep. 30, 2009, Document Version 1.0, Service Template Version 2.0, 21 pages.
"Intel accelerates the delivery of the digital home with the extended wireless PC initiative," TV Meets the Web, Sep. 10, 2002, pp. 1-2.
Schwartz, Ephraim, "Intel moving into home electronics with new digital initiative; Chipmaker to support Microsoft UPnP as way to connect TVs and stereos," InfoWorld, Sep. 9, 2002, pp. 1-3.
Salvator, Dave, "Intel Pushes Plug and Play Into Homes ; Universal Plug and Play and 802.11 remain the technology Intel is betting on to infiltrate home entertainment networks," ExtremeTech.com, Sep. 10, 2002, pp. 1-3.
"Intel UPnP—Based Remote I/O Developer's Guide," Version 0.4, Intel Corporation, Sep. 12, 2003, 25 pages.
Lemon, Sumner, "Intel: Digital media adapters to hit market in 2003; Dell, Gateway, Mitac, Legend set to launch adapters next year," InfoWorld, Oct. 15, 2002, 2 pages.
Drummond; Ionescu; Holte, "Intelligent Browsing for Multimedia Applications," University of Ottawa, Proceedings of Multimedia '96, pp. 386-389, 1996 IEEE.
"Intel's Digital Home Vision Moves Closer to Reality With New Industry Enabling Building Blocks," Business Wire, Feb. 28, 2003, pp. 1-4.
"InternetGatewayDevice:1 Device Template Version 1.01 for UPnP Version 1.0," Contributing Members of the UPnP Forum, 2001, 15 pages.
"Interoperable Home Infrastructure," Intel Technology Journal, vol. 6, Issue 04, ISSN 1535-766X, Nov. 15, 2002, 78 pages.
"Introducing the Digital Home Working Group," Digital Home Working Group, 2004, 16 pages.
Jeronimo, "It Just Works: UPnP in the Digital Home," Oct. 5, 2004, http://www.artima.com/spontaneous/upnp digihome.html, 16 pages.
Declaration of Kevin Jeffay, Ph.D., with regard to U.S. Pat. No. 8,045,952, May 9, 2014 (Inter Partes Review No. IPR2014-00740), 33 pages.
Declaration of Kevin Jeffay, Ph.D., with regard to U.S. Pat. No. 8,050,652, May 8, 2014 (Inter Partes Review No. IPR2014-00737), 37 pages.

(56) References Cited

OTHER PUBLICATIONS

O'Hara, K., et al., "Jukola: Democratic Music Choice in a Public Space," DIS 2004, Aug. 1-4, 2004, Cambridge, MA pp. 145-154.
"LANDevice:1 Device Template Version 1.01 for UPnP Version 1.0," Contributing Members of the UPnP Forum, 2001, 9 pages.
"LANHostConfigManagement:1 Service Template Version 1.01 for UPnP Version 1.0," Contributing Members of the UPnP Forum, 2001, 27 pages.
"Lansonic Professional Series—Digital Audio Server—Operating Instructions," Version 2.2.0, Feb. 2002, DAS-750-PRO, 120 pages.
"Layer3Forwarding:1 Service Template Version 1.01 for UPnP Version 1.0," Contributing Members of the UPnP Forum, 2001, 14 pages.
Brumbaugh, Pete, "Leading GPS Innovator Takes Wireless to the Streets," Garmin Int'l, Oct. 1, 1998, 1 page.
Mascia, J. and Reddy, S., "Cs219 Project Report—Lifetrak: Music in Tune With Your Life," Department of Electrical Engineering, UCLA '06, Los Angeles, California, copyright 2006, ACM, 11 pages.
MCi200 Streamium Broadband Internet Micro System, Philips Electronics, 2001, 2 pages.
MC-i200 Streamium Micro Hi-Fi System manual, Philips Consumer Electronics North America, publication date unknown, 39 pages.
MCi250 Streamium Broadband Internet Micro System, Philips Electronics, 2002, 2 pages.
MC-i250 Wireless Broadband Internet Audio System, Philips Electronics, publication date unknown, 42 pages.
"Mediabolic Incorporates Support for UPnP Technology into the Mediabolic ONE Platform," Business Wire, Jan. 6, 2003, pp. 1-2.
"MediaRenderer:2 Device Template Version 1.01," For UPnP Version 1.0, Standardized DCP, Sep. 30, 2008, Version 1.0, 26 pages.
"MediaRenderer:3 Device," For UPnP Version 1.0, Standardized DCP (SDCP) Dec. 31, 2010, Device Template Version 1.01, 29 pages.
"MediaRenderer1.xml," date unknown, 1 page.
"MediaRenderer2.xml," date unknown, 1 page.
"MediaServer:1 and Media Render:1." http://upnp.org/specs/av/av1, p. 1, approved Jun. 24, 2002, printed Oct. 2, 2013.
"MediaServer:1 Device Template Version 1.01 for UPnP 1.0," Contributing Members of the UPnP Forum, Jun. 25, 2002, 12 pages.
"MediaServer:2 Device Template Version 1.01," For UPnP Version 1.0, Approved Standard, May 31, 2006, Document Version 1.00, 24 pages.
"MediaServer:3 Device Template Version 1.01," For UPnP Version 1.0, Standardized DCP, Sep. 30, 2008, Document Version 1.0, 26 pages.
"MediaServer:4 Device," For UPnP Version 1.0, Standardized DCP (SDCP) Dec. 31, 2010, Device Template Version 1.01, 29 pages.
"MediaServer1.xml," date unknown, 1 page.
"MediaServer2.xml," date unknown, 1 page.
"MediaServer3.xml," date unknown, 1 page.
DHWG/DLNA, "MHS Use Case Proposal Samsung," r1.0, Digital Home Working Group, Feb. 25, 2004, pp. 1-36.
"Microsoft Announces Windows Media Connect Technology, Enabling Seamless Media Transfer Between Windows XP-Based PCs and Consumer Electronics Devices," PR Newswire, Jan. 7, 2004, pp. 1-5.
"Mobile Networking with WAP," Friedr, Vieweg, Sohn, 1st Edition 2000, 4 pages.
"Mobile Use Cases Passed for HNv1," Digital Home Working Group, Oct. 18, 2003, 18 pages.
Hacker, S., "MP3: The Definitive Guide," 1st Edition Mar. 2000, 378 pages.
"MSN—Music," http://music.msn.com/help/sync, copyright 2007 Microsoft, printed Nov. 16, 2007, 1 page.
"Music Downloads—Over 2 Million Songs—Try It Free—Yahoo! Music," http://music.yahoo.com/ymu/default.asp, copyright 2006 Yahoo! Inc., printed Feb. 7, 2007, 1 page.

Wang, J. and Reinders, M.J.T., "Music Recommender system for Wi-Fi Walkman," No. ICT-2003-01 in the ICT Group Technical Report Series, Information & Communication Theory Group, Department of Mediamatics, Faculty of Electrical Engineering, Mathematics and Computer Science, Delft University of Technology, Delft, The Netherlands, 2003, 23 pages.
"musicstrands.com—Because Music is Social," brochure, copyright 2006, MusicStrands, Inc., 2 pages.
"MyStrands Download," at <http://www.mystrands.com/overview.vm>, copyright 2003-2007, MediaStrands, Inc., printed Feb. 7, 2007, 3 pages.
"MyStrands Labs: Patent-pending Technologies," at <http://labs.mystrands.com/patents.html>, earliest description from Nov. 2004,printed Feb. 7, 2007, 5 pages.
"Napster—All the Music You Want," at <http://www.napster.com/using_napster/all_the_music_you_want.html>, copyright 2003-2006, Napster, LLC, printed Feb. 7, 2007, 2 pages.
"Napster.co.uk—Napster to Go," http://www.napster.co.uk/ntg.html, copyright 2003-2007 Napster, LLC, printed Nov. 15, 2007, 2 pages.
NavTalk Cellular Phone/GPS Receiver Bill of Material, Garmin, Sep. 10, 1998.
NavTalk Quick Guide, Revision A, Garmin, Jan. 23, 1999, 3 pages.
"NEC to Demonstrate a Series of Mobile Internet Applications and Service Creation Software for the European Market at 3GSM 2003," JCN Newswire, Feb. 12, 2003, 2 pages.
"Network Gateway Solutions," SimpleDevices, Apr. 13, 2004, http://web.archive.org/web/20040413033546/http://www.simpledevices.co m/network gateway.shtml, 1 page.
Lea, Rodger, "Networking Home Entertainment Devices with HAVi," Embedded Systems, Sep. 2000, 9 pages.
"Oregan Networks Demonstrates UPnP Enabled," PR Newswire, Feb. 18, 2003, pp. 1-3.
Intel, "Overview of UPnP* AV Architecture: A Digital Media Distribution Technology for the Home," Research and Development at Intel, Version 1.00, Jul. 2, 2003, copyright 2003 Intel Corporation, 10 pages.
Patent Owner's Preliminary Response to Inter Partes Review of U.S. Pat. No. 8,230,099 (Inter Partes Review No. IPR2013-00597) Filed Dec. 26, 2013, 50 pages.
Patent Owner's Preliminary Response to Inter Partes Review of U.S. Pat. No. 8,214,873 (Inter Partes Review No. IPR2013-00598) Filed Dec. 26, 2013, 63 pages.
Patent Owner's Preliminary Response to Inter Partes Review of U.S. Pat. No. 8,028,323 (Inter Partes Review No. IPR2014-00709) Filed Aug. 5, 2014, 47 pages.
Patent Owner's Preliminary Response to Inter Partes Review of U.S. Pat. No. 8,230,099 (Inter Partes Review No. IPR2014-00711) Filed Aug. 7, 2014, 67 pages.
Patent Owner's Preliminary Response to Inter Partes Review of U.S. Pat. No. 8,214,873 (Inter Partes Review No. IPR2014-00723) Filed Aug. 11, 2014, 51 pages.
Patent Owner's Preliminary Response to Inter Partes Review of U.S. Pat. No. 8,458,356 (Inter Partes Review No. IPR2014-00733) Filed Aug. 14, 2014, 54 pages.
Patent Owner's Preliminary Response to Inter Partes Review of U.S. Pat. No. 8,050,652 (Inter Partes Review No. IPR2014-00737) Filed Aug. 20, 2014, 67 pages.
Patent Owner's Preliminary Response to Inter Partes Review of U.S. Pat. No. 8,045,952 (Inter Partes Review No. IPR2014-00740) Filed Aug. 20, 2014, 64 pages.
Patent Owner's Preliminary Response to Inter Partes Review of U.S. Pat. No. 8,214,873 (Inter Partes Review No. IPR2014-00766) Filed Aug. 28, 2014, 68 pages.
Petition for Inter Partes Review of U.S. Pat. No. 8,050,652 (Inter Partes Review No. IPR2015-00334) Filed Dec. 3, 2014, 64 pages.
Petition for Inter Partes Review of U.S. Pat. No. 8,214,873 (Inter Partes Review No. IPR2014-00766) Filed May 16, 2014, 52 pages.
Petition for Inter Partes Review of U.S. Pat. No. 8,045,952 (Inter Partes Review No. IPR2014-00740) Filed May 9, 2014, 66 pages.
Petition for Inter Partes Review of U.S. Pat. No. 8,028,323 (Inter Partes Review No. IPR2014-00709) Filed Apr. 30, 2014, 65 pages.

(56) References Cited

OTHER PUBLICATIONS

Petition for Inter Partes Review of U.S. Pat. No. 8,050,652 (Inter Partes Review No. IPR2014-00737) Filed May 8, 2014, 64 pages.
Petition for Inter Partes Review of U.S. Pat. No. 8,230,099 (Inter Partes Review No. IPR2014-00711) Filed Apr. 30, 2014, 65 pages.
Petition for Inter Partes Review of U.S. Pat. No. 8,050,652 (Inter Partes Review No. IPR2015-00590) Filed Jan. 21, 2015, 62 pages.
Petition for Inter Partes Review of U.S. Pat. No. 8,028,323 (Inter Partes Review No. IPR2015-00337) Filed Dec. 3, 2014, 60 pages.
Petition for Inter Partes Review of U.S. Pat. No. 8,045,952 (Inter Partes Review No. IPR2015-00340) Filed Dec. 3, 2014, 65 pages.
Petition for Inter Partes Review of U.S. Pat. No. 8,214,873 (Inter Partes Review No. IPR2013-00598) Filed Sep. 18, 2013, 65 pages.
Petition for Inter Partes Review of U.S. Pat. No. 8,214,873 (Inter Partes Review No. IPR2014-00723) Filed May 1, 2014, 66 pages.
Petition for Inter Partes Review of U.S. Pat. No. 8,214,873 (Inter Partes Review No. IPR2015-00339) Filed Dec. 3, 2014, 64 pages.
Petition for Inter Partes Review of U.S. Pat. No. 8,230,099 (Inter Partes Review No. IPR2013-00597) Filed Sep. 18, 2013, 52 pages.
Petition for Inter Partes Review of U.S. Pat. No. 8,230,099 (Inter Partes Review No. IPR2015-00338) Filed Dec. 3, 2014, 63 pages.
Petition for Inter Partes Review of U.S. Pat. No. 8,458,356 (Inter Partes Review No. IPR2014-00733) Filed May 6, 2014, 48 pages.
Petitioner Yamaha Corporation of America's Reply to Patent Owner Response (Inter Partes Review No. IPR2013-00593) Filed Aug. 12, 2014, 21 pages.
Petitioner Yamaha Corporation of America's Reply to Patent Owner Response (Inter Partes Review No. IPR2013-00594) Filed Aug. 12, 2014, 21 pages.
Petitioner Yamaha Corporation of America's Reply to Patent Owner Response (Inter Partes Review No. IPR2013-00597) Filed Aug. 12, 2014, 21 pages.
Petitioner Yamaha Corporation of America's Reply to Patent Owner Response (Inter Partes Review No. IPR2013-00598) Filed Aug. 12, 2014, 22 pages.
Wallace, Brice, "Philips aims to blur TV-PC line," Deseret Morning News, Jan. 8, 2004, 3 pages.
"Philips Consumer Electronics Unveils 'Connected Planet' Strategy," Pressi.com, Aug. 28, 2003, pp. 1-3.
"PlayCD: 1 Sample Service Template for UPnP Version 1.0," Contributing Members of the UPnP Forum, 2001, 18 pages.
Belmont, "Playlist requirements," Intel, Oct. 29, 2003, pp. 1-3.
Griffith, Eric, "PRISMIQ MediaPlayer," http://www.wi-fiplanet.com/print/reviews/article.php/3091181/PRISMIQ-MediaPlayer.htm, printed Oct. 10, 2013, 2 pages.
PRISMIQ MediaPlayer User Guide, PRISMIQ, Inc. 2003, 44 pages.
PRISMIQ Teams with RealNetworks to Give Consumers Access to Rhapsody on Home Stereos PRISMIQ/Rhapsody Combo on Display During CES; Visit TechHome TechZone (Booth #17695, South Hall 2) and RealNetworks booth (#22611, South Hall) at Las Vegas Convention Center, 5 pages.
"ProxiWeb Fact Sheet," web.archive.org/web/19991022065434/http://www.proxinet.com /products nserv/proxiweb, ProxiNet, Inc. 1999, 1 page.
"Q3 2002 SONICblue Earnings Conference Call—Final," FD (Fair Disclosure) Wire, Nov. 6, 2002, 10 pages.
"QoSDevice:1," For UPnP Version 1.0, Mar. 10, 2005, 28 pages.
"QoSDevice:1 Erratum," UPnP Forum, Jul. 14, 2006, 25 pages.
"QoSManager:1," For UPnP Version 1.0, Mar. 10, 2005, 34 pages.
"QoSManager:1 Erratum," UPnP Forum, Jul. 14, 2006, 31 pages.
"QoSManager:1 Second Erratum," UPnP Forum, Aug. 4, 2008, 2 pages.
"QoSManager:2 Erratum," UPnP Forum, Jul. 31, 2008, 2 pages.
"QoSPolicyHolder 1.0," For UPnP Version 1.02, Mar. 10, 2005, 16 pages.
"QoSPolicyHolder:1 Erratum," UPnP Forum, Jul. 14, 2006, 6 pages.
"RAClient:1 Device," For UPnP Version 1.0, Standardized DCP, Sep. 30, 2009, Document Version 1.0, Device Template Version 2.00, 13 pages.
"RADAConfig:1 Service," For UPnP Version 1.0, Standardized DCP, Sep. 30, 2009, Document Version 1.0, Device Template Version 2.00, 20 pages.
"RADAConfig:2 Service," For UPnP Version 1.0, Standardized DCP, Apr. 30, 2011, Document Version 1.0, Device Template Version 2.00, 38 pages.
"RADASync:1 Service," For UPnP Version 1.0, Standardized DCP, Sep. 30, 2009, Document Version 1.0, Device Template Version 2.00, 29 pages.
"RADASync:2 Service," For UPnP Version 1.0, Standardized DCP, Apr. 30, 2010, Document Version 1.0, Device Template Version 2.00, 32 pages.
Baig, Edward, "Radio days: Out of the past, into the future," USA Today, Jan. 31, 2001, 4 pages.
"Radiolinja Finland Selects 724 Solutions X-treme Mobility Gateway; XMG Enables New Content-Rich Data Services," Business Wire, Jul. 8, 2003, 2 pages.
"RADiscoveryAgent:1 Device," For UPnP Version 1.0, Standardized DCP, Sep. 30, 2009, Document Version 1.0, Device Template Version 2.00, 13 pages.
"RADiscoveryAgent:2 Device," For UPnP Version 1.0, Standardized DCP, Apr. 30, 2010, Document Version 1.0, Device Template Version 2.00, 13 pages.
"RAServer:1 Device," For UPnP Version 1.0, Standardized DCP, Sep. 30, 2009, Document Version 1.0, Device Template Version 2.00, 14 pages.
"RAServer:2 Device," For UPnP Version 1.0, Standardized DCP, Apr. 30, 2011, Document Version 1.0, Device Template Version 2.00, 16 pages.
"RATAConfig:1 Service," For UPnP Version 1.0, Standardized DCP, Sep. 30, 2009, Document Version 1.0, Device Template Version 2.00, 54 pages.
Johnston, M., et al., "Real Networks," Case Study, revised Feb. 18, 1998 (copyright © Kotha & Johnston) 17 pages.
"Remote Access Architecture:1 for UPnP Version 1.0," 2009 UPnP, Sep. 30, 2009, pp. 1-30.
"Remote Access Architecture:2," For UPnP Version 1.0, Standardized DCP, Apr. 30, 2011, Document Version 1.0, Service Template Version 2.00, 53 pages.
Wendorft, Roli, "Remote Execution of HAVi Applications on Inernet-Enabled Devices," Philips Research, IEEE, Jun. 25, 2001, 11 pages.
"RemoteUIClient:1 Service Template Version 1.01," For UPnP version 1.0, Standardized DCP, Sep. 2, 2004, 29 pages.
"RemoteUIClientDevice:1 Device Template Version 1.01," For UPnP version 1.0, Standardized DCP, Sep. 2, 2004, 11 pages.
"RemoteUIServer Device:1 Device Template Version 1.01," For UPnP version 1.0, Standardized DCP, Sep. 2, 2004, 11 pages.
"RemoteUIServer:1 Server Template Version 1.01," For UPnP version 1.0, Standardized DCP, Sep. 2, 2004, 20 pages.
"RenderingControl: 1 Service Template Version 1.01 for UPnP Version 1.0," Contributing Members of the UPnP Forum, Jun. 25, 2002, 63 pages.
"RenderingControl:1 Service Annex A—Control Point Requirements," For UPnP Version 1.0, Standardized DCP Annex, Oct. 6, 2010, Service Template Version 2.00, 5 pages.
"RenderingControl:1 Service Template Version 1.01," For UPnP Version 1.0, Standardized DCP, Jun. 25, 2002, 63 pages.
"RenderingControl:2 Service Annex A—Control Point Requirements," For UPnP Version 1.0, Standardized DCP Annex, Oct. 6, 2010, Service Template Version 2.00, 5 pages.
"RenderingControl:2 Service Template Version 1.01," For UPnP Version 1.0, Approved Standard, May 31, 2006, Document Version 1.00, 84 pages.
"RenderingControl:3 Service," For UPnP Version 1.0, Standardized DCP (SDCP) Dec. 31, 2010, Service Template Version 1.01, 144 pages.
"RenderingControl1.SyntaxTests.xml," date unknown, 6 pages.
"RenderingControl1.xml," date unknown, 11 pages.
"RenderingControl2.SyntaxTests.xml," date unknown, 7 pages.
"RenderingControl2.xml," date unknown, 14 pages.
Palenchar, Joseph, "Replay TV to boost promotions, distribution. (Twice News)," HighBeam Research, Jun. 9, 2003, 2 pages.

(56) References Cited

OTHER PUBLICATIONS

ReplayTV From Wikipedia, the free encyclopedia, en.wikipedia.org/wiki/Replaytv, printed on Sep. 3, 2013, 6 pages.
"Rhapsody—Full-length music, videos and more—FREE," http://www.rhapsody.com/welcome.html, copyright 2001-2007 Listen.com, printed Feb. 7, 2007, 1 page.
"Rockford's Omnifi(TM) Awarded TechTV's Best of CES," PR Newswire, Jan. 16, 2003, pp. 1-3.
Bell, Ian, "Roku Soundbridge M1000 Review," http://www.digitaltrends.com/media-streamer-reviews/roku-soundbridge-m1000-review, Dec. 14, 2004, 8 pages.
"Roku Unveils New Award-Winning Network Music Players; Roku SoundBridge Features Sleek Design, Large Display, Apple iTunes Support," http://www.businesswire.com/news/home/20040107005285/en, Jan. 7, 2004, 3 pages.
"Roku Unveils SoundBridge Music Player," Online Reporter, Jan. 10, 2004, pp. 1-2.
"Roxio The Boom Box Music and recording reviews—CNET Reviews," http://reviews.cnet.com/music-and-recording/roxio-the-boom-box/4505-3669_7-3141440 . . . , printed Nov. 15, 2007, 4 pages.
"ScheduledRecording1.SyntaxTests.xml," date unknown, 4 pages.
"ScheduledRecording1.xml," date unknown, 7 pages.
"ScheduledRecording2.SyntaxTests.xml," date unknown, 4 pages.
"ScheduledRecording2.xml," date unknown, 7 pages.
"SecurityConsole:1 Service Template for UPnP Device Architure 1.0," Contributing Members of the UPnP Forum, 2003, 20 pages.
"Set-top Solutions," SimpleDevices, Apr. 13, 2004, http://web.archive.org/web/20040413044713/http://www.simpledevices.co m/settop.shtml, 1 page.
Smyers, Scott, "Sharing Digital Content in the Home," Digital Home Working Group, Oct. 7, 2003, 17 pages.
Stone, Glen, "Sharing Digital Content in the Home," Digital Home Working Group, Oct. 23, 2003, 23 pages.
"SimpleCenter," SimpleDevices, May 2, 2004, http://web.archive.org/web/20040502165145/http://simpledevices.com/sim plecenter.shtml, 1 pages.
"SimpleDevices Announces New Partnerships for its SimpleWare Integration and Interoperability Program," Business Wire, Jan. 15, 2004, pp. 1-3.
"SimpleDevices has developed a flexible, standards-based media server software development kit that transforms a gateway device into an intelligent and powerful media server," SimpleDevices, Apr. 13, 2004, http://web.archive.org/web/20040413143346/http://, 1 page.
"SimpleDevices Product Showcase," SimpleDevices, Apr. 14, 2004, http://web.archive.org/web/20040414041500/http://www.simpledevices.co m/showcase.shtml, 1 page.
"SimpleDevices Product Solutions," SimpleDevices, Apr. 14, 2004, http://web.archive.org/web/20040414072007/http://www.simpledevices.co m/solutions.shtml, 1 page.
"SimpleDevices Releases New Ver. Software, SimpleWare 2.0," PR Newswire, Jan. 9, 2003, pp. 1-4.
"SimpleDevices Releases New Version of its Software, SimpleWare 2.0," Jan. 9, 2002, http://web.archive.org/web/20040413144147/http://simpledevices.com/pre ss releases/01 09 2003 simpleware.shtml, 2 pages.
"SimpleWare Software Technologies," SimpleDevices, Apr. 13, 2004, http://web.archive.org/web/20040413042557/http://www.simpledevices.co m/products.shtml, 1 page.
"SimpleWare Software Technologies," SimpleDevices, Jul. 10, 2004, http://web.archive.org/web/20040710135809/http://www.simpledevices.co m/products.shtml, 1 page.
SL300i Wifi Wireless Multimedia Link Instructions for use, www.philips.com/streamium, publication date unknown, 54 pages.
SL300i Wireless Multimedia Link, Philips Electronics, 2003, 2 pages.
"SL400i," SimpleDevices, Apr. 13, 2004, http://web.archive.org/web/20040413145728/http://simpledevices.com/sho wcase philips.shtml, 1 page.
SL400i Wifi Wireless Multimedia Link Instructions for use, www.philips.com/streamium, publication date unknown, 55 pages.
SL400i Wireless Multimedia Link, Philips Electronics, 2003, 2 pages.
"SliMP3 Ethernet MP3 Player Owner's Manual," Slim Devices, Inc. 2002, 16 pages.
"SLIMP3 Network MP3 Player," Slim Devices, Inc. 2002, 2 pages.
"Solutions for Content Providers," SimpleDevices, Inc., Apr. 13, 2004, http://web.archive.org/web/20040413025938/http://www.simpledevices.co m/content provider.shtml, 1 page.
"Solutions for Internet Service Providers," SimpleDevices, Apr. 13, 2004, http://web.archive.org/web/20040413031950/http://www.simpledevices.co m/isp.shtml, 1 page.
"Squeezebox Owner's Guide," Slim Devices, Inc., 2003, 22 pages.
"Squeezebox The wireless MP3 player for your digital stereo," Slim Devices, Inc., 2003, 2 pages.
Berniker, Mark, "StarSight launches stand-alone program guide receiver. (StarSight Telecast's CB1500 for cable television operators) (Brief Article)," Broadcasting & Cable, HighBeam Research, Dec. 5, 1994, 1 page.
Walton, Brian, "StarSight: The Future of Television Today," Washington Informer, HighBeam Research, Jun. 22, 1995, 2 pages.
"Start Listening with Last.fm—Scrobbling You Say?" http://www.last.fm/, 1 page, Jul. 23, 2008.
Nichols; Myers, "Studying the Use of Handhelds to Control Smart Appliances," School of Computer Science, Carnegie Mellon University, Proceedings of the 23rd International Conference on Distributed Computing Systems Workshops (ICDCSW'03), 2003 IEEE, 6 pages.
"Supercomm Products," Connected Planet, May 14, 2001, 1 page.
"TemperatureSensor:1 Service Template for UPnP Device Architecture 1.0," Contributing Members of the UPnP Forum, 2003, 13 pages.
"TemperatureSetpoint:1 Service Template for UPnP Device Architecture 1.0," Contributing Members of the UPnP Forum, 2003, 17 pages.
Termination of the Proceeding, Final Judgement, with regard to U.S. Pat. No. 8,045,952, Apr. 22, 2015 (Inter Partes Review Nos. IPR2014-00740 and IPR2015-00340), 4 pages.
Termination of the Proceeding, Final Judgement, with regard to U.S. Pat. No. 6,050,652, Apr. 22, 2015 (Inter Partes Review Nos. IPR2014-00737 and IPR2015-00334), 4 pages.
Termination of the Proceeding, Final Judgement, with regard to U.S. Pat. No. 6,757,517 (IPR2015-00586); 7,236,739 (IPR2015-00587); 7,742,740 (IPR2015-00588) and 8,050,652 (IPR2015-00590), May 22, 2015, 3 pages.
Roli G. Wendorf; Maarten P. Bodlaender, "THAM 13.2 Remote Execution of HAVi Applications on Internet-Enabled Devices," IEEE 2001, 2 pages.
Gilligan, Gregory, "The TV is the Center of the Digital Home Connected Electronic Products That Work Together are Highlight of Show," Richmond Times Dispatch, Jan. 9, 2004.
"TV Meets the Web," Financial Times Information Limited, Sep. 10, 2002, 2 pages.
"Two-way Radio for Netizens," Computers Today, Mar. 6, 2000, 2 pages.
Mohanty, "UCS Report Digital Home Working Group Board of Directors Meeting," Digital Home Working Group, May 12, 2004, pp. 1-43.
Van der Heijden; Taylor, "Understanding WAP Wireless Applications, Devices, and Services," Artech House, 2000, pp. 98-99 (4 pages total).
UPnP, "Universal Plug and Play Device Architecture," Version 1.0, ftp://vtm.upnp.org/upnp/specs/arch/UPnPDA10_20000613.htm, Jun. 8, 2000, pp. 1-54.
Liu, "UPnP and Home Networking at Intel Developer Forum—Fall 2002," UPnPWorld Archives, Jul. 12, 2002, pp. 1-3.
Kang, Dong-Oh, "UPnP AV Architectural Multimedia System with an OSGi Platform," IEEE 2004, 5 pages.
Ritchie, J., et al., "UPnP AV Architecture: 0.83 for UPnP Version 1.0," Preliminary Design, Jun. 12, 2002, Copyright 2000 Contributing Members of the UPnP Forum, 22 pages.

(56) References Cited

OTHER PUBLICATIONS

"UPnP AV Architecture: 1 for UPnP Version 1.0," Standardized DCP, Document Version 1.1, Sep. 30, 2008, 30 pages.
"UPnP AV Architecture: 2 for UPnP Version 1.0," Standardized DCP, Dec. 31, 2010, 35 pages.
"UPnP AV Datastructure Template: 1," for UPnP Version 1.0, Standardized DCP, Document Version 1.0, Sep. 30, 2008, 28 pages.
"UPnP AVTransport:1 Service Template Version 1.01," for UPnP Version 1.0, Standardized DCP, Jun. 25, 2002, 67 pages.
Jeronimo, "UPnP Design by Example, A Software Developers Guide to Universal Plug and Play," Intel Press, Intel Corp. 2003, 109 pages.
Jeronimo, Weast, "UPnP Design by Example," http://intel.com/intelpress/upnp/index.htm, Dec. 20, 2003, 1 page.
"UPnP Device Architecture 1.0," UPnP Forum, Oct. 15, 2008, 80 pages.
"UPnP Device Architecture 1.1," UPnP Forum, Oct. 15, 2008, 136 pages.
"UPnP Device Architecture 1.1 Annex A—IP Version 6 Support," Mar. 15, 2011, 15 pages.
"UPnP Device Architecture V1.0 Annex A—IP Version 6 Support," Contributing Members of the UPnP Forum, 1999-2002 Microsoft Corporation, 11 pages.
"UPnP Implementers Corporation Certifies First Product in the New AV Device Category; Arcadyan Wireless Home A/V Platform to Display UPnP Certification Logo," Business Wire, Aug. 12, 2003, 3 pages.
"UPnP QoS Architecture:1.0," For UPnP Version 1.0, Mar. 10, 2005, 28 pages.
"UPnP QoS Architecture:2," For UPnP Version 1.0, Standardized DCP, Oct. 16, 2006, Document Version: 1.00, 33 pages.
"UPnP QoSDevice:2 Service Template Version 1.01," For UPnP Version 1.0, Standardized DCP, Oct. 16, 2006, Document Version 1.00, 39 pages.
"UPnP QoSDevice:3 Service Template Version 1.01," For UPnP Version 1.0, Standardized DCP, Nov. 30, 2008, 113 pages.
"UPnP QoSDevice:3 Underlying Technology Interface Addendum Service Template Version 1.01," For UPnP Version 1.0, Standardized DCP, Nov. 30, 2008, 22 pages.
"UPnP QoSManager:2 Service Template Version 1.01," For UPnP Version 1.0, Standardized DCP, Jul. 31, 2008, Document Version 1.00, 37 pages.
"UPnP QoSManager:3 Service Template Version 1.01," For UPnP Version 1.0, Standardized DCP, Nov. 30, 2008, 89 pages.
"UPnP QoSPolicyHolder:2 Service Template Version 1.01," For UPnP Version 1.0, Standardized DCP, Oct. 16, 2006, Document Version 1.00, 16 pages.
"UPnP QoSPolicyHolder:3 Service Template Version 1.01," For UPnP Version 1.0, Standardized DCP, Nov. 30, 2008, 36 pages.
"UPnP Security Ceremonies Design Document for UPnP Device Architecture 1.0," Contributing Members of the UPnP Forum, 2003, 18 pages.
UPnP, "UPnP Vendor's Implementation Guide," http://www.upnp.org/download/UPnP_Vendor_Implementation_Guide, Jan. 5, 2001, pp. 1-8.
"UPnP Vendor's Implementation Guide," Jan. 5, 2001, 5 pages.
UPnP AVWorking Committee, "UPnP XML Data Files for Testing," Jun. 25, 2002, 1 page.
UPnP, UPnPF Membership Database Showing Current 2013 and pre May 2004, 30 pages.
UPnP, UPnPF Membership Database as of Sep. 2003, 92 pages.
"UPnP-QoS Architecture:3," For UPnP Version 1.0, Standardized DCP, Nov. 30, 2008, 47 pages.
"UPnP-qos-SchemaFiles," Oct. 16, 2006, 13 pages.
"UPnP-qos-SchemaFiles," Dec. 5, 2008, 28 pages.
"UPnP-qos-TestFiles," Aug. 4, 2008, 26 pages.
"UPnP-qos-TestFiles," Nov. 23, 2008, 10 pages.
"UPnP-qos-TestFiles," Oct. 16, 2006, 14 pages.
"UPnP-ra-SchemaFiles," Sep. 30, 2009, 4 pages.
"UPnP-ra-TestFiles," Apr. 30, 2011, 36 pages.
"UPnP-ra-TestFiles," Sep. 30, 2009, 24 pages.
"UPnP-rui-TestFiles," Nov. 14, 2008, 9 pages.
"UpTo11.net—Music Recommendations and Search," at <http://www.upto11.net/>, copyright 2005-2006, Upto11.net, printed Feb. 7, 2007, 1 page.
DHWG/DLNA, "1. Use Case Ecosystem Selection Criteria for Home Networking version 1.0 Guidelines," Version 1.0 draft Aug. 6, 2003, pp. 1-3.
DHWG/DLNA, "DHWG Use Case Proposal," Version 1.1, Digital Media Network Business, Samsung Electronics Co., LTD, Aug. 28, 2003, pp. 1-15.
DHWG/DLNA, "Use Case Technical Selection Criteria for Home Networking version 1.0 Guidelines," Version 1.0 draft Aug. 11, 2003, pp. 1-2.
DHWG/DLNA, "Use Cases Passed for HNv1," DHWG, Sep. 11, 2003, pp. 1-74.
"User's Guide ProxiWeb for Palm OS," web.archive.org/web/20000916115046/http://www.proxinet.com/products n serv/guide palm/#Toc465146931, printed on Sep. 4, 2013, 14 pages.
"UUIDS and GUIDS," Paul J. Leach, Microsoft, Feb. 24, 1997, 16 pages.
"Virtual Replay TV for your PC," www.dvarchive.org, last updated Jul. 12, 2006, printed Sep. 3, 2013, 3 pages.
"WANCableLinkConfig:1 Service Template Version 1.01 for UPnP Version 1.0," Contributing Members of the UPnP Forum, 2001, 25 pages.
"WANCommonInterfaceConfig:1 Service Template Version 1.01 for UPnP Version 1.0," Contributing Members of the UPnP Forum, 2001, 24 pages.
"WANConnectionDevice:1 Device Template Version 1.01 for UPnP Version 1.0," Contributing Members of the UPnP Forum, 2001, 13 pages.
"WANDSLLinkConfig:1 Service Template Version 1.01 for UPnP Version 1.0," Contributing Members of the UPnP Forum, 2001, 27 pages.
"WANEthernetLinkConfig:1 Service Template Version 1.01 for UPnP Version 1.0," Contributing Members of the UPnP Forum, 2001, 10 pages.
"WANIPConnection:1 Service Template Version 1.01 for UPnP Version 1.0," Contributing Members of the UPnP Forum, 2001, 74 pages.
"WANPOTSLinkConfig:1 Service Template Version 1.01 for UPnP Version 1.0," Contributing Members of the UPnP Forum, 2001, 21 pages.
"WANPPPConnection:1 Service Template Version 1.01 for UPnP Version 1.0," Contributing Members of the UPnP Forum, 2001, 89 pages.
"Webjay—Playlist Community," at <http://www.webjay.org/>, copyright 2006, Yahoo! Inc., printed Feb. 7, 2007, 5 pages.
Ricca-Smith, "Science & Technology: Wired for sound and Video," Independent (UK) Ltd., Jan. 14, 2004, 4 pages.
Lakhani, Amit, "Wireless Application Protocol (WAP) and I-Mode: An insight," Stevens Institute of Technology, Apr. 7, 2001, 10 pages.
Bard, "Wireless Convergence of PC and Consumer Electronics in the e-Home," Connected and Extended PC Lab, Intel. Corp., Intel Technology Journal Q2, 2001, 11 pages.
Hartwig, Stephan, "Wireless Microservers," Pervasivie Computing, IEEE, 2002, 9 pages.
Declaration of Andrew Wolfe, Ph.D., with regard to U.S. Pat. No. 8,050,652, Jan. 21, 2015 (Inter Partes Review No. IPR2015-00590), 48 pages.
"Yahoo! Messenger," http://messenger.yahoo.com/webmessengerpromo.php, copyright 2007 Yahoo! Inc., printed Oct. 26, 2007, 1 page.
"Yahoo! Messenger—Chat, Instant message, SMS, PC Calls and More," http://messenger.yahoo.com/webmessengerpromo.php, copyright 2007 Yahoo! Inc., printed Oct. 26, 2007, 1 page.
"Zen Portable Media Center User's Guide," Creative Technology Ltd., Jul. 2004, 52 pages.

\* cited by examiner

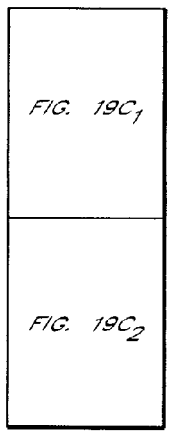
FIG. 19C
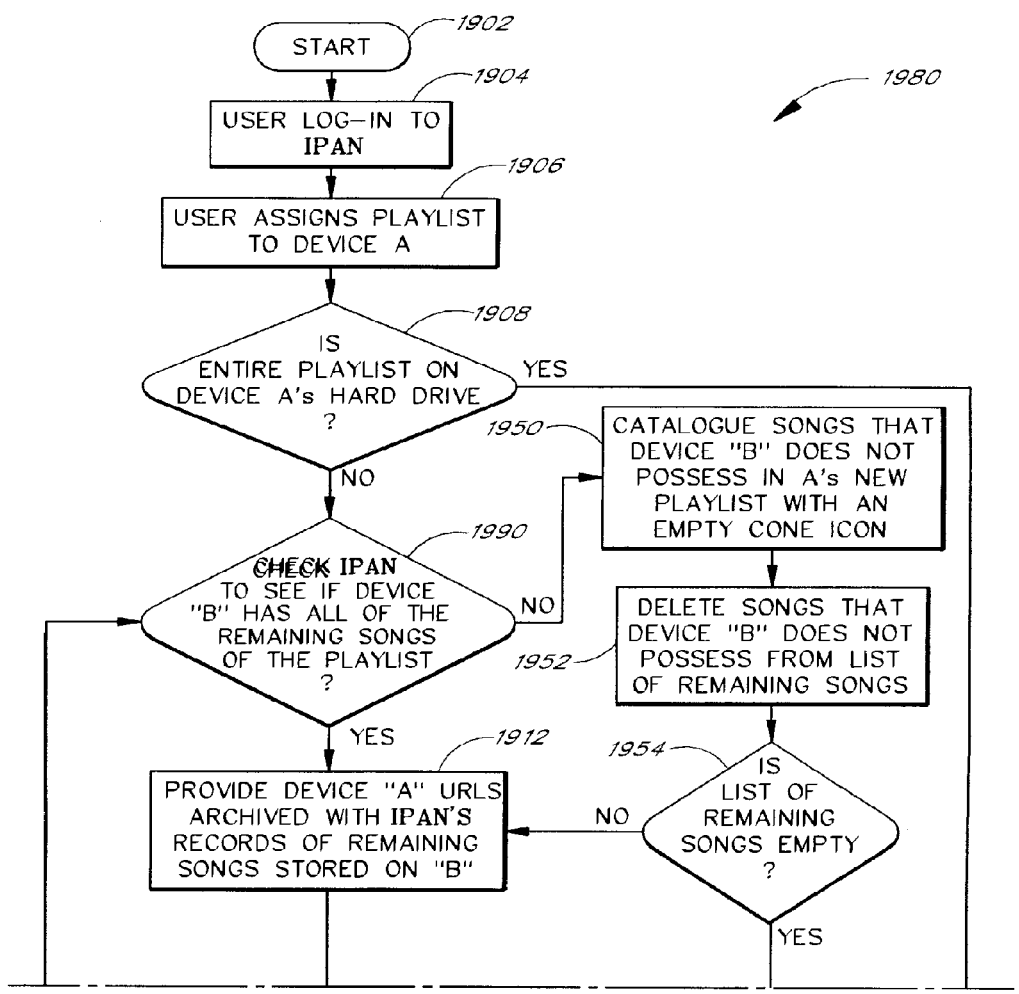
FIG. 19C₁

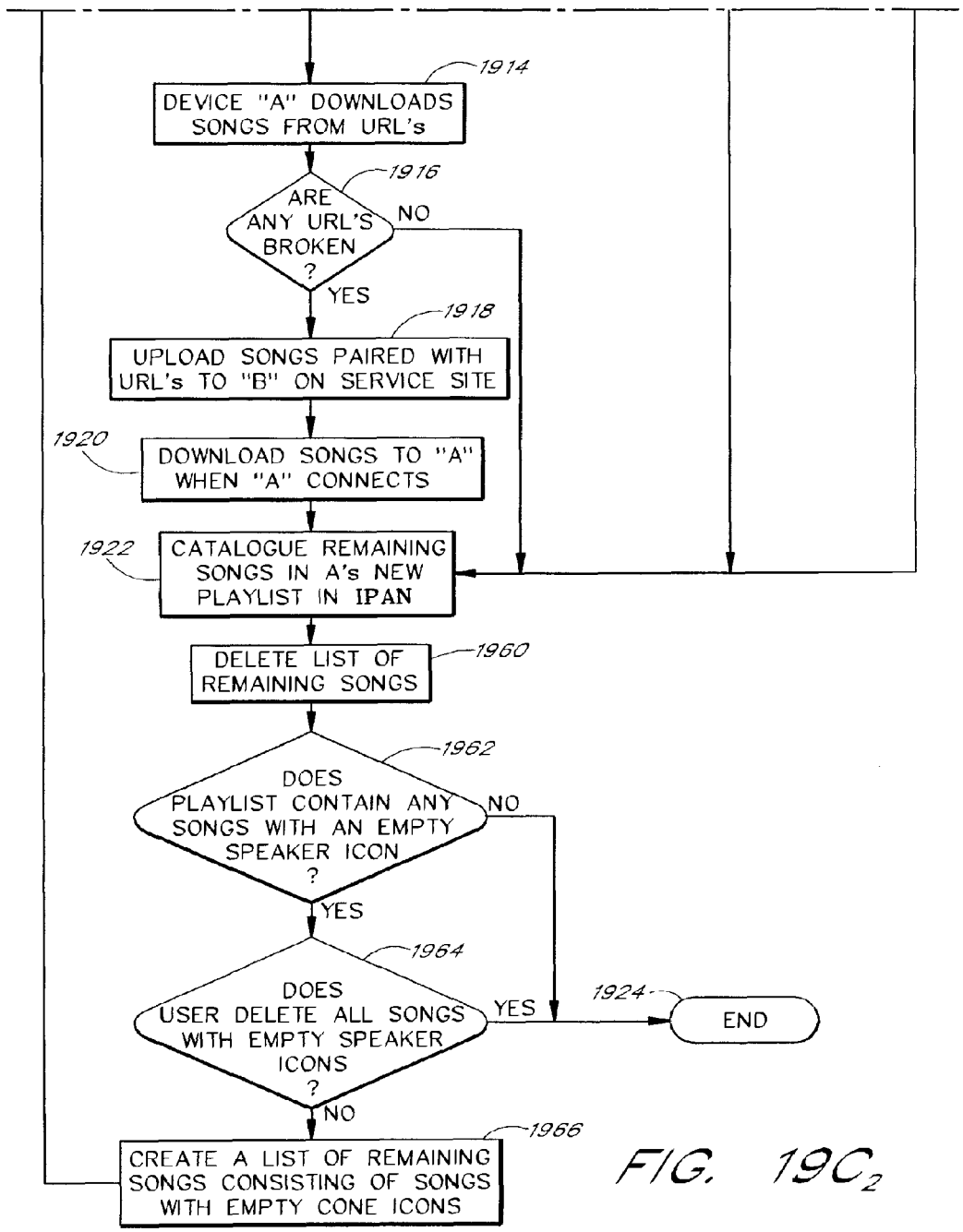
FIG. 19C₂

METHOD AND DEVICE FOR DISPLAYING SUPPLEMENTAL INFORMATION WHILE RENDERING A PLAYLIST

CROSS-REFERENCE TO RELATED APPLICATIONS

The present application is a continuation of U.S. patent application Ser. No. 13/282,758, filed Oct. 27, 2011, which is a continuation of U.S. patent application Ser. No. 11/563,232, filed Nov. 27, 2006, which is a continuation of U.S. patent application Ser. No. 09/805,470, filed Mar. 12, 2001, which claims the benefit of U.S. Provisional Application No. 60/246,842, filed Nov. 8, 2000. The disclosures of these applications are hereby incorporated by reference in their entireties.

BACKGROUND

The present disclosure relates to the field of audio file transfers and, more particularly, relates to the field of management and distribution of audio files over a computer network such as the Internet.

The Internet is a worldwide array of interconnected computers and information servers that allow anyone with a computer and access to the Internet to get information about virtually any subject 24 hours a day. For the average consumer, an Internet Service Provider (ISP) provides access to the Internet. ISPs such as CompuServe, Prodigy, and America On-Line, currently link over ten million users to the Internet. Users typically connect to the ISP by using standard telephone lines and a telephone modem. Cable modems that allow a user to connect to the ISP over cable television lines, and satellite connections to the Internet, are also available.

The Internet provides a wealth of information from stock reports to headline news. One of the newer services provided on the Internet is a streaming audio (e.g., RealAudio and MPEG audio) service. Streaming audio services are often provided in connection with the World Wide Web (Web) and thus are often called Web radio broadcasts. With streaming audio, a user with a Personal Computer (PC), a sound card, and the necessary software can listen to audio programs from anywhere in the world. For example, Radio Prague provides daily Internet broadcasts from the Czech Republic. Listeners in the U.S. can listen to these Web radio broadcasts either in real time, or stored for later replay. Thus, unlike more traditional radio broadcasts where the listener must be within a reception area, Web radio broadcasts can be heard anywhere, so long as the listener has a connection to the Internet and the necessary computer hardware and software.

Unfortunately, even with the ever-decreasing cost of personal computers, the hardware and software needed to listen to a Web radio broadcast is beyond the financial means of many people. Even for those that can afford a personal computer, listening to a Web radio broadcast ties up the computer so that the user cannot use it for other purposes. Moreover, the use of a personal computer to receive streaming audio (e.g., Web radio broadcasts) requires a certain amount of computer literacy on the part of the user. The user must be able to install the Web Radio software, configure the Web Radio software to communicate with the ISP, and find the various Web radio broadcasts provided on the Web.

In addition to listening to Web radio broadcasts, users may wish to listen to audio files. With a group of PC's in a home and in a network, users can download songs from one PC to another or upload songs from one PC to another. However, users cannot play a song on one PC by using the controls of another PC. In addition, the users must purchase multiple PC's, which can be costly. Further, the user must be able to install the network connection and the appropriate software. Moreover, even if the user can afford to purchase multiple PC's and install the proper connection, the user would have difficulty playing music in addition to performing other tasks on the PC. For example, the Web radio broadcast may be interrupted. Also, a skip over parts of a song may result if the user is using a word processing program at the same time as listening to music.

SUMMARY

In one aspect, an electronic media player device is provided that includes a transceiver to wirelessly send and receive communications, a memory, a control system, and at least one speaker. The control system is adapted to receive a command to log into an account before receiving a playlist, receive and display the playlist identifying a plurality of songs in a menu with context sensitive icons representing different functions, receive and display information associated with an artist from a currently playing song of the plurality of songs in the playlist, receive and display information on a related song that is from a genre similar to that of one of the currently playing song, and receive and display advertising. The at least one speaker plays the plurality of songs.

In another aspect a method and computer readable medium are provided that comprise receiving a command to log into an account before receiving a playlist, receiving and displaying the playlist identifying a plurality of songs in a menu with context sensitive icons representing different functions, receiving and displaying information associated with an artist from a currently playing song of the plurality of songs in the playlist, receiving and displaying information on a related song that is from a genre similar to that of one of the currently playing song, receiving and displaying advertising, and providing for at least one speaker to play the plurality of songs.

BRIEF DESCRIPTION OF THE DRAWING FIGURES

The various novel features of the invention are illustrated in the figures listed below and described in the detailed description that follows.

FIG. 17I shows a display for allowing a user to add a device to the IPAN.

Figure 19A:
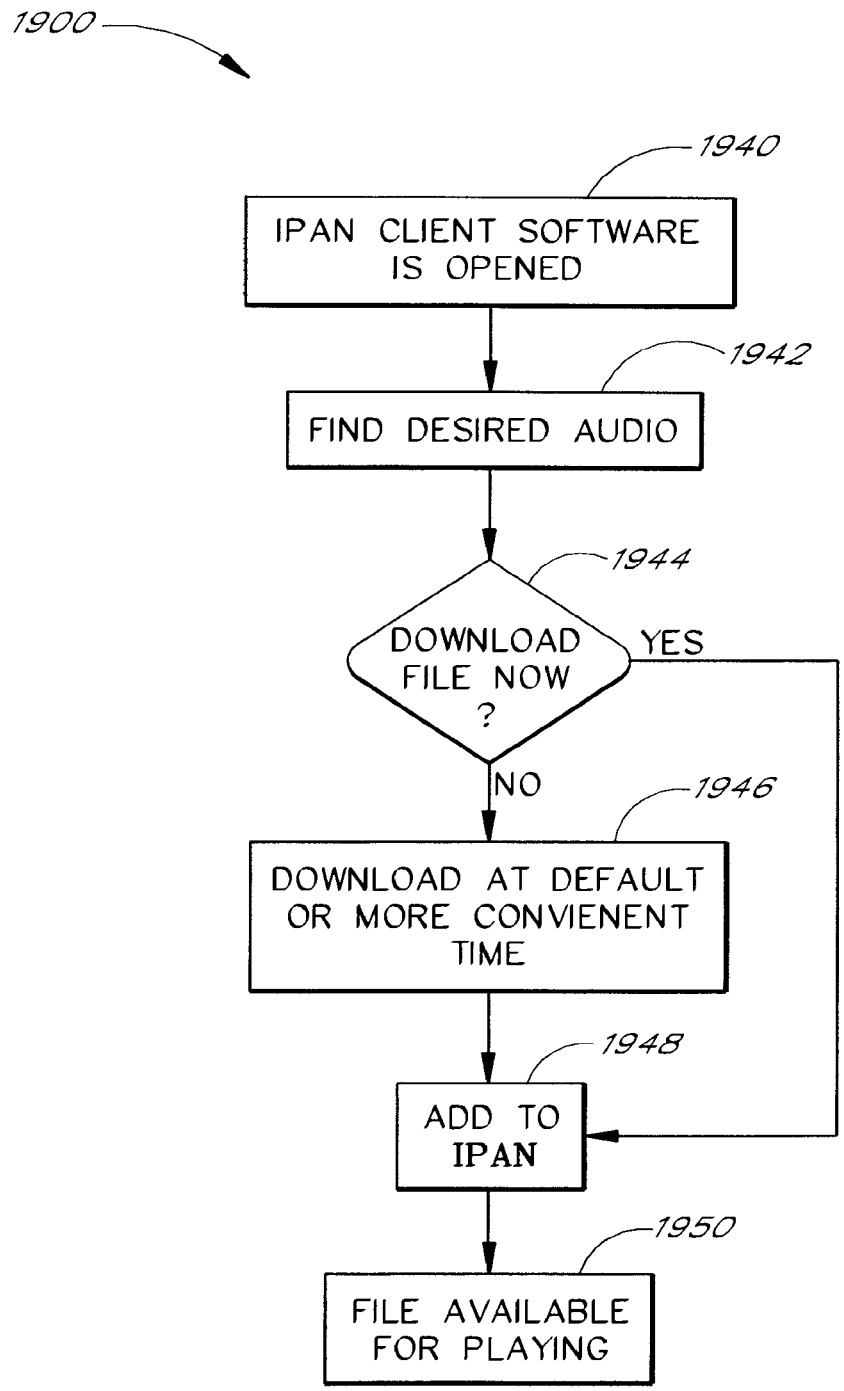
FIG. 19A is a flowchart showing the process for downloading audio files found when navigating the Internet.
Figure 19B:
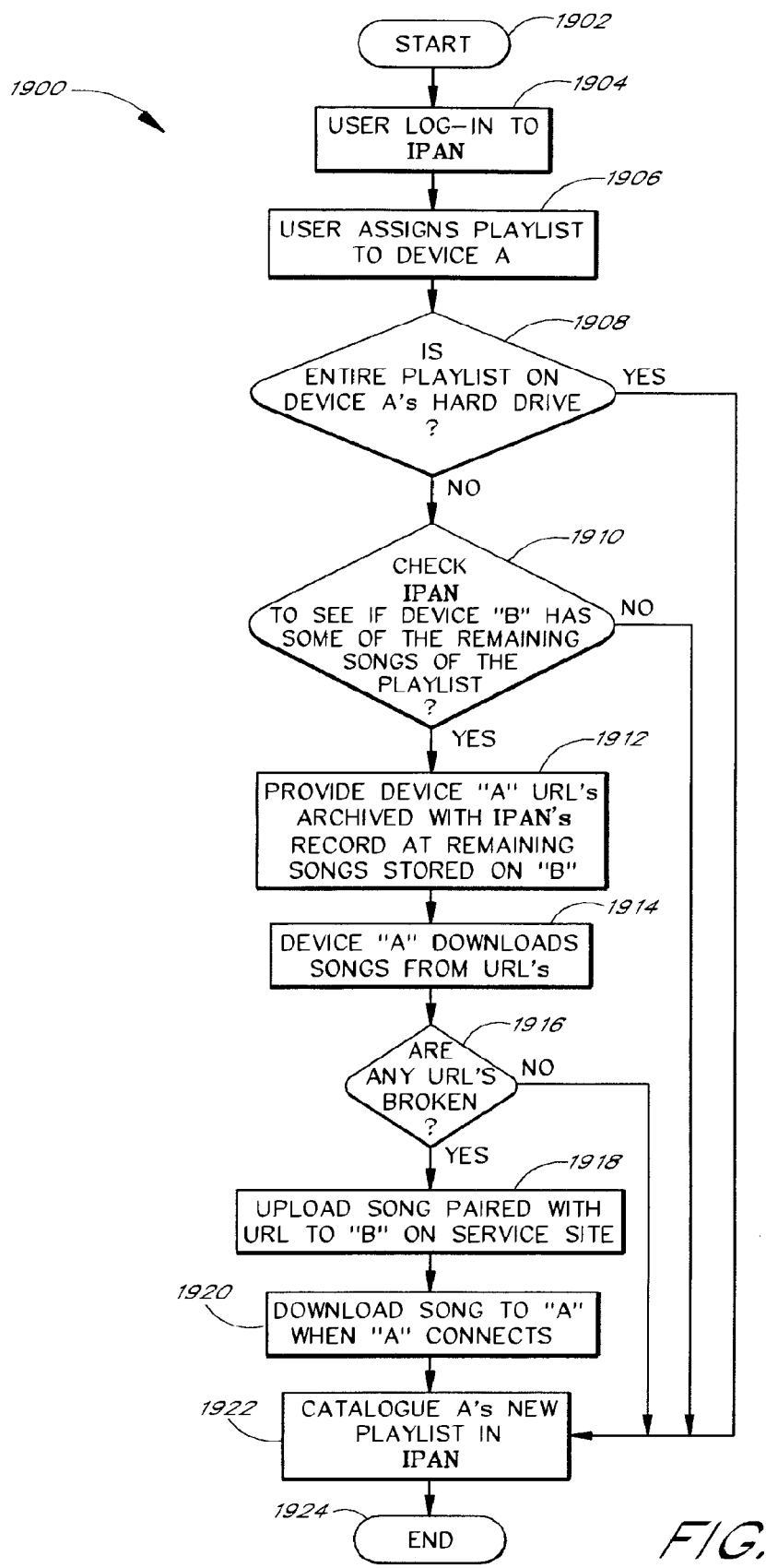
FIG. 19B is a flowchart showing the process for assigning playlists from one device to another.

FIG. 19C, which comprises FIG. 19C$_1$ and FIG. 19C$_2$, is a flowchart of the process shown in FIG. 19B that assigns playlists with missing songs from one device to another.

Figure 20A:
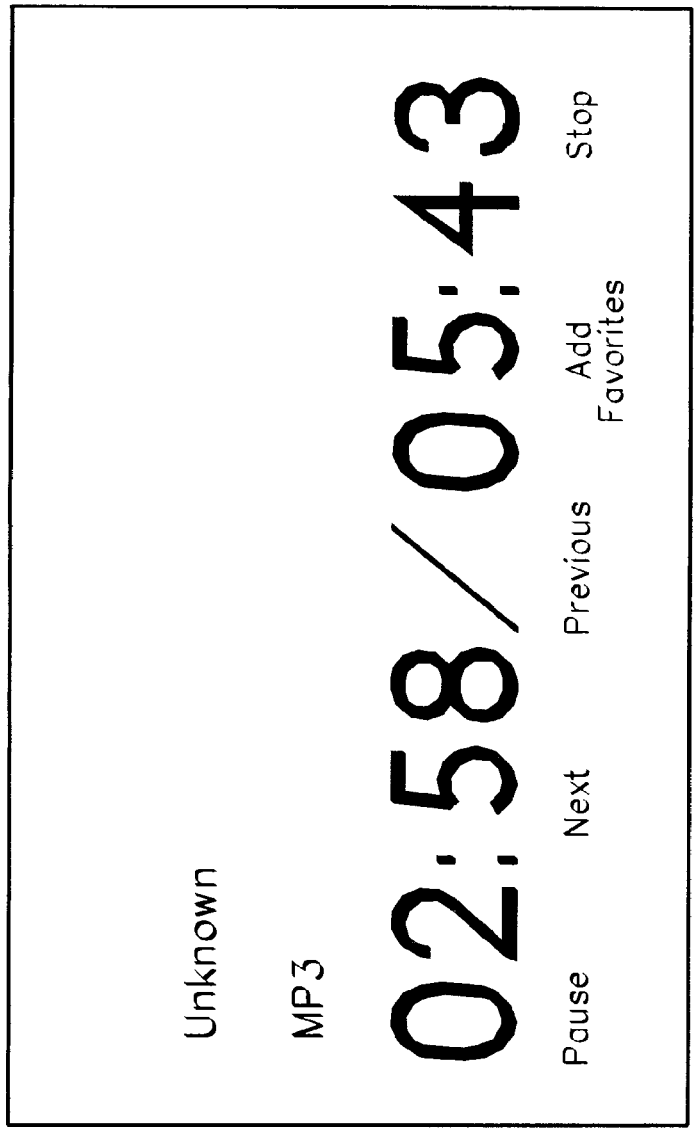

FIG. 20A shows a default display of the network-enabled audio device before the action button has been pressed, as shown in FIGS. 12A, 12B, 13A, and 13B.

Figure 20B:
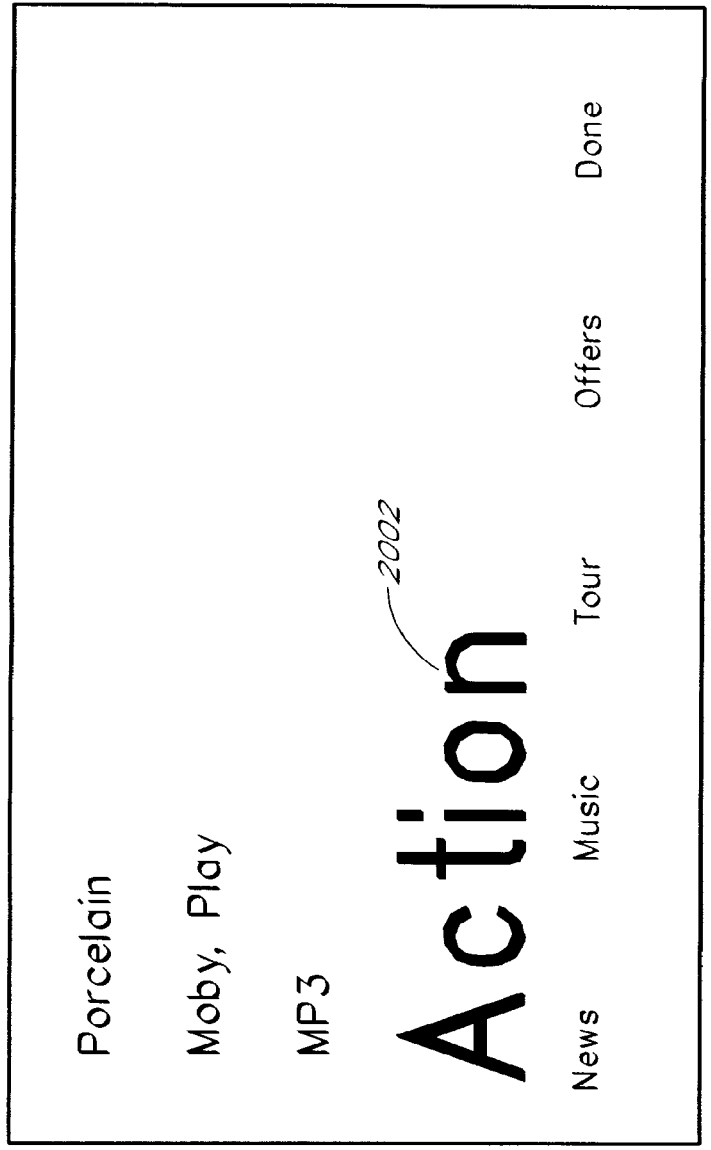

FIG. 20B shows a display of the menu items on the network-enabled audio device after the action button has been pressed.

Figure 20C:
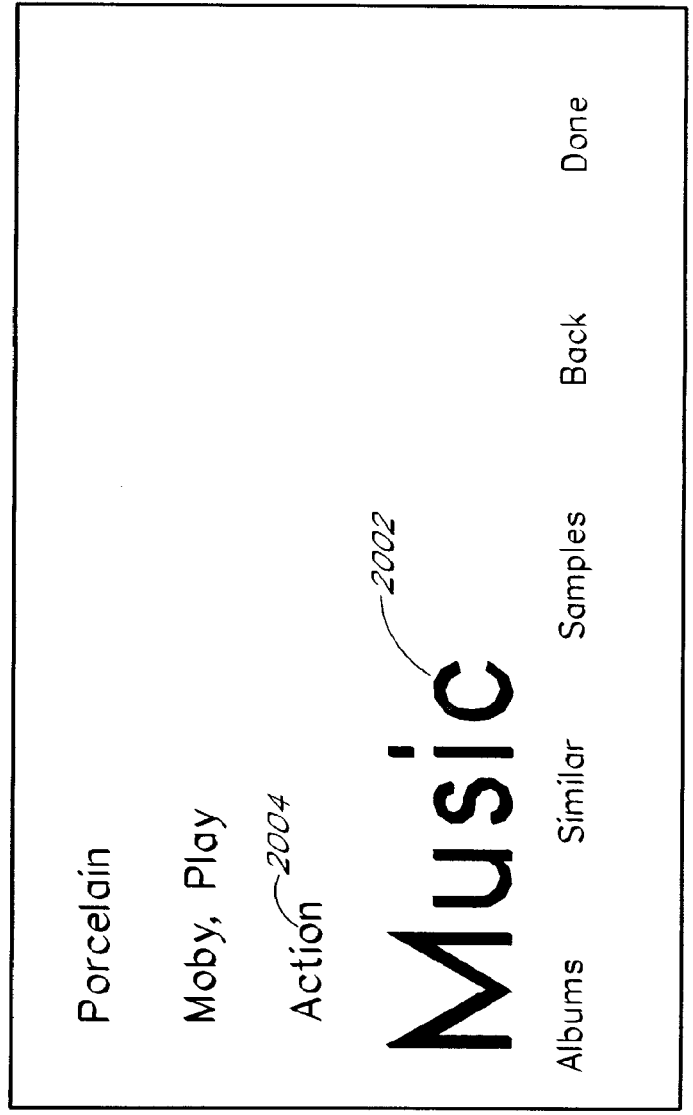

FIG. 20C shows a display of the menu items on the network-enabled audio device after the "music" menu item has been chosen.

Figure 20D:
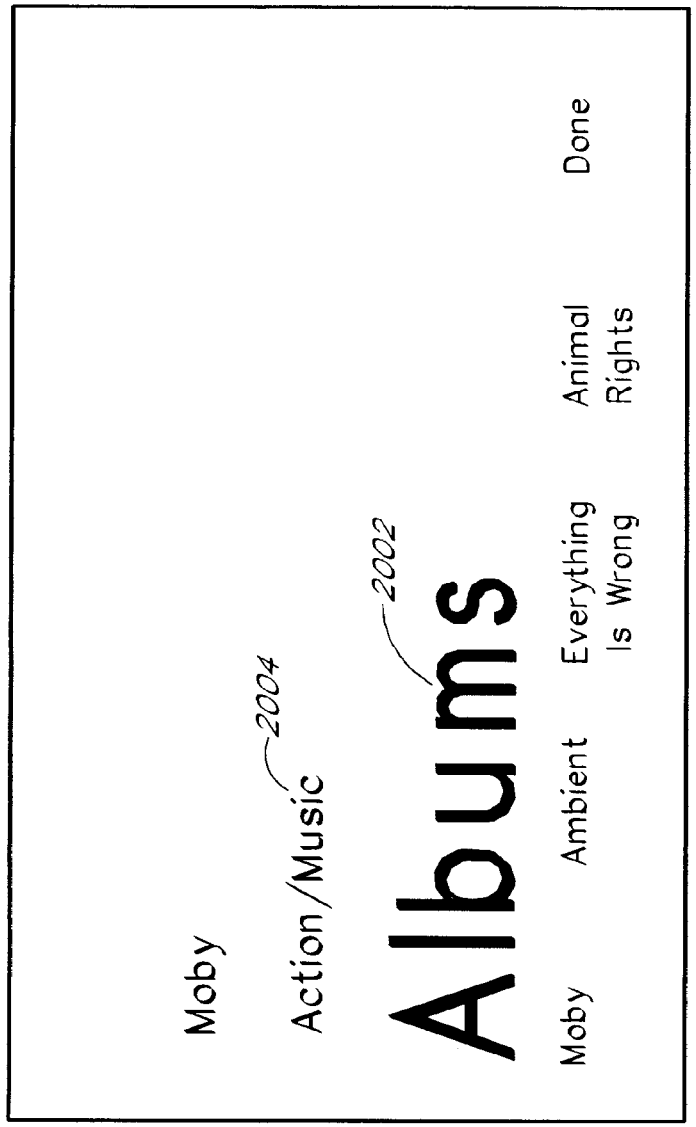

FIG. 20D shows a display of the menu items on the network-enabled audio device after the "albums" menu item has been chosen.

Figure 20E:
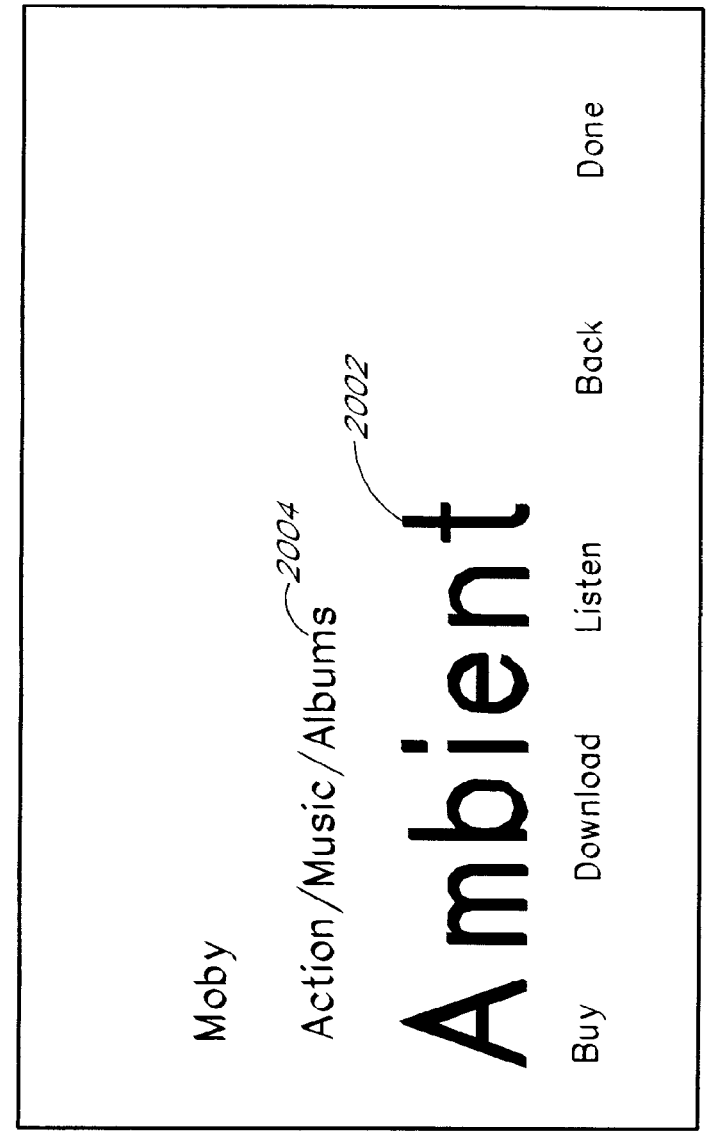

FIG. 20E shows a display of the menu items on the network-enabled audio device after the menu item representing an album has been chosen.

Figure 20F:
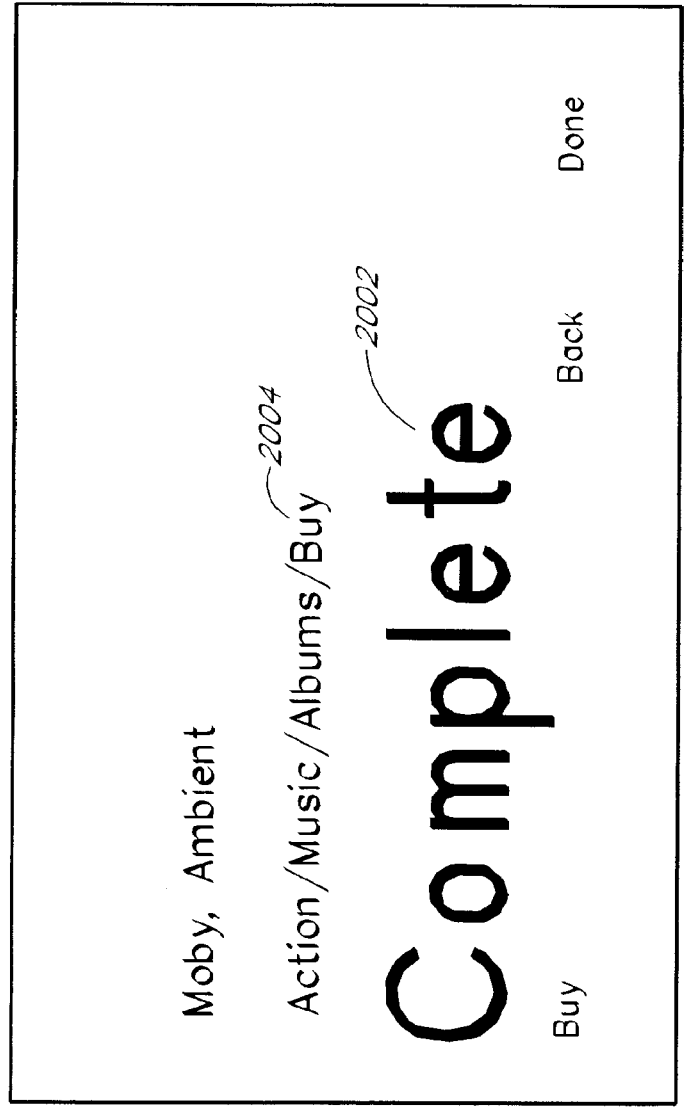

FIG. 20F shows a display of the menu items on the network-enabled audio device after the "buy" menu item has been chosen.

Figure 21:
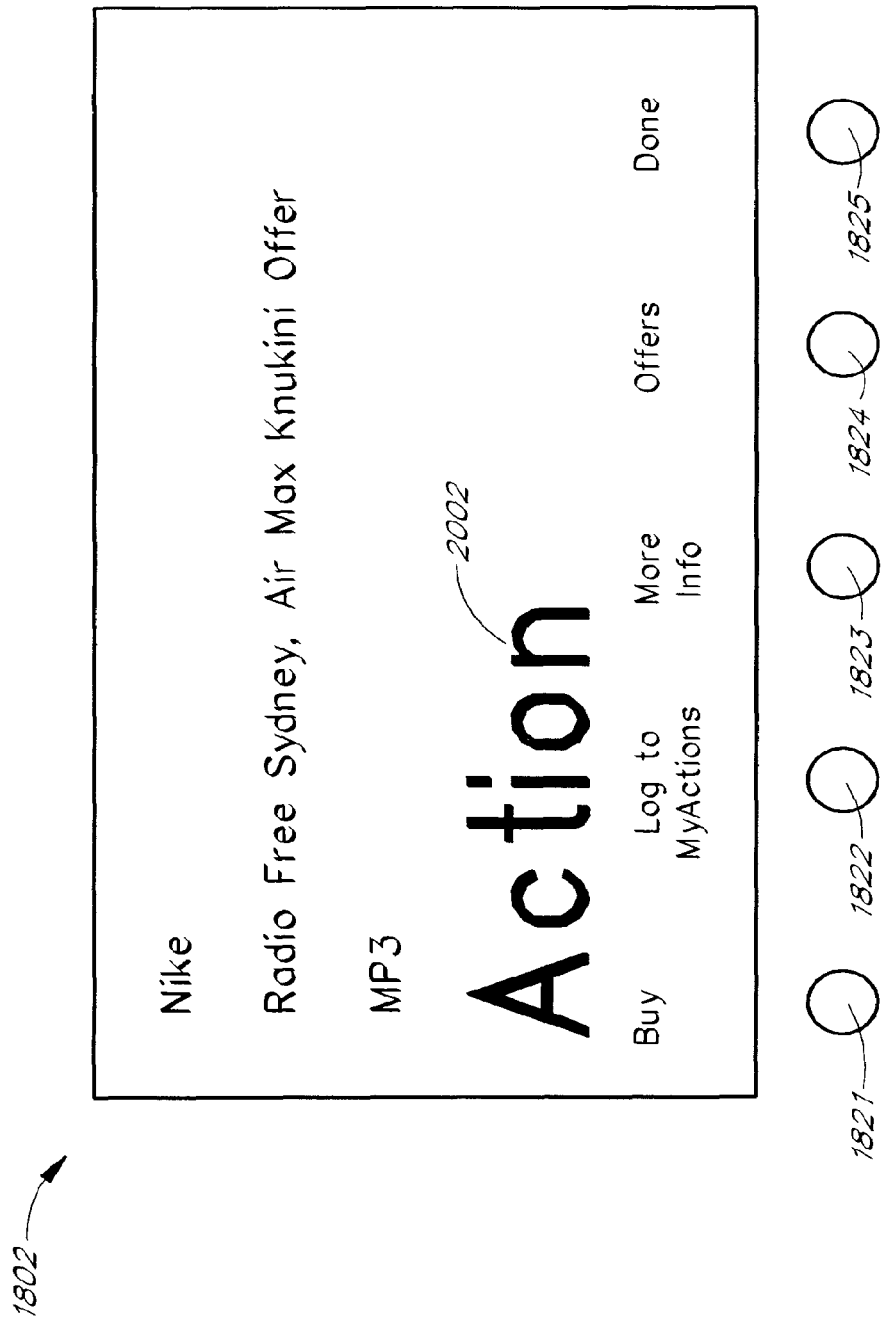

FIG. 21 shows a display including an advertisement after the action button has been pressed on the network-enabled audio device.

In the figures, the first digit of any three-digit number generally indicates the number of the figure in which the element first appears. For example, an element with the reference number 502 first appears in FIG. 5. Where four-digit reference numbers are used, the first two digits indicate the figure number.

DETAILED DESCRIPTION

One aspect of the present invention is an intelligent radio device that allows a user to receive digitized radio broadcasts over the World Wide Web (Web). The intelligent radio provides the hardware and software necessary to receive digitized audio from the Web without the need for a personal computer or other expensive equipment. The intelligent radio provides a display device, such as a Liquid Crystal Display (LCD) that allows the user to select a desired Web broadcast from a list of available Web broadcasts.

The display also allows the user to select Web broadcasts in a particular language. The software, the user controls, and the display in the intelligent radio 100 are operably configured and connected such that a user can tune into a Web radio broadcast in a manner similar to the way a user would use the controls on a conventional radio to tune into an AM or FM radio station. Thus, the intelligent radio provides people who are not comfortable with computers, or who do not own or have access to a computer, an opportunity to listen to streaming audio information from the Internet.

In one embodiment, the intelligent radio is a low-cost tabletop box that connects to an AC power line and a phone line. The device includes a display device, speakers, a control panel, a computer processor, a stored software program, and a modem. The intelligent radio uses the modem to establish a telephone connection to an Internet Service Provider (ISP). The stored software program connects to a Web Radio home page, via the ISP, and downloads a list of Web radio station addresses. Alternatively, the user can enter a web address (e.g., a Uniform Resource Locator (URL)) to connect directly to a web page that provides audio broadcasts (instead of first connecting to the Web Radio home page). The user may use buttons on the control panel to scroll through the display and select a Web radio broadcast "station" for listening. When a station is selected, the stored software program connects to the station and begins to receive digitized audio data transmitted by the station. The intelligent radio converts the received data to analog audio and plays the audio on one or more loudspeakers.

In an alternate embodiment, the intelligent radio is a tuner that connects to an audio system such as a component stereo system. The tuner provides an audio output to the audio system. The audio system provides amplifiers and loudspeakers. The tuner comprises an enclosure that connects to an AC power line, a network line, and the audio system. The network line may be any type of computer data connection, including, for example, a telephone line, a cable line, an Ethernet line, a Token-Ring line, a twisted pair line, an infrared link, a radio frequency link, an IEEE-1394 FireWire line, etc. The tuner includes a display device, a control panel, a computer processor, a stored software program, and a modem. The intelligent radio uses the modem to establish a telephone connection to an Internet Service Provider (ISP). The stored software program connects to a Web Radio home page, usually provided by the ISP, and downloads a list of Web radio stations. A user uses use buttons on the control panel (or remote control) to scroll through the display and select a Web radio broadcast "station" for listening. Alternatively, the user may use voice-activated commands to scroll through the display. When a station is selected, the stored software program connects to the station and begins to receive digitized audio data transmitted by the station. The intelligent radio converts the received data to analog audio, which is provided to the audio system.

Figure 1:
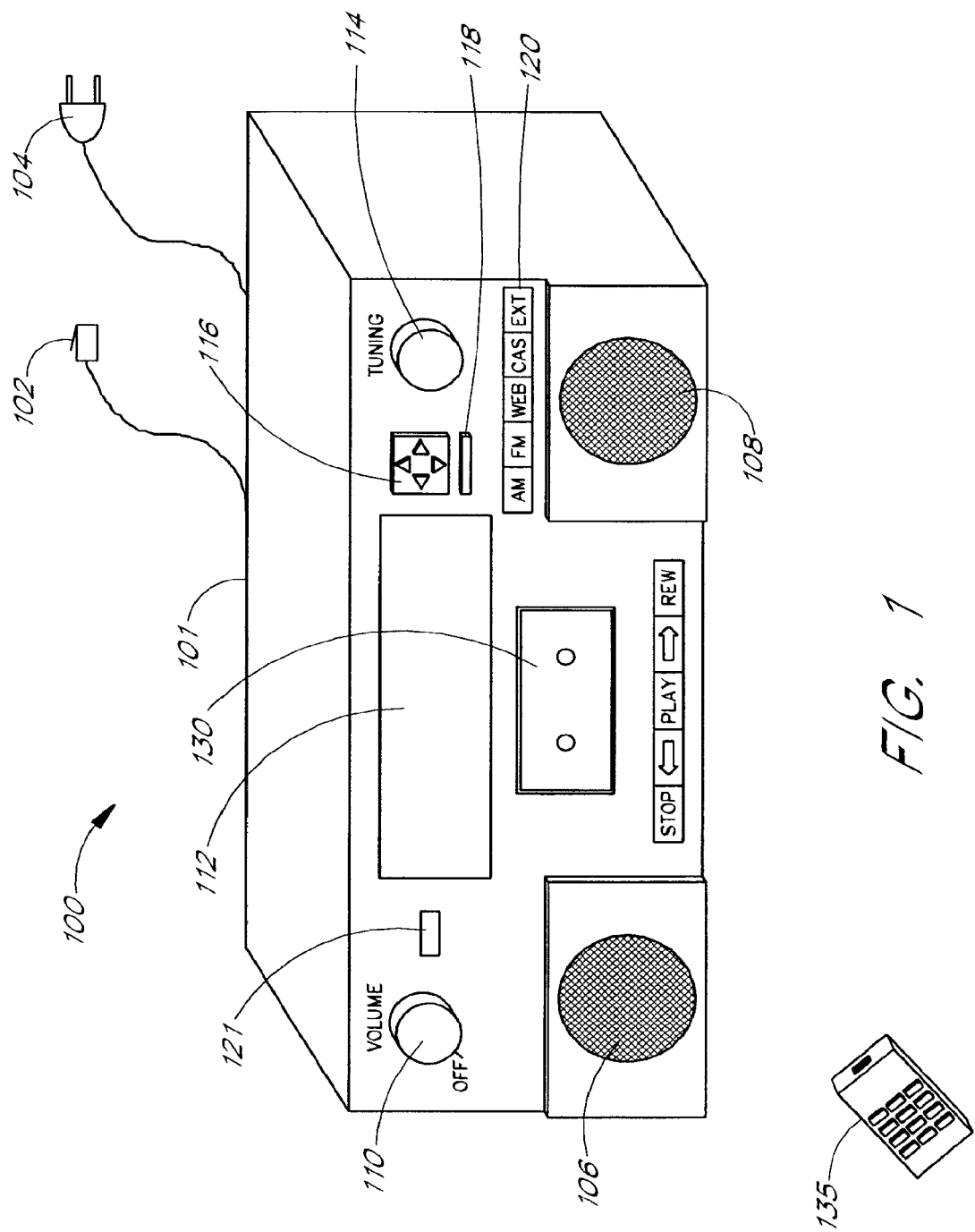
FIG. 1 is a perspective view of one embodiment of a tabletop intelligent radio apparatus.

FIG. 1 illustrates one embodiment of a tabletop intelligent radio 100. The intelligent radio 100 is mounted in an enclosure 101 and connects to household AC power through a power cord 104 and to a communications network by a network cable 102. The network cable 102 may be a telephone line, a network cable, a cable TV cable, a connection to a wireless (e.g., satellite) unit, etc. For example, the communications network may use Iridium satellites developed by the Motorola Corp., Globalstar satellites developed by a consortium of European manufacturers which includes Aerospatiale and Alcatel, P21 satellites developed on a project financed by Inmarsat, or the Odyssey satellite system developed by a TRW consortium associated with Teleglobe/Canada.

User controls are mounted on the front of the enclosure 101 and include a combined on-off and volume control 110, a command button 121, a cursor control 116, a select button 118, a tuning control 114, and a button bar 120. The cursor control 116 provides up, down, left, and right movements of a cursor or other entity on a display device 112. The button bar 120 provides buttons to select an audio source, including, for example, "AM" radio, "FM" radio, "Web" radio, "Cassette," and "External" input. Also mounted on the front of the enclosure 101 is the display device 112, which provides information to the user. An optional cassette player/recorder 130 provides the capability to play and record audio cassettes. The intelligent radio 100 also includes a left stereo speaker 106 and a right stereo speaker 108 that may be mounted in the enclosure 101 or in separate enclosures. A wireless remote 135 provides remote operation of the intelligent radio 100. In some embodiments, a microphone is provided as well. An output from the microphone is provided to an analog-to-digital converter to convert the analog microphone signal into digital data. The microphone may be placed in the intelligent radio 100, in the wireless remote 135, or both.

Figure 2:
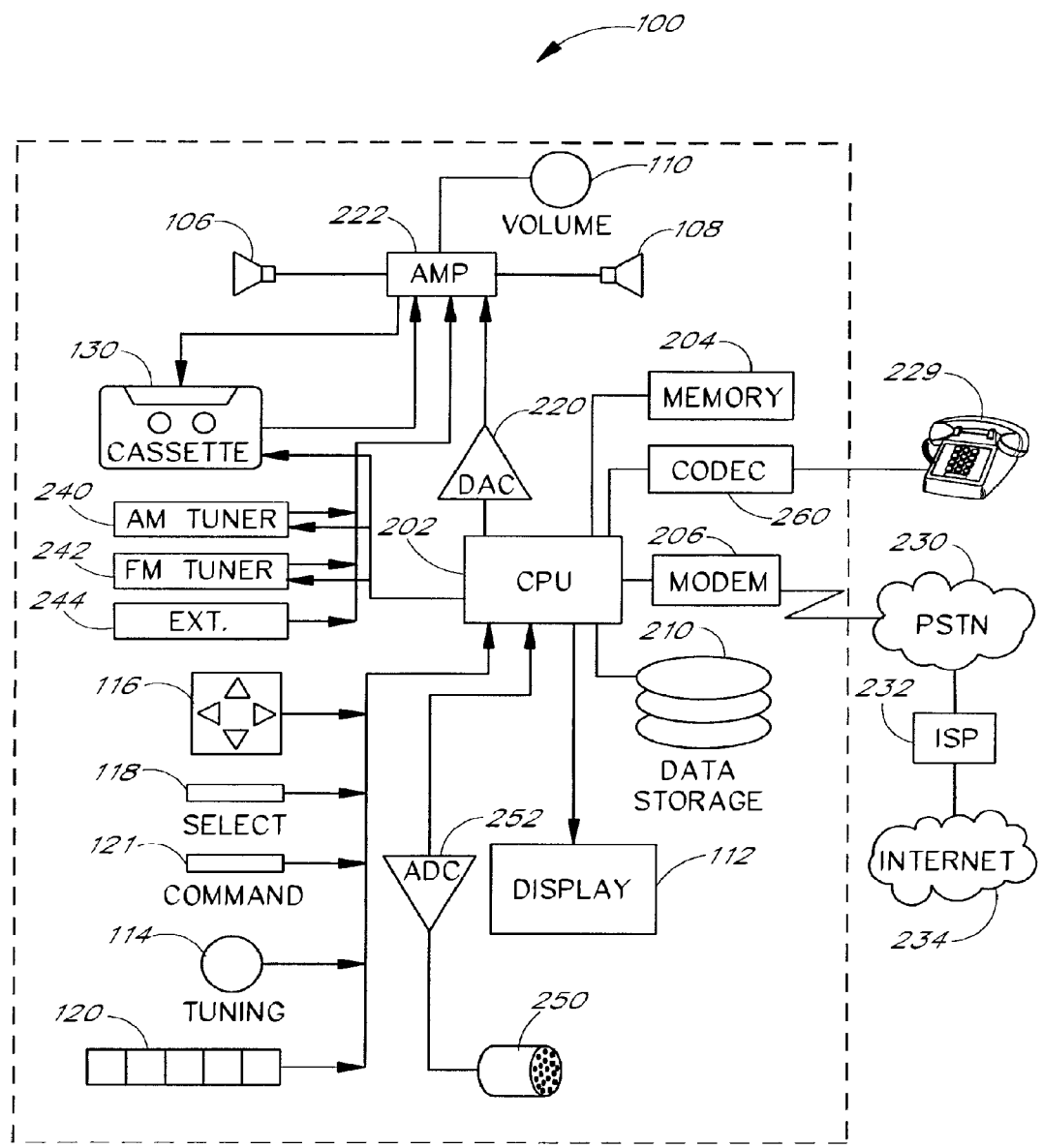
FIG. 2 is a block diagram of the functional elements of the intelligent radio apparatus.

FIG. 2 is a block diagram of the functional elements of the intelligent radio 100. The intelligent radio 100 comprises a Central Processor Unit (CPU) 202 that is used to run the intelligent radio software. The CPU 202 is connected to a random access memory 204, a data storage device 210, and a modem 206. The data storage device 210 may be any type of non-volatile data storage device, including, for example, a floppy disk drive, a hard disk drive, a flash memory, a CD-ROM, a DVD-ROM, a CMOS memory with battery backup, etc. The data storage device 210 provides storage for software programs used by the intelligent radio 100. The software stored on the data storage device 210 may be upgraded by downloading new software from the Web. The data storage device 210 may also provide storage for digitized audio material, such as recorded Web radio broadcasts, CD-Audio, etc. The modem 206 is connected to a communications network 230, shown as a Public Switched Telephone Network (PSTN), by the network cable 102. Although the communications network 230 is shown as a PSTN network, one skilled in the art will recognize that the network 230 may also be a cable television (CATV) network, a satellite network, or any other communications network. In one embodiment, the network 230 comprises both a Direct TV/PC satellite connection that provides information to the intelligent radio 100 at high speed (e.g., 400,000 bytes per second or more), and a PSTN network connection so the intelligent radio can upload information back to the ISP 232 (because many Direct TV/PC connections are only one-way). In yet another embodiment, the satellite network is a two-way satellite network that uses the satellite for both download and upload. In one embodiment, the satellite network uses the Iridium™ system developed, in part, by the Motorola Corp.

Optionally, a telephone 229 is connected to a first port of a codec 260. A second port of the codec 260 is provided to the CPU 202. The codec 260 provides digital-to-analog conversion and analog-to-digital conversion for the telephone 229. The codec 260 also provides standard telephone interface signals, such as a ringing signal, to the telephone 229, and telephone status conditions, such as receiver up or receiver down, to the CPU 202. In some embodiments, the codec 260 and the modem 206 may be combined as a telephone modem. The telephone 229 may be connected even when the network 230 is not a telephone network.

The modem 206 provides an interface between the CPU 202 and the communications network 230 and the operational characteristics of the modem 206 are determined by the type of communications network 230. Thus, if the network 230 is a PSTN network, then a telephone modem is used; if the network 230 is a CATV network, then a cable modem is used, etc. In a preferred embodiment, the modem 206 is integral to the intelligent radio 100. In other embodiments, the modem 206 is provided in a separate enclosure. An Internet Service Provider (ISP) 232 provides the user with a connection from the communications network 230 to the Web via the Internet 234. Note that FIG. 2 shows functional elements, but not necessarily hardware configurations. Thus, for example, the modem 206 may be implemented in software on the CPU 202. The CPU 202 may be a Digital Signal Processor (DSP). The CPU 202 may comprise a single computer processor, or multiple computer processors. In one embodiment, the CPU 202 comprises two processors, a DSP and a general purpose microprocessor. In one embodiment, the modem 206 is provided in a plug-in module such that the intelligent radio can be configured for different types of computer networks by simply changing the modem plug-in to suit the type of network being used.

The CPU 202 provides data to the display device 112. The CPU 202 receives user inputs from the command button 121, the tuning control 114, the button bar 120, the select button 118, and the cursor control 116. The CPU 202 provides digitized audio samples to an input of a Digital-to-Analog Converter (DAC) 220. The analog audio output of the DAC 220 is provided to an amplifier 222. In a preferred embodiment, the DAC 220 and the amplifier 222 are each two-channel devices, providing left and right stereo channels. A left channel output of the amplifier 222 is provided to the left channel speaker 106 and a right channel output of the amplifier 222 is provided to the right channel speaker 108. The volume control 110 controls the gain of the amplifier 222.

As shown in the preferred embodiment in FIG. 2, the other optional audio sources such as the cassette device 130, an AM tuner 240, an FM tuner 242, and an external input 244 also provide inputs to the amplifier 222. Other optional audio sources may be provided, such as, for example, an audio CD, a DVD, a digital audio tape unit, etc. The CPU 202 controls the cassette device 130, the AM tuner 240, the FM tuner 242, and other optional audio sources. A line output from the amplifier 222 may also be provided to a record input of the cassette device 130.

As described above, the button bar 120 is used to select one of the audio sources. When the button bar 120 is set to "AM," the intelligent radio 100 operates in an AM radio mode. In the AM radio mode, an analog output from the AM tuner 240 is provided to the amplifier 222. Also in the AM radio mode, the display device 112 displays the frequency of an AM station selected by the AM tuner 240. The user may use the tuning control 114 to select a desired AM station. The AM mode is optional.

An analog output from a microphone 250 is provided to an analog input of an analog-to-digital converter 252. A digital output from the analog-to-digital converter 252 is provided to the CPU 202. The microphone 250 and converter 252 allow for voice commands to control the intelligent radio. The microphone 250 and converter 252 are optional. In some embodiments, a microphone is also placed in a wireless remote so that voice commands can be provided from the wireless remote.

When the button bar 120 is set to "FM," the intelligent radio 100 operates in an FM radio mode. In the FM radio mode, the analog audio output from the FM tuner is provided to the amplifier 222, and the display device 112 displays the frequency of the FM station selected by the FM tuner 242. The FM mode is also optional.

When the button bar 120 is set to "Cassette," the intelligent radio 100 operates in a cassette playback mode. In the cassette playback mode, analog output from the cassette player is provided to the amplifier 222, and the display device 112 displays information relating to the cassette playback. The cassette playback mode is also optional. The cassette device 130 may also optionally be configured to provide a record capability such that the cassette can be used to record audio information from any of the other modes. Thus, for example, the cassette can be used to record FM radio, AM radio, or Web radio broadcasts.

When the button bar 120 is set to "Web," the intelligent radio 100 operates in a Web Radio mode. In the Web Radio mode, the intelligent radio 100 uses the modem 206 to connect to the ISP 232. The ISP 232 provides a list of available Web broadcasts, and access to the Internet 234, so that the various Web broadcasts can be received by the intelligent radio 100. In the Web Radio mode, the display device 112 is used to select a Web broadcast and to provide information about the selected Web broadcast.

Figure 3A:
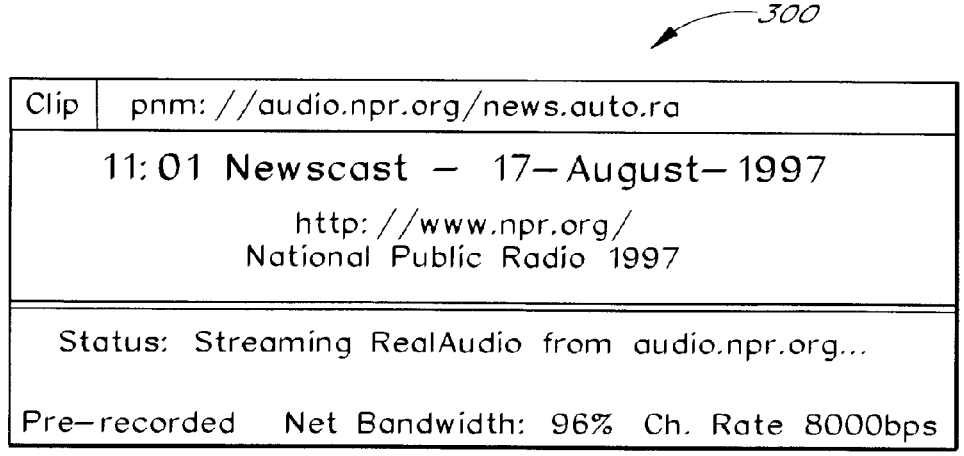
FIG. 3A shows a default display that appears while a Web broadcast is being received.
Figure 3B:
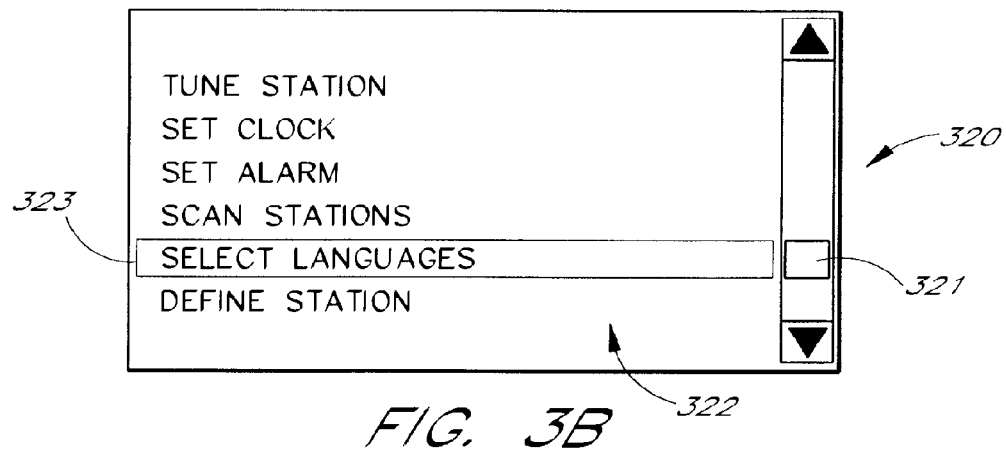
FIG. 3B shows a menu display that allows the user to select one of the command and setup displays shown in FIGS. 3C-3E.
Figure 3C:
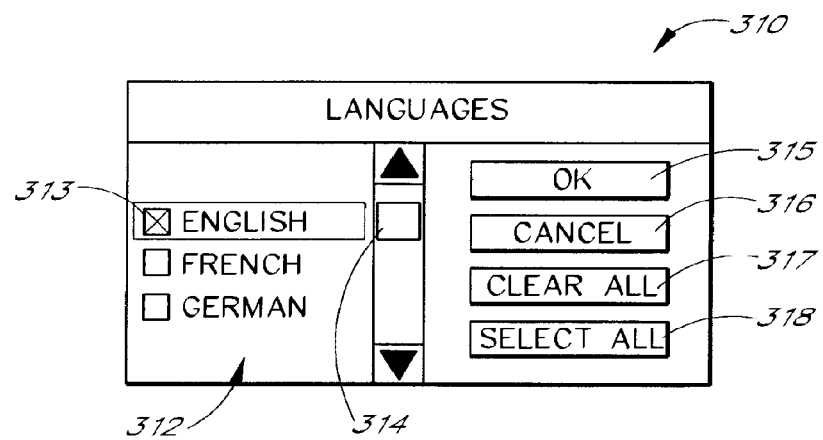
FIG. 3C illustrates a select language display that allows a user to specify desired languages (e.g., English, French, etc.).

FIGS. 3A through 3E show various displays provided by the display device 112 while in the Web Radio mode. FIG. 3A shows a default display 300 that appears while a Web broadcast is being received. FIG. 3B shows a menu display that allows the user to select one of the command and setup displays shown in FIGS. 3C-3E.

The display 300, shown in FIG. 3A, includes information about the Web broadcast including the type of broadcast (e.g., "Newscast"), the Web address (URL) of the source for the broadcast (e.g., http://www.npr.org), a description of the broadcast (e.g., "National Public Radio 1997"), a broadcast format (e.g., "Streaming RealAudio"), etc.

Figures 3D, 3E:
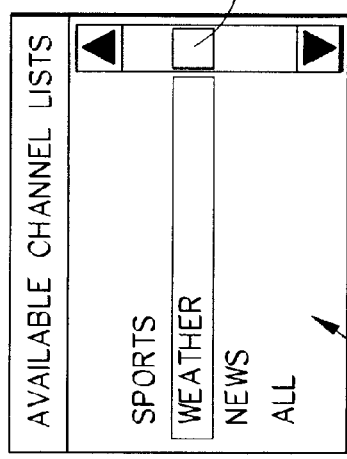
FIG. 3D illustrates a display that allows a user to select a type of program material (e.g., news, sports, weather, etc.).
FIG. 3E illustrates a display that allows a user to select various program broadcasts.

FIG. 3B shows a menu display 320 that allows the user to access the various setup and control displays shown in FIGS. 3D-3E. The user activates the menu display 320 by pressing the command button 121. The display 320 provides a menu list 322 that lists the various other command displays. The list 322 may provide: a "Tune Station" command for activating a tune-station display 340, shown in FIG. 3E; a "Select Language" command for activating a select-language display 310, shown in FIG. 3C; and a "Select List" command for activating a select-list display 322, shown in FIG. 3D. The list 322 may also provide commands to activate other displays (not shown) such as "Setup," to initialize the intelligent radio, "Scan Stations," to get a new list of Web broadcast stations from the Internet 234, and "Define Station," to manually define a Web broadcast station not listed. The list 322 may also provide commands to activate other displays such as "Set Clock," and "Set Alarm," to provide optional clock and alarm clock modes for the display device 112.

The display 320 also provides a scroll bar 321 to allow the user to scroll through the list 322 and select an item (command) from the list. Scrolling may be accomplished by using either the cursor control 116 or the tuning control 114. The user uses the cursor control 116 or the tuning control 114 to highlight a desired menu item in the list 322, and then the user presses the select button 118 to select the highlighted menu item.

The select-language display 310, shown in FIG. 3B, allows the user to elect to receive Web broadcasts in one or more selected languages. The display 310 provides a list of available languages 312 and a scroll bar 314 for scrolling through the list 312. Each item in the list 312 corresponds to a language (e.g., English, French, etc.) and each item is provided with a checkbox 313. If a checkbox 313 is checked, then the corresponding language is enabled. The display 310 also provides an OK button 315, a Cancel button 316, a Clear-All button 317, and a Select-All button 318. The Clear-All button 317 clears all of the checkboxes 313, and the Select-All button 318 checks all of the checkboxes 313. The user "presses" one of the buttons 315-318 by using the cursor control 116 to highlight a desired button and then pressing the select button 118 to "press" the highlighted button.

The select-list display 330, shown in FIG. 3D, allows the user to select a preferred type of program material (e.g., Sports, Weather, News, All, etc.). The display 330 includes a list 332 of program types and a scroll bar 331. The user uses the cursor control 116 or the tuning control 114 to highlight a desired program type from the list 332, and then the user presses the select button 118 to select the highlighted program type.

The select-broadcast display 340, shown in FIG. 3E, allows the user to select a Web broadcast. The display 330 includes a list 342 of the available Web broadcasts having the proper language (as selected in the select language display 310) and the desired program type (as selected in the select-list display 331). The user uses the cursor control 116 or the tuning control 114 to highlight a desired broadcast from the list 342, and then the user presses the select button 118 to select the highlighted program type. Each item in the list 342 is provided with a checkbox 343. If the checkbox 343 is checked, then the corresponding broadcast is a preferred (or "fast-tune") broadcast. The user may scroll through the fast-tune broadcasts by using the tuning control 114 from the default display 300 shown in FIG. 3A, without having to activate the select-broadcast display 340. This provides a convenient shortcut feature to allow the user to quickly tune to stations that the user regularly listens to.

Figure 4:
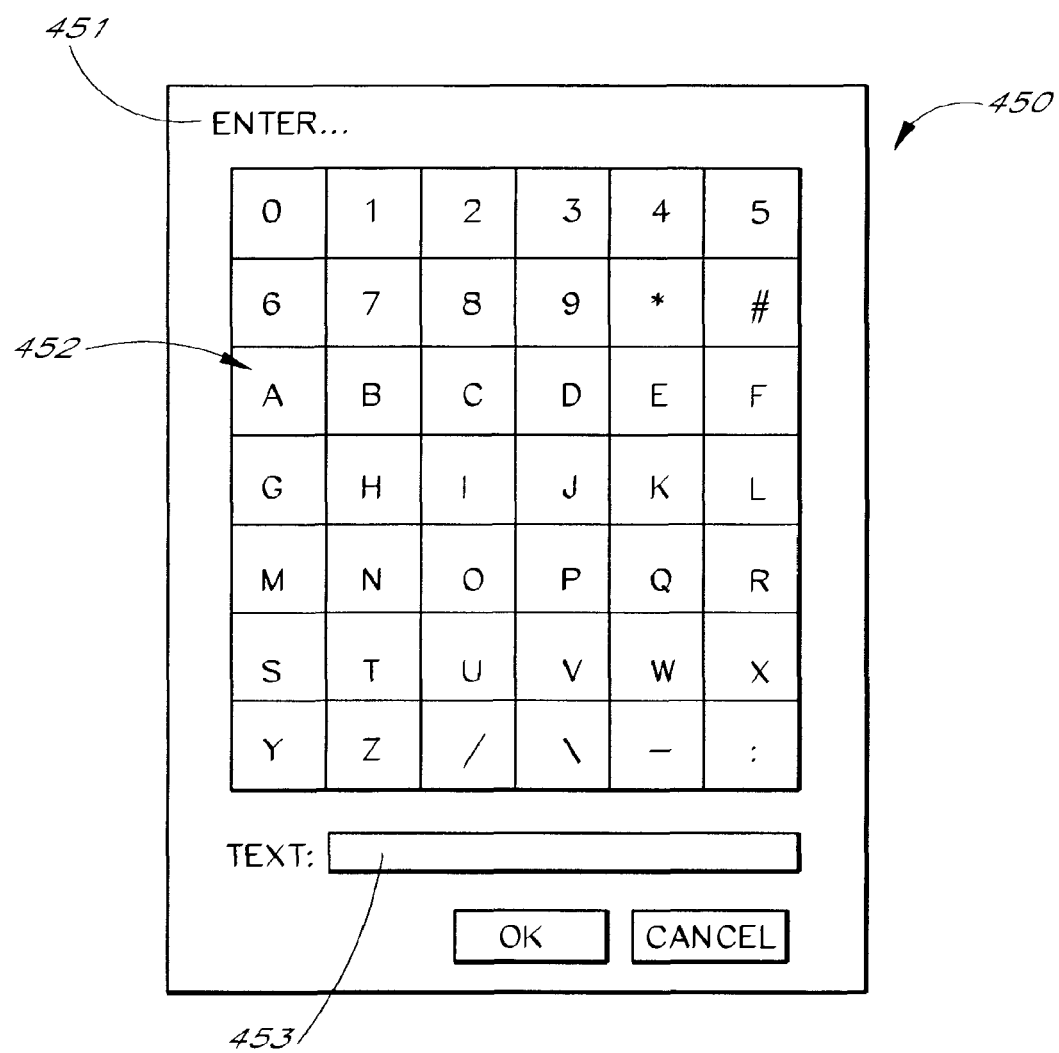
FIG. 4 illustrates a data-entry display that the intelligent radio apparatus uses to allow the user to input alphanumeric text.

FIG. 4 illustrates a data-entry display 450 that allows the user to input alphanumeric text (e.g., the telephone number of the ISP 232 or a URL). The display 450 includes a text prompt 451 to prompt the user for the desired data. The display also includes an on-screen keyboard 452, a text display 453, an OK button 454 and a Cancel button 455. The user enters text by using the cursor control 118 to highlight a desired character on the on-screen keyboard 452 and then pressing the select button 118 to enter the highlighted character into the text display 453. The OK button 454 and the Cancel button 455 are "pressed" in the same fashion.

Figure 5:
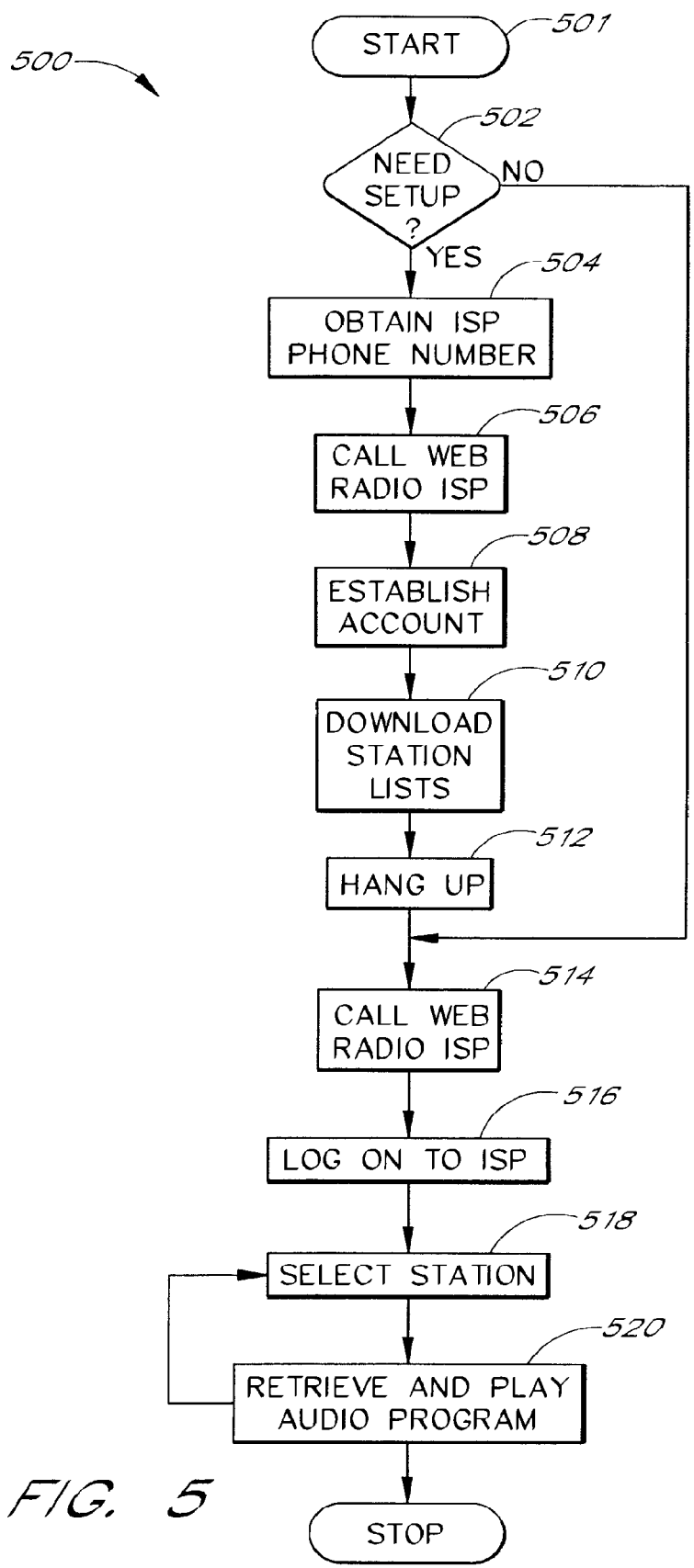
FIG. 5 is a flowchart that illustrates operation of the intelligent radio apparatus.

FIG. 5 is a flowchart 500 that begins at a start block 501 and illustrates the Web Radio mode process. The process advances from the start block 501 to a decision block 502, where the process checks a status flag to determine whether or not the intelligent radio software needs to be initialized (setup). If setup is needed, then the process advances to a process block 504; otherwise, the process jumps over the setup steps to a process block 514. In the process block 504, the process obtains a phone number for the desired ISP 232. The phone number may be obtained from a default phone number stored in the intelligent radio software, or by prompting the user through the data-entry display 450. Once the phone number has been obtained, the process advances to a process block 506, where the modem 206 dials the telephone number and establishes a modem connection with the ISP 232. Once the connection is established, the process advances to a process block 508 where the user establishes an account with the ISP 232.

In one embodiment, the user is prompted for a password that is stored on the data storage device 210 or entered using the data-entry display 450. Establishing an account may include other actions, such as creating a username for the user, changing the phone number used to access the ISP 232, and entering information about the user and the user's account. Once an account is established, the process advances to a process block 510 where a list of available Web radio broadcast stations is downloaded to the intelligent radio 100 from the ISP 232 and stored on the storage device 210. Lists of available languages and program types are also downloaded and stored on the storage device 210. Once the lists are downloaded, the process advances to a hang-up block 512 wherein the modem 206 terminates the network connection (e.g., hangs-up the phone). Upon hang-up, the setup process is complete, and the process advances to the process block 514.

In the process block 514, the modem dials the ISP 232 and then advances to a process block 516 where the intelligent radio 100 logs on to the user's account at the ISP 232. The hang-up, redial, and logon (blocks 512, 514, and 516, respectively) is desirable when using a PSTN, because the initial telephone call, placed in the block 506, is typically a long-distance call or a toll-free (e.g., a 1-800) call. By contrast, the telephone call placed in the block 514 is typically a local call. When using a non-PSTN network (e.g., a cable modem, a satellite network, etc.) then the hang-up, redial, and logon (blocks 512, 514, and 516, respectively) is typically omitted.

Once the user is logged on, the process advances to a process block 518 where the user selects (tunes) a Web radio broadcast station. Once a Web broadcast has been selected, the process advances to a process block 520 where the intelligent radio 100 receives the Web broadcast. The CPU 202 decodes and decompresses the received data as necessary and then sends the decompressed data to the DAC 220 where it is converted to an analog signal that is subsequently played on the speakers 106, 108. The process remains in the process block 520 while the user listens to the Web broadcast.

If the user tunes to a new Web broadcast station (e.g., by turning the tuning control 114 or by activating the select-broadcast display 340) then the process loops back to the process block 518, selects the new station, and returns to the process block 520.

Figure 6:
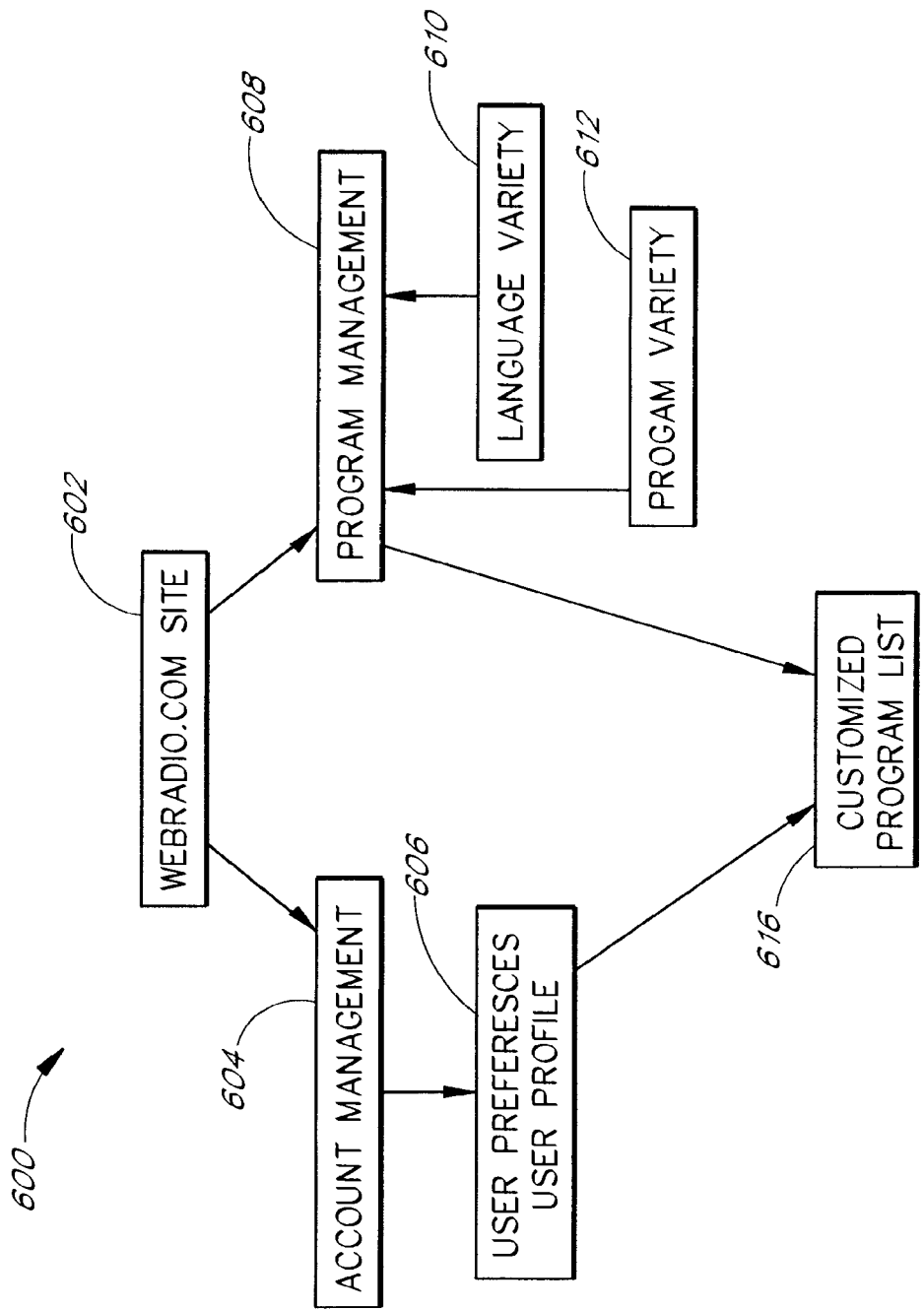
FIG. 6 is a flow graph that illustrates operation of the intelligent radio networked system.
Figure 6A:
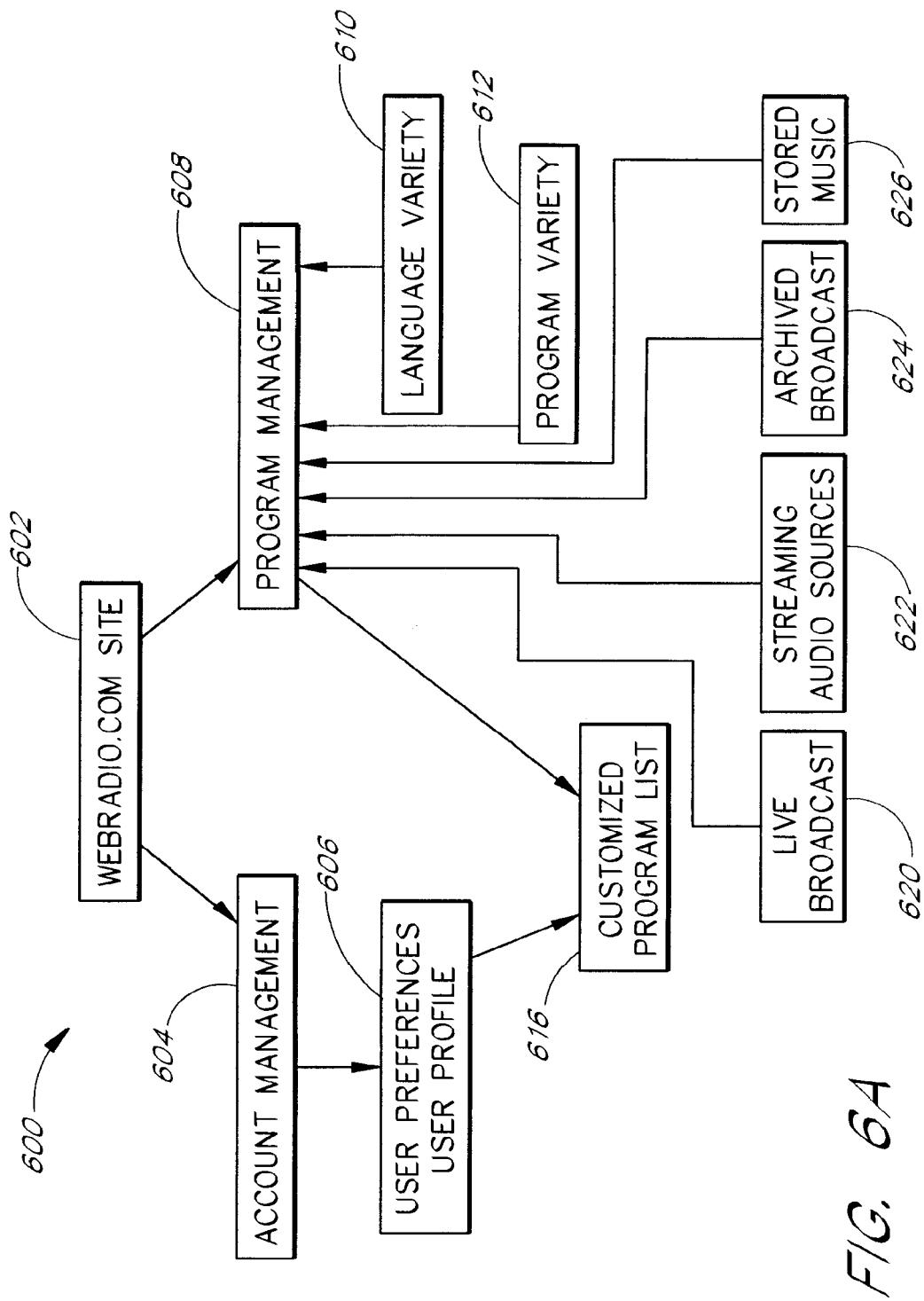
FIG. 6A illustrates the information management and data processing functions provided by a Web radio Web site (e.g., www.webradio.com) to produce a list of Web radio broadcast stations for the user.

FIG. 6A illustrates the information management and data processing functions 600 provided by a Web Radio site 602 (e.g., www.webradio.com). Access to the Internet site 602 is made possible by the Internet access provided by the ISP 232. The Internet site 602 provides a list of Web radio broadcast stations for the user and optionally other value-added services that enhance the operation of the intelligent radio 100. For example, the Internet site 602 may provide a list of available program sources and streaming audio programming. The site 602 may also maintain user profile comprising a list of preferred Internet "broadcast stations." The site 602 also provides special download capabilities such that the user can download information and software into the intelligent radio. The site 602 also provides upload capabilities such that the user can upload information, such as preferences, etc., from the intelligent radio 100 to the site

602. For example, the site 602 can provide a customized list of stations for each user and voicemail capability. The site 602 may provide reformatting of streaming audio data into a format better suited for the intelligent radio.

In one embodiment, the site 602 also provides Web telephone capabilities to the intelligent radio 100, such that the user can use the intelligent radio as a telephone to talk to other users that are connected to the Internet. In one embodiment of the Web telephone, the codec 260 is used to digitize speech from a microphone in the handset of the telephone 229. The digitized speech is sent over the network 230 to the ISP. The ISP forwards the digitized speech to a remote user. Similarly, the ISP provides digitized speech from the remote user to the intelligent radio. The intelligent radio uses the codec 260 to convert the digitized speech into analog signals that are played on the speakers 106 and 108 or a speaker in the handset of the telephone 229.

In yet another embodiment, the intelligent radio provides voice email in connection with the site 602. To receive email, text-to-voice software in the site 602 is used to convert email text into digitized voice data as words spoken in the user's desired language. The digitized voice data is provided to the intelligent radio where it is converted to an analog signal and played on the speakers 106 and 108 or a speaker in the handset of the telephone 229. To receive email, the user speaks into the microphone 250 or the microphone in the handset of the telephone 229 and the spoken words are converted into digitized speech by the intelligent radio. The intelligent radio sends the digitized speech to the site 602 where it is converted into email text and then emailed to the recipient. The software to convert speech to text and text to speech is provided in the site 602 in order to minimize the cost and complexity of the intelligent radio. Alternatively, the software to convert speech to text and text to speech is provided in the intelligent radio.

In one embodiment, the site 602 also provides special formatting and markup protocols that are tailored to the intelligent radio display 112. Most existing Internet sites are geared towards a computer or television and assume that a user has a large, high resolution, color monitor. Most existing Internet sites also assume that a user is accessing the site by using a Web browser such as Netscape Navigator™ or Microsoft Internet Explorer™. These browsers support high level protocols such as HyperText Markup Language (HTML). The display 112 may be relatively smaller, and relatively less capable than a traditional computer monitor. In some embodiments, the display 112 does not necessarily need all of the capabilities and complexity of HTML and is thus better served by information that is formatted for the display 112 and that is expressed in a markup language that is suited to the needs of the intelligent radio 100, without the overhead and complexity of HTML.

When the user connects to the Internet site, information is passed along a first data stream to an account management block 604. The block 604 provides account management functions relating to the user's account with the ISP 232. The account management block passes data to a user preference block 606, which retrieves user profile information and user preferences specified by the user. Information regarding the user preferences may be stored by the ISP 232, or downloaded from the intelligent radio 100 as needed.

Information is also passed from the process block 602 along a second data stream to a program management block 608. The program management block 608 accesses a language variety database 610 to determine which languages are available, and a program variety database 612 to determine which types of programs are available. The program management block 608 also accesses program sources such as live broadcasts 620, archived broadcasts 624, stored music 626, and other streaming audio sources 622.

User profile information from the user preference block 606 and program data from the program management block 608 are provided to a program list block 616, which constructs a list of available Web programs (broadcasts) that fit the user's preferences. The list constructed in the block 616 is passed to the intelligent radio 100.

Figure 6B:
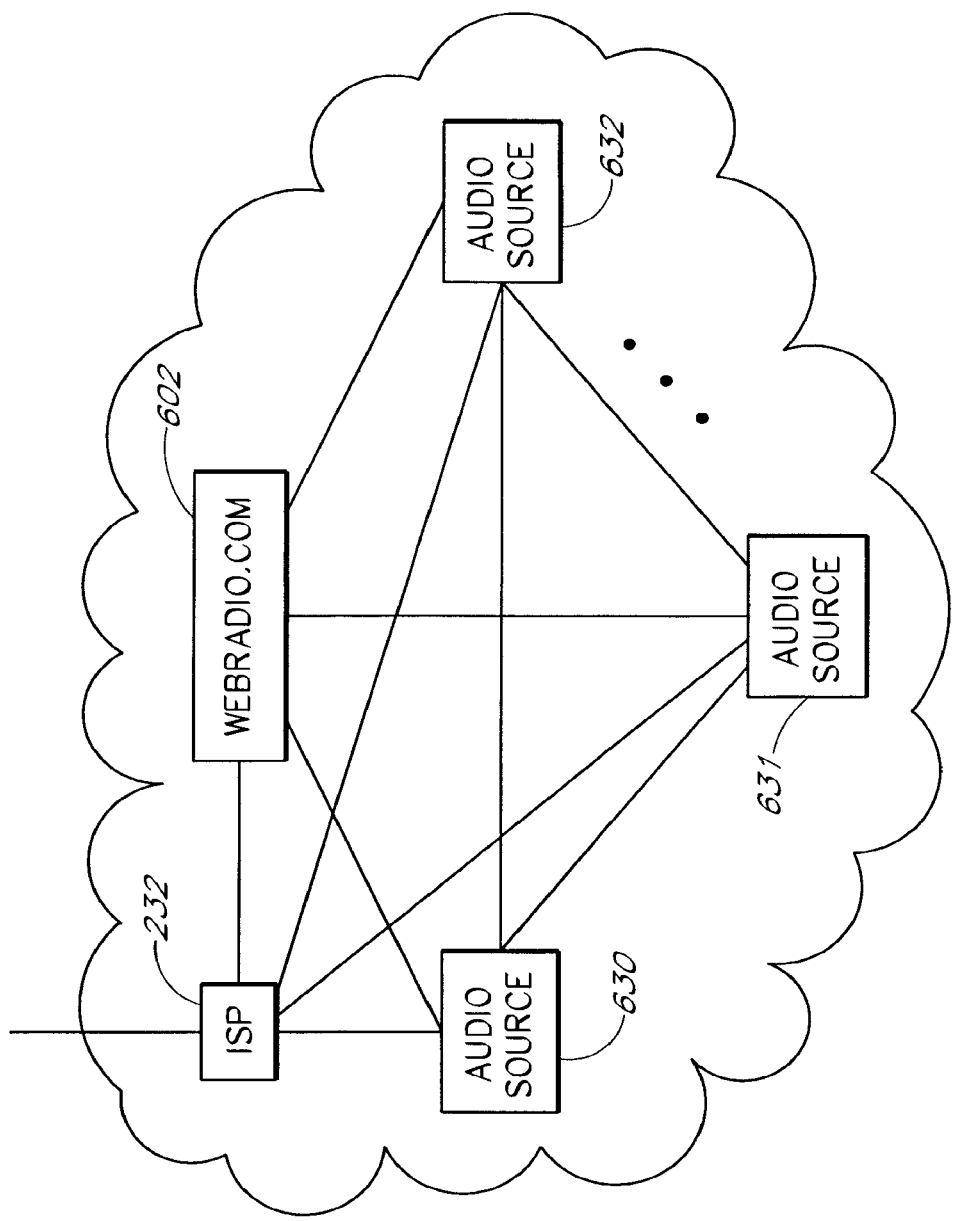
FIG. 6B illustrates a relationship between the Web radio Web site and other web sites that provide streaming audio programming.

FIG. 6B shows the conceptual relationship between the site 602 and other Web sites that supply streaming audio information, such as a site 630, a site 631, and a site 632. The Internet provides the ability to transfer data between any two of the sites 602, 630-632. The user connects, through the ISP 232, to the site 602. The site 602 provides links to the sites 630-632 through the programming lists provided by the site 602. If the user selects a streaming audio program from one of the sites 630-632, then the site 602 provides the necessary link to the selected site. In some embodiments, the site 602 provides the link information to the intelligent radio 100, and the intelligent radio 100 makes a "direct" connection to the selected site. In other embodiments, the site 602 links to the selected site, receives the streaming audio data, reformats the data if desired, and then sends the streaming audio data to the intelligent radio 100.

Figure 7:
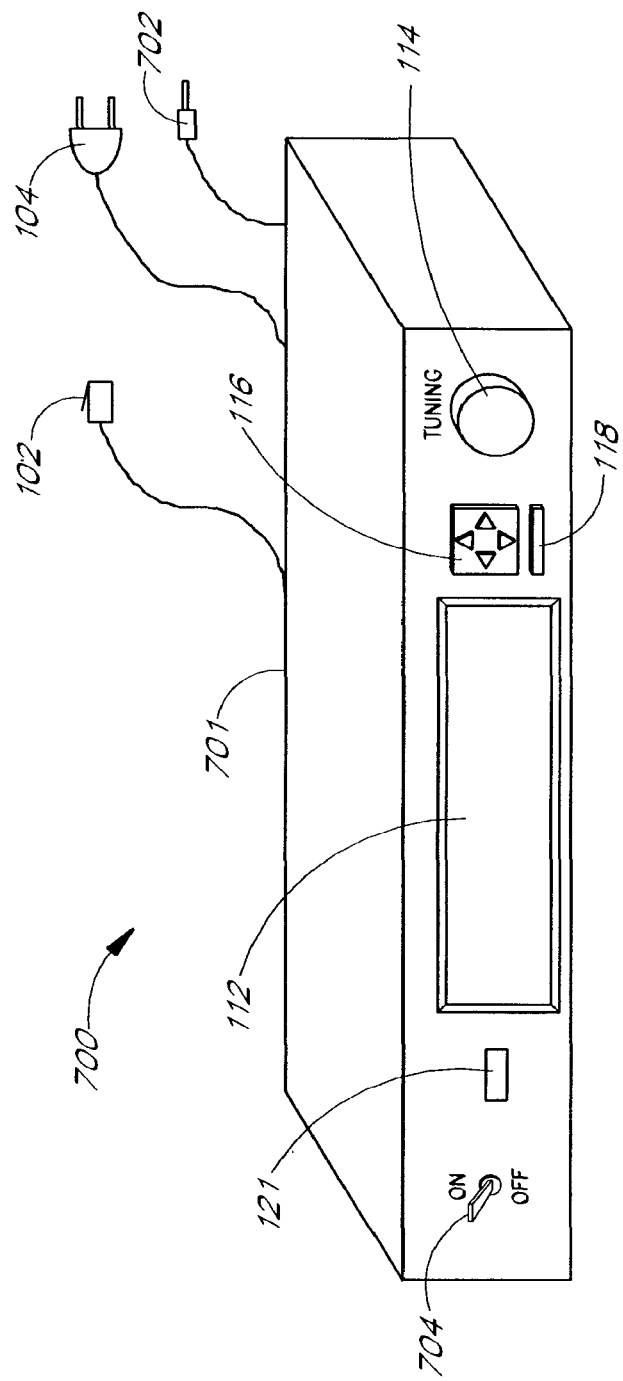
FIG. 7 is a perspective view of a tabletop intelligent radio tuner.

FIG. 7 illustrates an embodiment of an intelligent radio tuner 700. The tuner 700 is mounted in an enclosure 701 and connects to household AC power through a power cord 104, to a network through a network cable 102, and to an audio system through an audio line 702. User controls are mounted on the front of the enclosure 701 and include an on-off switch 704, a command button 121, a cursor control 116, a select button 118, and a tuning control 114. The cursor control 116 provides up, down, left, and right movements of a cursor or other entity on a display device 112. Also mounted on the front of the enclosure 701 is the display device 112, which provides information to the user.

Figure 8:
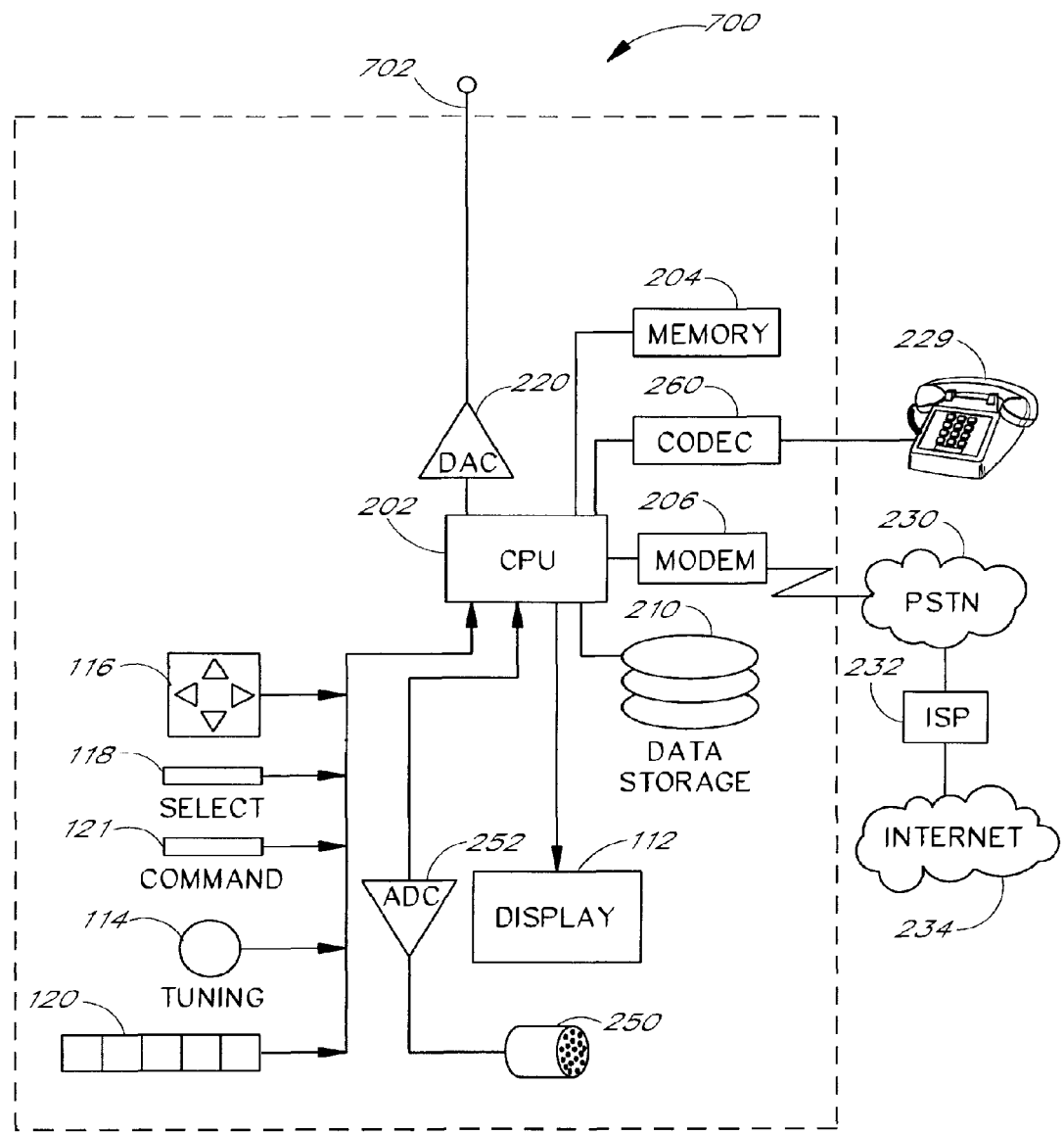
FIG. 8 is a block diagram of the functional elements of the intelligent radio tuner shown in FIG. 7.

FIG. 8 is a block diagram of the functional elements of the intelligent radio configured as a tuner 700. The tuner 700 comprises the Central Processor Unit (CPU) 202 that is used to run the intelligent radio software. The CPU 202 is connected to the random access memory 204, the data storage device 210, the modem 206, and the codec 260. The data storage device 210 may be any type of non-volatile data storage device, including, for example, a floppy disk drive, a hard disk drive, a flash memory, a CD-ROM, a DVD-ROM, a CMOS memory with battery backup, etc. The modem 206 is connected to a communications network 230, shown as a Public Switched Telephone Network (PSTN). Although the communications network 230 is shown as a PSTN network, one skilled in the art will recognize that the network 230 may also be a cable television (CATV) network, a satellite network, or any other communications network. The modem 206 provides an interface between the CPU 202 and the communications network 230 and the operational characteristics of the modem 206 are determined by the type of communications network 203. Thus, if the network 230 is a PSTN network, then a telephone modem is used; and if the network 230 is a CATV network, then a cable modem is used, etc. An Internet Service Provider (ISP) 232 provides the user with a connection from the network 230 to the Web via the Internet 234.

The CPU 202 provides data to the display device 112. The CPU 202 receives user inputs from the command button 121, the tuning control 114, the select button 118, and the cursor control 116. The CPU 202 provides digitized audio samples to an input of a Digital-to-Analog Converter (DAC)

220. The analog audio output of the DAC 220 is provided to the audio output 702. In a preferred embodiment, the DAC 220 is a two-channel device, providing left and right stereo channels.

Figure 9:
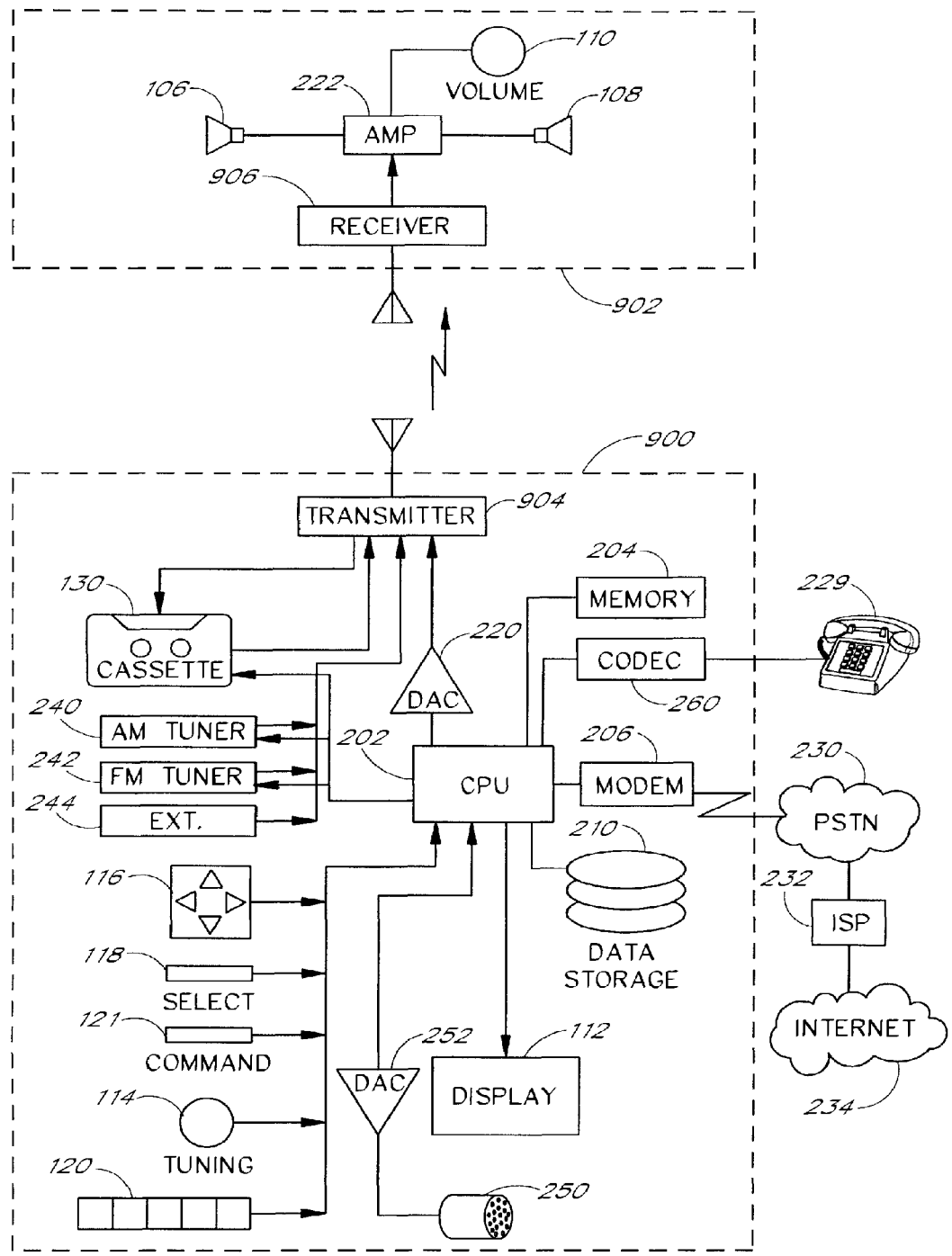
FIG. 9 is a block diagram of the functional elements of an embodiment of the intelligent radio that provides a remote playback capability.

FIG. 9 is a block diagram of the functional elements of an embodiment of an intelligent radio that provides for remote playback. FIG. 9 shows a base unit 900 that is connected to the communications network 230. The base unit 900 receives streaming audio from the Web and transmits the audio information to a remote playback unit 902.

The base unit 900 is similar in most respects to the intelligent radio except that the amplifier 222, the loudspeakers 106 and 108, and the volume control 110 are not located in the base unit 900, but rather are located in the remote playback unit 902. In the base unit, the DAC 220, the cassette device 130, the AM tuner 240, the FM tuner 242, and the external input 244 are connected to a transmitter 904 rather than the amplifier 222. The transmitter 904 provides a transmitted signal to a receiver 906 in the remote unit 902. The receiver 906 provides an audio output to the amplifier 222.

The base unit 900 receives the streaming audio information from the Internet 234 and uses a transmission carrier to retransmit the audio information to one or more remote units 902. The transmitter 904 and the receiver 906 may use any form of communication for the transmission carrier, including radio frequency communication, infrared communication, ultrasonic communication, etc. In one embodiment, the transmitter 904 may be a low power FM (Frequency Modulation) transmitter compatible with standard FM broadcast bands, such that the remote playback unit 902 can be a standard FM transistor radio or a stereo receiver. In yet another embodiment, the transmitter 904 may be a low power AM (Amplitude Modulation) transmitter compatible with standard AM broadcast bands, such that the remote playback unit 902 can be a standard AM transistor radio or a stereo receiver.

In other embodiments, the base unit 900 may also include an amplifier 222, loudspeakers 106 and 108, and a volume control 110 such that the base unit 900 can provide both playback of the audio information and transmission of the audio information to the remote unit 902.

Figure 10:
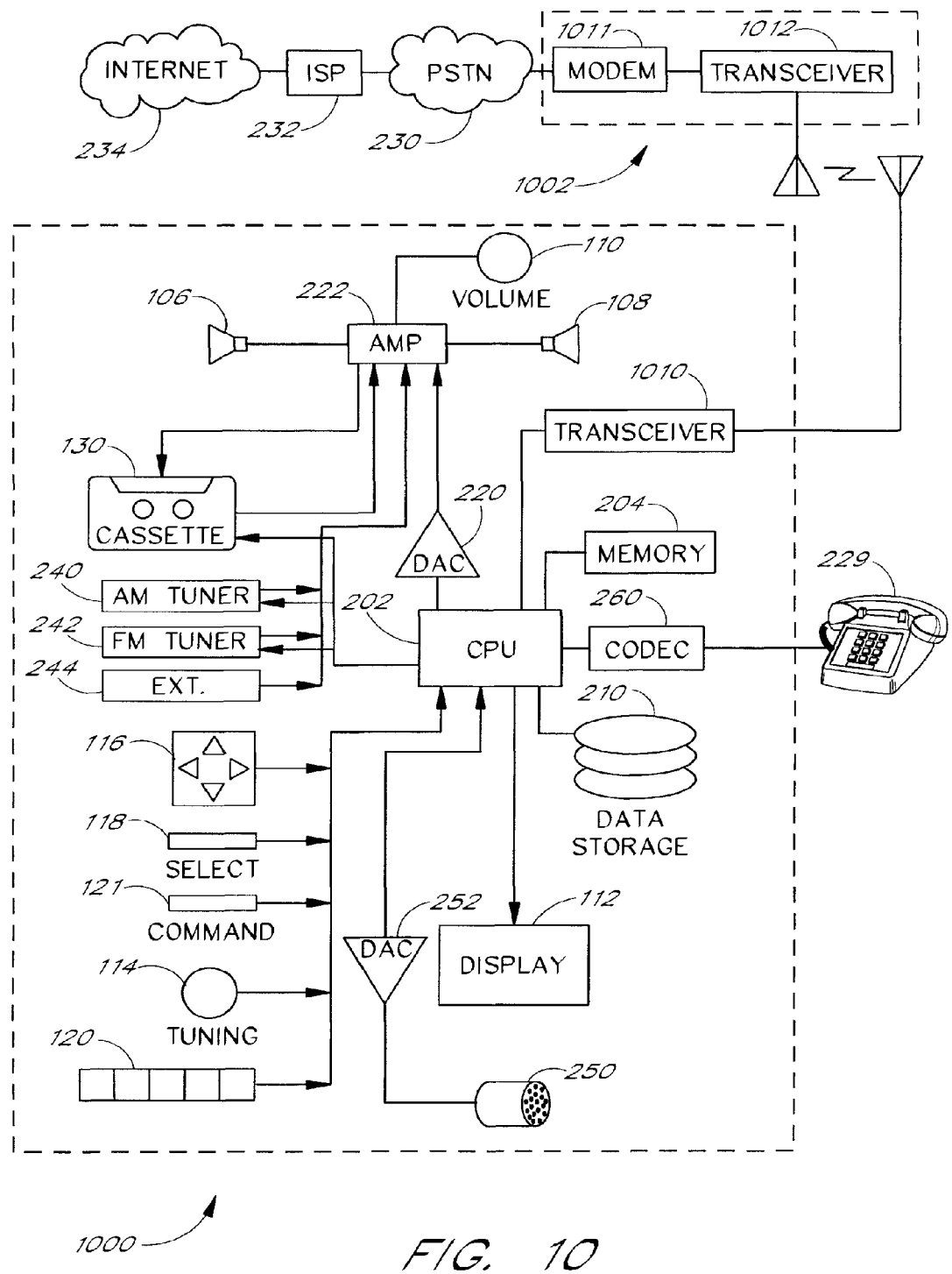
FIG. 10 is a block diagram of the functional elements of an embodiment of the intelligent radio that provides a remote access capability.

FIG. 10 is a block diagram of the functional elements of an embodiment of an intelligent radio that provides for remote access, comprising a base unit 1002 and an intelligent radio 1000. The base unit 1002 comprises a transceiver 1012 coupled to a modem 1011. The modem 1011 is connected to the communications network 230. The modem 1011 receives data from the ISP and provides the data to the transceiver 1012, which then transmits the data to a transceiver 1010 in the intelligent radio 1000. The transceiver 1010 transmits data from the intelligent radio 1000 to the transceiver 1012. The transceiver 1012 provides the data from the intelligent radio 1000 to the modem 1011, which sends the data to the ISP 232.

The intelligent radio 1000 is similar in most respects to the intelligent radio 100 shown in FIG. 2, with the addition of the transceiver 1010. A data input/output port of the transceiver 1010 is provided to the processor 202 and a Radio Frequency (RF) input/output port of the transceiver 1010 is provided to an antenna. Also, in the intelligent radio 1000, the modem 206 is optional (because network communications are handled by the transceiver 1010 rather than the modem 206).

The transceivers 1010 and 1012 use any suitable means for communication, including, for example, optical communication, radio communication, etc. In a preferred embodiment, the transceivers 1010 and 1012 are radio transceivers that use spread-spectrum communication techniques at a frequency of approximately 2.4 GHz. The combination of the base unit 1002 and the intelligent radio 1000 provides a capability similar to that provided by a cordless telephone. The base unit 1002 can be located near a network connection point (e.g., a telephone outlet), and the intelligent radio 1000 can be conveniently placed anywhere within the range of the base unit 1002. The two-way communication link between the transceiver 1010 and the transceiver 1012 provides a cordless connection to the network 230.

Figure 11:
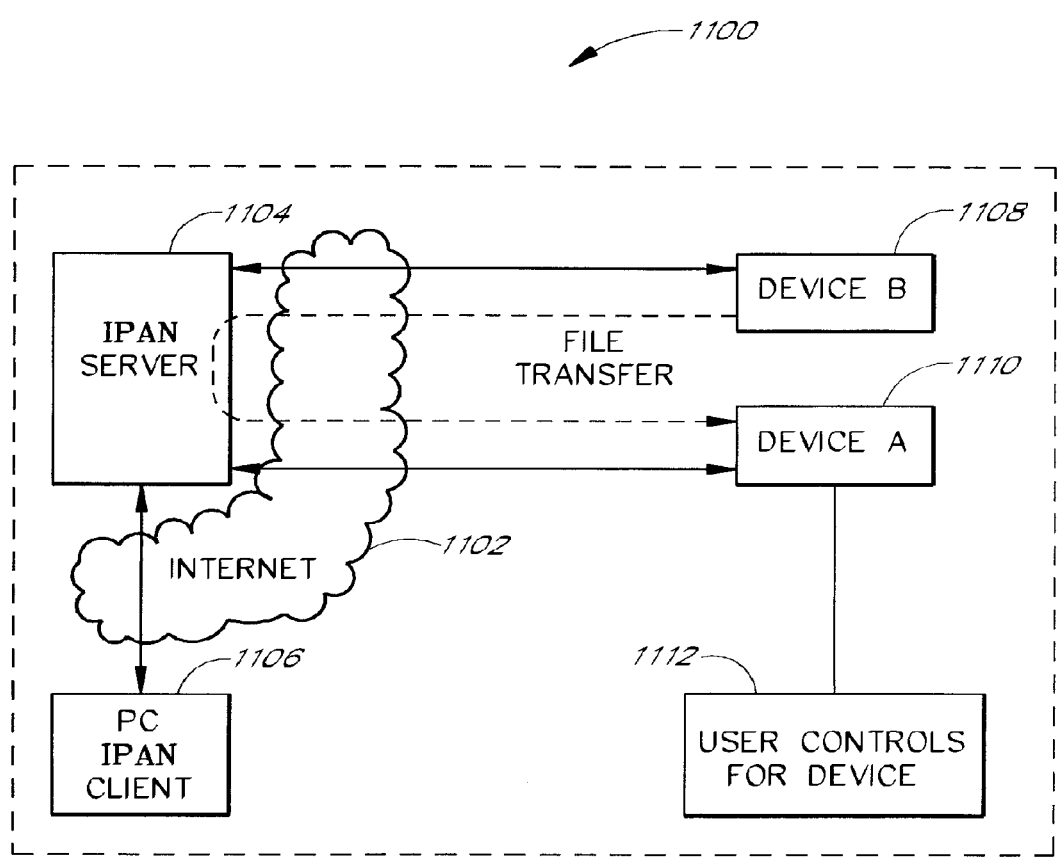
FIG. 11 is a perspective view of one embodiment of the computing environment of a network-enabled audio device configuration.

In one embodiment, the intelligent radio, as shown in FIG. 1, is a network-enabled audio device. FIG. 11 illustrates one embodiment of the network-enabled audio device configured for use with other electronic devices. In one embodiment, the network-enabled audio device works in conjunction with a PC. With a network connection, software on a PC can be used to assign playlists of songs to the network-enabled audio device. Further, the network-enabled audio devices can be set to turn on at a certain time and play a playlist of music. In one embodiment, songs encompass a variety of audio sources including, but not limited to, audio files containing music and/or advertisements. Optionally, the network-enabled audio devices can turn on through an Internet connection as well. The front panel, including the user controls, can be disabled in order to prevent users from turning the device off when a playlist is scheduled.

In one embodiment, the network-enabled audio device records user activity and provides that information to a server for data mining purposes. For instance, a user's composition of a playlist including songs from The Beatles can be recorded by the network-enabled audio device and sent to a server tracking the number of users composing playlists including songs from The Beatles. Tracking information can then be provided to record companies interested in selling more Beatles MP3's to gauge consumer demand. In one embodiment, a button is provided for allowing the user to turn the logging feature on or off.

In FIG. 11, an IPAN 1100 includes an IPAN server 1104, a PC IPAN client 1106, a network 1102, a device B 1108, a device A 1110, and user controls 1112. The PC IPAN client 1106 connects to the IPAN Server 1104 through the network 1102 (such as the Internet). The Device 1110 represents a network-enabled audio device, which connects at a default time to the IPAN server 1104. The user can optionally change the default time or can connect to the IPAN server 1104 at a desired time independent of the default time. The user can use the user controls 1112 on the Device 1110 to bypass the default time and connect to the server 1104 immediately. When the Device 1110 connects, the IPAN server 1104 may have a playlist for the Device 1110. The IPAN server 1104 downloads the playlist to the device 1110. The IPAN server 1104 checks to see what devices have the audio files listed in the playlist. The IPAN server 1104 maintains a list of URL's from which the device 1110 received audio files listed in the playlists. In one embodiment, the list of URL's is stored in a catalog. In one embodiment, the catalog also includes other information such as, for example, a list of available audio playback devices and their settings, scheduled audio playback, and/or commands for system synchronization. The Device 1110 attempts to connect to the URL's listed as the location from which the songs located on the Device's 1108 hard drive were retrieved from. If the URL's do not work and the song exists in the IPAN 1100, then the audio files are transferred from the Device 1108 to the Device 1110 by uploading the files from the Device 1108 the next time the Device 1108 connects. The next time the Device 1110 connects, it will download the list of files from the server. If the song does not exist in the IPAN, the Device 1110 attempts to download the song at intervals until the user deletes the song from the playlist or the song is added to the Device 1108. In one embodiment, for example, an empty cone will appear beside the song in the playlist that could not be downloaded. The user can delete the song in order to request a cease in the attempts to download, or the user can refrain from deleting the song from the playlist in order to request that further attempts be made to download the song. A request for further attempts in downloading the song results in further iterations of Device 1110 attempting to download the song from the broken URL followed by attempts to upload the song from Device 1108 when Device 1108 connects.

Figure 12A:
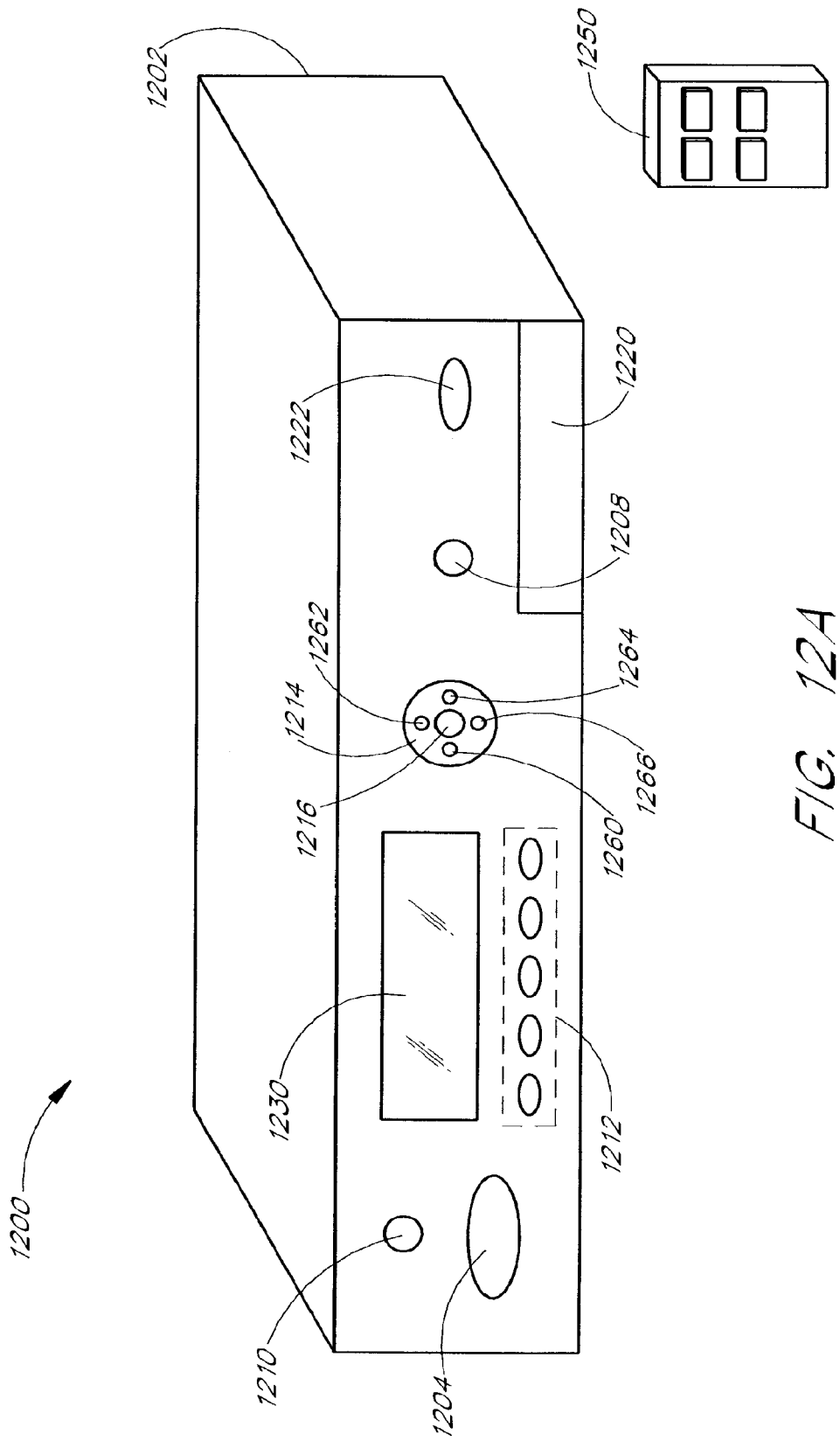
FIG. 12A is a perspective front view of one embodiment of the network enabled component audio device as shown in FIG. 11 that integrates with a home stereo entertainment system.
Figure 12B:
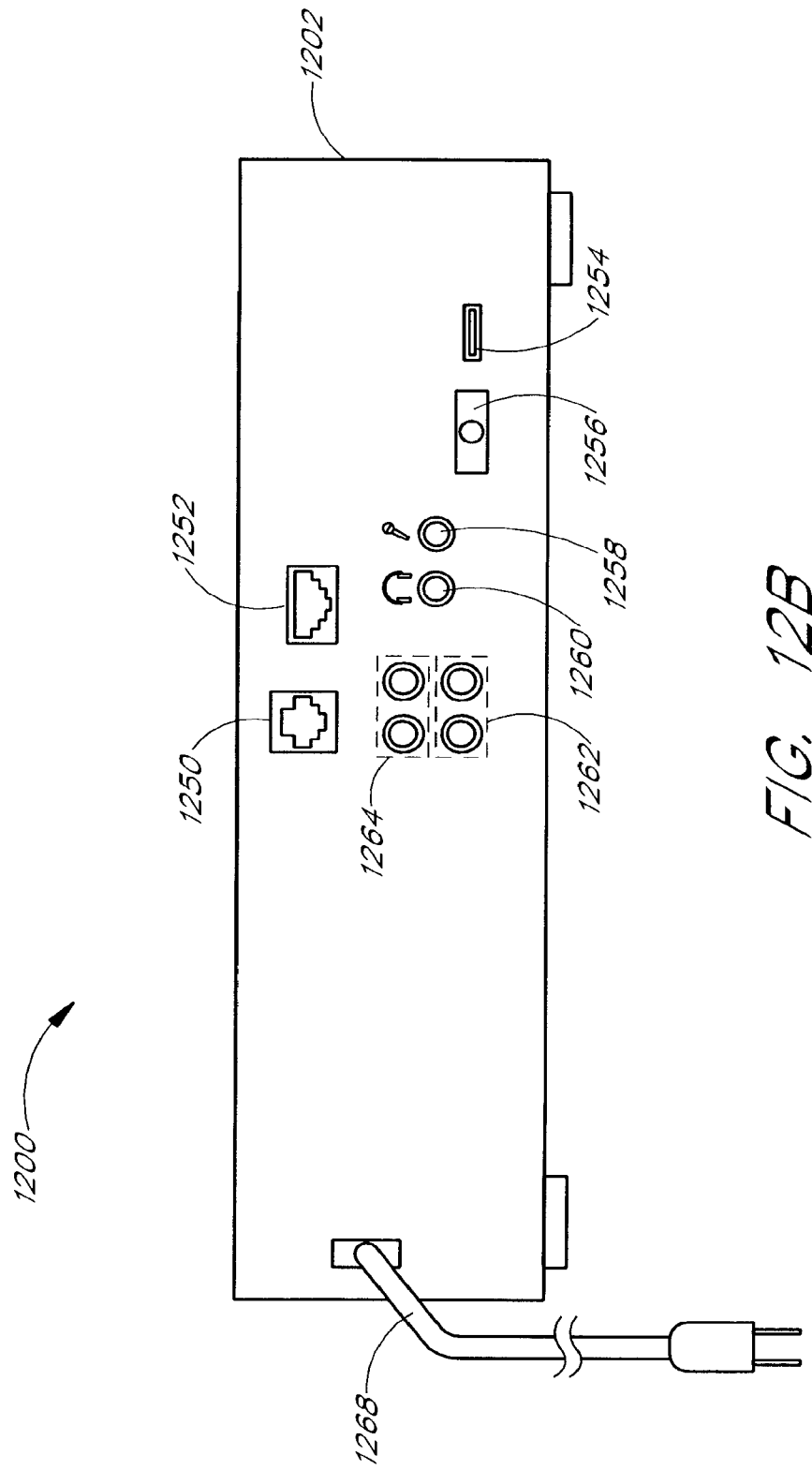
FIG. 12B is a perspective rear view of one embodiment of the network enabled component audio device as shown in FIG. 11 that integrates with a home stereo entertainment system.

FIGS. 12A and 12B illustrate one embodiment of a network-enabled component audio device 1200. The device 1200 represents one embodiment of the intelligent radio 700. FIG. 12A illustrates a front view of the network-enabled audio device 1200. The network-enabled audio device 1200 has user controls which are mounted on the front of an enclosure 1202 and include a power button 1204, a shuttle control 1214, an enter button 1216, menu buttons 1212, an action button 1210, and a CD-eject button 1222. On the shuttle control 1214, there is a right button 1264, a left button 1260, an up button 1262, and a down button 1266 for navigating through menus on the display 1230. An infrared port 1208 is mounted on the front of the enclosure 1202 to read signals from a remote control 1250. In one embodiment, the remote control includes buttons for volume, enter, navigation shuttle, action, power, CD eject, and five pre-set menu buttons. A CD player 1220 is also mounted on the front of the enclosure 1202 to play standard audio CD's or MP3 encoded CD's.

In one embodiment, the display 1230 has a menu bar to provide the user with options for listening to playlists, listening to the CD player, or listening to streaming audio. The shuttle control 1214 is used to scroll through the selections in a playlist. Each selection is highlighted as the shuttle control 1214 is pressed right 1264 or left 1260. When the user makes a choice, the enter button 1216 is pressed to signify that choice being made. If the user chooses the playlist option, a drop down menu is displayed in the display 1230 showing the available playlists. The user then uses the shuttle control 1214 to scroll through the playlists by pressing the up button 1262 or the down button 1266. Once the user chooses an audio source with the shuttle control 1214, the user can navigate and play the audio with the group of menu buttons 1212.

The group of menu buttons 1212 is context sensitive and will change function depending on the audio source. For example, in one embodiment, if the user selects the CD player 1220 as the audio source, then the first menu button in the group of menu buttons 1212 is used to play the CD while the second menu button is used to stop. In one embodiment, the bottom of the display 1230 changes according to the audio source determined by the user. If the user chooses to play CDs, a "play" icon appears above the first button in the group of menu buttons. In one embodiment, if the user chooses to listen to the AM/FM radio, a scan icon appears above the first button in the group of menu buttons 1212.

In addition to allowing the user to play files, the network-enabled audio device allows the user to play audio CD's on the CD player 1220. Further, the user can copy and encode songs off CD's in digital formats (known as "ripping") and compose playlists with those songs and other files and streaming audio.

The action button 1210 allows the user to request the latest news, albums, concerts and other information on artists. For example, if the user is listening to a streaming audio broadcast and does not know who the artist is, he or she can press the action button 1210 and receive information on the display 1230 identifying the artists, the name of the songs, interesting facts about the artist, etc. Optionally, the user can acquire similar information by pressing the action button when listening to a CD or a playlist. In one embodiment, the network-enabled audio device 1200 acquires this information by accessing the IPAN server 1104. The IPAN server 1104 then accesses its own database to search for the requested information. Optionally, the database is located on at least one different server than the IPAN server 1104. In one embodiment, if the information is not found, a sample of the song will be sent to another server to analyze the sample and report back to the IPAN server 1104 with the correct information.

FIG. 12B illustrates a rear view of the network-enabled component audio device 1200. The network-enabled audio device 1200 connects to household AC power through a power cord 1268. The network-enabled audio device 1200 includes a phone jack 1250, an Ethernet port 1252, a line-in connector 1264 having left and right channels, a line-out connector 1262 having left and right channels, a microphone jack 1258, a headphone jack 1260, a TOS link 1256, and a USB port 1254.

In one embodiment, the phone jack 1250 can be used to either establish a modem connection to an ISP and/or to establish a LAN connection (e.g. Home Phone Network Alliance network connection). The Ethernet port 1252 can be used with an Ethernet cable to provide access to an Ethernet LAN. Optionally, the Ethernet port 1252 can be replaced or supplemented with other types of connections to communications networks. A network cable provided to the Ethernet port 1252 can be a network cable, a cable TV cable, a connection to a wireless (e.g., satellite) unit, a power line, etc. For example, the communications network uses satellites developed by the Motorola Corp., Global Star satellites developed by a consortium of European manufacturers which includes Aerospatiale and Alcatel, P21 satellites developed on a project financed by Inmarasat, or the Odyssey satellite system developed by a TRW consortium associated with Teleglobe/Canada.

In one embodiment, the network-enabled audio device 1200 provides an audio output to an associated audio system. For high-speed interaction with other audio components, the digital out TOS link 1256 (also known as "Optic S/PDIF") is used for an optical connection to provide for the transfer of raw digital streams. Files can be transferred from the network-enabled audio device 1200 without a conversion from digital to analog signals. When the audio file reaches the associated audio system, such as for example a portable MP3 player, the digital audio stream is then converted to an analog stream within the associated audio system to enhance audio quality. The associated audio system provides for amplifiers and loudspeakers.

The line in connector 1264 is an analog line in from another device. The line out connector 1262 is an analog line out to standard left and right RCA-style connectors. The standard USB host connector 1254 allows downloading of music to portable MP3 players (in a host downloading to a slave relationship) and/or USB networking with a PC or other network-enabled audio device 1200 or 1300.

Figure 13A:
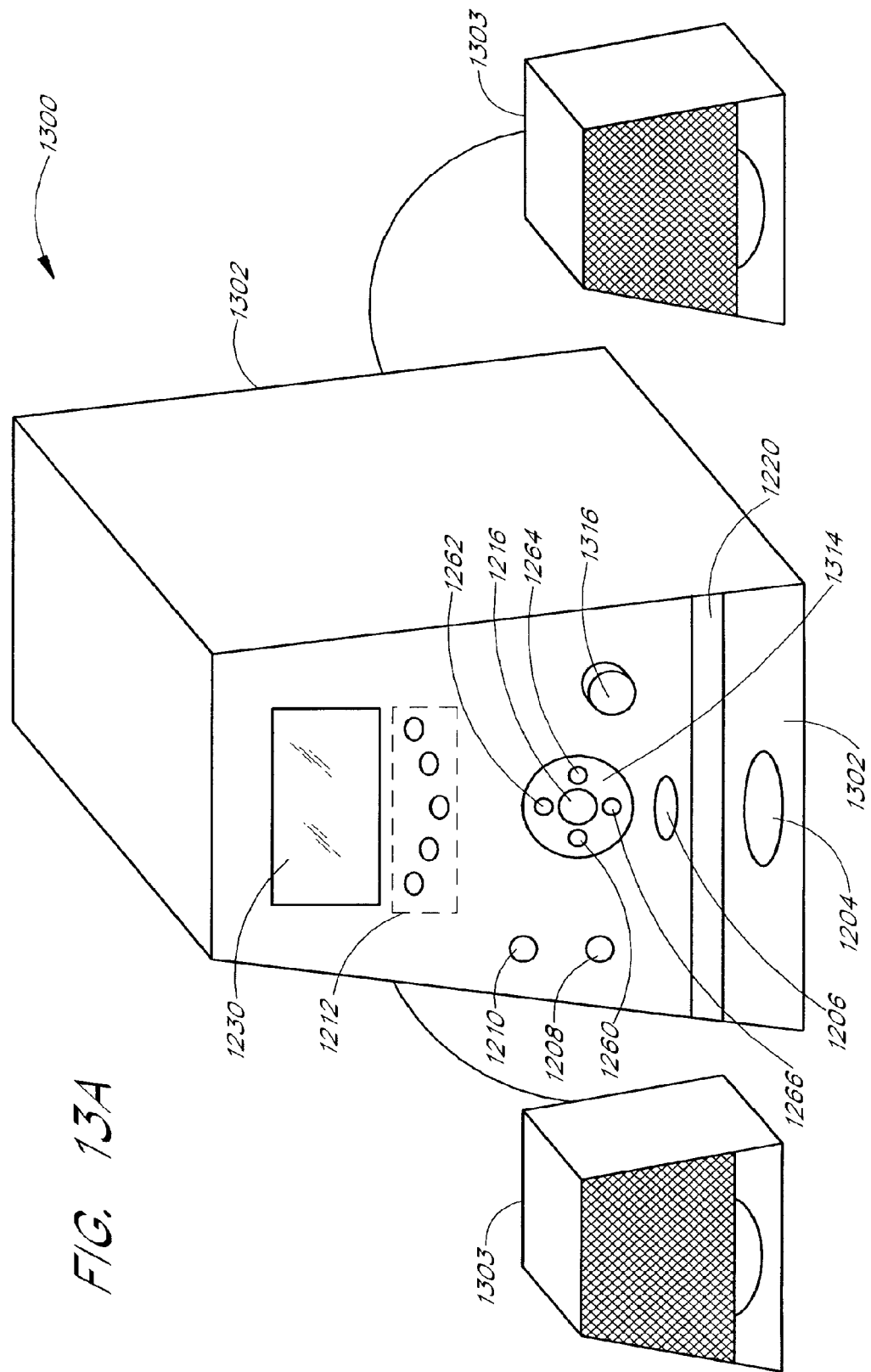
FIG. 13A is a perspective front view of one embodiment of a stand alone network-enabled audio device as shown in FIG. 11.
Figure 13B:
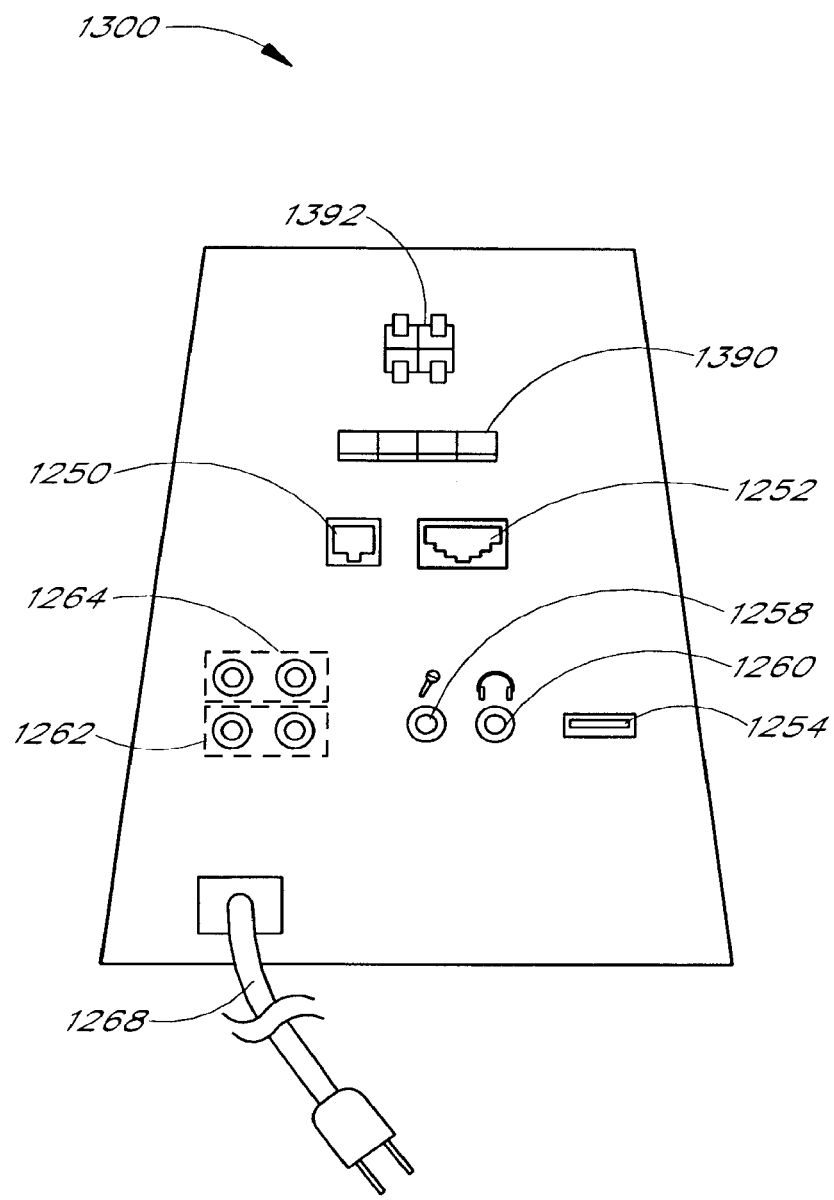
FIG. 13B is a perspective rear view of one embodiment of a stand alone network-enabled audio device as shown in FIG. 11.

FIGS. 13A and 13B illustrate one embodiment of a tabletop network-enabled audio device 1300. FIG. 13A illustrates a front view of the tabletop version of the network-enabled audio device 1300. As described in more detail below, the network-enabled audio device 1300 is similar to the network enabled audio device 1200 with the addition of extra features such as a radio, amplifier, and speakers. The network-enabled audio device 1300 has user controls which are mounted on the front of the enclosure 1302 and includes the power button 1204, the shuttle control 1214, the enter button 1216, the menu buttons 1212, the action button 1210, the volume control 1316, and a CD eject button 1222. The shuttle control 1214 includes the right button 1264, the left button 1260, the up button 1262, and the down button 1266 for navigating through menus on the display 1230. The infrared port 1208 is mounted on the front of the enclosure 1302 to read signals from the remote control 1250. In one embodiment, the remote control includes buttons for volume, enter, navigation shuttle, action, power, CD eject, and five pre-set menu buttons. The CD player 1220 is also provided on the device 1300 to play standard audio CD's or MP3 encoded CD's. A right speaker 1303 and a left speaker 1303 are operably connected to the network-enabled audio device 1300.

In one embodiment, the group of menu buttons 1212 perform the same or similar functions as the group of menu buttons 1212 in the network-enabled component audio device 1200 illustrated in FIG. 12 except that the display 1230 will illustrate an additional option of playing an AM/FM radio. Therefore, when the shuttle control 1214 is used to select the AM/FM radio audio source and the user presses the enter button 1216, the icons that reflect functions such as tuning, scanning, and other buttons used to navigate and manage an AM/FM audio source appear. If the user chooses to listen to the AM/FM radio, a scan icon appears above the first menu button 1212.

FIG. 13B illustrates a rear view of the tabletop network-enabled audio device 1300. The network-enabled audio device 1300 connects to household AC power through the power cord 1268. The network-enabled audio device includes the phone jack 1250, the Ethernet port 1252, the line-in connector 1264 having left and right channels, the line-out connector 1262 having right and left channels, the microphone jack 1258, the headphone jack 1260, an AM/FM antenna port 1390, left and right speaker outputs 1392, and the USB port 1254.

In one embodiment, the network-enabled audio device 1300 has an AM/FM antenna port for connecting to an AM/FM antenna. The network enabled audio device 1300 includes an amplifier and loudspeakers 1303 (as will be described in FIG. 14) which connect to the left and right speaker outputs 1350.

Figure 14:
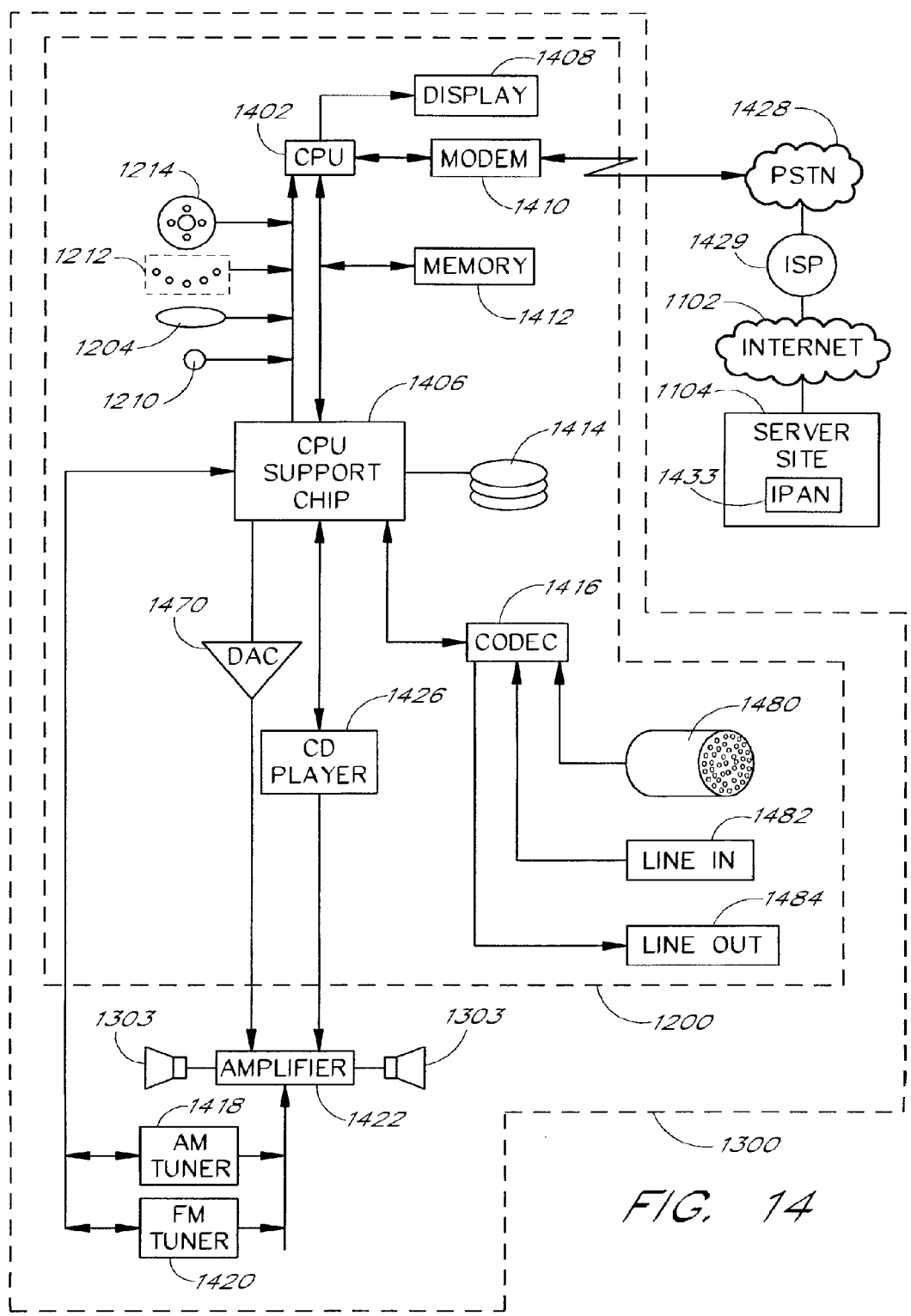
FIG. 14 is a block diagram of the functional elements of the network-enabled audio device as shown in FIGS. 12A, 12B, 13A, and 13B.

FIG. 14 is a block diagram of the functional elements of the network-enabled audio devices 1200 and 1300. The network-enabled audio device 1300 typically includes the functional elements of the network-enabled audio device 1200. The network-enabled component audio device system 1300 includes an AM Tuner 1418, an FM tuner 1420, an amplifier 1422, and the speakers 1303. In one embodiment, the network-enabled audio device 1200 does not include the AM tuner 1418, the FM tuner 1420, the amplifier 1422, or the speakers 1303. A Central Processing Unit (CPU) 1402 and a CPU Support Chip 1406 are used to run the software on the network-enabled audio devices 1200 and 1300. In one embodiment, the CPU 1402 is a StrongARM SA-1110 manufactured by Intel, and the CPU Support Chip 1406 is a StrongARM SA-1111 manufactured by Intel. The network-enabled audio device 1200 includes a display 1408, a modem 1410, a memory card 1412, a data storage device 1414, a codec 1416, a CD player, a DAC 1470, a microphone 1480, a line-in port 1482, and a line out 1484. Further, the network-enabled audio device 1200 includes user controls, including a shuttle control 1214, a group of menu buttons 1212, an enter button 1204, and an action button 1210. The network-enabled audio device 1200 connects externally to a network 1428. The network 1428 is shown as a Public Switched Telephone Network (PSTN) 1428 that connects to an ISP 1429 which gives access to the Internet 1102. Through the Internet 1102, a user can access the server site 1104 and thereby access the server site IPAN software 1433.

In one embodiment the CPU 1402 communicates with the random access memory 1412, the telephone modem 1410, and the display 1408. The memory 1412 can be flash memory or a combination of flash memory and other types of memory. The memory 1412 can be volatile or non-volatile or a combination of volatile and non-volatile. The modem 1410 is connected to a communications network 1428, shown as a PSTN 1428. In one embodiment, the modem 1410 is also connected to an HPNA network. Although the communications network 1428 is shown as a PSTN network, one skilled in the art will recognize that the network 1428 can also be a cable television (CATV) network, a satellite network, or any other communications network. In one embodiment, the network 1428 comprises both a Direct TV/PC satellite connection that provides information to the network-enabled audio device at high speed (e.g., 400,000 bytes per second or more), and a PSTN 1428 network connection so the intelligent radio can upload information back to the ISP 1429 (because many Direct TV/PC connections are only one-way). In yet another embodiment, the satellite network is a two-way satellite network that uses the satellite for both download and upload.

A port of the codec 1416 is provided to the CPU Support Chip 1406. In one embodiment, the codec is a Cirrus CS4299 audio codec. The codec 1416 provides analog-to-digital conversion for the microphone 1480 and for the line in 1482, and digital-to-analog conversion for the line out 1484. In some embodiments, the codec 1416 and the modem 1430 are combined as a telephone modem.

The modem 1410 provides an interface between the CPU 1402 and the communications network 1428 and the operational characteristics of the modem 1410 are determined by the type of communications network 1428. Thus, if the network 1428 is a PSTN network, then a telephone modem is used; if the network 1428 is a CATV network, then a cable modem is used, etc. In a preferred embodiment, the modem 1430 is integral to the network-enabled audio device. An Internet Service Provider (ISP) 1429 provides the user with a connection from the communications network 1428 to the Web via the Internet 1430. The server site 1104 can then be accessed, and the server site IPAN software 1433 can be used by the user to manage audio sources and devices. Note that FIG. 14 shows functional elements, but not necessarily hardware configurations. Thus, for example, the modem 1410 can be implemented in software on the CPU 1402 or even on the CPU Support Chip 1406. The CPU 1402 is a single computer processor, or multiple computer processors. In one embodiment, the CPU 1402 comprises two processors, a Digital Signal Processor (DSP) and a general purpose microprocessor. In one embodiment, the modem 1410 is provided in a plug-in module such that the intelligent radio can be configured for different types of computer networks by simply changing the modem plug-in to suit the type of network being used.

Optionally, the microphone 1480 is connected to a second port of the codec 1416. An analog output from the microphone 1480 is provided to the codec 1416. A digital output from the codec 1416 is provided to the CPU 1402. The microphone 1480 allows for voice commands to control the network-enabled audio device. The microphone 1416 is optional. In one embodiment, a microphone (not shown) is also placed in a wireless remote so that voice commands can be provided from the wireless remote. Optionally, headphones can also be used.

The CPU 1402 provides data to the display device 1408. The CPU 1402 receives user inputs from the shuttle control 1214, the group of menu buttons 1212, the enter button 1202, and the action button 1210.

A system bus interface interconnects the CPU 1402 to the CPU Support Chip 1406. In one embodiment, the CPU Support Chip provides digitized audio samples to an input of the Digital-to-Analog Converter (DAC) 1470. The analog audio output of the DAC 1470 is provided to the amplifier 1422. In one embodiment, the DAC 1470 and the amplifier 1422 are each two-channel devices, providing left and right stereo channels. Channel outputs of the amplifier 1422 are provided to the speakers 1303. The volume control controls the gain of the amplifier 1422. In one embodiment, the amplifier and speakers are part of an external stereo system.

The CPU support chip 1406 is also operably connected to a CD player 1426 which outputs audio to the amplifier 1422 or an external amplification system. The CPU Support Chip 1406 or optionally the CPU 1402 also maintains software for managing the transfer of audio files from CD's to the network-enabled audio device's hard drive.

Figure 15:
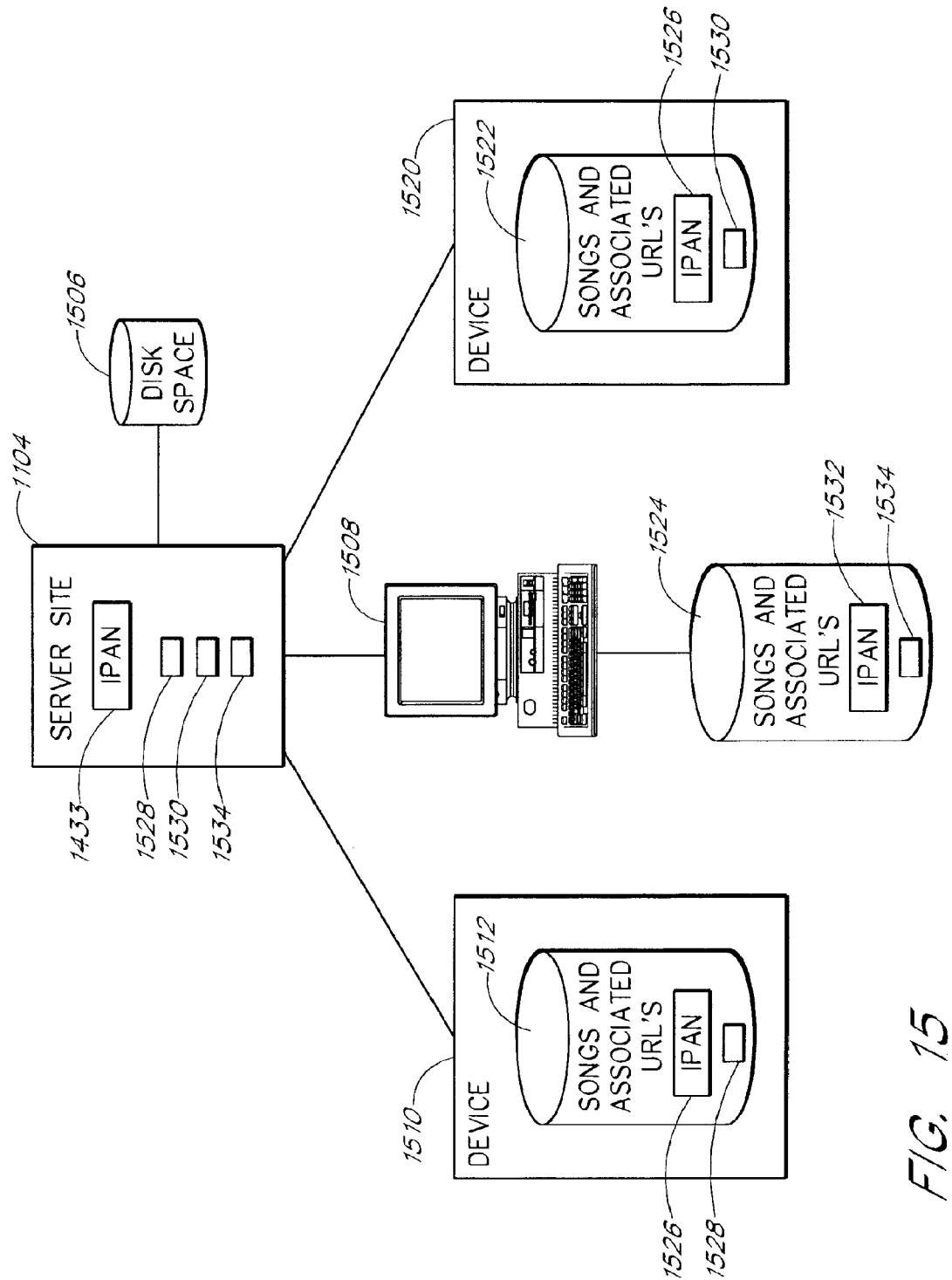
FIG. 15 is a block diagram illustrating the configuration between several network-enabled audio devices and a stereo web site as shown in FIG. 11.

FIG. 15 illustrates a configuration for assigning playlists and audio sources to a network-enabled audio device 1510 or other devices such as a PC 1508 from a network-enabled audio device 1520 or another device. Each network-enabled audio device 1510 has a storage space 1512 for network-enabled audio device IPAN software 1526, a playlist 1528, and associated URL's and songs within the playlist. Similarly, each network-enabled audio device 1520 has a storage space 1522 for network-enabled audio device IPAN software 1526, a playlist 1528, and associated URL's and songs within the playlist. Each client PC 1508 has a storage space 1524 for client IPAN software 1532, a playlist 1534, and associated URL's and songs within the playlist. The server site 1104 includes server site IPAN software 1433, the playlist 1528 stored on the storage space 1522 of device 1510, the playlist 1530 stored on the storage space 1524 of the client PC 1508, and the playlist 1530 stored on the storage space 1522 of the device 1520. A storage space 1506 is provided to the server site 1104 for use in uploading and downloading audio files when URL's are broken. Storage space 1506 for the server site IPAN 1104 and other software programs can be stored externally or locally at the site.

Each network enabled audio device 1510 has storage space 1512 for a playlist 1528, which is a list of audio files and associated URL's of where the audio files were retrieved from. Optionally, the associated URL's can be archived for only file formats that are streaming audio or MP3. Multiple playlists can be stored on the storage space 1512. In addition to the playlist 1528, the actual audio files listed in the playlist are also stored in the storage space 1512. The audio files can be streaming audio, Windows Media Audio (WMA), and other audio formats. The network enabled audio device 1520 performs the same functions as the network enabled audio device 1510 with the storage space 1522, the playlist 1530, the network-enabled audio device IPAN software 1526, and songs and associated URL's.

The PC client 1508 has a storage space 1524 for a playlist 1534 and associated URL's and songs in the playlist. PC IPAN client software 1532 is also stored on the storage space 1524. The PC client 1508 includes a web browser (e.g., Microsoft Explorer, Netscape Navigator, etc.), an IPAN plug-in to the web browser, and an IPAN active tray software module.

The IPAN plug-in opens as soon as the web browser is opened. The IPAN plug-in affects the handling of links to MP3 files, streaming audio, and any other audio file type designated. Whenever a user selects, saves, or opens a file in the web browser, the IPAN plug-in intercepts the normal processing of the web browser and will check to see if the file is an audio file. If the file is an audio file, the IPAN plug-in will allow the user to download the audio file to the IPAN 1100 now or to schedule the file for download at a later time. In either case, the URL can be added to the playlist. Further, the IPAN plug-in will periodically connect to the server site IPAN software 1433 to receive software upgrades or to upload updates of the audio files present on the client PC 1433.

The web browser can be used to connect to the server site 1104 and provide access to the server site IPAN software 1433. The IPAN active tray software module runs in the background when the PC client 1508 is turned on. Without the web browser being opened, the IPAN active tray software module can play audio files in playlists.

At the server site 1104, the user can access the server site IPAN software 1433 through a network connection to the server site IPAN 1104 and from the server site IPAN software 1433 the user can assign playlists to different devices such as the network-enabled audio device 1510, the network-enabled audio device 1520, or the client PC 1508. The user composes the playlists from the server site IPAN software 1433, but typically only stores the title of the song and the URL from which the song came. The playlists stored throughout the IPAN 1100 are also stored in the server site IPAN 1433. The user then has a master list of where all playlists are located. When the device 1510 connects to the server site IPAN 1104, a playlist is assigned to it. Within the playlist, the URL's indicate the location from which the audio files associated with the song titles in the playlist can be downloaded. The network-enabled audio device 1510 then proceeds to download the song from the given site specified by the URL to the disk space 1512 on the device 1510. If the site at the URL is not working, the server site IPAN software 1433 will upload the playlist from the disk space 1522 of another device 1520 the next time the second device 1520 connects to the network. The next time the original device 1510 calls in, it will download the playlist from the server site 1104.

Further, the server downloads software upgrades, if necessary, when the device accesses the IPAN 1433. For example, if the disk space in a device that was supposed to have a playlist was accidentally erased, then the server site 1104 provides the URL's for sites to download the lost playlists. In addition, the server site 1104 downloads any other software used to enhance the communications between the server and the device. Software can also be downloaded to be used by the CPU 1402 or the Support Chip CPU 1406.

In one embodiment, there is no server site 1104. The PC IPAN client software 1532 stores the playlists that are located throughout the IPAN 1100. Through a network connection, the PC IPAN client software assigns playlists to devices 1510 and 1520.

Figure 16:
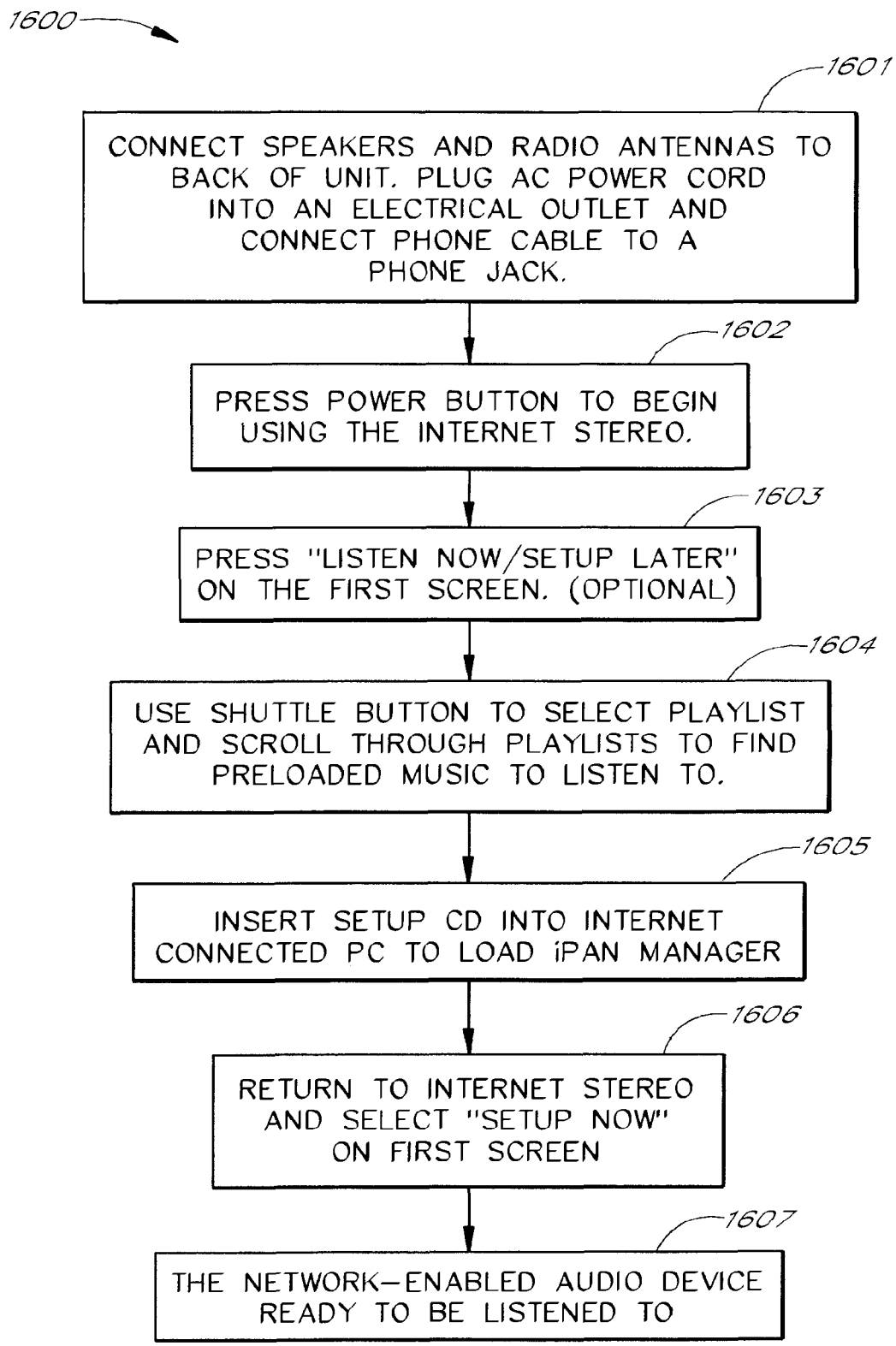
FIG. 16 illustrates a process for connecting the components and setting up the software for the network-enabled audio device as shown in FIGS. 12A, 12B, 13A, and 13B.

FIG. 16 illustrates the connection steps used when the user first sets up the network-enabled audio device. A user begins at process block 1601 by connecting the speakers and radio antennas to the back of the unit. The user also takes other preparatory measures such as plugging in the AC power cord and connecting a phone cable to a telephone jack. At the next process block 1602, the user can choose to begin listening to preloaded music without setting up any of the software by pressing the power button 1204 on the machine and pressing the "Listen Now/Setup Later" button on the first screen. The user can thus listen to preloaded music before even setting up the software for the network-enabled audio device. The process then advances to the next process block 1603 where the user can scroll through the playlists of preloaded music by using the shuttle control 1214 and the enter button 1216. At the next process block 1605, the user begins to set up the network-enabled audio device 1200 by inserting a setup CD into the CD player 1220. The process advances to process block 1606 where the user returns to the first screen and selects "Setup Now" in order to begin loading the PC IPAN client software 1532 on the network-enabled audio device 1200.

Figure 17A:
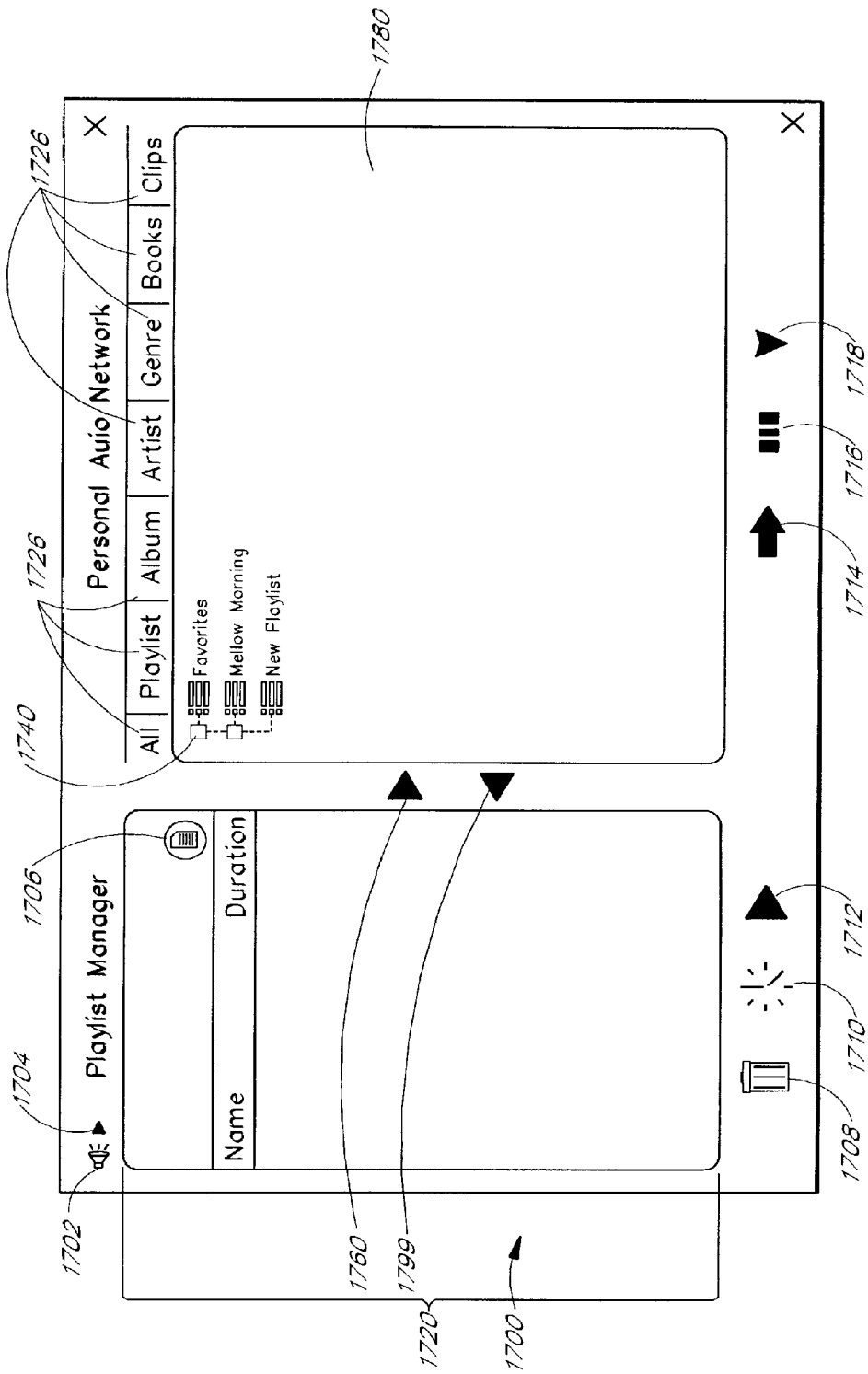
FIG. 17A shows a default display of the current playlists when the Internet Personal Area network (IPAN) manager software is started.

FIGS. 17A through 17I show various displays provided by the PC IPAN client software 1532 and the server site IPAN software 1433. In one embodiment, these displays are produced by web pages provided by the server and display on the user's PC in a web browser. FIG. 17A illustrates a Playlist Manager window 1700 that appears when a user runs the PC IPAN client software 1532 and the server site IPAN software 1433. The user-control buttons in the Playlist Manager window include a client feature control button 1702, an audio player window button 1704, a create new playlist button 1706, a delete button 1708, a schedule button 1710, a play button 1712, a scan hard drive button 1714, an add device button 1716, and a synchronize button 1718. Personal Audio Information Tabs 1726 allow the user to view classifications for audio such as by artist or playlist. The display playlist and song button 1740 provides access to audio and devices such as PC's, network-enabled audio devices 1200 and 1300, portable audio devices, etc. Access is provided as a tree control in the playlist window 1780. The playlist window 1780 displays playlists, the title window 1720 displays songs in the playlist, an arrow button 1760 provides for addition of songs to playlists, and an arrow button 1799 provides for deletion of songs from playlists.

The Client Feature control button 1702 allows the user to select a desired playlist or other audio source to listen to. The client feature control button also allows the user to control the look and feel of the window such as color and background designs ("skins") etc. The user clicks the play button 1712 to play a selection. To control the volume, shuffle, repeat, and other playback functions, the user clicks the audio player window button 1704. A new popup window appears with buttons for each of those functions. In addition to choosing a playlist, the user can compose a new playlist. The user clicks the new playlist button 1706 to create a new playlist by artist, album, or genre. The user can scan the PC's hard drive for music to incorporate into a playlist by clicking the scan button 1714. The user can also add a device to the IPAN 1433 by clicking the add device button 1716.

To help manage playlists and devices, the Playlist Manager 1700 provides personal audio information tabs 1726. The devices that can be managed include network-enabled audio devices 1200 and 1300, PC's, portable MP3 players, cell phones, etc. With the personal audio information tabs 1726, the user can view and manage the devices, playlists, and audio classifications by "All," "Playlist," "Album," "Artist," "Genre," "Books," or "Clips." The playlist window 1780 lists the playlists selected by the personal audio information tabs 1726. The title window 1720 lists the songs in a playlist selected in the playlist window 1780. Songs are added to a playlist listed in the playlist window 1780 using the arrow button 1760 and removed from a playlist listed in the playlist window 1780 using the arrow button 1799. The user deletes audio files from the IPAN 1100 by selecting the file and pressing the delete button 1708. Further, the user can schedule playlists or streams to be heard at designated devices and at designated times by using the schedule button 1710. The user can synchronize with the server site IPAN 1433 by clicking the synchronize button 1718. Playlists are stored on the server site IPAN 1433 in addition to the PC IPAN client 1508 or device 1510. In other words, a playlist may have been updated at the server site IPAN 1433 by adding or deleting some songs in the playlist. The user can choose to have the same playlist with two different songs at the server site 1104 and on the device 1200 or 1300. But, if the user made the playlist at the server site IPAN 1433, the user presses the synchronize button 1718 so that the next time the device 1200 or 1300 connects, an updated playlist will be downloaded. To access a playlist or the playlists on a particular device, the user clicks the display button 1740.

Figure 17B:
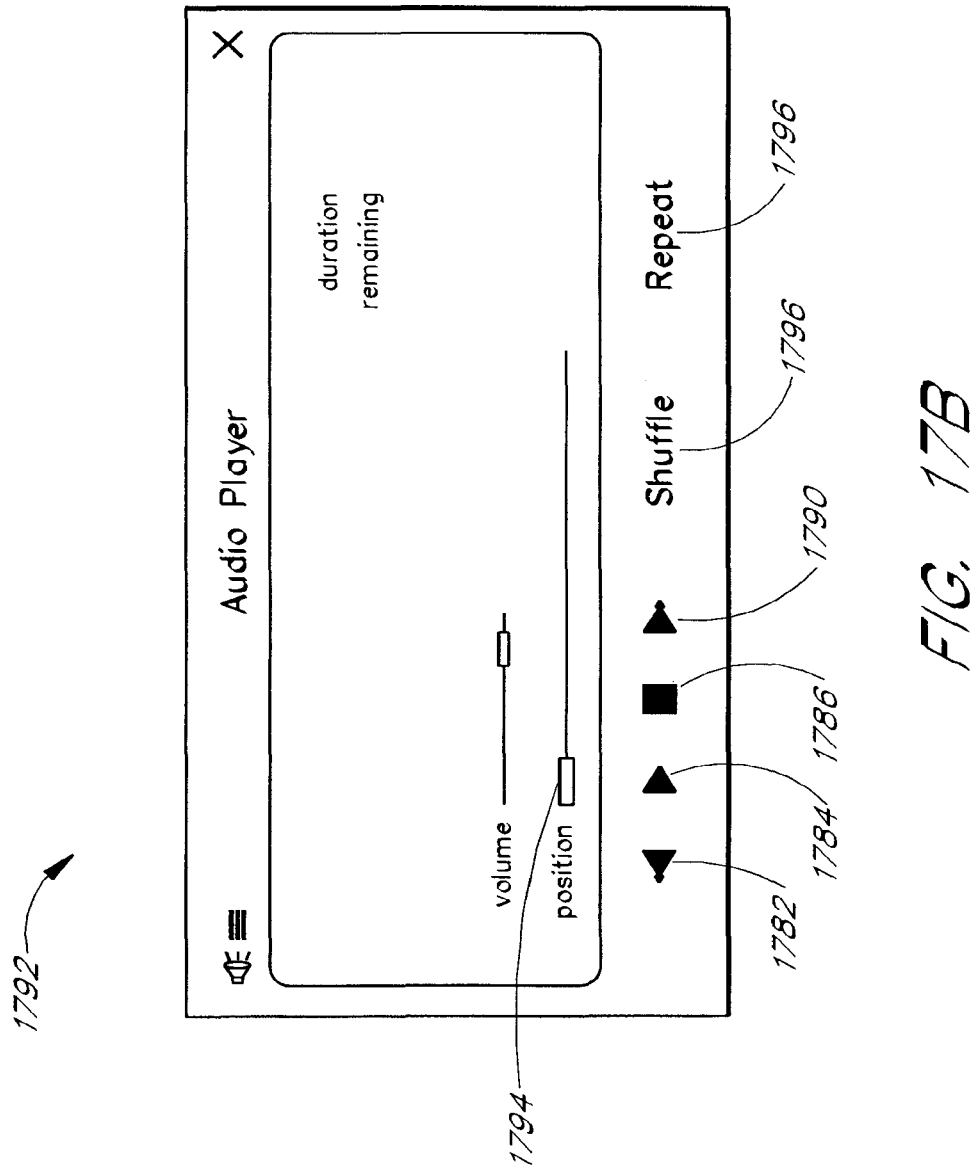
FIG. 17B illustrates a display that allows the user to control the sound and perform other functions on the audio source.

FIG. 17B illustrates the display of an audio player window 1792 that includes a previous track button 1782, a play button 1784, a stop button 1786, and a next track button 1790. The audio player window 1792 is invoked by pressing the audio player window button 1704. A volume indicator 1794 displays the current volume. The user can click on the volume indicator 1794 to drag it higher or lower to a different volume. The user can click the shuffle button 1796 to "randomize" the playlist as opposed to playing the playlist in the same order. Further, the user can press the repeat button 1798 in order to have continuous play as opposed to the playlist stopping when it runs out of songs to play. The playlists will typically start from the beginning.

Figure 17C:
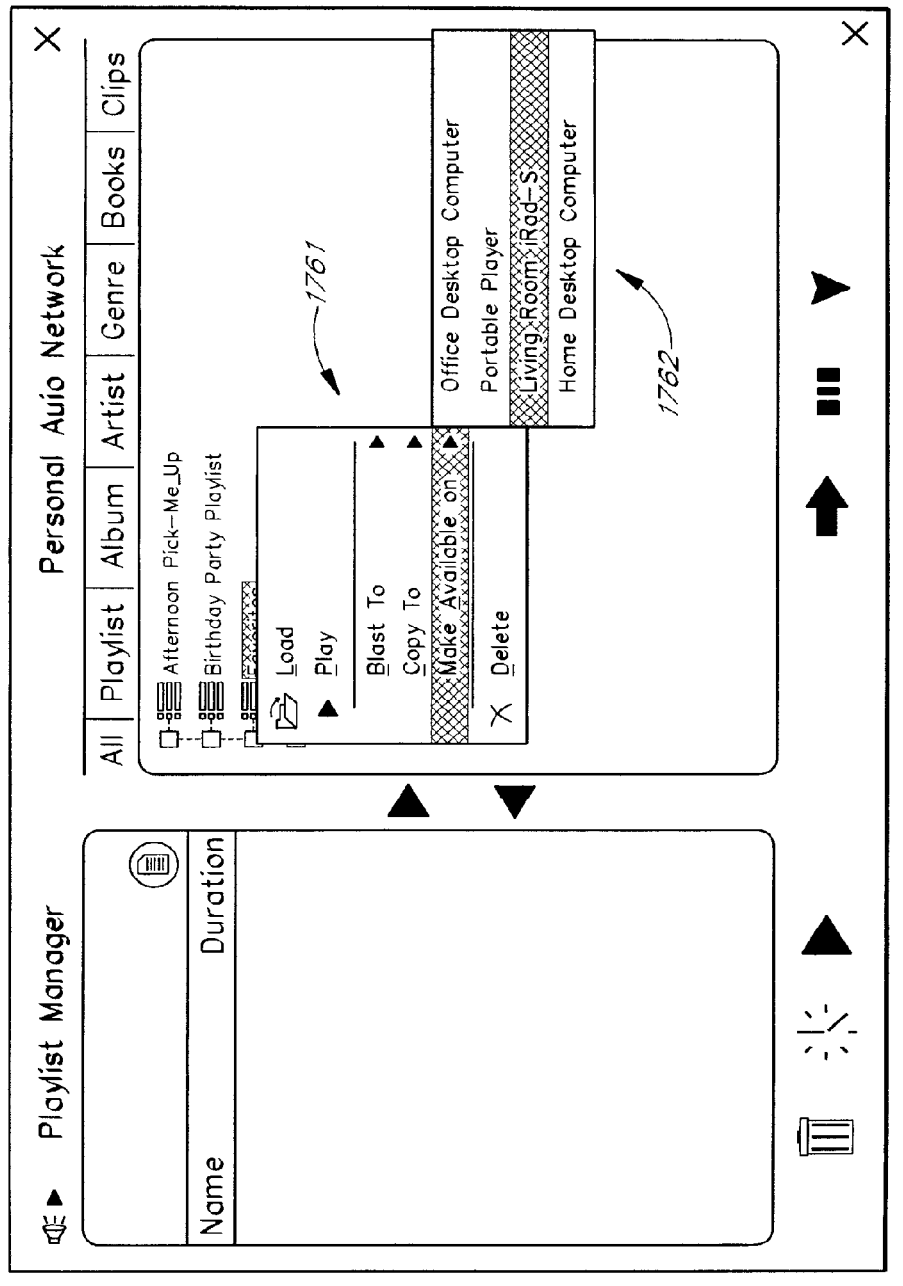
FIG. 17C illustrates the menus used to assign a playlist, as shown in FIG. 17A, to another device.

FIG. 17C illustrates the display of the audio player window 1700 showing popup menus that appear when the user attempts to assign a highlighted playlist to another device. After the user highlights a song, the user can right-click on the song in order to have a popup menu 1761 appear with a variety of options such as "Load," "Play," "Blast To," "Copy To," "Make Available On," and "Delete." The user can choose the menu option of "Make Available On" to assign the playlist from one device to another, (e.g. from device 1510 to device 1520). The addition of the device 1510, the device 1520, a portable player, a PC, etc. to the IPAN 1100 will be discussed with reference to FIG. 17I. Once the "Make Available On" option is chosen, another window 1762 appears with options of devices for the playlist to be assigned to. In FIG. 17C, the playlist is assigned to "Living Room iRad-S" instead of "Office Desktop computer," "Portable Player," or "Home Desktop Computer."

Figure 17D:
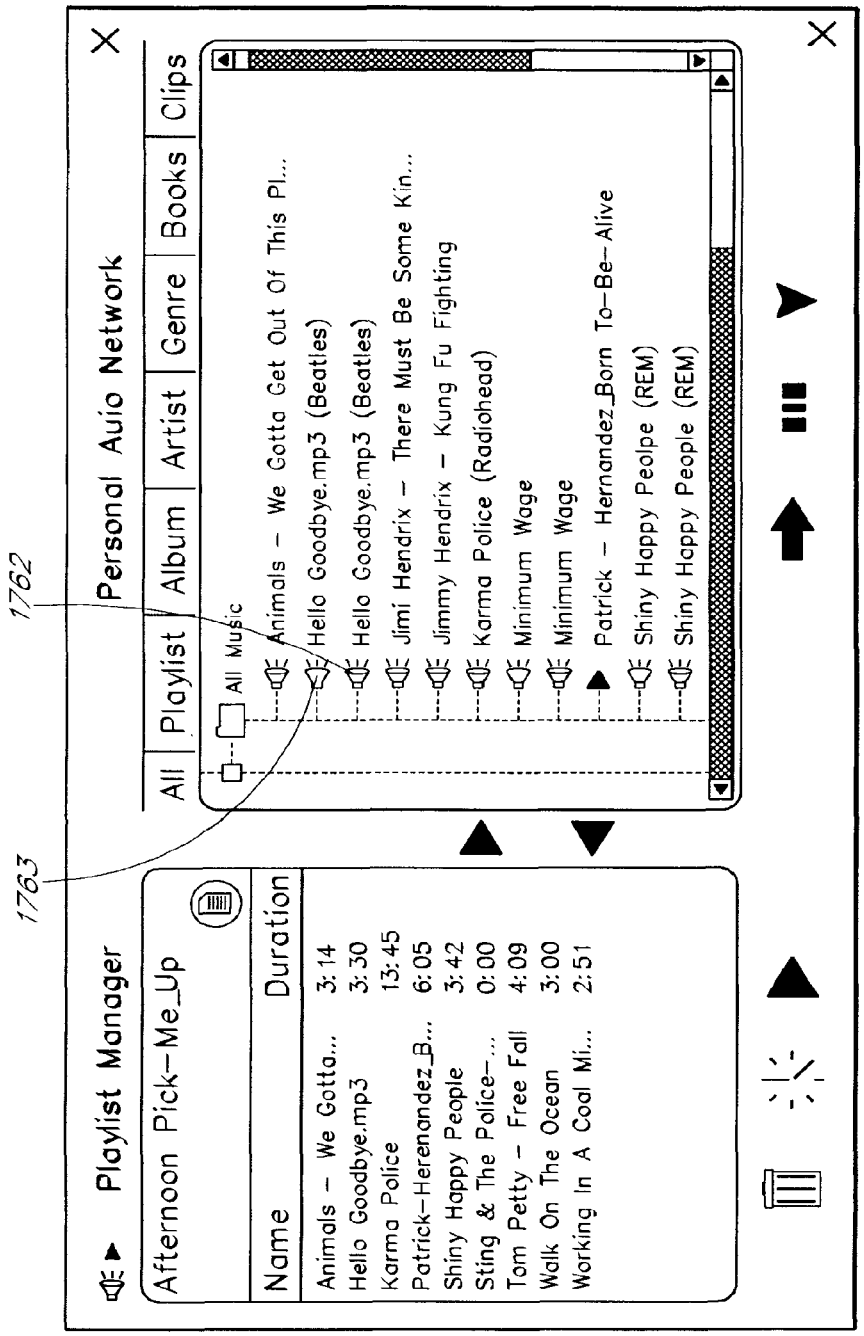
FIG. 17D illustrates the songs within a playlist and links to other devices that have the songs present on their hard disk space.

FIG. 17D illustrates one embodiment of how the list of songs in a playlist is displayed. A speaker icon 1762 is used to indicate a local audio file. In other words, the audio file is located on some storage space within one of the devices (e.g., a network enabled audio device 1200 or 1300, a PC, a portable player, etc.). A speaker outline icon 1763 indicates a link to an audio file located elsewhere on another device within the IPAN 1100. The link can be clicked in order to see what other devices, if any, the file is located on.

Figure 17E:
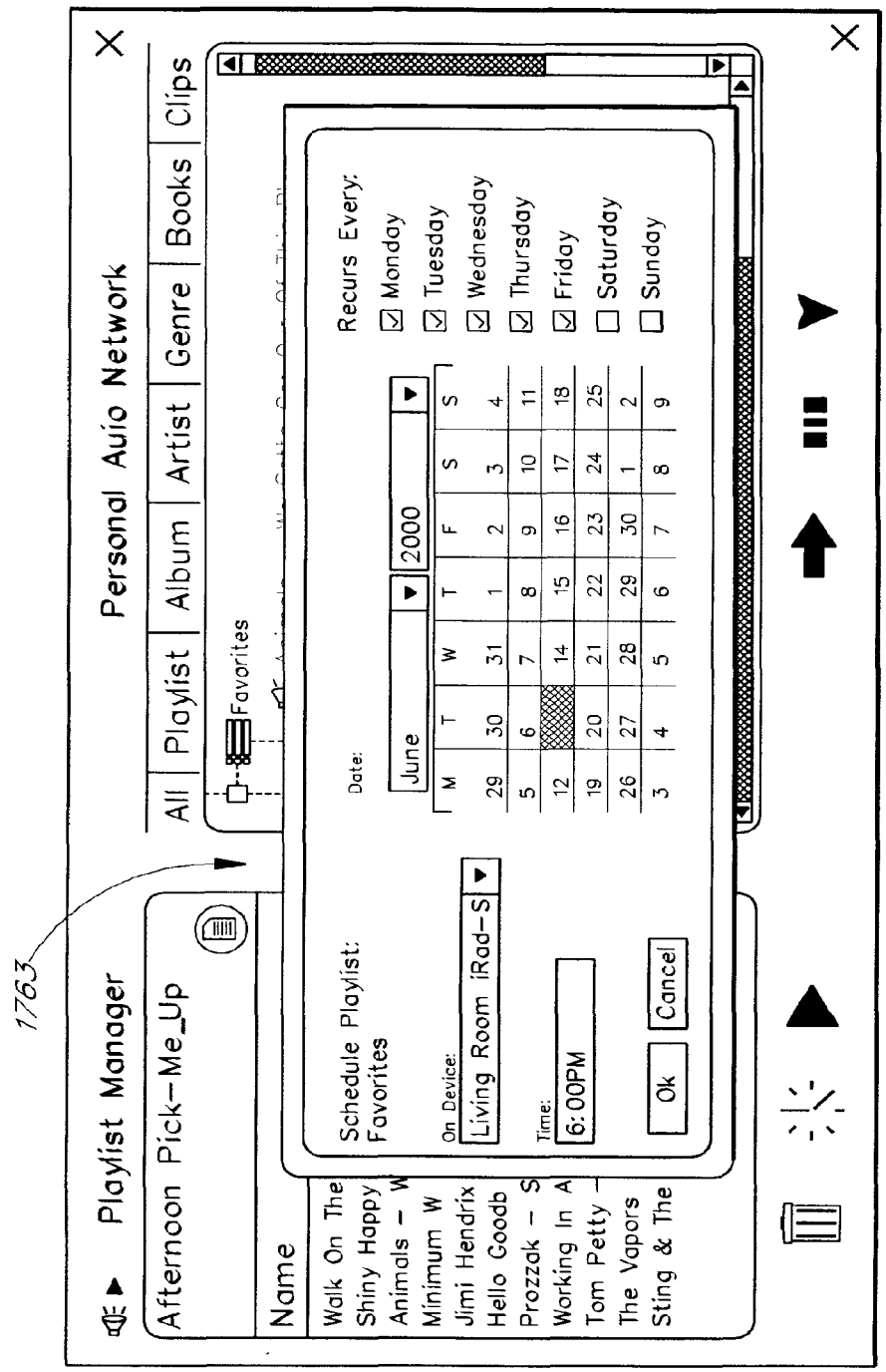
FIG. 17E illustrates a schedule window that appears for a song (shown in FIG. 17D) to be played at a particular time on a specific device.

FIG. 17E illustrates a scheduling window 1763 that opens in response to the pressing the schedule button 1710. The user can schedule playlists to be played at a particular time and on a particular device. The network-enabled audio device will automatically turn on at the scheduled time and play the given playlist. The user controls can be disabled in order to prevent a user at a remote location from changing the music scheduled to be played at the given time. Optionally, the user controls can be disabled in order to prevent the network-enabled audio device from being turned off. The scheduling window 1763 allows a user to highlight dates on a calendar and choose devices from menus to be played at a specific time. The user can also choose to interactively play the selected playlist on a day of the week at a particular time. For example, the user can choose to have a selected playlist played every Monday, Tuesday, Wednesday, Thursday, and Friday at 6 p.m.

Figure 17F:
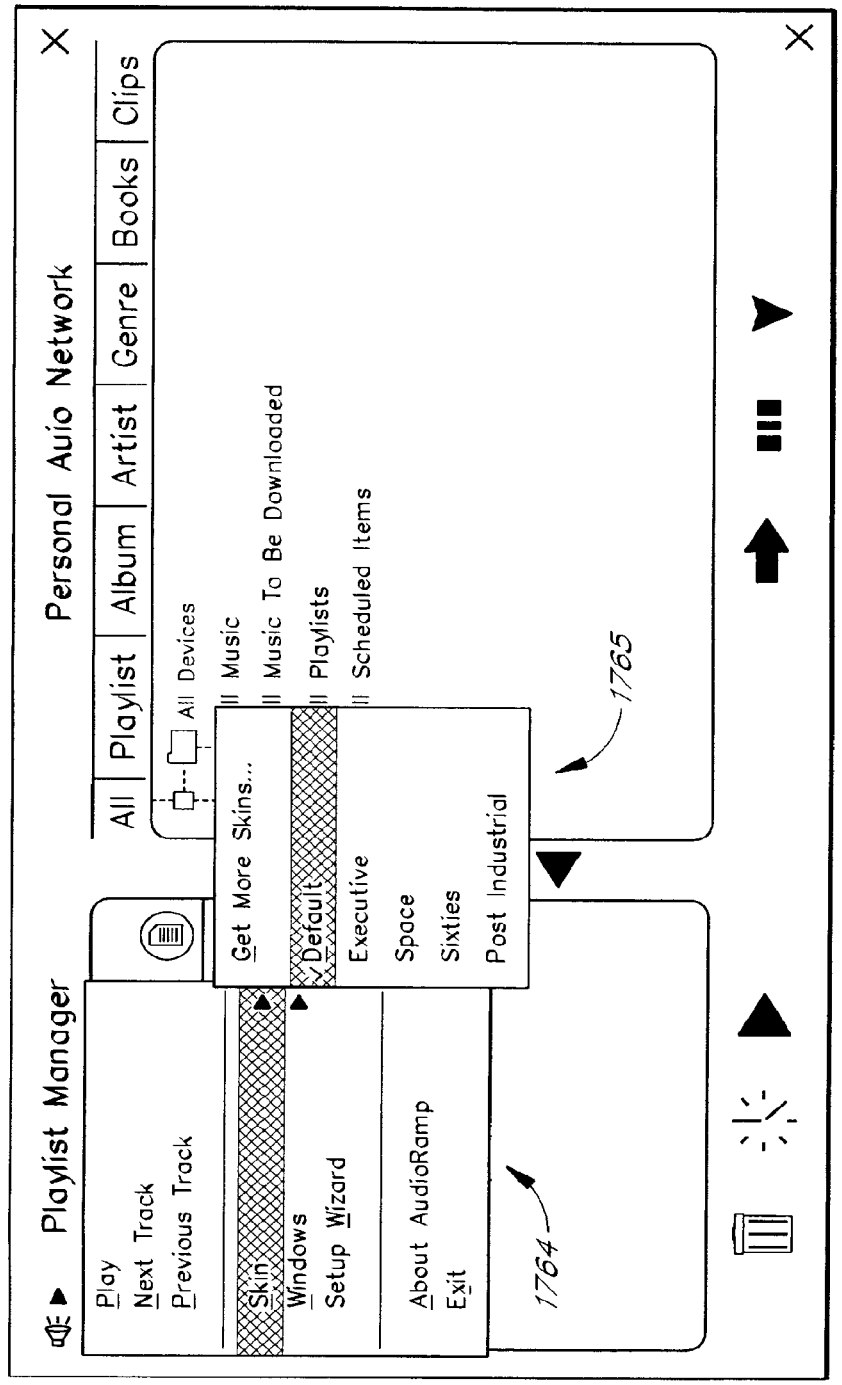
FIG. 17F illustrates the window that appears to allow the user to choose a default look and feel for the IPAN manager window, as shown in FIG. 17A.
Figure 17G:
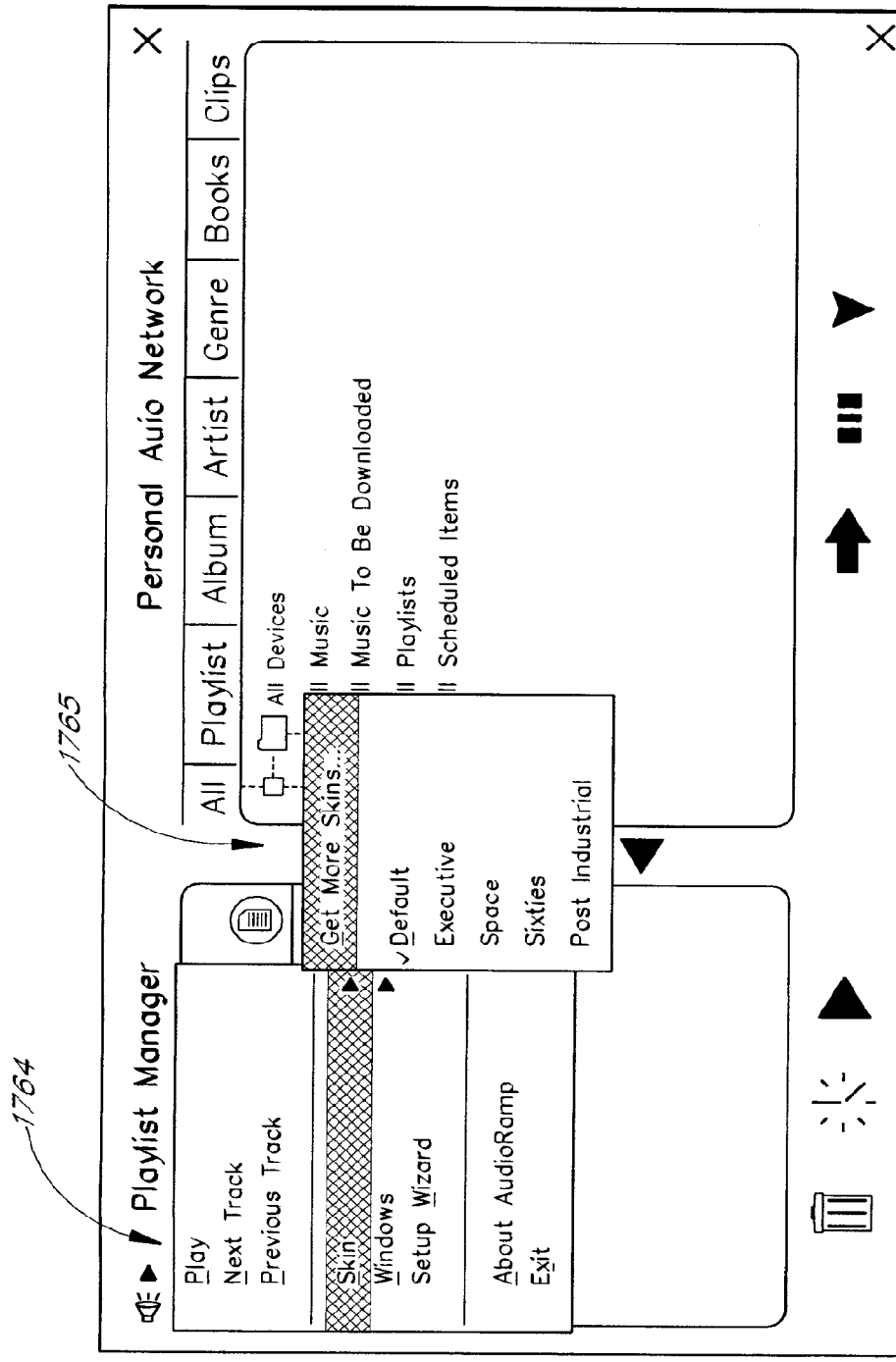
FIG. 17G illustrates the window that appears to allow the user to choose other options and the look and feel for the IPAN manager window, as shown in FIG. 17A.

FIG. 17F illustrates a popup menu for selecting the default look and feel ("skin") of the IPAN client 1508. The user accesses the "skin" option by pressing the client feature control button 1702 and the client feature control menu 1764 appears. After the user selects "skin" from the client feature control menu 1764, a "skin" menu 1765 appears to provide different "skin" options such as, for example, "Default," "Executive," "Space," "Sixties," and "Post Industrial." FIG. 17G shows that the "skin" menu 1765 also provides a "Get More Skins" option to allow the user to see other "skins" besides the ones listed in the "skin" window 1765.

Figure 17H:
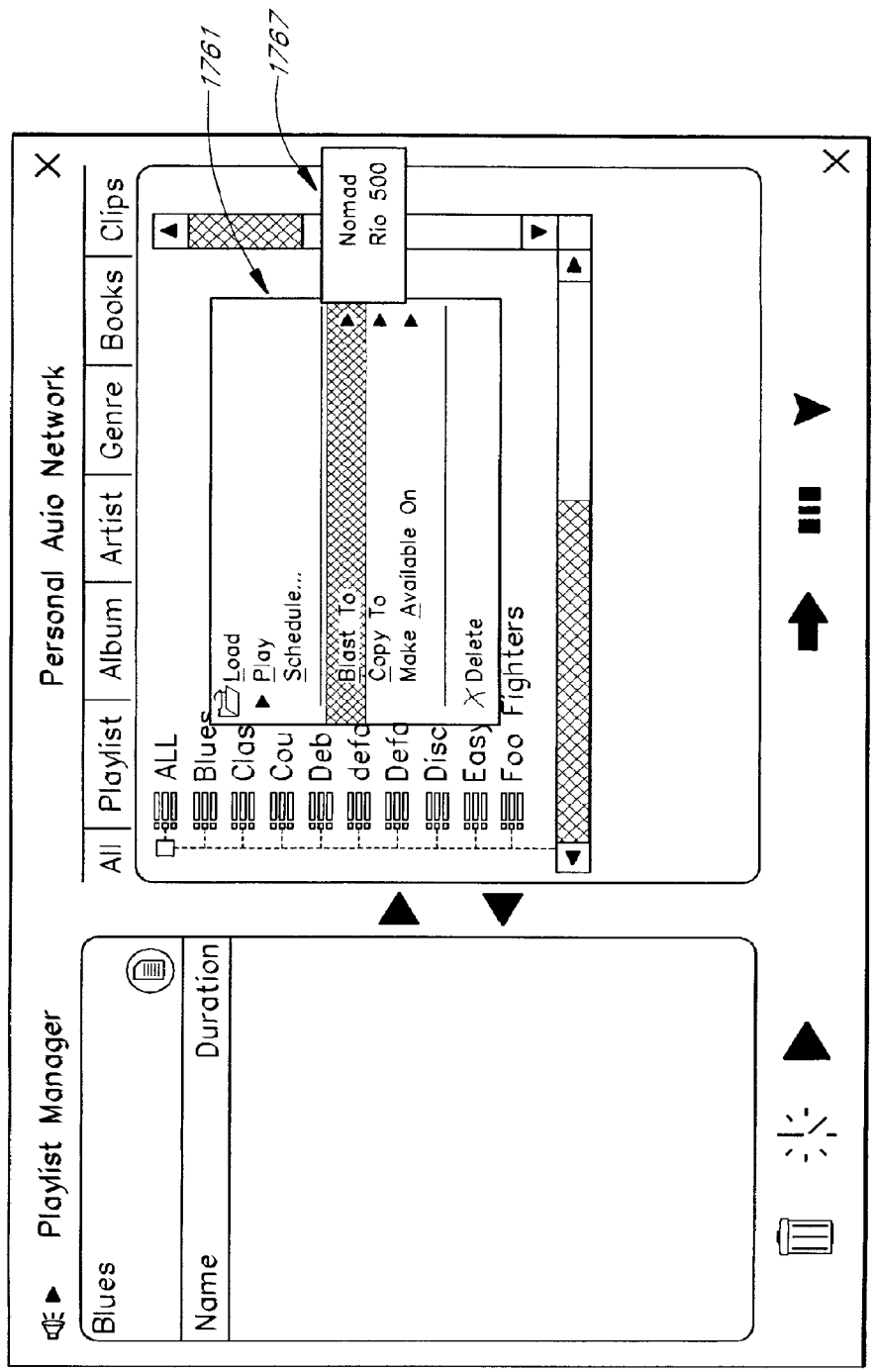
FIG. 17H illustrates the window that appears to allow the user to move audio files from one device to another device.
Figure 171:
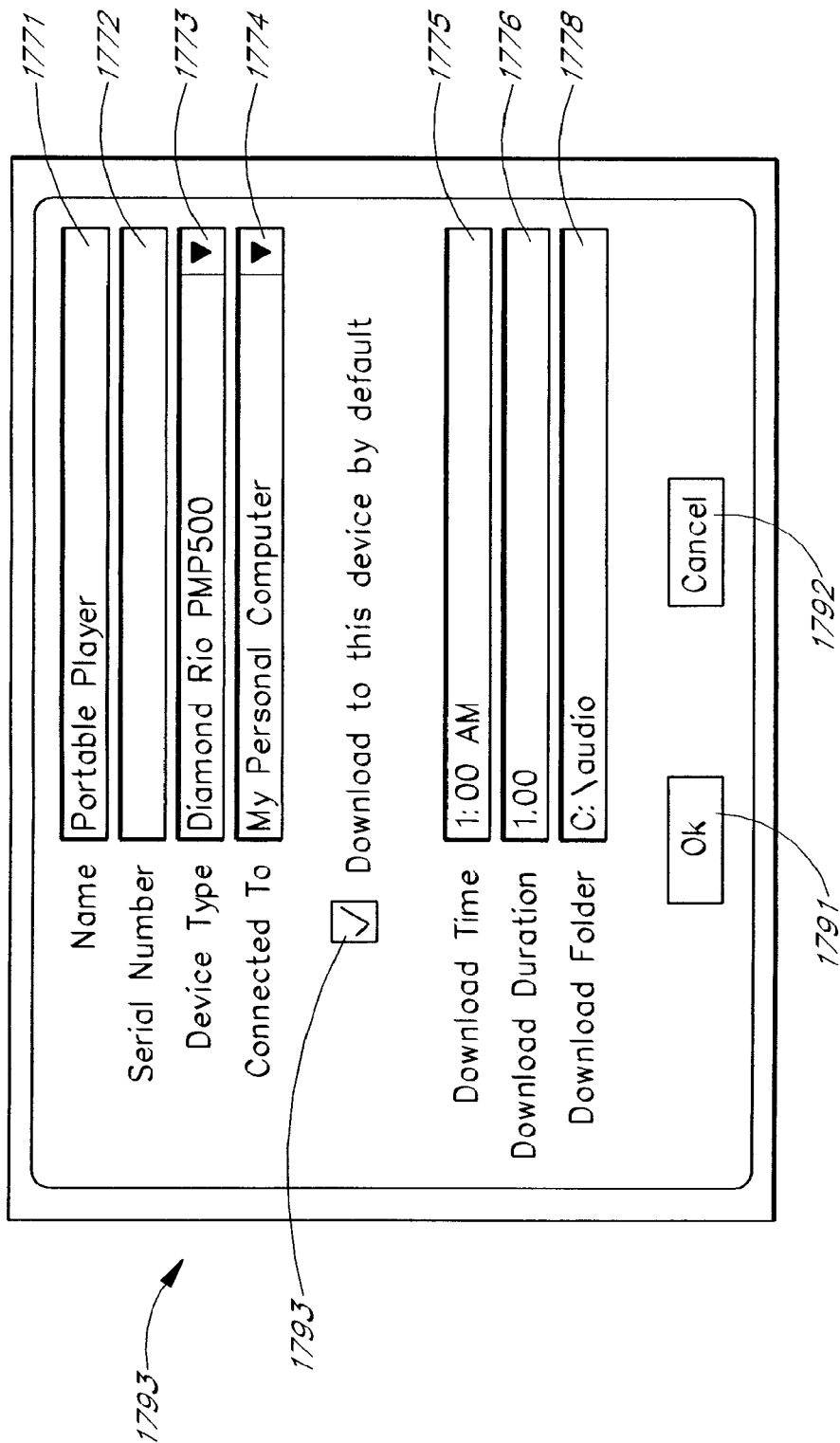

FIG. 17H shows how the user can choose to "blast" a playlist of the existing audio files from a device, such as a portable player, and replace them with a new playlist in one easy process. In other words, the user can delete the existing audio files from a playlist without deleting the playlist name and substitute new audio files for the old audio files. After the user selects a song, the user right-clicks on the song to open a window 1766 with the option "Blast To." When the "Blast to" menu item is selected, a popup menu 1767 appears to provide the user with a list of devices that the music can be "Blasted" to. Devices such as the network-enabled audio devices 1200 and 1300, PC's, portable players, etc. can be "Blasted" to.

FIG. 17I illustrates a pop up window 1779 for adding a device to the IPAN. A plurality of fields 1771-1774 and a plurality of fields 1775-1778 are provided to allow the user to enter information concerning the new device to be added. The user enters the name of the new device to be added in the field 1771; the serial number of the device in the field 1772; the device type of the new device in the field 1773, the connection point in the field 1774; the time to automatically download to the new device in the field 1775; the maximum time for download duration in the field 1776, and a folder for receiving files in the field 1778. In addition an OK button 1791 and a Cancel button 1792 are provided. Finally, there is a download box 1793 that is checked to have new files and updates automatically downloaded to the device when it is connected to the IPAN 1100. A device can become a dedicated MP3 server by downloading files to the device every time an audio file is downloaded to any other device.

The user selects the type of device in the field 1773 from a list of devices supported by the IPAN 1100. The user may have more than one type of device in the IPAN 1100. Therefore, the user can enter a name in the field 1771 and the serial number in the field 1772 to distinguish similar devices. If the user designates a portable device, the device which the portable device will be connected to is entered in the field 1774 to provide the IPAN with information about how to access the portable device. The download time is entered in the field 1775 to provide the IPAN with the time when the user would like the device to automatically download. The default time is set to early morning (e.g. between midnight and 5 a.m.) because that is the time when the least amount of people are on the telephone and the Internet. The download duration is entered into the field 1776 to provide a maximum time limit for download duration if desired. The default is unlimited, but the user can set a maximum time so that if the download is not finished within the time limit, the device signs off. Before signing off, the current task will be completed. In other words, if the maximum time is exceeded in the middle of downloading the third song in a download of ten songs, the task of downloading the third song will be completed. The download will continue where it left off upon initiation of the next download command. In the previous example, the download will continue at the fourth song. Finally, the server site IPAN software 1433 will automatically install downloaded files in a designated folder unless the user specifies a different location in the field 1778.

Figure 18A:
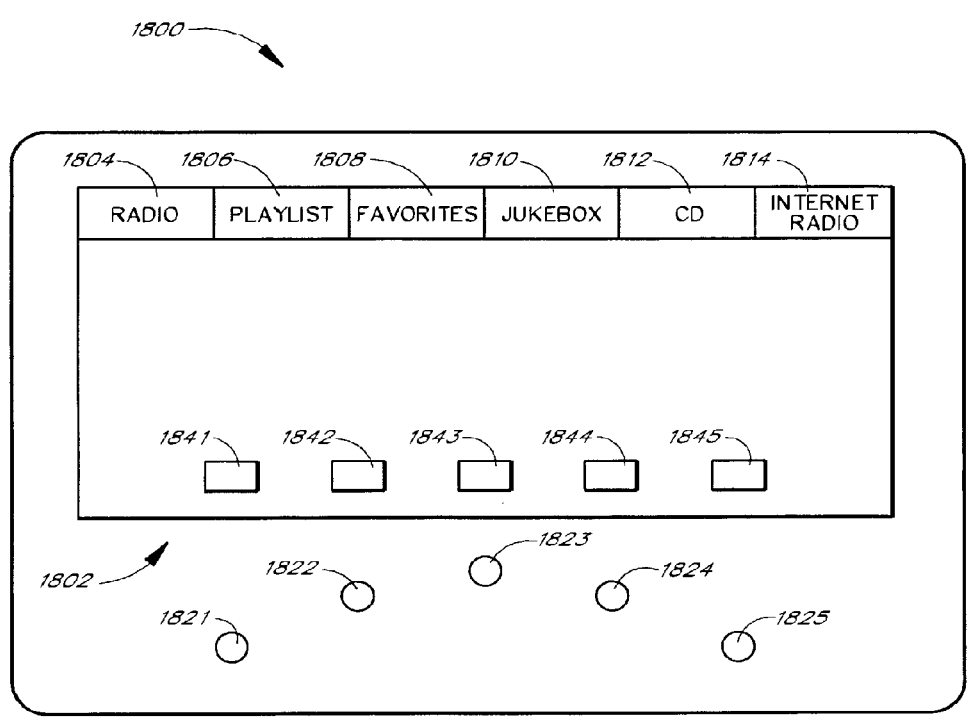
FIG. 18A shows a default display of the network-enabled audio device, as shown in FIGS. 12A, 12B, 13A, and 13B.

FIGS. 18A through 18H illustrate the use of the display 1800 on the network-enabled audio device. In FIG. 18A, the screen display 1802 includes a "Radio" menu item 1804, a "Playlist" menu item 1806, a "Favorites" menu item 1808, a "Jukebox" menu item 1810, a "CD" menu item 1812, and an "Internet Radio" menu item 1814. Residing in the lower portion of the display 1800, the menu buttons 1821-1825 are in the group of menu buttons 1212 and are provided to correspond to icons 1841-1845 residing in the lower portion of the display 1800. Each one of the icons 1841-1845 represents a different function to be performed with respect to a selected audio source.

The user selects items from the screen display 1802 by using the shuttle control 1214 and the enter button 1216. For example, to select the "CD" audio source, the user presses right shuttle control 1264 until the "CD" menu item is highlighted. The user then presses the enter button 1216. Once an audio source is selected, context sensitive icons 1841-1845 appear above the corresponding menu buttons 1821-1825. Depending on the chosen audio source, the icons 1841-1845 represent different functions.

Figure 18B:
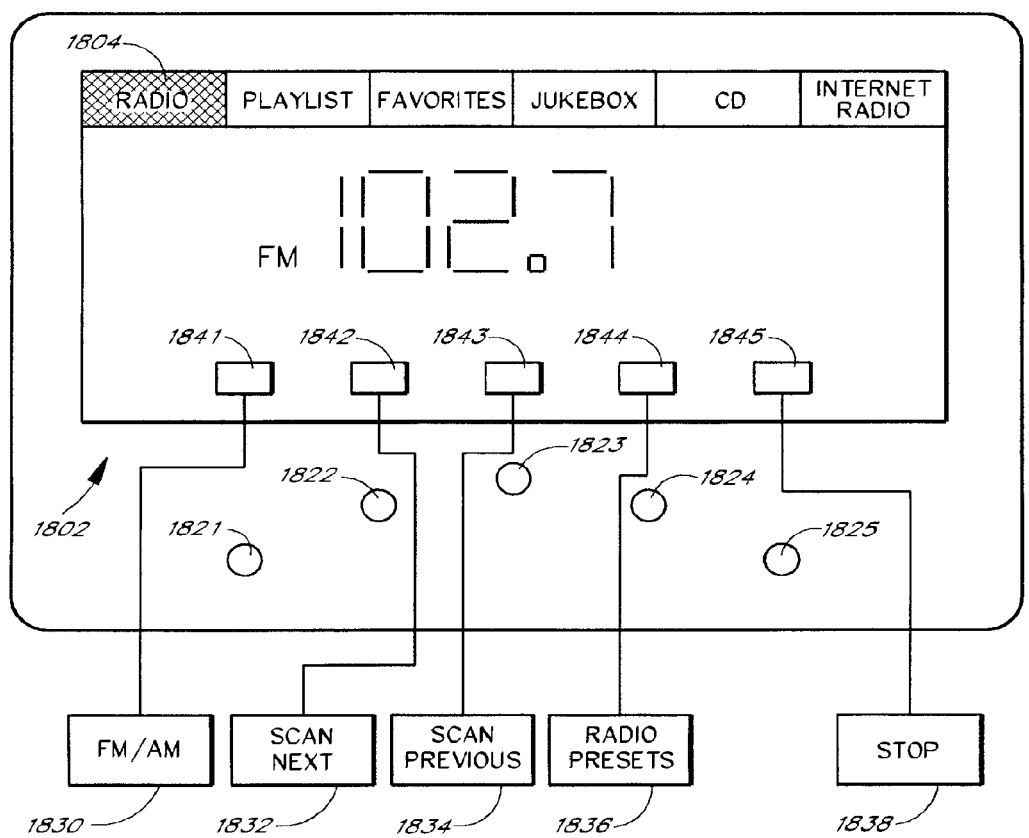
FIG. 18B shows a display for allowing a user to operate the radio functions of the network-enabled audio device, as shown in FIGS. 12A, 12B, 13A, and 13B.
Figure 18C:
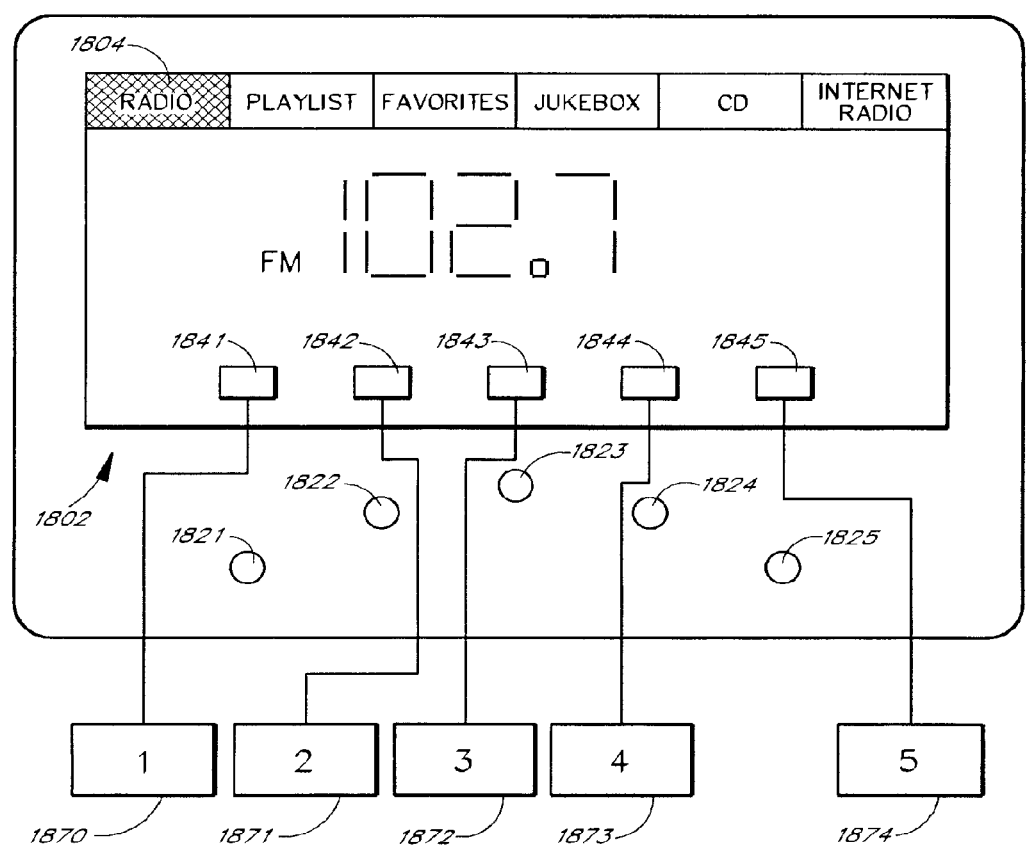
FIG. 18C shows a display for allowing a user to use preset radio stations of the network-enabled audio device, as shown in FIGS. 12A, 12B, 13A, and 13B.

FIG. 18B illustrates the screen display 1802 when the audio source is an AM/FM radio, such as the AM/FM "Radio" menu item 1804. The menu item 1804 is highlighted to indicate that the AM/FM "Radio" audio source has been chosen. The menu buttons 1821-1825 change context to correspond to icons that represent functions related to the audio source selected. Because the AM/FM "Radio" audio source was selected, the menu buttons 1821-1825 change context to correspond to the icons for an AM/FM tuner. The icons 1841-1845 shown as, respectively, a play icon 1841 corresponding to a play function 1830, a scan next icon 1842 corresponding to a scan next function 1832, a scan previous icon 1843 corresponding to a scan next function 1834, a radio presets icon 1844 corresponding to a radio presets function 1836, and a stop icon 1845 corresponding to a stop function 1838. As further illustrated in FIG. 18C, if the menu button 1823 corresponding to the icon 1844 representing the radio presets function 1836 is pressed, the menu buttons 1821-1825 change context to correspond to icons 1841-1845 which represent the choice of preset stations with each of the functions 1870-1874 corresponding to a different radio station. In one embodiment, the radio source menu option 1804 is omitted.

Figure 18D:
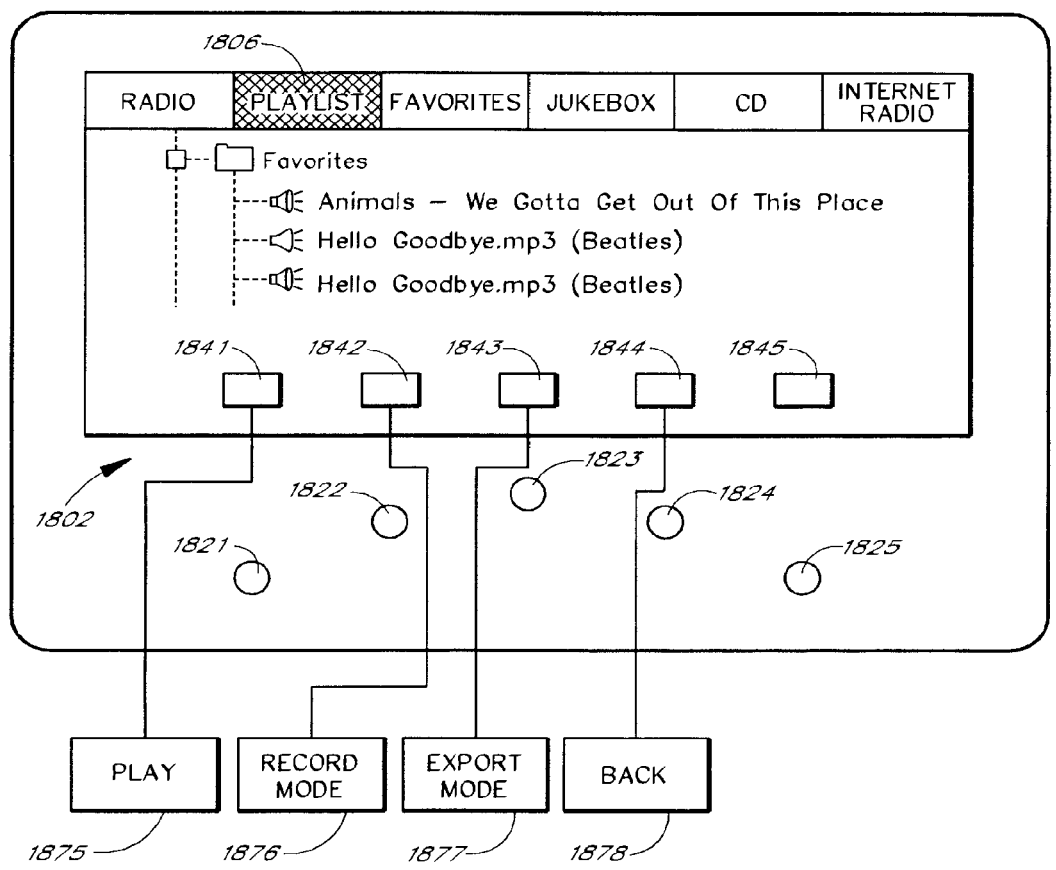
FIG. 18D shows a display for allowing a user to play a playlist stored on the network-enabled audio device, as shown in FIGS. 12A, 12B, 13A, and 13B.
Figure 18E:
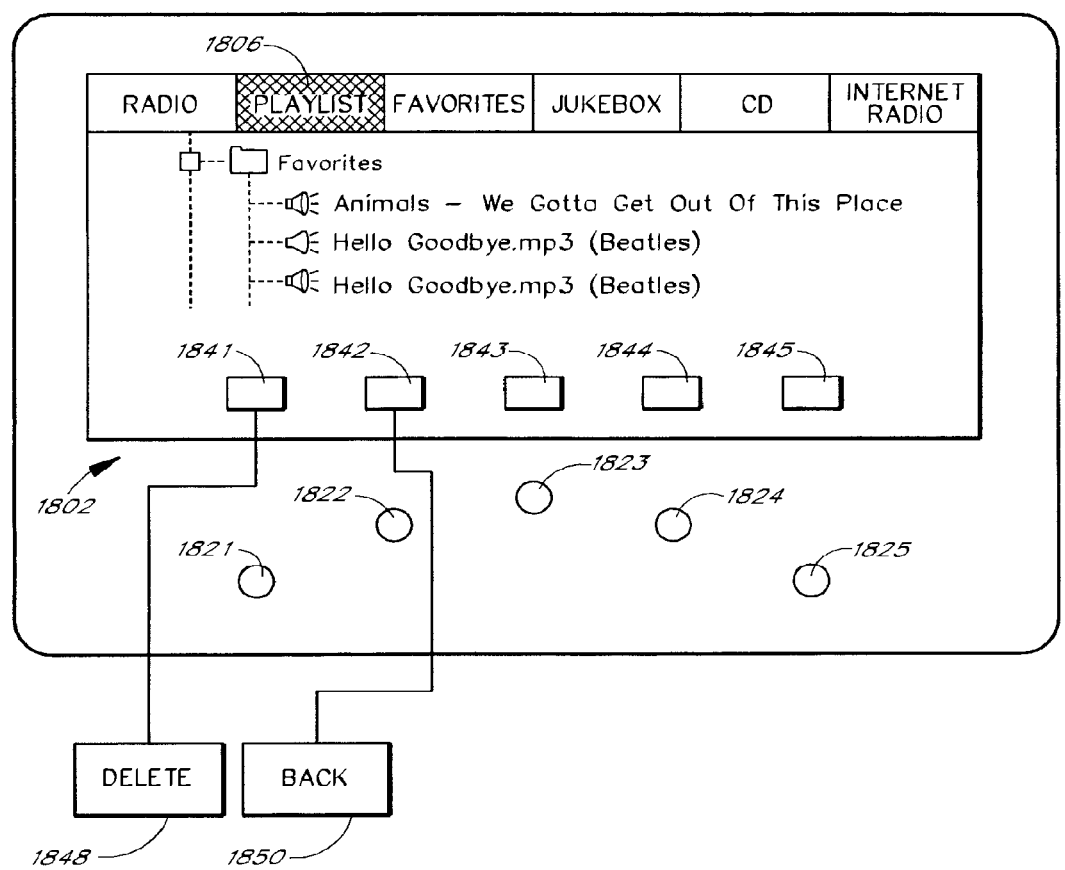
FIG. 18E shows a display for allowing a user to delete a song from a playlist stored on the network-enabled audio device, as shown in FIGS. 12A, 12B, 13A, and 13B.

FIG. 18D shows the screen display 1802 after the user has selected the Playlist menu item 1806. The menu buttons 1821-1825 are used to select from various playlist icons 1841-1845. The icons 1841-1845 shown as, respectively, a play icon 1841 corresponding to a play function 1875, a record icon 1842 corresponding to a record function 1876, an export icon 1843 corresponding to an export function 1877, and back to previous menu icon 1845 corresponding to a back to previous menu function 1878. The shuttle control 1214 and the enter button 1216 are used to select a song from the playlist in order to play. The record function 1876 will record a playlist to the network-enabled audio device's storage device 1510. The export mode downloads the playlist to a portable player. After a song is chosen from a playlist in FIG. 18D, FIG. 18E shows the menu buttons 1821 and 1822 changing context to correspond to icons 1840 and 1841. The icons 1841 and 1842 are shown as, respectively, a delete icon 1841 corresponding to a delete function 1848 and a back to previous menu icon 1850 corresponding to a back to previous menu function 1850.

Figure 18F:
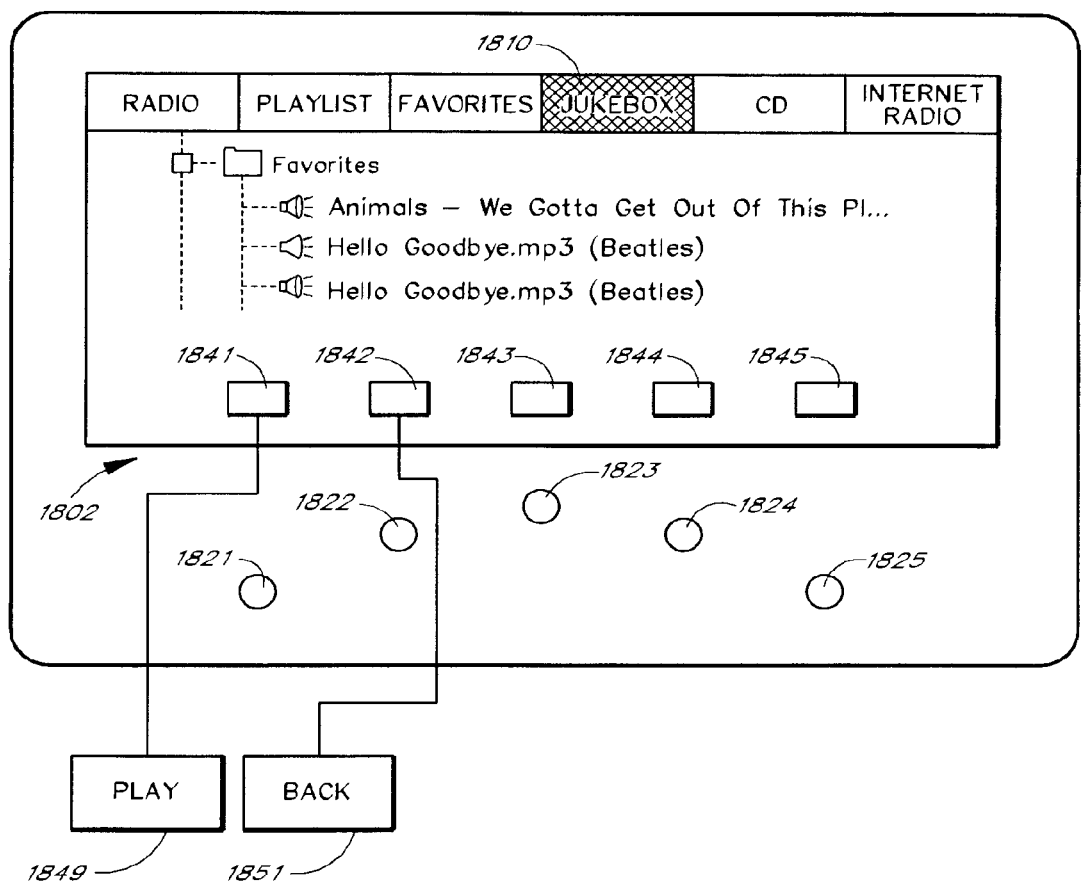
FIG. 18F shows a display allowing a user to play the songs from all the playlists stored on the network-enabled audio device as shown in FIGS. 12A, 12B, 13A, and 13B.

FIG. 18F illustrates the Jukebox audio source 1810, which provides a listing of all the audio files stored on the hard drive 1512 of the network enabled audio device 1510 by Title, Artist, Album, or Genre. The menu buttons 1821 and 1822 change contexts to correspond go icons 1840 and 1841. The icons 1841 and 1842 are shown as, respectively, a play icon 1849 corresponding to a play function 1849 and a back to previous menu icon 1851 corresponding to a back to previous menu function 1851.

Figure 18G:
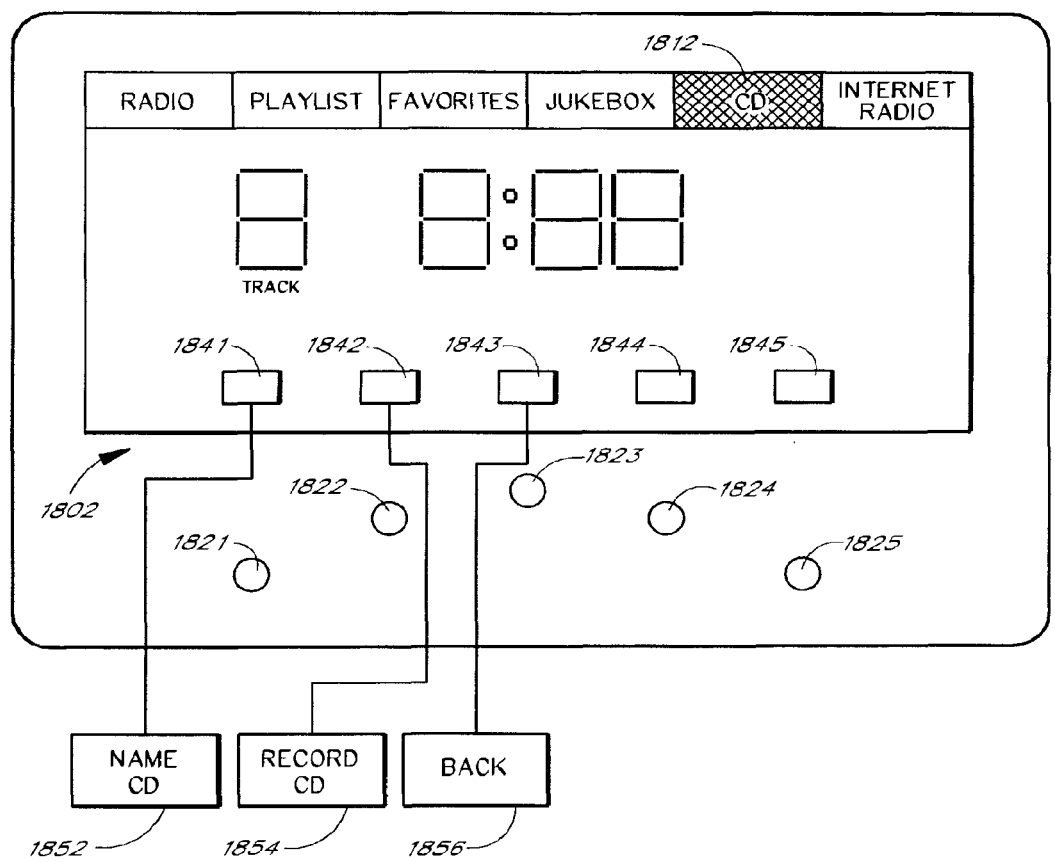
FIG. 18G shows a display for allowing a user to collect information about a CD and copy a CD to the internal hard drive of the network-enabled audio device shown in FIGS. 12A, 12B, 13A, and 13B.

FIG. 18G illustrates the CD audio source 1812 being selected. The menu buttons 1821-1823 change context to correspond to icons 1841-1843. The icons 1841-1843 are shown as, respectively, a Name CD icon 1841 corresponding to a Name CD function 1852, a Record CD icon 1842 corresponding to a Record CD function 1854, and a back to previous menu icon 1843 corresponding to a back to previous menu function 1856. The Record CD function 1854 can be used to copy tracks from a CD to the hard drive 1512 for future use in playlists. The Name CD function 1852 is used to retrieve a title name for a track and other information via the Internet from a CD database site after the Record CD function 1854 has been used to copy the CD to the hard drive. In one embodiment, an online database is checked via the Internet.

Figure 18H:
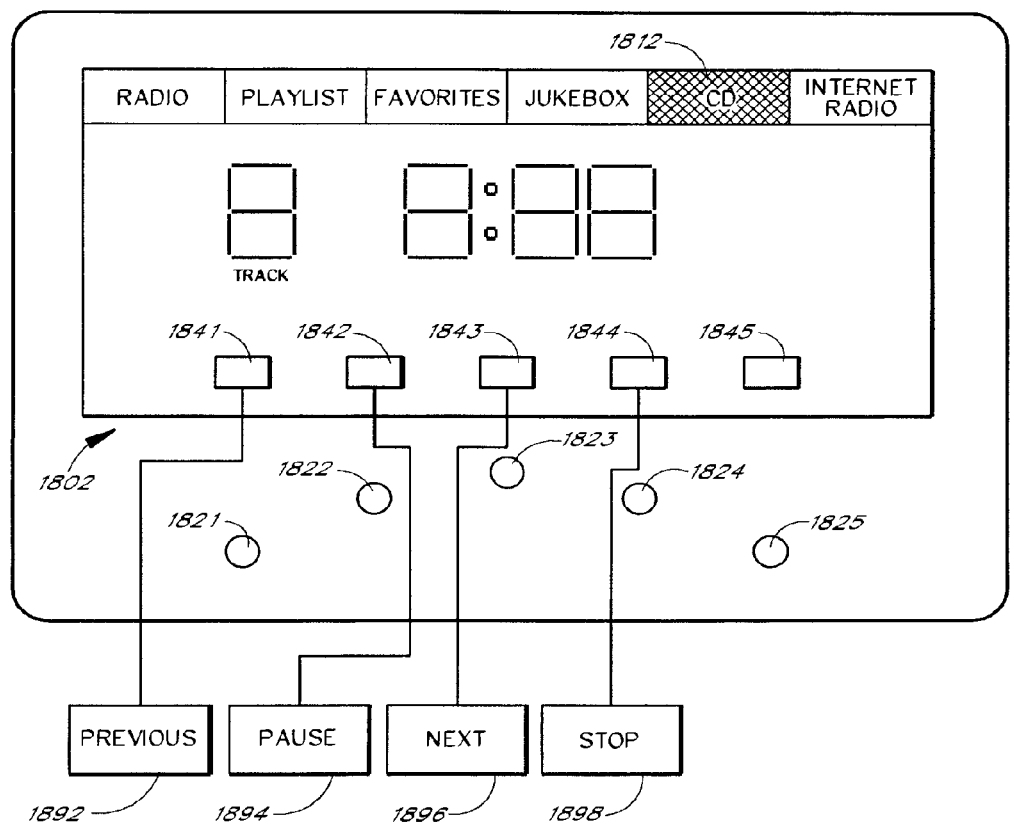
FIG. 18H shows a display that allows a user to play and navigate through the audio stored on the CD.

In FIG. 18H, when the CD player is being played, menu buttons 1821-1825 change context to correspond to icons 1841-1844. The icons 1841-1845 are shown as, respectively, a previous track icon 1841 corresponding to a previous track function 1892, a pause icon 1842 corresponding to a pause function 1894, a next track icon 1843 corresponding to a next track function 1896, and a stop icon 1844 corresponding to a stop play function 1898.

FIG. 19A is a flowchart that illustrates an audio query process 1900 of the IPAN 1100. The audio query process 1900 begins at start block 1940 where the PC IPAN client software 1532 is opened. In one embodiment, a portion of the PC IPAN client software 1532 is part of the "active tray" so that when a user turns the PC 1508 on, the PC IPAN client software 1532 is opened. Further, a portion of the PC IPAN client software 1532 is part of the IPAN plug-in so that when an Internet or other network connection is established, the PC IPAN client software 1532 runs in the background to query whether to add an audio file found on the Internet to the server site IPAN 1104. The process advances to a process block 1942 where the user finds a desired audio file as addressed by a URL. The user can search the Internet for audio without having to access the web site associated with the server site 1502. In a decision block 1944, the user is asked, through a menu, if the file is to be downloaded. If the process advances to a process block 1948, the user has decided to download the file now and the playlist is added to the IPAN 1100. At a process block 1950, the file has been downloaded and is available for playing. If the user decides "NO" (i.e. to download the file at a later time or at the default time) the process advances to a process block 1946 to download the file at that default or more convenient time. The process then advances to a process block 1948 when the file is added to the IPAN 1100. The web site associated with the server site 1104 does not have to be opened. The PC IPAN client software 1532 will download the software to the hard drive of the PC 1508 and connect to the web site associated with the server site 1508 to upload the audio files. At the final process block 1950, the audio files will be available for playing.

FIG. 19B is a flowchart 1900 that begins at start block 1902 and illustrates the assignment of playlists to devices. The process advances from the start block 1902 to a process block 1904 where the user logs into the server site IPAN 1433. The process advances to the next process block 1908 where the user assigns a playlist to a first device 1510. In one embodiment, the playlist is stored in an SQL database and accessed via active server pages. After the active server pages access the SQL database, the playlist is downloaded to the first device 1510. The process then advances to a decision block 1908 where the process checks to see if all the songs in the playlist are stored in the first device's hard drive 1512. If all the songs in the playlist are already on the first device 1510, the songs on device 1510 are catalogued as being present. If songs need to be downloaded, the server site IPAN 1433 forms a list of remaining songs. In the next process block 1910, the server site IPAN 1433 compares the list of remaining songs to its records of the songs present on the device 1520 to see if the device 1520 has some of the necessary songs to complete the playlist formation. If the second device 1520 does have some of the remaining songs, the URLs of those songs, which are stored on the Server site IPAN, are provided to the first device 1510. The remaining songs which the second device 1520 does not have are deleted from the list of remaining songs and do not become part of the playlist. In the next process block 1914, the first device 1510 will download the songs from the URLs provided to it by server site IPAN 1433. The first device 1510 downloads all of the remaining songs needed for the playlist from the second device's 1520 URL's, but if all the songs are not on the second device's 1520 playlist, the first device 1510 will either get them from another device or in the worst case compose a playlist from only the songs that could be retrieved.

In the decision block 1916, the process determines if any URLs are broken. If A is unable to download the files from the URLs, the server site IPAN 1433 will upload the files to the server site in process block 1920, store the files in the interim, and download the files to the first device 1510 in process block 1922 the next time the first device 1510 calls in. For instance, the first device 1510 can be located on the east coast, and the second device 1520 can be located on the west coast. The first device 1510 may be assigned a playlist that is stored on the disk drive 1522 of the second device 1520. When the first device connects (e.g., at 2 a.m.) to the server site IPAN 1433, the first device will receive the URL's for the location where the second device 1520 downloaded the audio files and now the first device 1510 can download the audio files. If the URLs are broken, the first device 1510 will disconnect. When the second device 1520 calls in three hours later at 2 a.m. Pacific Time, the server site IPAN 1433 will upload the audio files to the server site 1104 and store the files on the disk space 1506. When the first device 1510 connects at 2 a.m. the following evening, the audio files will be ready to download from the server site 1104 to the first device 1510. The audio files will finally be stored on the disk space 1512.

At process block 1922, the songs that are present on the device 1510's storage space, the songs that have been downloaded from URL's to the device 1510, and the songs that have been uploaded to the device 1520 are catalogued in the IPAN 1100. In one embodiment, the songs are catalogued in the IPAN 1100 at the time that they are found. For instance, the songs that are on the device 1510's hard drive found at the process block 1908 can be catalogued in the IPAN 1100 at that time rather than at process block 1922. Further, the songs downloaded from URL's can be catalogued at process block 1916 or decision block 1916. Finally, the songs uploaded from the device 1520 can be catalogued at the time of uploading at process block 1918 or at the time of downloading at process block 1920. Optionally, delays in cataloguing can be used. In one embodiment, for example, the uploaded songs and the downloaded songs are all catalogued at process block 1920 whereas the songs present on the device 1510's storage space are catalogued at the decision block 1908.

FIG. 19C is a flowchart 1980 that illustrates another embodiment of the process of flowchart 1900. In one embodiment, the flowchart 1980 has process and decision blocks that handle an assignment of a playlist that includes songs not present on the device 1510. The process advances from the start block 1902 through 1908 in the same fashion as the process in flowchart 1900. In contrast to the process in flowchart 1900, the process then advances to decision block 1990 rather than 1910. At decision block 1990, if songs need to be downloaded, the server site IPAN 1433 checks its records to see if the device 1520 has all the necessary songs on the list of remaining songs to complete the playlist formation. If the device 1520 has none or some but not all of the necessary songs, the process advances to a process block 1950. At the process block 1950, the necessary songs that are not present on the device 1520 are catalogued in the new playlist with empty cone icons next to those songs. Optionally, the icon can be a symbol other than an empty cone. The playlist is not yet completely formed and will have additions of songs that are present on the device 1520 at a later point in the process. The process then advances to a process block 1952 and deletes songs that the device 1520 does not have from the list of remaining songs. The process then advances to decision block 1954 to determine if the list of remaining songs is empty. If the list of remaining songs is empty, then the process advances to process block 1922 where the songs present on the device 1510's storage space 1512 are catalogued in addition to the missing songs that are catalogued. In one embodiment, cataloguing does not include multiple entries for songs determined to be present at an earlier time. For instance, if a song is present on a device and is catalogued once as being present on the device, a multiple entry for the song being present on the device will not be made at a subsequent iteration of the process. If the list of remaining songs is not empty, the process advances to the process block 1912. At the process block 1912, the process in the flowchart 1980 proceeds in the same fashion as the process in flowchart 1900 until the process advances to the process block 1922. After all the songs (including the missing songs) are catalogued at the process block 1922, the process advances to the process block 1960 where the list of remaining songs is deleted. At the process block 1962, if the playlist does not contain any songs with an empty cone icon, the playlist is complete and the process advances to the end process block 1924. If the playlist contains any songs with an empty cone icon, the process advances to the decision block 1964 to allow the user to delete the missing songs. If the user deletes the missing songs, the playlist is complete, and the process advances to the end process block 1924. If the user decides not to delete the missing songs, a new list of remaining songs is created consisting of the missing songs not deleted by the user. The process then advances to the decision block 1990.

At the decision block 1990, if the device 1520 initially had all the remaining songs on the playlist, the process 1980 proceeds in the same fashion as the process 1900. In one embodiment, if the process advanced from the process block 1966 rather than 1908, the missing songs have been added to the storage space 1522 of the device 1520 so that the playlist can now be complete. The process advances through iterations until all the songs present on the playlist are present on the storage space 1512 of the device 1510 or until the user deletes songs from playlist so that no missing songs are present. In one embodiment, the process advances from the process block 1966 to the decision block 1908 in order to check whether the missing songs have been added to the storage space 1512 of the device 1510 or the storage space 1522 of the device 1520 so that the playlist can now be complete.

In one embodiment, the IPAN 1100 includes a network connection so that the first device 1510 and the second device 1520 can have audio files downloaded from the first device 1510 to the second device 1520 almost instantaneously after the assignment of an audio file to the device 1510. For example, in a home network, the device 1510 does not need to connect to the Internet and can retrieve the necessary file through the network connection.

FIGS. 20A-20F illustrate the use of the action button 1210 on the network-enabled audio devices 1200 or 1300. FIG. 20A illustrates the screen display 1802 before the action button 1210 has been pressed. In one embodiment, the action button 1210 can be pressed when an audio source (e.g. an audio source in MP3 file format) with an unidentified artist is playing. Optionally, the action button 1210 can be pressed when an audio source in MP3 file format with an identified artist is playing. Optionally, the action button 1210 can be pressed for audio sources such as, for example, streaming audio, files in WMA file format, CDs, etc. The menu buttons 1821-1825 represent the functions that can be performed on the given audio source before the action button 1210 is pressed. For an MP3 file, for example, the menu buttons 1821-1825 correspond to a "pause" function, a "next" function, a "previous" function, an "add favorites" function, and a "stop" function. After the action button 1210 is pressed, the menu buttons 1821-1825 change context to perform functions that provide additional information on the given audio source and artist. Further, after the action button 1210 is pressed, the artist will no longer be shown as "unknown" because the audio source will be uploaded to a server for analysis to determine the identification of the artist. The server will download the identity of the artist in addition to other information concerning the audio source.

FIG. 20B illustrates the screen display 1802 after the action button 1210 has been pressed. The "unknown" artist in FIG. 20A has been determined to be "Moby," and the unidentified MP3 file has been identified as "Porcelain." The menu buttons 1821-1825 correspond to menu items that provide information on, or related to, the audio source. A title menu 2002 is provided to indicate the location in the directory of action button options that the user has chosen.

If the user is at the beginning of the action button directory structure, the screen display 1802 illustrates the text "action" in the title menu 2002.

The menu buttons 1821-1825 correspond to the menu items "news," "music," "tour," "offers," and "done." By choosing the menu item "news," information will be presented to the user of current events regarding the artist and/or the given audio source. For instance, the "news" function can display Billboard top 40 information, clothing lines introduced by the artist, new albums, etc. The menu button 1822 corresponding to the "music" menu item provides the user access to other audio sources from a given artist. The menu button 1823 corresponding to the "tour" menu item allows the user to get up-to-date information on tours that the artist is going on. The menu 1824 corresponds to the "offers" menu item which allows the user to receive information on merchandise, promotional items, etc. for the given artist. The menu button 1825 corresponding to the "done" menu item allows a user to turn off the action button 1210.

FIG. 20C illustrates the screen display 1802 after the menu item "music" has been chosen. The menu path 2204 lists "action" to indicate to the user that the menu title "music" 2202 was a menu item chosen from the menu items illustrated in the screen shot denoted by the menu title "action." The menu buttons 1821-1825 correspond to the menu items "albums," "similar," "samples," "back," and "done." If the user selects the "albums" menu item the user will be able to view a list of other albums by the artist of the audio source. In one embodiment, the server downloads the albums listing when the action button 1210 is pressed for the first time. Optionally, the server downloads additional information after the user selects one of the menu buttons 1821-1825. When the user presses the menu button 1822, the "similar" menu item is chosen and a listing of albums that are from a genre of music similar to that of the audio source or from artists that are in some way similar to the artist of the audio source is presented. If the "similar" menu item is performed on Moby and "Porcelain," a list of techno songs from Moby and/or techno songs from other artists can be presented. If the user presses the menu button 1823 corresponding to the "samples" menu item, audio samples from the artist will be presented. If the user presses the menu button 1824 corresponding to the "back" menu item, the location illustrated in the menu title is returned to. If the user presses the menu button 1825 corresponding to the "done" menu item, the action button 1210 is turned off.

FIG. 20D illustrates the screen display 1802 after the menu item "albums" has been chosen. The menu path 2204 lists "action/music" to indicate to the user that the menu title "albums" 2202 was a menu item chosen from the menu items illustrated in the screen shot denoted by the menu title "music." The menu buttons 1821-1824 correspond to different albums for the given artist. FIG. 20D illustrates four of Moby's albums: "Moby," "Ambience," "Everything is Wrong," and "Animal Rights." The menu button 1825 corresponds to the "done" function which allows the user to turn the action button 1210 off.

FIG. 20E illustrates the screen display 1802 after the menu item "Ambient" is chosen on the screen display 1802 illustrated in FIG. 20D. The menu path 2204 action/music/albums shows that "Ambient" was chosen from the menu title "albums" 2202. The menu item "buy" is chosen to purchase the album "Ambient." The menu item "download" is chosen to download the "Ambient" album. The menu item "listen" is pressed to allow the user to listen to the album. The menu item "back" allows the user to access the previous menu title. To reach the screen shot with the menu title "albums" from the menu title "Ambient," the user chooses the "back" menu item. The user can turn the action button off by pressing the "done" menu item.

FIG. 20F illustrates the screen display 1802 after the user determines to buy the album illustrated in FIG. 20E. The menu path action/music/albums/buy indicates that the user chose the "buy" menu item in FIG. 20E. The title menu 2202 "complete" is used at the end of the transaction. The menu item "buy" can be chosen to allow the user to complete the transaction. To reach the screen shot with the menu title "Ambient" from the menu title "Complete," the user chooses the "back" menu item. The menu button 1825 corresponds to the menu item "done" which allows the user to turn the action button 1210 off.

In FIG. 20B, if the menu item "news" is chosen by the user, the subsequent screen will display the menu path "action," the menu title "news," and the menu items: "listen," "read," "log to myactions," "back," "done." If the user chooses the menu item "read," a subsequent screen displays the menu path "action/news," the menu title "read," and the menu items "log to myactions," "back," and "done." If the user chooses the menu item "log to myactions," information about a particular artist or a particular audio source will be stored in a log for future reference. The displayed menu path will be "action/news/to myactions," the menu title will be "complete," and the menu items will be "back" and "done."

If instead of reading the news, the user would like to listen to the "news," the "listen" menu item can be chosen in the screen displaying the "action" menu path and the "news" menu title. The next screen will display the "action/news" menu path and the "listen" menu title. The screen will also alert the user as to the status of the retrieval of the news. The menu items include "log to myactions," "back" and "done."

In FIG. 20C, the user can choose the menu item "samples" so that the next screen displays the menu path "action/music," the menu title "samples," and the menu items which include different audio source samples. After the user chooses a sample from the menu items of samples, a screen displays the menu path "action/music/samples," the title menu "Ambient," and the menu items "buy," "download," "listen," "back," and "done." If the user chooses to select the "buy" menu item, the next screen displays the menu path "action/music/samples/buy," the menu title "complete," and the menu items "back," and "done."

In FIG. 20B, if the user decides to select the menu item "tour," the next screen will display the menu path "action," the menu title "tour," and the menu items "appearing," "log to myactions," "back," and "done." If the user selects the menu item "appearing," the next screen will display a location or locations of tours for the given artist. For example, when the user presses "tour" for "Moby," the screen can display "Dec. 13, 2000 Verizon Amphitheater Irvine Calif." The screen will also display the menu title "appearing" and the menu items "log to myactions," "back," and "done." If the user selects the "log to myactions" menu item, the next screen displays the menu path "action/tour/appearing," the menu title "complete" and the menu items "log to myactions," "back," and "done."

In FIG. 20B, if the user selects the "offers" menu item, the next screen displays the menu path "action," the menu title "offers," and the menu items "merch," "special," "back," and "done." If the user selects the menu item "merch," the next screen displays the menu path "action/offers," the menu title "merchandise," and the menu items "item one," "item two," "item three," "back," and "done." If the user selects the menu item "item one," the next screen displays the menu path "action/offers/merchandise," "item one," and the menu items "buy," "log to myactions," "back," and "done." If the user selects "buy," the next screen displays the menu path "action/offers/merchandise/buy," the menu title "complete," and the menu items "buy," "back," and "done." The screen also displays the artist and the item selected. For example, the screen displaying "Moby, Item 1" indicates that the user bought Item 1 by Moby. If instead of buying Item 1, the user wishes to keep a log of Item 1 for future reference, the user can upload that future reference to a server. For instance, in the next screen, the menu path can be "action/offers/merchandise/to myaudioramp." The menu title is "complete," and the menu items are "back" and "done."

In FIG. 20C, if the user decides to choose "similar" music, the next screen displays the menu path "action/music," the menu title "similar," and the menu items that include audio sources similar to that of the artist with the given audio source. Menu items that can appear on the screen for "Moby," for example, are "808 state," "air," "aphex," "back," and "done." If the user decides to select the menu item "808 state," the next screen displays the menu path "action/music/similar," the menu title "808 state," the menu items "buy," "download," "listen," "back," and "done." If the user decides to buy "808 state," the next screen displays the menu path "action/music/similar/buy," the menu title "complete," and the menu items "back" and "done."

In FIG. 20C, if the user decides to select the menu item "samples," the next screen displays the menu path "action/music," the menu title "samples," and the menu items that include audio source samples of the given album. The menu items for "Moby" can include "Moby," "Ambient," "Everything is Wrong," "Animal Rights," and "done,"

In FIG. 20C, if the user selects the menu item "similar," the next screen displays the menu path "action/music/similar," the menu title "listen," and the menu items "back" and "done." The user can also choose to download the similar music. The next screen displays the menu path "action/music/similar," the menu title "download," and the menu items "back" and "done."

In FIG. 21, after the action button 1210 is pressed, the audio-enabled device 1200 or 1300 can at times play advertisements. For a Nike advertisement, the text "Nike" would be displayed on the first line of the screen. The text of the advertisement, such as "radio free Sydney, air max knukini offer," can be displayed underneath the "Nike" text. The menu title "action" 2002 is displayed and the menu items "buy," "log to myactions," "more info," "offers," and "done" are displayed. If the user decides to buy the products offered in the advertisement, the next screen displays the menu path "action/buy," the menu title "complete," the menu items "back" and "done," and the advertisements are displayed. If the user decides instead to store the offer for a future reference, the menu path "action/to myaudioramp" is displayed in addition to the menu title "complete," and the menu items "back" and "done" are displayed. If the user wishes to receive more information, the "more info" menu item can be chosen. The menu path "action/more info," the menu title "more info," and the menu items "buy," "log to myactions," "offers," and "done" are displayed.

While the above description contains many specifics, these should not be construed as limitations on the scope of the invention, but rather as an exemplification of preferred embodiments thereof. The various user controls and buttons can be relocated, combined, reconfigured, etc. Most of the user controls and buttons can even be omitted entirely in favor of voice-activated commands. One skilled in the art will recognize that many of the various features, and capabilities described in connection with the intelligent radio 100, are also applicable to other embodiments as well, including the embodiments described in connection with FIGS. 7-10 and the network-enabled audio device in FIGS. 13A-21. One skilled in the art will also recognize that other embodiments are contemplated, including, for example, handheld intelligent radios, and intelligent radios for boats, cars, trucks, planes, and other vehicles, etc.

One skilled in the art will recognize that these features, and thus the scope of the present invention, should be interpreted in light of the following claims and any equivalents thereto.

What is claimed is:

1. An electronic media player device comprising:
   a transceiver to wirelessly send and receive communications;
   a memory;
   a control system connected to the memory and the transceiver and adapted to:
      receive a command to log into an account before receiving a playlist identifying a plurality of songs, wherein the playlist defines a sequence for playing the identified plurality of songs;
      receive and display the playlist, according to the defined sequence by default, in a menu with context sensitive icons representing different functions;
      receive and display information associated with an artist from a currently playing song of the plurality of songs in the playlist;
      receive and display information on a related song that is from a genre similar to that of the currently playing song;
      receive and display advertising; and
   at least one speaker to play the plurality of songs.

2. The electronic media player device of claim 1, wherein the playlist is a list referencing media items arranged to be played in the sequence.

3. The electronic media player device of claim 1, wherein the control system is further adapted to play the playlist when triggered by a settable schedule.

4. The electronic media player device of claim 1, wherein the control system is further adapted to change a visual appearance of the menu by customizing a background associated with the menu.

5. The electronic media player device of claim 4, wherein the control system is further adapted to record user activity for data mining purposes and provide the user activity to a remote source.

6. The electronic media player device of claim 5, wherein the control system is further adapted to send a request to a second remote source for supplemental information related to at least one of the plurality of songs in real-time while the at least one song is playing.

7. The electronic media player device of claim 5, wherein the control system is further adapted to receive and display information on merchandise associated with an artist of the currently playing song.

8. The electronic media player device of claim 5, wherein the control system is further adapted to receive input from a wireless remote control and enable navigation of the playlist via the input from the wireless remote control.

9. The electronic media player device of claim 5, wherein the control system is further adapted to display information enabling a playback of a sample of a song from an artist associated with at least one of the plurality of songs in the playlist.

10. The electronic media player device of claim 1, wherein the control system is further adapted to display classifications for the plurality of songs by artist.

11. The electronic media player device of claim 1, wherein the controls system is further adapted to send a request to a remote source for supplemental information related to at least one of the plurality of songs in real time while at least one song is the currently playing song and receiving the supplemental information from the remote source.

12. The electronic media player device of claim 1, wherein the supplemental information comprises information enabling play of at least one sample of the plurality of songs.

13. The electronic media player device of the claim 1, wherein the supplemental information comprises a title of the currently playing song and a name of a currently playing artist.

14. The electronic media player device of claim 1, wherein the control system is further adapted to display at least one song from a currently playing artist.

15. The electronic media player device of claim 1, wherein the control system is further adapted to display popup windows with functions including at least one of volume, shuffle, and repeat.

16. The electronic media player device of claim 1, wherein the control system is further adapted to create a playlist by at least one of an artist, album and genre.

17. The electronic media player device of claim 1, wherein the playlist includes information indicating album art.

18. The electronic media player device of claim 1, wherein the control system is further adapted to:
   receive, at the electronic media player device, information enabling the electronic media player device to request the ones of the plurality of songs from at least one remote source; and
   obtain the ones of the plurality of songs from the at least one remote source.

19. The electronic media player device of claim 1, the control system further adapted to respond to voice commands to control the electronic media player device.

20. The electronic media player device of claim 1, the control system further adapted to respond to voice commands to scroll through the playlist.

21. The electronic media player device of claim 1, wherein the control system is further adapted to display a list of Internet radio stations when in an Internet radio mode of operation.

22. The electronic media player device of claim 1, wherein the context sensitive icons representing different functions includes at least one of a play icon, a shuffle control icon, and a back to previous menu icon.

23. A method comprising:
   receiving a command to log into an account before receiving a playlist identifying a plurality of songs wherein the playlist defines a sequence for playing the identified plurality of songs;
   receiving and displaying the playlist, according to the defined sequence by default, in a menu with context sensitive icons representing different functions;
   receiving and displaying information associated with an artist from a currently playing song of the plurality of songs in the playlist;
   receiving and displaying information on a related song that is from a genre similar to that of the currently playing song;
   receiving and displaying advertising; and
   providing for at least one speaker to play the plurality of songs.

24. A non-transitory computer readable medium storing software for instructing a computing system to:
   receive a command to log into an account before receiving a playlist identifying a plurality of songs wherein the playlist defines a sequence for playing the identified plurality of songs;
   receive and display the playlist, according to the defined sequence by default, in a menu with context sensitive icons representing different functions;
   receive and display information associated with an artist from a currently playing song of the plurality of songs in the playlist;
   receive and display information on a related song that is from a genre similar to that of the currently playing song;
   receive and display advertising; and
   provide for at least one speaker to play the plurality of songs.

* * * * *